US012626833B2

(12) United States Patent
Lukin et al.

(10) Patent No.: US 12,626,833 B2
(45) Date of Patent: May 12, 2026

(54) TOPOLOGICAL QUBITS IN A QUANTUM SPIN LIQUID

(71) Applicants: President and Fellows of Harvard College, Cambridge, MA (US); Massachusetts Institute of Technology, Cambridge, MA (US)

(72) Inventors: Mikhail D. Lukin, Cambridge, MA (US); Vladan Vuletic, Cambridge, MA (US); Markus Greiner, Cambridge, MA (US); Ruben Verresen, Cambridge, MA (US); Ashvin Vishwanath, Cambridge, MA (US); Alexander Keesling Contreras, Cambridge, MA (US); Harry Jay Levine, Cambridge, MA (US); Giulia Semeghini, Cambridge, MA (US); Tout Taotao Wang, Cambridge, MA (US); Ahmed Omran, Cambridge, MA (US); Dolev Bluvstein, Cambridge, MA (US); Sepehr Ebadi, Cambridge, MA (US)

(73) Assignees: President and Fellows of Harvard College, Cambridge, MA (US); Massachusetts Institute of Technology, Cambridge, MA (US)

( * ) Notice: Subject to any disclaimer, the term of this patent is extended or adjusted under 35 U.S.C. 154(b) by 231 days.

(21) Appl. No.: 18/320,708

(22) Filed: May 19, 2023

(65) Prior Publication Data

US 2024/0029911 A1 Jan. 25, 2024

Related U.S. Application Data

(63) Continuation of application No. PCT/US2021/060138, filed on Nov. 19, 2021.

(Continued)

(51) Int. Cl.

*G21K 1/00* (2006.01)
*G06N 10/20* (2022.01)

(Continued)

(52) U.S. Cl.

CPC ............. *G21K 1/003* (2013.01); *G06N 10/20* (2022.01); *G06N 10/40* (2022.01); *G06N 10/70* (2022.01)

(58) Field of Classification Search

CPC ........ G21K 1/003; G06N 10/40; G06N 10/20; G06N 10/70

See application file for complete search history.

(56) References Cited

U.S. PATENT DOCUMENTS 3,872,470 A 3/1975 Hoerz et al.
4,479,199 A 10/1984 Friedlander et al.

(Continued)

FOREIGN PATENT DOCUMENTS

CN 106980178 A 7/2017
EP 1171968 B1 11/2002

(Continued)

OTHER PUBLICATIONS

Adachi et al., "Application of Quantum Annealing to Training of Deep Neural Networks," arXiv.org: 18 pages (2015).

(Continued)

*Primary Examiner* — Nicole M Ippolito

(74) *Attorney, Agent, or Firm* — Wolf, Greenfield & Sacks, P.C.

(57) ABSTRACT

Topological qubits are provided in a quantum spin liquid. In various embodiments, a device is provided comprising a two-dimensional array of particles, each particle disposed at a vertex of a ruby lattice having a parameter ρ greater than (Continued)

$$\frac{1}{\sqrt{2}};$$

each particle having a first state and an excited state; each particle that belongs to at least three unit cells of the ruby lattice having a blockade radius, when in the excited state, sufficient to blockade each of at least six nearest neighboring particles in the ruby lattice from transitioning from its first state to its excited state, and wherein the array has at least one outer edge configured to be in a first boundary condition.

54 Claims, 141 Drawing Sheets

Related U.S. Application Data

(60) Provisional application No. 63/166,165, filed on Mar. 25, 2021, provisional application No. 63/116,321, filed on Nov. 20, 2020.

(51) Int. Cl.
*G06N 10/40* (2022.01)
*G06N 10/70* (2022.01)

(56) References Cited

U.S. PATENT DOCUMENTS

| | | | |
|---|---|---|---|
| 5,684,621 | A | 11/1997 | Downing |
| 6,988,058 | B1 | 1/2006 | Sherwin et al. |
| 11,380,455 | B2 | 7/2022 | Keesling Contreras et al. |
| 11,710,579 | B2 * | 7/2023 | Keesling Contreras ..................... G06N 10/40 378/70 |
| 11,985,451 | B2 | 5/2024 | Kim et al. |
| 12,051,520 | B2 | 7/2024 | Keesling Contreras et al. |
| 12,165,004 | B2 * | 12/2024 | Pichler ................... G06N 10/20 |
| 12,282,242 | B2 * | 4/2025 | Christen ................ G06N 10/40 |
| 2002/0089718 | A1 | 7/2002 | Penninckx et al. |
| 2004/0000666 | A1 | 1/2004 | Lidar et al. |
| 2004/0017833 | A1 | 1/2004 | Cundiff et al. |
| 2004/0126114 | A1 | 7/2004 | Liu et al. |
| 2006/0225165 | A1 | 10/2006 | Maassen van den Brink et al. |
| 2007/0113012 | A1 | 5/2007 | Cable et al. |
| 2008/0116449 | A1 | 5/2008 | Macready et al. |
| 2008/0185576 | A1 | 8/2008 | Hollenberg et al. |
| 2008/0237579 | A1 | 10/2008 | Barker et al. |
| 2008/0313430 | A1 | 12/2008 | Bunyk |
| 2009/0204877 | A1 | 8/2009 | Betts |
| 2009/0299947 | A1 | 12/2009 | Amin et al. |
| 2011/0238607 | A1 | 9/2011 | Coury et al. |
| 2014/0025926 | A1 | 1/2014 | Yao et al. |
| 2014/0200689 | A1 | 7/2014 | Utsunomiya et al. |
| 2014/0253987 | A1 | 9/2014 | Christmas |
| 2015/0317558 | A1 | 11/2015 | Adachi et al. |
| 2016/0064108 | A1 | 3/2016 | Saffman et al. |
| 2016/0125311 | A1 | 5/2016 | Fuechsle et al. |
| 2016/0328253 | A1 | 11/2016 | Majumdar |
| 2017/0300817 | A1 | 10/2017 | King et al. |
| 2018/0217629 | A1 | 8/2018 | Macfaden |
| 2018/0218279 | A1 | 8/2018 | Lechner et al. |
| 2018/0260731 | A1 | 9/2018 | Zeng et al. |
| 2019/0266508 | A1 | 8/2019 | Bunyk et al. |
| 2020/0185120 | A1 | 6/2020 | Keesling Contreras et al. |
| 2021/0279631 | A1 | 9/2021 | Pichler et al. |
| 2021/0365827 | A1 | 11/2021 | Monroe et al. |
| 2021/0383189 | A1 | 12/2021 | Cong et al. |
| 2022/0060668 | A1 | 2/2022 | Kim et al. |
| 2022/0138608 | A1 | 5/2022 | Ramette et al. |
| 2022/0197102 | A1 | 6/2022 | Christen et al. |
| 2022/0293293 | A1 | 9/2022 | Contreras et al. |
| 2022/0391743 | A1 | 12/2022 | Wild et al. |
| 2023/0326623 | A1 | 10/2023 | Keesling Contreras et al. |
| 2023/0400492 | A1 | 12/2023 | Xu et al. |
| 2024/0029911 | A1 | 1/2024 | Lukin et al. |
| 2024/0185113 | A1 | 6/2024 | Cong et al. |
| 2024/0289665 | A1 | 8/2024 | Pichler et al. |
| 2024/0346352 | A1 | 10/2024 | Bluvstein et al. |
| 2024/0347995 | A1 | 10/2024 | Levine et al. |

FOREIGN PATENT DOCUMENTS

| | | | |
|---|---|---|---|
| EP | 3113084 | A1 | 1/2017 |
| EP | 3438726 | A1 | 2/2019 |
| GB | 0205011 | A | 10/1923 |
| JP | 2007/233041 | A | 9/2007 |
| JP | 2008/134450 | A | 6/2008 |
| JP | 2008/158325 | A | 7/2008 |
| JP | 2014-197733 | A | 10/2014 |
| JP | 2017/078832 | A | 4/2017 |
| WO | WO-2014/051886 | A1 | 4/2014 |
| WO | WO-2019/014589 | A1 | 1/2019 |
| WO | WO-2020/072981 | A1 | 4/2020 |
| WO | WO-2020/172588 | A1 | 8/2020 |
| WO | WO-2020/236574 | A1 | 11/2020 |
| WO | WO-2021/007560 | A1 | 1/2021 |
| WO | WO-2021/141918 | A1 | 7/2021 |
| WO | WO-2022/132388 | A2 | 6/2022 |
| WO | WO-2022/132389 | A2 | 6/2022 |
| WO | WO-2022/174072 | A1 | 8/2022 |
| WO | WO-2022/132388 | A3 | 9/2022 |
| WO | WO-2022/132389 | A3 | 9/2022 |
| WO | WO-2023/287503 | A2 | 1/2023 |
| WO | WO-2023/287503 | A3 | 1/2023 |
| WO | WO-2023/287503 | A9 | 1/2023 |
| WO | WO-2023/080936 | A2 | 5/2023 |
| WO | WO-2023/080936 | A3 | 7/2023 |
| WO | WO-2023/132865 | | 7/2023 |
| WO | WO-2023/132865 | A9 | 7/2023 |
| WO | WO-2024/155291 | A2 | 7/2024 |

OTHER PUBLICATIONS

Aliferis et al., "Computation by measurements: A unifying picture," Arxiv: 13 pages (2004).

Anonymous., "Magneto-optical trap," Wikipedia, retrieved online <https://web.archive.org/web/20210125084412/https://en.wikipedia.org/wiki/Magneto-optical_trap>: 7 pages (2022).

Auger et al., "Blueprint for fault-tolerant quantum computation with Rydberg atoms." Physical Review A 96(5): 052320 (2017).

Barredo et al., "An atom-by-atom assembler of defect-free arbitrary 2d atomic arrays," arXiv:1607.03042, Jul. 11, 2016, pp. 1-7.

Barredo et al., "An atom-by-atom assembler of defect-free arbitrary two-dimensional atomic arrays," Science, 354(6315): 1021-1023 (2016).

Barredo et al., "Synthetic three-dimensional atomic structures assembled atom by atom," Nature, 561: 79-82 (2018).

Baur et al., "Single-Photon Switch Based on Rydberg Blockade," Phys. Rev. Lett., 112: 073901 (2014).

Beugnon et al., "Two-dimensional transport and transfer of a single atomic qubit in optical tweezers" Nature Physics, vol. 3, p. 1-4 (2007).

Brion et al., "Quantum Computing with Collective Ensembles of Multilevel Systems," Phys. Rev. Lett., 99: 260501 (2007).

Browaeys et al., "Many-body physics with individually controlled Rydberg atoms," Nature Physics, 16: 132-142 (2020).

Bruzewicz et al., "Trapped-Ion Quantum Computing: Progress and Challenges," Applied Physics Reviews, 6(2): 021314 (2019).

Chao et al., "Fault-tolerant quantum computation with few qubits." npj Quantum Information 4.1 (2018): 42.

Cong et al., "Hardware-efficient, fault-tolerant quantum computation with Rydberg atoms", Physical Review X 12(2): 021049 (2022).

Cong et al., "Quantum convolutional neural networks" Nature Physics, vol. 15, p. 1273-78 (2019).

(56) References Cited

OTHER PUBLICATIONS

Couvert et al., "Optimal transport of ultracold atoms in the non-adiabatic regime" Europhysics Letters, 83: 5 pages (2008).
Debnath et al., "Demonstration of a small programmable quantum computer with atomic qubits," Nature, 536(7614): 63-66 (2016).
Dordevic et al., "Entanglement transport and a nanophotonic interface for atoms in optical tweezers" arXiv: 16 pages (2021).
Ebert et al., "Coherence and Rydberg Blockade of Atomic Ensemble Qubits," Phys. Rev. Lett., 115: 093601 (2015).
Endres et al., "Atom-by-atom assembly of defect-free one-dimensional cold atom arrays," Science, 354 (6315): 1024-1027 (2016).
Endres et al., "Cold Matter Assembled Atom-by-Atom," arXiv:1607.03044, Jul. 11, 2016, pp. 1-12.
Engstrom et al., "Calibration of spatial light modulators suffering from spatially varying phase response," Optics Express, 21(13): 16086-16103 (2013).
Extended European Search Report for EP Application No. 19854402.5 dated May 9, 2022.
Extended European Search Report for EP Application No. 19868908.5 dated Jun. 13, 2022.
Extended European Search Report for EP Application No. EP 18831504 mailed Mar. 30, 2021.
Farhi et al., "Classification with Quantum Neural Networks on Near Term Processors," arXiv:1802.06002, 1-21 (2018).
Fienup., "Phase retrieval algorithms: a comparison," Applied Optics 21(15): 2758-2769 (1982).
Fowler et al., "Surface code quantum communication" arXiv, pp. 1-4 (2010).
Fowler et al., "Surface codes: Towards practical large-scale quantum computation," Phys. Rev. A, 86: 032324 (2012).
Fowler et al., "Surface Codes: Towards practical large-scale quantum computation" Physical Review, vol. 86 (3), p. 1-54 (2012).
Gerchberg et al., "A Practical Algorithm for the Determination of Phase from Image and Diffraction Plane Pictures," Optik, 35(2): 237-246 (1972).
Gorniaczyk et al., "Single-Photon Transistor Mediated by Interstate Rydberg Interactions," Phys. Rev. Lett., 113: 053601 (2014).
Graham et al., "Demonstration of multi-qubit entanglement and algorithms on a programmable neutral atom quantum computer" arXiv, p. 1-25 (2022).
Grant et al., "Hierarchical quantum classifiers" ArXiv, p. 1-16 (2018).
Gunter et al., "Interaction Enhanced Imaging of Individual Rydberg Atoms in Dense Gases," Phys. Rev. Lett., 108: 013002 (2012).
Gunter et al., "Observing the Dynamics of Dipole-Mediated Energy Transport by Interaction- Enhanced Imaging," Science, 342(6161): 954-956 (2013).
Haegeman et al., "Order Parameter for Symmetry-Protected Phases in One Dimension," Phys. Rev. Lett., 109(5): 050402-1-5 (2012).
Haldane, "Nonlinear Field Theory of Large-Spin Heisenberg Antiferromagnets: Semiclassically Quantized Solitons of the One-Dimensional Easy-Axis Neel State," Phys. Rev. Lett., 50(15): 1153-1156 (1983).
Hashizume et al., "Deterministic Fast Scrambling with Neutral Atom Arrays" Physical Review Letters, vol. 126: 14 pages (2021).
International Search Report and Written Opinion for Application No. PCT/US2021/060136 dated Aug. 11, 2022.
International Search Report and Written Opinion for International Application No. PCT/US18/42080 dated Oct. 22, 2018.
International Search Report and Written Opinion for International Application No. PCT/US2019/049115 dated Jan. 7, 2020.
International Search Report and Written Opinion for International Application No. PCT/US2019/054831 dated Feb. 6, 2020.
International Search Report and Written Opinion for International Application No. PCT/US2020/019309 dated Jul. 14, 2020.
International Search Report and Written Opinion for International Application No. PCT/US2020/033100 dated Sep. 2, 2020.
International Search Report and Written Opinion for International Application No. PCT/US2020/041709 dated Oct. 28, 2020.
International Search Report and Written Opinion for International Application No. PCT/US2021/012209 mailed May 3, 2021.
International Search Report and Written Opinion for International Application No. PCT/US2022/016173 dated May 24, 2022.
International Search Report and Written Opinion for International Application No. PCT/US2022/031297 dated Feb. 21, 2023.
International Search Report and Written Opinion of Application No. PCT/US2021/060138 dated Aug. 19, 2022.
Isenhower et al., "Demonstration of a neutral atom controlled-NOT quantum gate," arXiv:0907.5552, Nov. 24, 2009, pp. 1-5.
Jahromi et al., "Topological spin liquids in the ruby lattice with anisotropic Kitaev interactions," Physical Review B, 94(12): (10 pages) (2016).
Jahromi et al., "Topological $Z_2$ RVB quantum spin liquid on the ruby lattice," Physical Review B, 101(11): (10 pages) (2020).
Jaksch et al., "The cold atom Hubbard toolbox," Arxiv, (30 pages) (2004).
Johnson et al., "Rabi Oscillations between Ground and Rydberg States with Dipole-Dipole Atomic Interactions," Physical Review Letters, 110(11): 113003-1-4 (2008).
Kaufman et al., "Hong-Ou-Mandel atom interferometry in tunnel-coupled optical tweezers," arXiv:1312.7182, Jun. 17, 2014, pp. 1-17.
Kaufman et al., "Quantum thermalization through entanglement in an isolated many-body system" arXiv: 19 pages (2016).
Killoran et al., "Continuous-variable quantum neural networks" ArXiv, p. 1-21 (2018).
Kim and Swingle., "Robust entanglement renormalization on a noisy quantum computer" ArXiv, p. 1-17 (2017).
Labuhn et al., "Realizing quantum Ising models in tunable two-dimensional arrays of single Rydberg atoms" arXiv: 1-12 (2016).
Labuhn et al., "Tunable two-demensional arrays of single Rydberg atoms for realizing quantum Ising models," Nature, 534(7609): 667-670 (2016).
Lengwenus et al., "Coherent Transport of Atomic Quantum in a Scalable Shift Register" Physical Review Letters, 105: 4 pages (2010).
Leonardo et al., "Computer generation of optimal holograms for optical trap arrays," Optics Express, 15(4): 1913-1922 (2007).
Lester et al., "Rapid production of uniformly-filled arrays of neutral atoms," arXiv:1506.04419, Jun. 14, 2015, pp. 1-5.
Low et al., "Practical trapped-ion protocols for universal qudit-based quantum computing", Physical Review Research 2(3): 033128 (2020).
Lu et al., "Aluminum nitride integrated photonics platform for the ultraviolet to visible spectrum," Optics Express, 26(9): 11147 (2018).
Ma et al., "Generation of three-dimensional optical structures by dynamic holograms displayed on a twisted nematic liquid crystal display," Applied Physics B Lasers and Optics, 110(4): 531-537 (2013).
Matsumoto et al., "High-quality generation of a multispot pattern using a spatial light modulator with adaptive feedback," Optics Letters, 37(15): 3135-3137 (2012).
Mazurenko, "Optical Imaging of Rydberg Atoms," Thesis (S.B.)—Massachusetts Institute of Technology, Dept. of Physics (2012).
Mehta et al., "Towards fast and scalable trapped-ion quantum logic with integrated photonics," Proc. SPIE 10933, Advances in Photonics of Quantum Computing, Memory, and Communication XII, 109330B (2019).
Morgado et al., "Quantum simulation and computing with Rydberg-interacting qubits," Arxiv, Cornell University Library: 36 pages (2020).
Murmann et al., "Two Fermions in a Double Well: Exploring a Fundamental Building Block of the Hubbard Model," arXiv:1410.8784, Feb. 17, 2015, pp. 1-12.
Negretti et al., "Quantum computing implementation with neutral particles," Arxiv, (19 pages) (2011).
Nogrette et al., "Single-Atom Trapping in Holographic 2D Arrays of Microtraps with Arbitrary Geometries," Physical Review X, 4: Article 021034 pp. 1-9 (2014).
Perez-Garcia et al., "PEPS as unique ground states of local Hamiltonians," Quant. Inf. Comp., 8: 0650 (2008).

(56) References Cited

OTHER PUBLICATIONS

Persson et al., "An algorithm for improved control of trap intensities in holographic optical tweezers," Proceedings of SPIE, 8458: 8 pages (2012).
Persson et al., "Minimizing intensity fluctuations in dynamic holographic optical tweezers by restricted phase change," Optics Express, 18(11): 11250-11263 (2010).
Persson et al., "Real-time generation of fully optimized holograms for optical trapping applications," Proceedings of SPIE, 8097: 10 pages (2011).
Persson et al., "Reducing the effect of pixel crosstalk in phase only spatial light modulators," Optics Express, 20(20): 22334-22343 (2012).
Persson., "Thesis for the Degree of Doctor of Philosophy: Advances in Holographic Optical Trapping," Department of Physics University o Gothenburg: 82 pages (2013).
Pichler et al., "Computational complexity of the Rydberg blockade in two dimensions," arXiv: 1809.04954 (2018).
Poland et al., "Development of a doubly weighted Gerchberg-Saxton algorithm for use in multibeam imaging applications," Optics Letters, 39(8): 2431-2434 (2014).
Pollmann et al., "Detection of symmetry-protected topological phases in one dimension," Phys. Rev. B, 86(12): 125441-1-13 (2012).
Prongue et al., "Optimized kinoform structures for highly efficient fan-out elements," Applied Optics, 31(26): 5706-5711 (1992).
Rehn et al., "A fractionalised "Z2" classical Heisenberg spin liquid" arXiv: 5 pages (2016).
Reichle et al., "Transport Dynamics of single ions in segmented microstructed Paul trap arrays" Forschritte der Physik Progress of Physics, 54 (8-10): 666-685 (2006).
Saffman et al., "Quantum information with Rydberg atoms," Rev. Mod. Phys., 82(3): 2313-2363 (2010).
Saffman et al., "Scaling the neutral-atom Rydberg gate quantum computer by collective encoding in holmium atoms," Phys. Rev. A, 78: 012336 (2008).
Satzinger et al. "Realizing topologically ordered states on a quantum processor," 27 pages, (2021).
Savary et al., "Quantum Spin Liquids" arXiv: 60 pages (2016).
Shi, "Deutsch, Toffoli, and CNOT Gates via Rydberg Blockade of Neutral Atoms," arxiv.org, Cornell University Library, 201 Olin Library Cornell University Ithaca, NY (2018).
Shi, "Fast, Accurate, and Realizable Two-Qubit Entangling Gates by Quantum Interference in Detuned Rabi Cycles of Rydberg Atoms," arxiv.org, Cornell University Library, 201 Olin Library Cornell University Ithaca, NY (2019).
Sorace-Agaskar et al., "Multi-layer integrated photonics from the ultraviolet to the infrared," Proc. SPIE 10510, Frontiers in Biological Detection: From Nanosensors to Systems X, 105100D (2018).
Tamura et al., "Highly uniform holographic microtrap arrays for single atom trapping using a feedback optimization of in-trap fluorescence measurements," Optics Express, 24(8): 8132-8141 (2016).
Tanasittikosol et al., "Microwave dressing of Rydberg dark states," Arxiv, Cornell University Library: 12 pages (2011).
Thimons et al., "Investigating the Gerchberg-Saxton Phase Retrieval Algorithm," SIAM: 11 pages (2018).
Torlai et al., "Integrating Neural Networks with a Quantum Simulator for State Reconstruction," Cornell University Library, (15 pages) (2019).
Urban et al., "Observation of Rydberg blockade between two atoms," Nature Physics, 5: 110-114 (2009).
Verdon et al., "A Universal Training Algorithm for Quantum Deep Learning" ArXiv, p. 1-83, (2018).
Verresen et al., "One-dimensional symmetry protected topological phases and their transitions," Phys. Rev. B, 96(16): 165124-1-23 (2017).
Verstraete et al., "Criticality, the Area Law, and the Computational Power of Projected Entangled Pair States," Phys. Rev. Lett., 96: 220601 (2006).
Vidal, "Class of Quantum Many-Body States That Can Be Efficiently Simulated," Phys. Rev. Lett., 101(11): 110501-1-4 (2008).
Wang et al., "Coherent Addressing of Individual Neutral Atoms in a 3D Optical Lattice," Physical Review Letters, 115(4): 043003-1-5 (2015).
Wu et al., "Erasure conversion for fault-tolerant quantum computing in alkaline earth Rydberg atom arrays," arXiv.org: 16 pages (2022).
Yang et al., "Coherence Preservation of a Single Neutral Atom Qubit Transferred between Magic-Intensity Optical Traps" Physical Review Letter, 117: 6 pages (2016).
Yavuz et al., "Fast Ground State Manipulation of Neutral Atoms in Microscopic Optical Traps," Physical Review Letters, 96(6): 063001-1-4 (2006).
Ying, "Entangled Many-Body States as Resources of Quantum Information Processing," Center for Quantum Technologies National University of Singapore (2013).
Yoder et al., "Universal fault-tolerant gates on concatenated stabilizer codes", Physical Review X 6(3): 031039 (2016).
Zimmermann et al., "High-resolution imaging of ultracold fermions in microscopically tailored optical potentials," arXiv:1011.1004, Apr. 8, 2011, pp. 1-15.
Du et al., "Superconducting circuit probe for analog quantum simulators", *Physical Review A* 92(1): 012330 (2015).
International Search Report and Written Opinion for Application No. PCT/US2022/039189 dated Aug. 4, 2023.
International Search Report and Written Opinion for International Application No. PCT/US22/37325 dated Jun. 16, 2023.
Keating et al., "Adiabatic quantum computation with Rydberg-dressed atoms", Physical Review A 87, 052314, May 2013.
Levine, "Quantum Information Processing and Quantum Simulation with Programmable Rydberg Atom Arrays" The Department of Physics at Harvard University, PhD Thesis (2021).
Meschede, "Quantum engineering with neutral atoms one by one", *Conference on Lasers and Electro-Optics/Pacific Rim*. Optica Publishing Group, 2007.
Wang et al., "Quantum state manipulation of single-Cesium-atom qubit in a micro-optical trap", *Frontiers of Physics* 9: 634-639 (2014).
Willner et al., "Optics and photonics: Key enabling technologies", *Proceedings of the IEEE* 100.Special Centennial Issue: 1604-1643 (2012).
International Search Report and Written Opinion for International Application No. PCT/US23/26737 dated Sep. 30, 2024.
Jaksch et al., "Fast quantum gates for neutral atoms." arXiv (2000): 2208.
Keating et al., "Robust quantum logic in neutral atoms via adiabatic Rydberg dressing." Physical Review A 91 (2015): 012337.
Nickerson et al., "Freely scalable quantum technologies using cells of 5-to-50 qubits with very lossy and noisy photonic links." Physical Review X 4.4 (2014): 041041.
Ramette et al., "Fault-tolerant connection of error-corrected qubits with noisy links." npj Quantum Information 10.1 (2024): 58.
Weimer et al. "A Rydberg quantum simulator." Nature Physics 6.5 (2010): 382-388.
Levine, "Quantum Information Processing and Quantum Simulation with Programmable Rydberg Atom Arrays" The Department of Physics at Harvard University, PhD Thesis, published Jan. 12, 2022.
Monroe et al., "Remapping the quantum frontier." Physics World 21.08 (2008): 32.

* cited by examiner

2000

$(Z)_{BFFM} =$

*Equation 11*

*Equation 12*

TOPOLOGICAL QUBITS IN A QUANTUM SPIN LIQUID

CROSS-REFERENCE TO RELATED APPLICATIONS

This application is a continuation of International Application No. PCT/US2021/060138, filed Nov. 19, 2021, which claims the benefit of U.S. Provisional Application No. 63/116,321, filed Nov. 20, 2020, and of U.S. Provisional Application No. 63/166,165, filed Mar. 25, 2021, each of which is hereby incorporated by reference in its entirety.

STATEMENT REGARDING FEDERALLY SPONSORED RESEARCH OR DEVELOPMENT

This invention was made with government support under DE-SC0021013 awarded by U.S. Department of Energy (DOE) and under 2012023 and 1734011 awarded by National Science Foundation (NSF) and under W911NF-20-1-0082 awarded by U.S. Army Research Office (ARO). The government has certain rights in the invention.

BACKGROUND

The linchpin of fault tolerant quantum computing is a quantum code that protects quantum information from decoherence and errors by the environment. By far the most studied error correcting code is the so called surface code. However, practical implementations of the surface code have lagged behind theory.

Embodiments of the present disclosure relate to the creation of a quantum spin liquid and the implementation of qubits and qubit operations therein.

BRIEF SUMMARY

In a $1^{st}$ example embodiment, the presence invention is a device. In the $1^{st}$ aspect, the device comprises a two-dimensional array of particles, each particle disposed at a vertex of a ruby lattice having a parameter ρ greater than $$\frac{1}{\sqrt{2}};$$

each particle having a first state and an excited state; each particle that belongs to at least three unit cells of the ruby lattice having a blockade radius, when in the excited state, sufficient to blockade each of at least six nearest neighboring particles in the ruby lattice from transitioning from its first state to its excited state, and wherein the array has at least one outer edge configured to be in a first boundary condition.

In a $2^{nd}$ example embodiment, the present invention is a system. The system comprises a confinement system for arranging particles in a two-dimensional array, and an excitation source for exciting at least some of the particles from the first state to the excited state. The confinement system comprises a laser source arranged to create a plurality of confinement regions; a source of an atom cloud, the atom cloud capable of being positioned to at least partially overlap with the plurality of confinement regions. In a $1^{st}$ aspect of the $2^{nd}$ example embodiment, in the two-dimensional array, each particle is disposed at a vertex of a ruby lattice; each particle has a first state and an excited state; each particle that belongs to at least three unit cells of the ruby lattice has a blockade radius, when in the excited state, sufficient to blockade each of at least six nearest neighboring particles in the ruby lattice from transitioning from its first state to its excited state, and wherein the array has at least one outer edge configured to be at a first boundary condition.

In a $3^{rd}$ example embodiment, the present invention is a method of making a $\mathbb{Z}_2$ Quantum Spin Liquid ($\mathbb{Z}_2$ QSL). In a $1^{st}$ aspect, the method comprises arranging a two-dimensional array of particles, wherein each particle is disposed at a vertex of a ruby lattice having a parameter ρ greater than $$\frac{1}{\sqrt{2}};$$

each particle has a first state and an excited state; and the array has at least one outer edge. The method further comprises exciting about 25% of the particles into the excited state, thereby causing each particle in the excited state that belongs to at least three unit cells of the ruby lattice to have a blockade radius sufficient to blockade at least six nearest neighboring particles in the ruby lattice; and, optionally, imposing a first boundary condition on the at least one outer edge.

In a $4^{th}$ example embodiment, the present invention is a method of encoding a topological qubit in a $\mathbb{Z}_2$ Quantum Spin Liquid ($\mathbb{Z}_2$ QSL). The method comprises preparing a $\mathbb{Z}_2$ QSL according to the method defined in the $3^{rd}$ example embodiment and any of its aspects, as described above. In a $1^{st}$ aspect of the $4^{th}$ example embodiment, the array comprises at least a first outer edge, a second outer edge, a third outer edge, and a fourth outer edge; and imposing a first boundary condition on the first and third outer edges and imposing a second boundary condition on the second and fourth outer edges.

In a 5th example embodiment, the present invention is a method of encoding a topological qubit in a $\mathbb{Z}_2$ Quantum Spin Liquid ($\mathbb{Z}_2$ QSL). The method comprises preparing a $\mathbb{Z}_2$ QSL according to the method defined in the $3^{rd}$ example embodiment. In a $1^{st}$ aspect of the $5^{th}$ example embodiment, the array comprises at least one interior edge.

In a $6^{th}$ example embodiment, the present invention is a method of reading a state of a topological qubit encoded in a $\mathbb{Z}_2$ Quantum Spin Liquid ($\mathbb{Z}_2$ QSL). In a $1^{st}$ aspect of the $6^{th}$ example embodiment, the method comprises receiving an indication of a state of each particle of a two-dimensional array of particles, each particle disposed at a vertex of a ruby lattice; each particle having a first state and an excited state; each particle that belongs to at least three unit cells of the ruby lattice having a blockade radius, when in the excited state, sufficient to blockade each of at least six nearest neighboring particles in the ruby lattice from transitioning from its first state to its excited state, and wherein the array has a plurality of outer edges, each outer edge being either in a first boundary condition or in a second boundary condition, each outer edge being in a different boundary condition than any adjacent outer edge. The method further comprises determining a first path through the array from a first outer edge of the plurality of outer edges having the first boundary condition to a second outer edge of the plurality of outer edges having the first boundary condition via a first plurality of vertices of the ruby lattice having thereat a first plurality of particles; assigning a first value to the first path based on the state of each of the first plurality of particles; based on the first value, determining the state of a first topological qubit.

In a $7^{th}$ example embodiment, the present invention is a method of reading a state of a topological qubit encoded in a $\mathbb{Z}_2$ Quantum Spin Liquid ($\mathbb{Z}_2$ QSL). In a $1^{st}$ aspect of the $7^{th}$ example embodiment, the method comprises: receiving an indication of a state of each particle of a two-dimensional array of particles, each particle disposed at a vertex of a ruby lattice; each particle having a first state, and an excited state; each particle that belongs to at least three unit cells of the ruby lattice having a blockade radius, when in the excited state, sufficient to blockade each of at least six nearest neighboring particles in the ruby lattice from transitioning from its first state to its excited state, and wherein the array comprises at least one outer edge and at least one interior edge; determining a first path through the array from the at least one interior edge to the at least one outer edge via a first plurality of vertices of the ruby lattice having thereat a first plurality of particles; assigning a first value to the first path based on the state of each of the first plurality of particles; and, based on the first value, determining the state of a first topological qubit.

In an $8^{th}$ example embodiment, the present invention is a method of operating on a topological qubit. The method comprises preparing a topological qubit according to the method defined by the $4^{th}$ example embodiment or any of its aspects. In a $1^{st}$ aspect of the $8^{th}$ example embodiment, the first boundary condition is the e-boundary condition, and the method comprises: creating a first and a second e-anyon in the array; removing the first e-anyon from the array via the first outer edge and removing the second e-anyon from the array via the third outer edge.

In a $9^{th}$ example embodiment, the present invention is a method of operating on a topological qubit. The method comprises preparing a topological qubit according to the method defined in the $5^{th}$ example embodiment or any of its aspects. In a $1^{st}$ aspect of the $9^{th}$ example embodiment, the method further comprises creating a first and a second e-anyon in the array; pinning the first e-anyon; and moving the second e-anyon along a circular path circumscribing the at least one interior edge and having the end point at the position of the first e-anyon, thereby destroying the first and the second e-anyons.

In a $10^{th}$ example embodiment, the present invention is a method of encoding a first and second topological qubit in a $\mathbb{Z}_2$ Quantum Spin Liquid ($\mathbb{Z}_2$ QSL), comprising preparing a $\mathbb{Z}_2$ QSL according to the method defined by the $4^{th}$ example embodiment or any of its aspects. In a $1^{st}$ aspect of the $10^{th}$ example embodiment, the array comprises a first interior edge and a second interior edge, the first interior edge having a first boundary condition and the second interior edge having a second boundary condition different from the first boundary condition, the first topological qubit corresponding to the first interior edge and the second topological qubit corresponding to the second interior edge, and the array comprises a first outer edge, the first outer edge having the first boundary condition, and the array comprising an additional edge, the additional edge having the second boundary condition and being either an interior edge or an outer edge.

In an $11^{th}$ example embodiment, the present invention is a method of operating on a first and second topological qubit, comprising encoding the first and second topological qubit according to the method defined by the $10^{th}$ example embodiment. In a $1^{st}$ aspect of the $11^{th}$ example embodiment, the method further comprises moving the first interior edge along a closed continuous path circumscribing the second interior edge.

In a $12^{th}$ example embodiment, the present invention is a computer program product comprising a computer readable storage medium having program instructions embodied therewith, the program instructions executable by a processor to cause the processor to perform the method defined any one of $4^{th}$ through $11^{th}$ example embodiments or any of its aspects.

BRIEF DESCRIPTION OF THE SEVERAL VIEWS OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1:
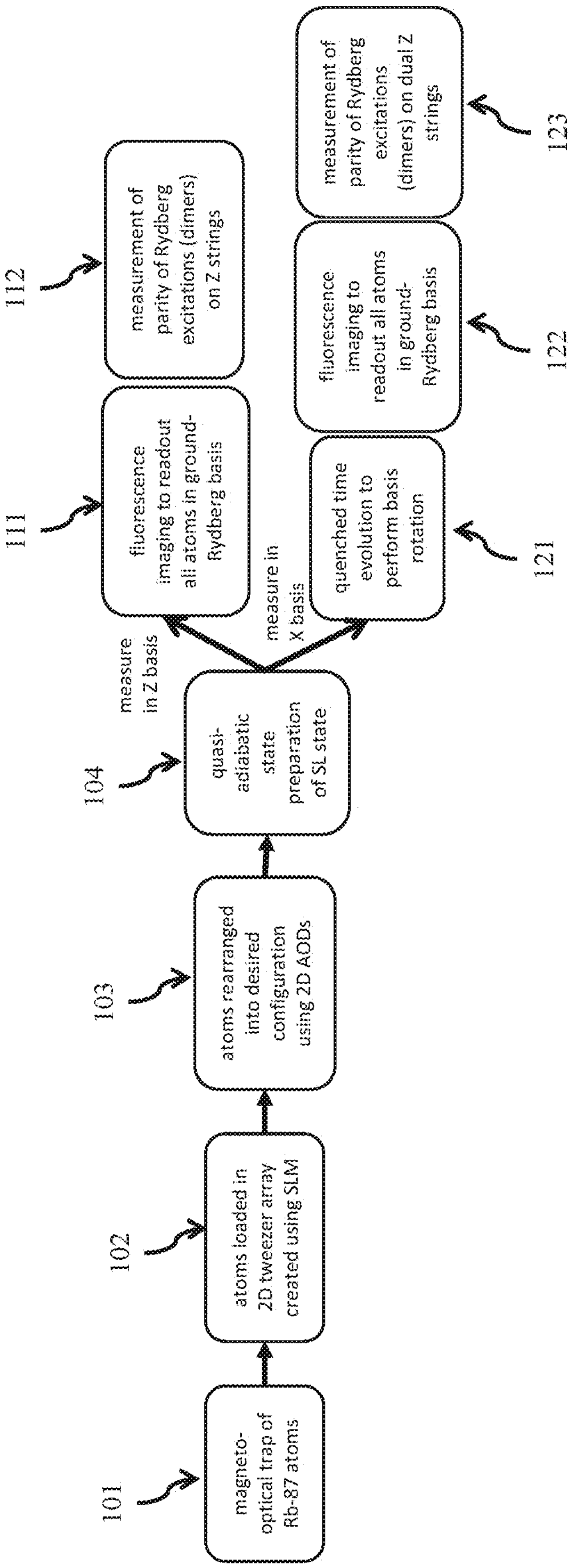
FIG. 1 is a flowchart that outlines a process for preparing a quantum spin liquid and measuring the state of a topological qubit according to embodiments of the present disclosure.

Referring to FIG. 1, a flowchart is provided that outlines a process for preparing a quantum spin liquid and measuring the state of a topological qubit according to embodiments of the present disclosure. Each step of this process is described in further detail in the sections below.

At 101, Rb-87 atoms are provided in a magneto-optical trap. At 102, these atoms are loaded in a 2-dimensional optical tweezer array, which may be create using, e.g., a spatial light modulator (SLM). At 103, the atoms are rearranged into a desired lattice configuration, using, e.g., two-dimensional acousto-optical deflectors (AODs). At 104, quasi-adiabatic preparation of the spin liquid state is performed.

In order to measure the state of a qubit in the Z-basis, at 111, fluorescence imaging is used to readout all atoms in a ground-Rydberg basis. At 112, measurement of the parity of Rydberg excitations (dimers) on Z strings is performed.

In order to measure the state of a qubit in the X-basis, at 121, a quenched time evolution is performed to achieve basis rotation. At 122, fluorescence imaging is used to readout all atoms in a ground-Rydberg basis. At 123, measurement of the parity of Rydberg excitations (dimers) on dual Z strings is performed.

An exemplary device for preparing a quantum spin liquid and measuring the state of a topological qubit includes a two-dimensional array of optical tweezers configured to provide confinement for the atoms. Rearrangement of the atoms to form desired defect-free arrays with arbitrary geometries may be provided using two-dimensional AODs as set out below. Lasers are provided to excite the atoms from their electronic ground state to a Rydberg state (highly excited electronic state), where the atoms interact with each other via strong van der Waals interactions. Read-out of the atomic states is provided via fluorescence imaging. This allows detection of atoms in the ground state, while atoms in the Rydberg state are detected as losses (due to the anti-trapping effect of the optical tweezers).

Formation of Array of Particles Using Optical Tweezers

Optical trapping of neutral atoms is a powerful technique for isolating atoms in vacuum. Atoms are polarizable, and the oscillating electric field of a light beam induces an oscillating electric dipole moment in the atom. The associated energy shift in an atom from the induced dipole, averaged over a light oscillation period, is called the AC Stark shift. Based on the AC Stark shift induced by light that is detuned (i.e., offset in wavelength) from atomic resonance transitions, atoms are trapped at local intensity maxima (for red detuned, that is, longer wavelength trap light), because the atoms are attracted to light below the resonance frequency. The AC Stark shift is proportional to the intensity of the light. Thus, the shape of the intensity field is the shape of an associated atom trap. Optical tweezers utilize this principle by focusing a laser to a micron-scale waist, where individual atoms are trapped at the focus. Two-dimensional (2D) arrays of optical tweezers are generated by, for example, illuminating a spatial light modulator (SLM), which imprints a computer-generated hologram on the wavefront of the laser field. The 2D array of optical tweezers is overlapped with a cloud of laser-cooled atoms in a magneto-optical trap (MOT). The tightly focused optical tweezers operate in a "collisional blockade" regime, in which single atoms are loaded from the MOT, while pairs of atoms are ejected due to light-assisted collisions, ensuring that the tweezers are loaded with at most single atoms, but the loading is probabilistic, such that the trap is loaded with a single atom with a probability of about 50-60%.

To prepare deterministic atom arrays, a real-time feedback procedure identifies the randomly loaded atoms and rearranges them into pre-programmed geometries. Atom rearrangement requires moving atoms in tweezers which can be smoothly steered to minimize heating, by using, for example, acousto-optic deflectors (AODs) to deflect a laser beam by a tunable angle which is controlled by the frequency of an acoustic waveform applied to the AOD crystal. Dynamic tuning of the acoustic frequency translates into smooth motion of an optical tweezer. A multi-frequency acoustic wave creates an array of laser deflections, which, after focusing through a microscope objective, forms an array of optical tweezers with tunable position and amplitude that are both controlled by the acoustic waveform. Atoms are rearranged by using an additional set of dynamically moving tweezers that are overlaid on top of the SLM tweezer array.

Exemplary Hardware

Optical tweezer arrays constitute a powerful and flexible way to construct large scale systems composed of individual particles. Each optical tweezer traps a single particle, including, but not limited to, individual neutral atoms and molecules for applications in quantum technology. Loading individual particles into such tweezer arrays is a stochastic process, where each tweezer in the system is filled with a single particle with a finite probability $p<1$, for example $p\sim0.5$ in the case of many neutral atom tweezer implementations. To compensate for this random loading, real-time feedback may be obtained by measuring which tweezers are loaded and then sorting the loaded particles into a programmable geometry. This may be performed by moving one particle at a time, or in parallel.

Parallel sorting may be achieved by using two acousto-optic deflectors (AODs) to generate multiple tweezers that can pick up particles from an existing particle-trapping structure, move them simultaneously, and release them somewhere else. This can include moving particles around within a single trapping structure (e.g., tweezer array) or transporting and sorting particles from one trapping system to another (e.g., between one tweezer array and another type of optical/magnetic trap). This sorting is flexible and allows programmed positioning of each particle. Each movable trap is formed by the AODs and its position is dynamically controlled by the frequency components of the radiofrequency (RF) drive field for the AODs. Since the RF drive of the AODs can be controlled in real time and can include any combination of frequency components, it is possible to generate any grid of traps (such as a line of arbitrarily positioned traps), move the rows or columns of the grid, and add or remove rows and columns of the grid, by changing the number, magnitude, and distribution of the frequency components in the RF drive fields of the AODs.

In an exemplary embodiment, an optical tweezer array is created using a liquid crystal on silicon spatial light modulator (SLM), which can programmatically create flexible arrangements of tweezers. These tweezers are fixed in space for a given experimental sequence and loaded stochastically with individual atoms, such that each tweezer is loaded with probability p~ 0.5. A fluorescence image of the loaded atoms is taken, to identify in real-time which tweezers are loaded and which are empty.

After detecting which tweezers are loaded, movable tweezers overlapping the optical tweezer array can dynamically reposition atoms from their starting locations to fill a target arrangement of traps with near-unity filling. The movable tweezers are created with a pair of crossed AODs. These AODs can be used to create a single moveable trap which moves one atom at a time to fill the target arrangement or to move many atoms in parallel.

Figure 2:
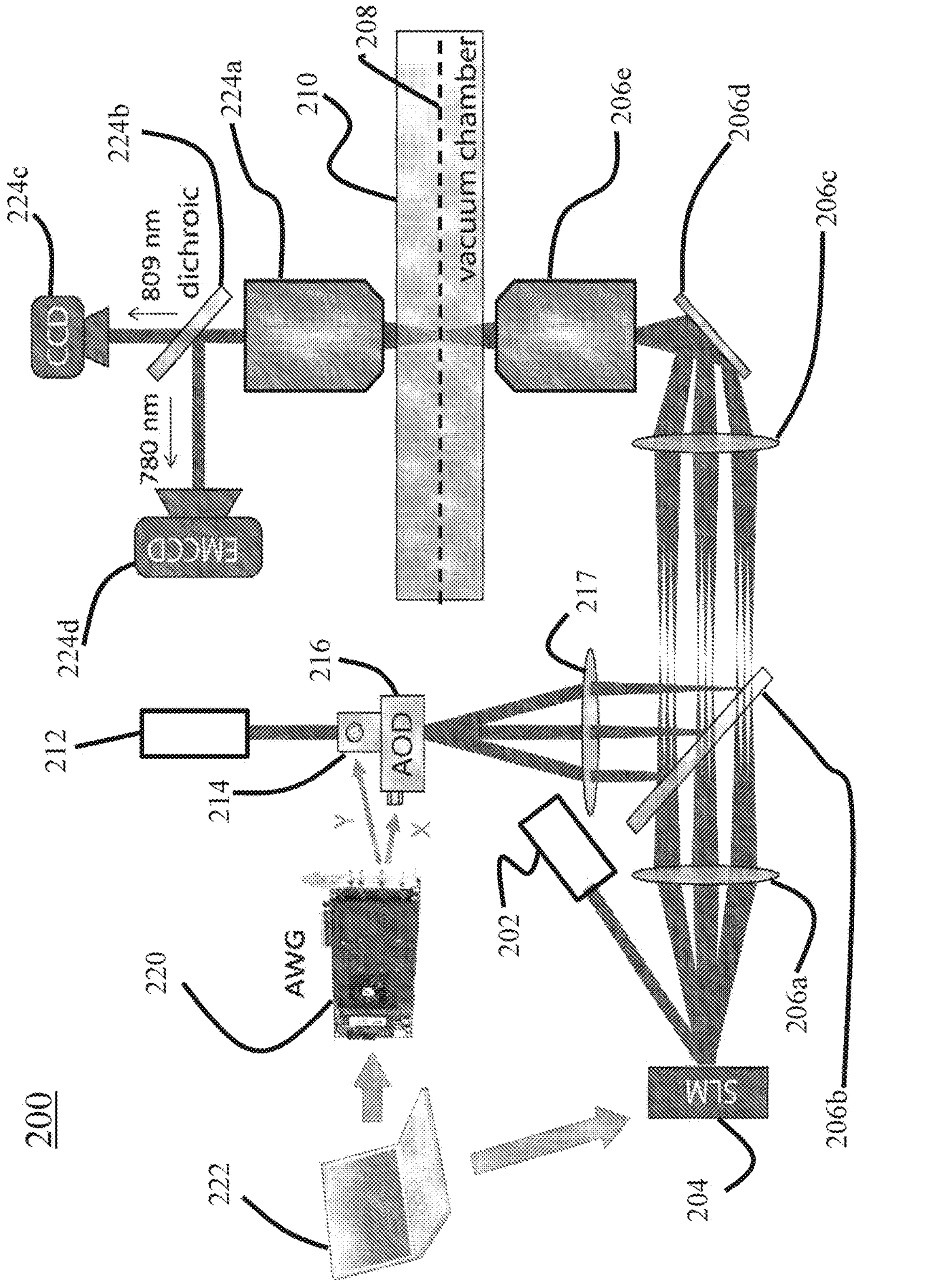
FIG. 2 is a schematic view of an apparatus for parallel sorting of trapped particles according to embodiments of the present disclosure.

Referring to FIG. 2, a schematic view is provided of an apparatus 200 for parallel sorting of trapped particles according to embodiments of the present disclosure. As shown in FIG. 2, using a beam generated by a light source 202 (for example, a coherent light source, in some example embodiments—a monochromatic light source), SLM 204 forms an array of trapping beams (i.e., a tweezer array) which is imaged onto trapping plane 208 in vacuum chamber 210 by an optical train that, in the example embodiment shown in FIG. 2, comprises elements 206*a*, 206*c*, 206*d*, and a high numerical aperture (NA) objective 206*e*. Other suitable optical trains can be employed, as would be easily recognized by a person of ordinary skill in the art. Using a beam generated by light source 212 (for example, a coherent light source; in some example embodiments—a monochromatic light source), a pair of AODs 214 and 216, having non-parallel directions of acoustic wave propagation (for example, orthogonal directions) creates dynamically movable sorting beams. By using the optical train, such as the one depicted in FIG. 2 (elements 217, 206*b*, 206*c*, 206*d*, and 206*e*), the sorting beams are overlapped with the trapping beams. It is understood that other optical train can be used to achieve the same result. For example, source 202 and 212 can be a single source, and the trapping beam and the sorting beam are generated by a beam splitter.

The dynamic movement of the steering beams is accomplished by employing two non-parallel AODs 214, 216, arranged in series. In the example embodiment depicted in FIG. 2, one AOD defines the direction of "rows" ("horizontal"—the 'X' AOD) and the other AOD defines the direction of "columns" ("vertical"—the 'Y' AOD). Each AOD is driven with an arbitrary RF waveform from an arbitrary waveform generator 220, which is generated in real-time by a computer 222 which processes the feedback routine after analyzing the image of where atoms are loaded. If each AOD is driven with a single frequency component, then a single steering beam ("AOD trap") is created in the same plane 208 as the SLM trap array. The frequency of the X AOD drive determines the horizontal position of the AOD trap, and the frequency of the Y AOD drive determines the vertical position; in this way, a single AOD trap can be steered to overlap with any SLM trap.

In FIG. 2, laser 202 projects a beam of light onto SLM 204. SLM 204 can be controlled by computer 222 in order to generate a pattern of beams ("trapping beams" or "tweezer array"). The pattern of beams is focused by lens 206*a*, passes through mirror 206*b*, and is collimates by lens 206*c* on mirror 206*d*. The reflected light passes through objective 206*e* to focus an optical tweezer array in vacuum chamber 210 on trapping plane 208. The laser light of the optical tweezer array continues through objective 224*a*, and passes through dichroic mirror 224*b* to be detected by charge-coupled device (CCD) camera 224*c*.

Vacuum chamber 210 may be illuminated by an additional light source (not pictured). Fluorescence from atoms trapped on the trapping plane also passes through objective 224*a*, but is reflected by dichroic mirror 224*b* to electron-multiplying CCD (EMCCD) camera 224*d*.

In this example, laser 212 directs a beam of light to AODs 214, 216. AODs 214, 216 are driven by arbitrary wave generator (AWG) 220, which is in turn controlled by computer 222. Crossed AODs 214, 216 emit one or more beams as set forth above, which are directed to focusing lens 217. The beams then enter the same optical train 206*b* . . . 206*e* as described above with regard to the optical tweezer array, focusing on trapping plane 208.

It will be appreciated that alternative optical trains may be employed to produce an optical tweezer array suitable for use as set out herein.

Excitation of Atoms in Arrays of Optical Tweezers into Rydberg States

At the micrometer length scales separating optical tweezers, atoms in their ground electronic states have negligible van der Waals interactions. Fortunately, neutral atoms offer a remarkable way to switch on strong interactions through the coherent excitation of the atoms into Rydberg states.

The properties of atomic states scale dramatically with principal quantum number. Rydberg states are highly excited electronic states of the atoms, wherein one of the electrons of the atom has a high principal quantum number n in a range of between 30 and 100. In a classical picture of the atom, this situation corresponds to one (negatively charged) electron orbiting far away from the (positively charged) ionic core on atomic length scales, thus forming an oscillating electric dipole. Two atoms excited into the same Rydberg state can exhibit very strong dipolar interactions over distances of several tens of microns. The interaction energy $V(R)=C_6/R^6$, where R is the interatomic distance, and the coefficient $C_6$ scales with a very large power law $C_6 \propto n^{11}$, with typical values of the interaction energy V(R) in a range of between several megahertz and several gigahertz for atoms that are separated by several microns. The interaction energy can be employed for a number of important applications, such as quantum entanglement and quantum gates, by implementation of a Rydberg blockade mechanism.

Consider an ideal two-level atom, having a ground state $|g\rangle$ and a Rydberg state $|r\rangle$. These two states are laser-coupled with a coupling strength set by the angular Rabi frequency Ω, the inverse of the duration of a Rabi cycle, also referred to as a Rabi flop, that is the cyclic absorption and stimulated emission of a quantum of energy by a two-level atom in the presence of an oscillatory driving field. The Rabi frequency is proportional to the strength of the coupling between the light and the atomic transition, and to the amplitude of the light's electric field. For two such atoms, also referred to herein as Rydberg atoms, if their interatomic distance R is large, such that the van der Waals interaction energy $V_{vdw}$ can be neglected compared to the laser coupling strength, that is $V_{vdW} \ll \hbar\Omega$ (where $\hbar$ is the reduced Planck's constant), the atoms can be regarded as independent particles, and thus both can be excited to the Rydberg state at the same time. However, for small interatomic distances, the van der Waals interaction between the Rydberg states can become very strong, and lead to an energy shift of the state $|rr\rangle$, the state where both atoms are in the same Rydberg state, of magnitude $V(R)=C_6/R^6$. If this interaction energy shift is larger than the laser coupling strength, such that $V_{vdW} \gg \hbar\Omega$, then the excitation of the doubly excited state is no longer possible. The suppression of more than a single excitation inside a certain radius is called the Rydberg blockade. The blockade radius $R_b$ is the distance at which the interaction energy and the laser coupling strength are equal, such that $R_b=(C_6/\hbar\Omega)^{1/6}$. As the van der Waals interaction coefficient scales as $C_6 \sim n^{11}$, the blockade radius increases as $n^{11/6}$ with the principal quantum number n, with typical values of $R_b$ in a range of between 2 μm and 20 μm. The blockade radius decreases with increasing laser coupling strength (i.e., higher Rabi frequency Ω). As an additional or alternative control parameter, the interaction energy shift can also be increased by reducing the interatomic distance R, with the lower limit of R set by the optical resolution of the imaging system used to focus the optical tweezers, typically to about 2 μm.

Several implementations of optical excitation from an atomic ground state to a target Rydberg state are available. The simplest is direct laser excitation with a single-photon transition. The wavelengths for such transitions in Rydberg atoms are typically in the ultraviolet. For example, the single-photon wavelength for $^{87}$Rb is 297 nm. Ultraviolet lasers pose serious experimental challenges, due to, for example, material degradation, and unavailability of optical fibers and low-loss optics. Alternatively, two-photon laser excitation can be used to couple the atomic ground state to a target Rydberg state through an intermediate electronic excited state by illuminating the atoms from opposite sides with two counterpropagating laser beams.

Consistent with the above description, the term "blockade" is used herein to refer to the phenomenon in which a laser-stimulated transition of an atom in a pair of interacting atoms from a first state (e.g., ground state) to an excited state cannot be achieved (is blockaded) due to a mismatch between the laser frequency and a shifted energy level of the excited state, where the shift in the energy level is electrically or magnetically induced. For example, a blockade can be achieved by a dipole-dipole interaction between two neighboring atoms where one is excited into a Rydberg state.

Detuning from Resonance with an Excited State

The coherent evolution of two atoms under laser excitation from a ground state $|g\rangle$ to a Rydberg state $|r\rangle$ is described by the Hamiltonian $$\frac{H}{\hbar} = \frac{\Omega}{2}\sum_i (|g_i\rangle\langle r_i| + |r_i\rangle\langle g_i|) - \Delta\sum_i n_i + \sum_{i<j} V_{ij} n_i n_j \qquad \text{Equation 1}$$

where $V_{ij}$ is the van der Waals interaction energy ($V(R)=C_6/R^6$), $n_i=|r_i\rangle\langle r_i|$, and $\Omega$ and $\Delta$ are the Rabi frequency and detuning of the laser excitation frequency away from the transition resonance frequency, respectively. For an interatomic distance R such that $$\frac{R_b}{R} \approx 1,$$

sweeping the detuning $\Delta$ from negative to positive values while keeping the Rabi frequency $\Omega$ fixed implements the nearest-neighbor Rydberg blockade, where only one out of every pair of nearest-neighbor atoms can be excited to $|r\rangle$.

Furthermore, in the two-photon laser excitation scheme, it is preferable to detune the two excitation lasers, that typically have one frequency in the blue range of the optical spectrum, such as 420 nm, and the other frequency in the red or infrared, such as 1013 nm, by a frequency shift $\delta$ away from the intermediate state ($\delta \gg \omega_B$, $\omega_R$, where $\omega_B$ and $\omega_R$ are the Rabi frequencies of the blue and red lasers, respectively). This detuning avoids populating the intermediate state, thereby preventing spontaneous emission from this state, and enables the treatment of the time evolution of the population of atoms as a two-level system between $|g\rangle$ and $|r\rangle$.

Array Geometry

Figure 3A:
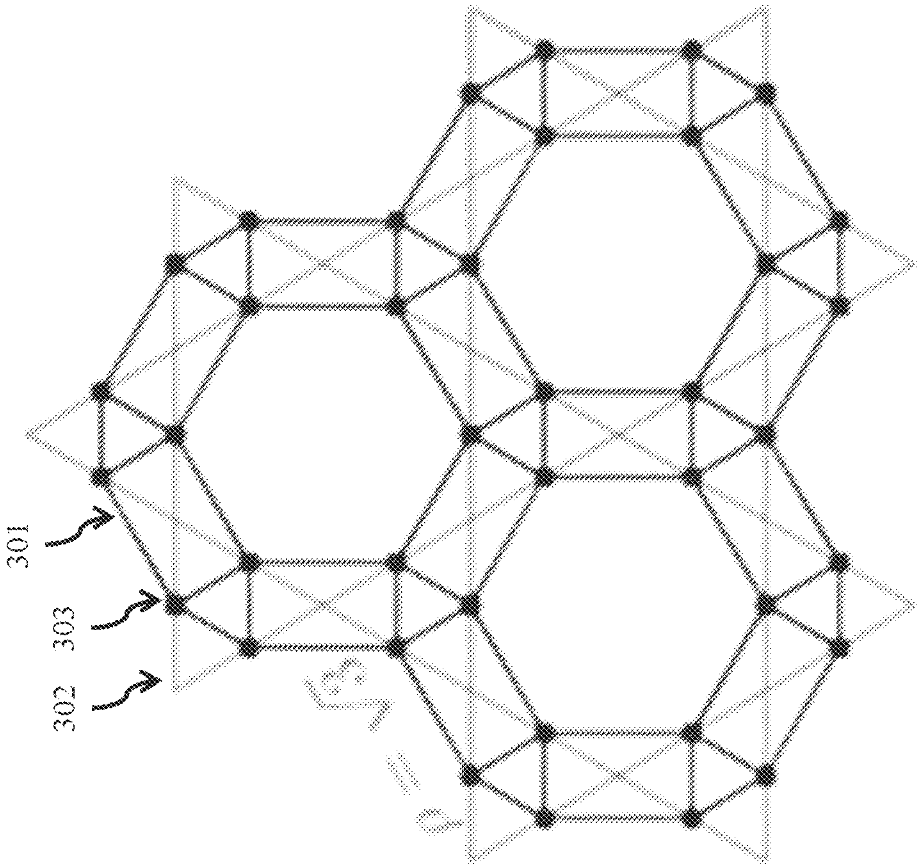
FIGS. 3A-C illustrate exemplary ruby lattices according to embodiments of the present disclosure.
Figure 3B:
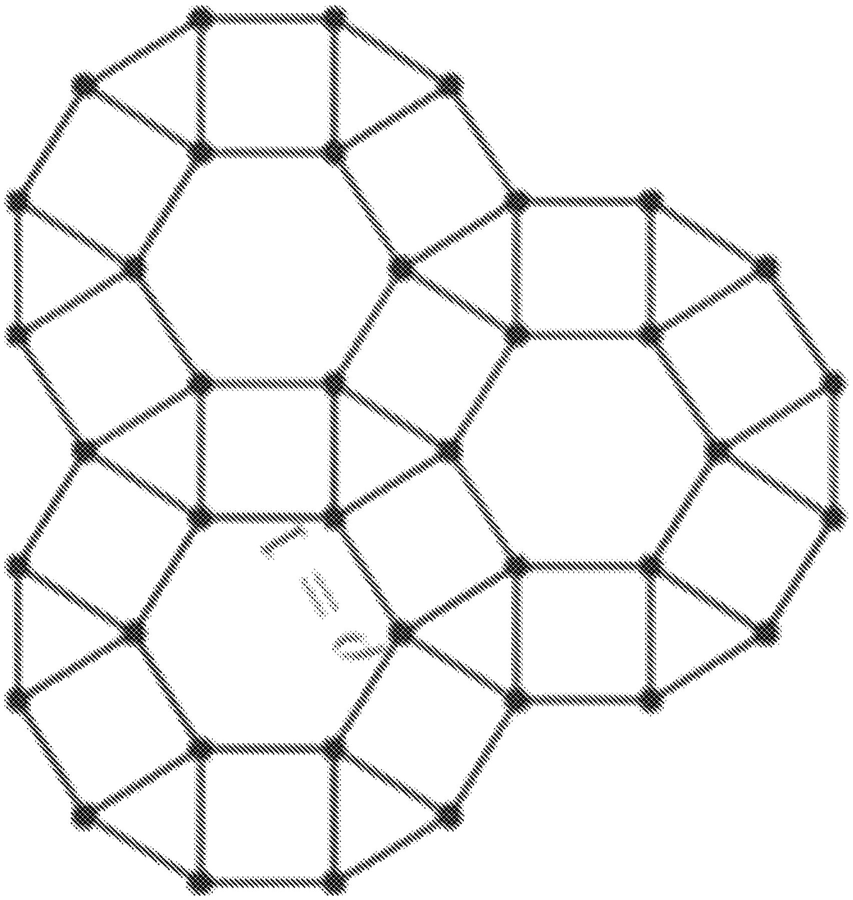
Figure 3C:
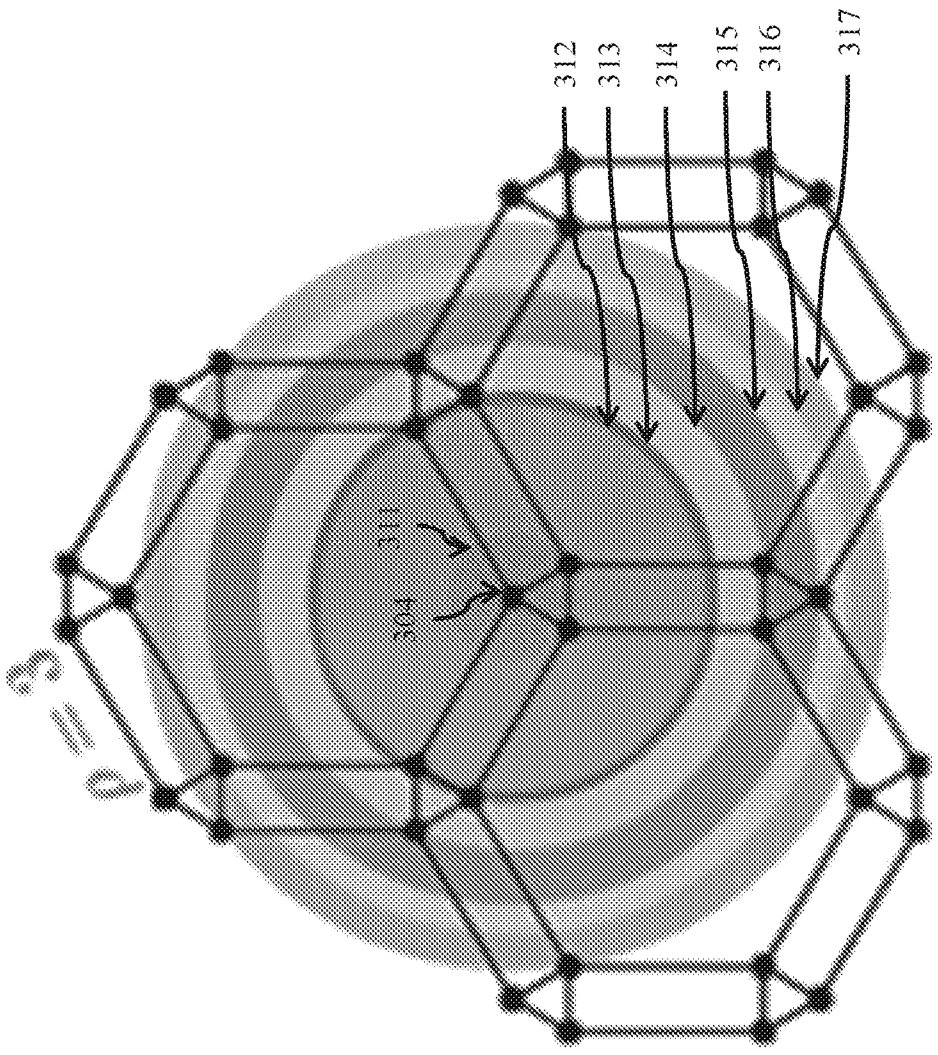

FIGS. 3A-C illustrate exemplary ruby lattices according to the present disclosure. Referring to FIG. 3A, a kagome lattice 302 is shown in grey lines superimposed on ruby lattice 301. It will be appreciated that when particles 303 are placed at the vertices of ruby lattice 301, they are located on the edges of corresponding kagome lattice 302.

A ruby lattice has a free parameter $\rho$, corresponding to the aspect ratio of the quadrilateral portion of the lattice. FIG. 3A depicts a lattice 301 with $\rho=\sqrt{3}$; FIG. 3B depicts a lattice with $\rho=1$ (yielding a square quadrilateral portion); and FIG. 3C depicts a lattice with $\rho=3$. Referring again to FIG. 3A, it will be appreciated that the correspondence between ruby lattice 301 and kagome lattice 302 arises when $\rho=\sqrt{3}$. As set forth below, tuning of $\rho$ enables optimization of the properties of the spin liquid.

In addition to the lattice, FIG. 3C shows seven interaction distances from particle 304. As shown, each successive radius includes additional particles in the lattice as follows: radius 311—2 particles; radius 312—4 particles; radius 313—6 particles; radius 314—10 particles; radius 315—11 particles; radius 316—13 particles; radius 317—17 particles. As set out more fully below, selection of the number of particles within a given interaction radius provides the conditions required for the realization of a quantum spin liquid (QSL).

Figure 4:
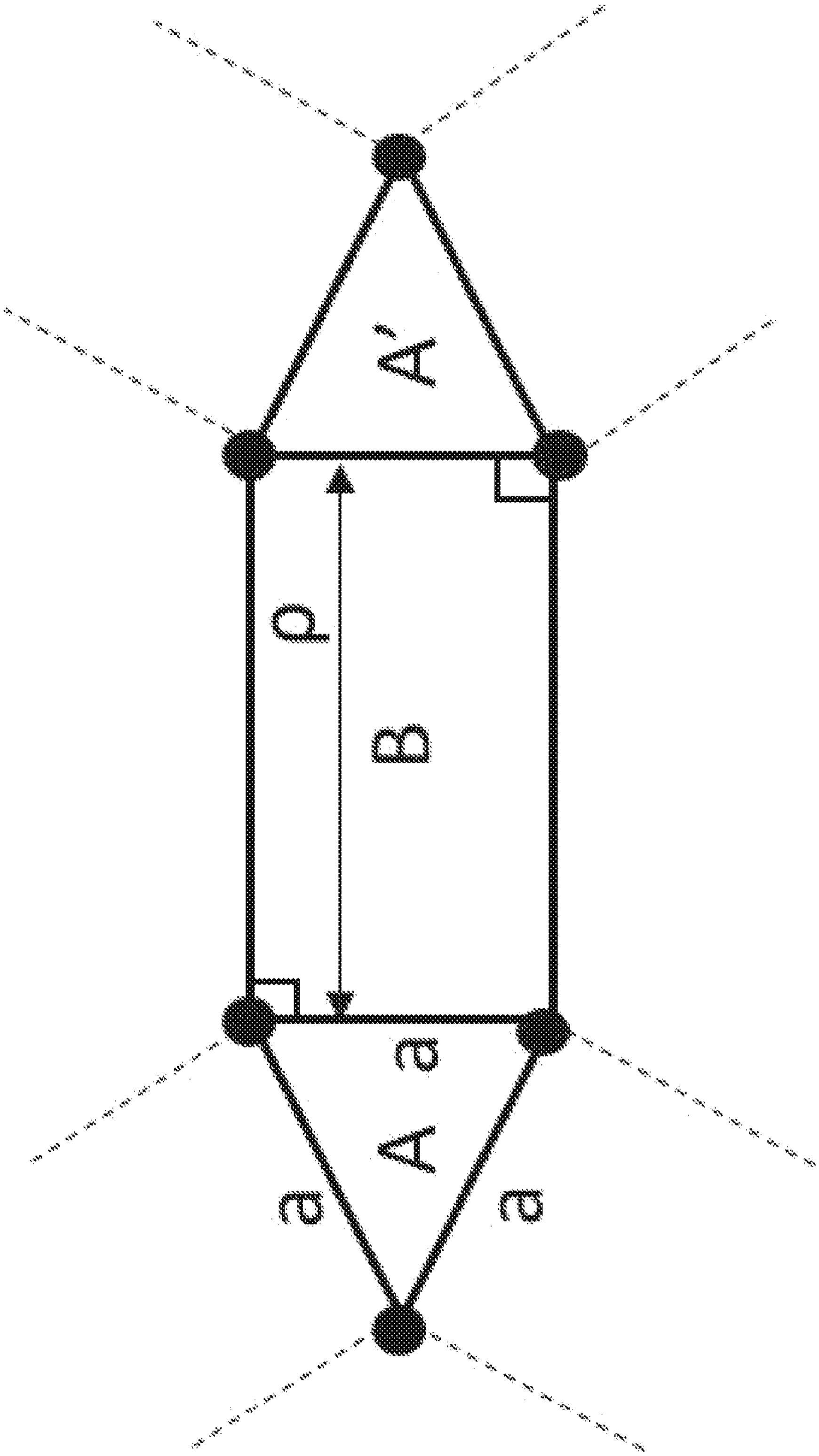
FIG. 4 depicts an ideal unit cell of a ruby lattice according to embodiments of the present disclosure.

FIG. 4 depicts an ideal unit cell of a ruby lattice. Any unit cell of the lattice can be deformed to the extent that such deformation does not eliminate the quantum spin liquid properties of the lattice described herein. For example, the left or the right triangles A and A' can deviate from being equilateral, whereas the quadrilateral B can deviate from being a rectangle.

As used herein, the term "edge" refers to a unidimensional manifold of vertices of a ruby lattice occupied by particles. An edge can be a segment having two endpoints or a closed loop. Edges can be outer edges or interior edges. The "outer edge" refers to a subset of particle-occupied lattice vertices that can be approached from an infinite distance without traversing any unit cell having at least one particle-occupied vertex. The term "interior edge" refers to a subset of particle-occupied lattice vertices circumscribing a contiguous area of the lattice such that no vertex of the interior edge also belongs to an outer edge.

As set forth further below, an interior edge may circumscribe a region containing lattice vertices that are not particle-occupied. An interior edge may alternatively circumscribe a region containing lattice vertices that are particle-occupied, but whose particles differ from particles elsewhere in the lattice with respect to a physical property or a state and thus do not interact via van der Waals interactions with the particles in the bulk of the lattice. For example, circumscribed particles may be driven into a ground state.

With reference to the unit cell of FIG. 4, it will be appreciated that a variety of path segments may be defined relative to the unit cell or a lattice comprising multiple unit cells. First, a segment may extend between two vertices in a triangular portion of a unit cell. Such a segment would correspond to an edge of one of the triangular portions (A or A') of the unit cell in the above figure. Second, a segment may extend between two vertices in a quadrilateral portion of a unit cell. Such a segment would correspond to either an edge of the quadrilateral portion (B) of the unit cell, or to a diagonal connection between non-adjacent vertices of the quadrilateral portion. Third, a segment may extend between vertices in different unit cells within a ruby lattice. For example, when a segment extends between two vertices in different unit cells of the ruby lattice without crossing any unit cells of the ruby lattice, this refers to a segment that extends through the hexagonal void that appears when multiple unit cells are assembled in a lattice.

For a quadrilateral portion that is a rectangle having a width of one, it will be appreciated that the length is equivalent to the aspect ratio of the quadrilateral portion and thus equal to $\rho$ as pictured in FIG. 4. In the unit cell, a is the length of a leg of the equilateral triangle portion, which generally corresponds to the smallest distance between atoms in the array. Accordingly, the edges of the quadrilateral portion have lengths of a and ρa.

Realization of Quantum Spin Liquid

For a particular choice of ρ for a ruby lattice, three additional parameters are selected to produce a quantum spin liquid: Ω sets the Rabi frequency term (which causes transitions between a ground state and an excited state); δ which sets the detuning (which can analogized to a chemical potential that favors excited states for positive δ and the ground state for negative δ); and the blockade radius $R_b$ (this sets the distance within which it is unlikely to encounter two excited Rydberg atoms due to repulsive dipolar interactions). Ω sets the overall scale of the Hamiltonian (which does not directly affect the physics), and so Ω may be set to 1 without loss of generality (this can be interpreted as choosing our energy units such that Ω=1, which can always be done). Accordingly, fixing $$\frac{\delta}{\Omega}$$

and the blockade radius $R_b$ is sufficient.

A quantum spin liquid is realized on a ruby lattice in a region of the parameter space as follows. $R_b$ is chosen in view of ρ such that it contains not more and not less than the 6 nearest neighbors around any given vertex of the lattice. The detuning parameter δ

$$\left(\text{or } \frac{\delta}{\Omega} \text{ for } \Omega \neq 1\right)$$

is then selected to achieve approximately $$\langle n \rangle = \frac{1}{4},$$

meaning that on average one quarter of all atoms n is in the excited Rydberg state. The combination of these properties leads to a sufficient covering of the lattice with excited particles.

Figure 5A:
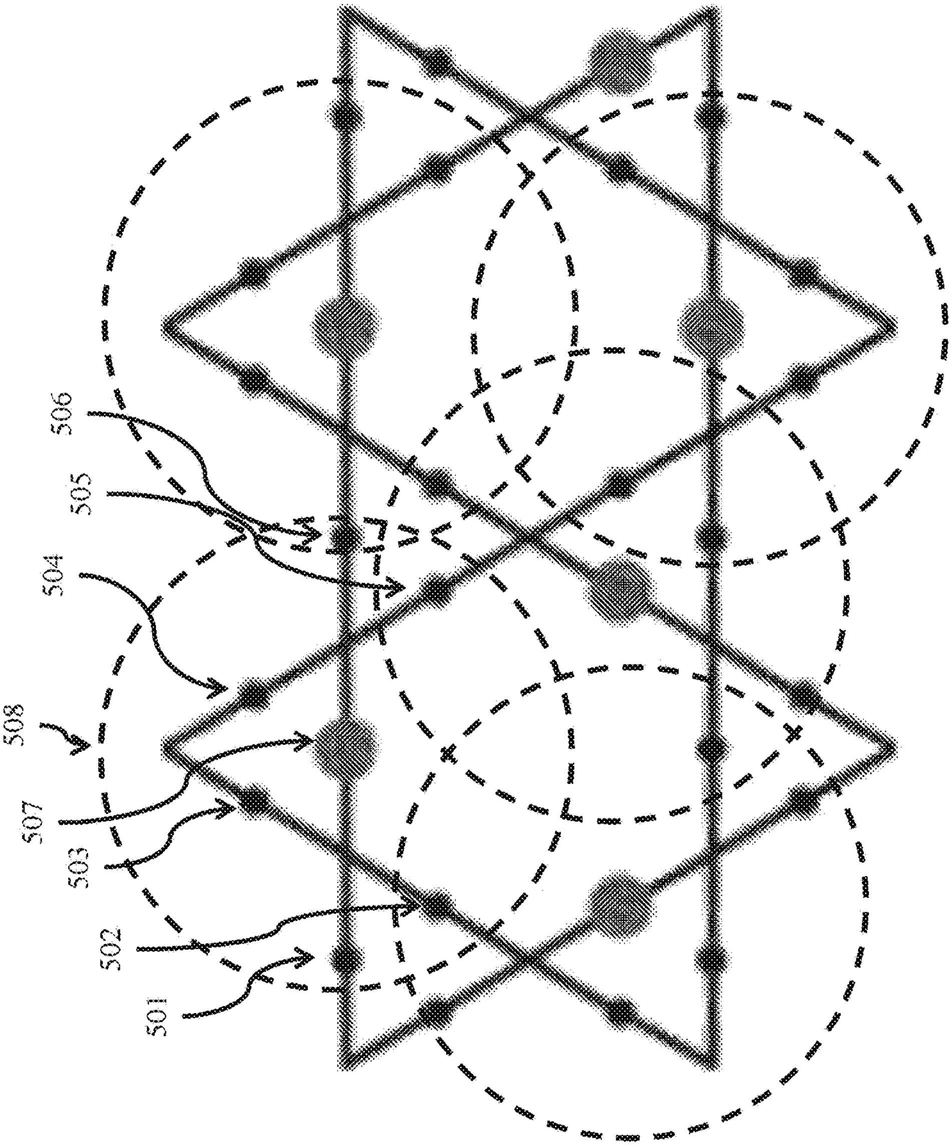
FIG. 5A-B depicts an approximate kagome lattice according to embodiments of the present disclosure.
Figure 5B:
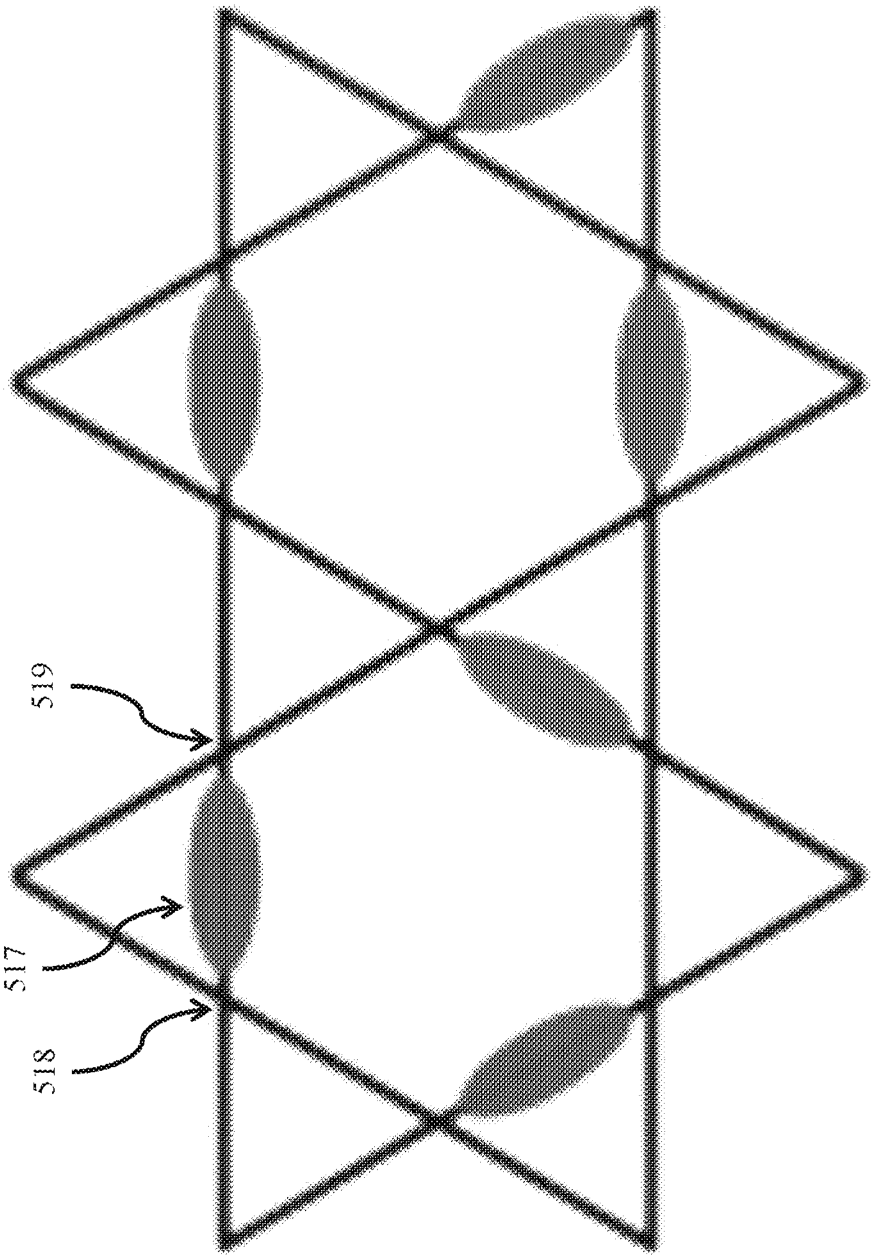

This covering may be visualized in terms of the kagome lattice. As noted above, there is a correspondence between a kagome lattice and a ruby lattice only when $\rho=\sqrt{3}$. However, an approximate kagome lattice may be drawn corresponding to an arbitrary value of ρ for the purposes of this visualization. Referring to FIG. 5A, an approximate kagome lattice is shown in which each small dot (e.g., 501 . . . 506) corresponds to a particle in the ground state on the ruby lattice, and each large dot (e.g., 507) corresponds to an excited particle in the ruby lattice. Circles (e.g., 508) are provided, illustrating a blockade radius $R_b$ about each excited particle sufficient to blockade its six nearest neighbors. Thus, excited particle 507 has blockade radius 508, which blockades nearest neighbors 501 . . . 506. As noted above, vertices of a ruby lattice map onto edges of a kagome lattice (or an approximate kagome lattice). Referring to FIG. 5B, each excited particles is drawn as a dimer connecting two vertices of the kagome lattice. Accordingly, particle 507 is depicted as dimer 517 connecting vertices 518, 519.

The dimer visualization provides a framework for visualizing anyons. In particular, if a particular vertex of the kagome lattice (corresponding to an edge in the ruby lattice between particles) has zero or more than one dimer touching it, it indicates the presence of an e-anyon (discussed further below). A vertex with no adjacent dimer can be referred to as a monomer, and a vertex with two adjacent dimers can be referred to as a double-dimer.

In addition to selecting the geometry and detuning as set forth above, sufficient quantum fluctuations are required to prevent the state from settling into a frozen or classical pattern, instead forming a quantum superposition of many distinct dimer coverings. Such fluctuations are quantified by a Rabi oscillation term. Whether the Rabi oscillation is strong enough to give rise to a QSL may be determined numerically, as set forth in the examples below. In an exemplary case, ρ=3, δ/Ω=5.3, and $R_b$=3.8a gives rise to a $\mathbb{Z}_2$ QSL, where a is defined as the length of the leg of the triangular portion of each unit cell, and thus the shortest distance between two Rydberg atoms on the ruby lattice for ρ≥1. This case is merely exemplary, and it will be appreciated that the present disclosure enables determination of additional parameters suitable for the realization of a $\mathbb{Z}_2$ QSL. These parameters may be spatially varying across the ruby lattice. Although spatial variation is not necessary for realization of the quantum spin liquid, variation of these parameters allow establishment of boundary conditions as set forth below.

The tunable parameters may thus be controlled as follows. The aspect ratio of the rectangles in the ruby lattice (ρ) may be controlled by moving the particles within the optical tweezer array into new positions according to the chosen value of ρ. The Rabi oscillation parametrized by Ω is controlled by varying the laser intensity. The detuning term δ is controlled by changing the laser frequency (and captures how much the laser is off-resonance between the ground state and excited state energy splitting).

The blockade radius $R_b$ for a given atomic species and chosen Rydberg state is known once 12 is known. In particular, it is understood in the art that $R_b$ depends on the $6^{th}$ root of Ω. It will be appreciated that while $R_b$ is not an independent parameter, it is convenient to describe the condition for a QSL in terms of $R_b$ rather than 12.

As noted above, an exemplary configuration in which a $\mathbb{Z}_2$ QSL exists is a ruby lattice with rectangle aspect ratio ρ=3. Ω is tuned such that $R_b$=3.8a where a is the spacing between two neighboring Rydberg atoms (a is on the order of a micrometer). The detuning δ is set equal to 5.3ω. At this point in the parameter space, a numerical simulation of the full system demonstrates that there is a $\mathbb{Z}_2$ QSL, as set out in detail in the examples below.

However, a $\mathbb{Z}_2$ QSL will emerge in a broader subset of the parameter space. In principle, and $$\rho > \frac{1}{\sqrt{2}}$$

(approximately 0.71) can be considered, since for any such lattice, one can draw a radius around an atom that contains the 6 atoms to be blockaded. More precisely, it means that Ω can be tuned such that the blockade radius will contain (only) the 6 atoms to be blockaded. One can write down this condition mathematically as follows:

$$\sqrt{1+\rho^2} < \frac{R_b}{a} < \min\left\{\sqrt{3}\,\rho,\ \sqrt{1+\sqrt{3}\,\rho+\rho^2}\right\} \quad \text{Equation 2}$$

This relation gives the range of ρ, and the corresponding range of $R_b$. As discussed above, a range of $R_b$ is equivalent to a range of Ω once the type of atom is fixed. What remains to be determined is a range for the detuning δ. As discussed above, δ tunes the likelihood of an atom being in the ground state or the excited state. In particular, if $\delta \to -\infty$, all atoms are in the ground state, and if $\delta \to +\infty$, all atoms are excited. δ can thus be used to tune this likelihood. The desired value of δ is chosen such that the probability of finding an atom in the excited state is approximately 0.25. As discussed above, this probability corresponds to a dimer covering in which each vertex of the kagome lattice has one adjacent dimer. This probability can be measured experimentally by taking a snapshot of the atom array at a given δ and determining the ratio between atoms in the ground state and those in the excited state. In this way, δ may be determined by iteratively measuring the system and increasing or decreasing δ until the desired density is achieved.

It will be appreciated that creation of anyons and boundary conditions involves a departure from an exact covering of this kind. Accordingly, it will be appreciated that the observed state of the QSL may depart from the ideal 0.25 probability of excitation.

For any given set of parameters in the range described above, the presence of a $\mathbb{Z}_2$ QSL may be confirmed numerically using the methods set out in detail below. The QSL may also be experimentally confirmed by measuring e-type and m-type string parity as set out below (e-type and m-type strings may alternately be referred to as X strings and Z strings, respectively).

Figure 6:
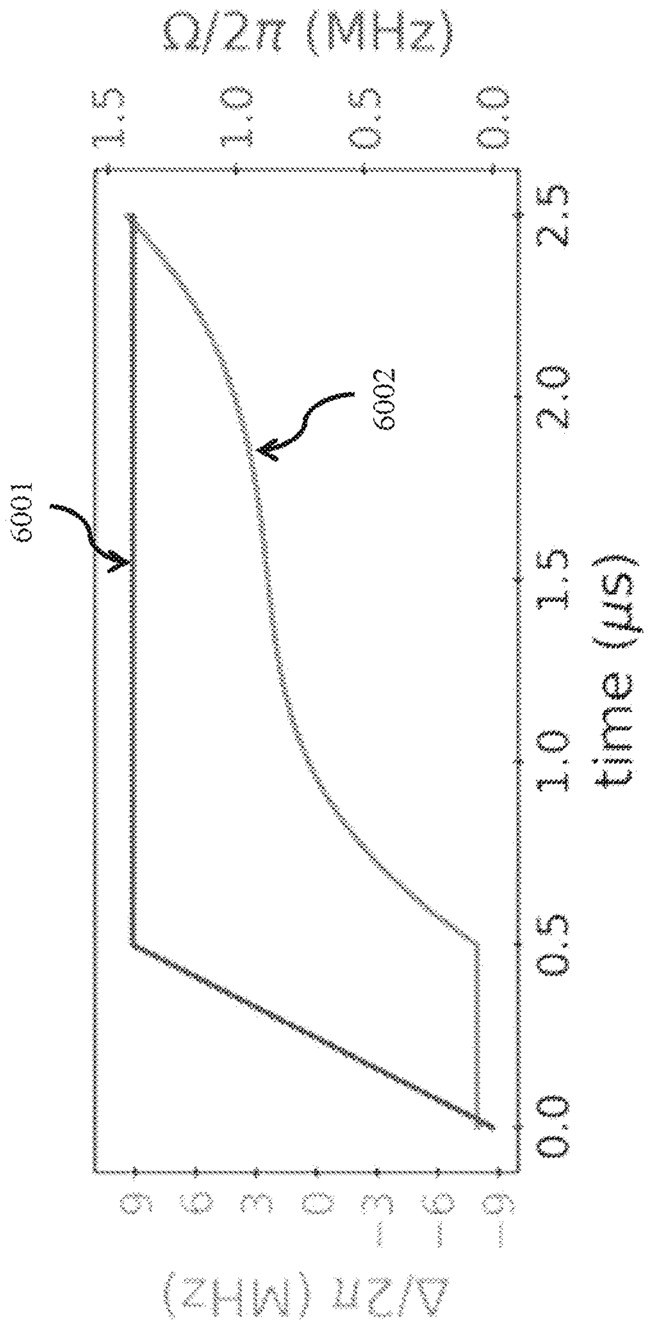
FIG. 6 illustrates an exemplary state preparation protocol for a quantum spin liquid according to embodiments of the present disclosure.

Referring to FIG. 6, an exemplary state preparation protocol for the quantum spin liquid is provided. As shown, the detuning and amplitude of the optical transition to the Rydberg state are dynamically adjusted to realize the quasi-adiabatic preparation of the spin liquid state. The quasi-adiabatic preparation consists of a slow turn on of the amplitude (Ω, depicted by line 6001 as $$\frac{\Omega}{2\pi})$$

while the detuning (Δ, depicted by line 6002 as $$\frac{\Delta}{2\pi})$$

is kept to large negative values, followed by a detuning sweep from negative to positive values. Ω is typically increased linearly over a time $\sim 1/\Omega_{max}$. The detuning sweep can be a cubic function or any functional form Δ(t) where the slope is steeper at the beginning and at the end of the sweep but slows down around $\Delta_{gap}$, i.e., where the energy gap between the ground state and the excited state is at a minimum. To avoid excitations in the quantum state being created, parameters must be tuned more slowly in that part of the phase diagram. The duration of the sweep is of order a few (2 to 10) $1/\Omega_{max}$ (as shown in the horizontal axis of FIG. 6).

This quasi-adiabatic preparation of the spin liquid phase initializes the topological qubit in the $|+\rangle = (|0\rangle + |1\rangle)/\sqrt{2}$ state.

Readout of State

A variety of methods may be used to read out the state of an array of atoms. In general, these methods use fluorescence imaging to readout all atoms. From such a snapshot, the atoms in the ground state and in the excited (Rydberg) state may be identified.

Fluorescence imaging detects atoms in $|g\rangle$, while atoms in $|r\rangle$ are detected as loss. As noted above, the Rydberg atoms are anti-trapped by the optical tweezers and so are lost as soon as we turn the tweezers back on. In some embodiments, a strong microwave (MW) pulse is applied to ionize the Rydberg atoms and increase the loss probability.

Measuring String Parity

To experimentally confirm the quantum spin liquid and to read out the state of topological qubits, string correlation properties are measured based on snapshots of the atom array. In particular, for "strings" or "paths" (which are used interchangeably) meeting certain constraints, parity is measured as set out below.

A string is a collection of atoms that constitute a one-dimensional subset of the vertices of the two-dimensional ruby lattice. For any such subset, a parity can be measured. The parity of a single vertex in the lattice is defined as +1 if that vertex has an atom in the ground state and −1 if that vertex has an atom in the excited state. The parity of a string or path is the product of the parities of the constituent vertices.

Depending on its particular traversal of the ruby lattice, a string may be of m-type or of e-type.

Figure 7:
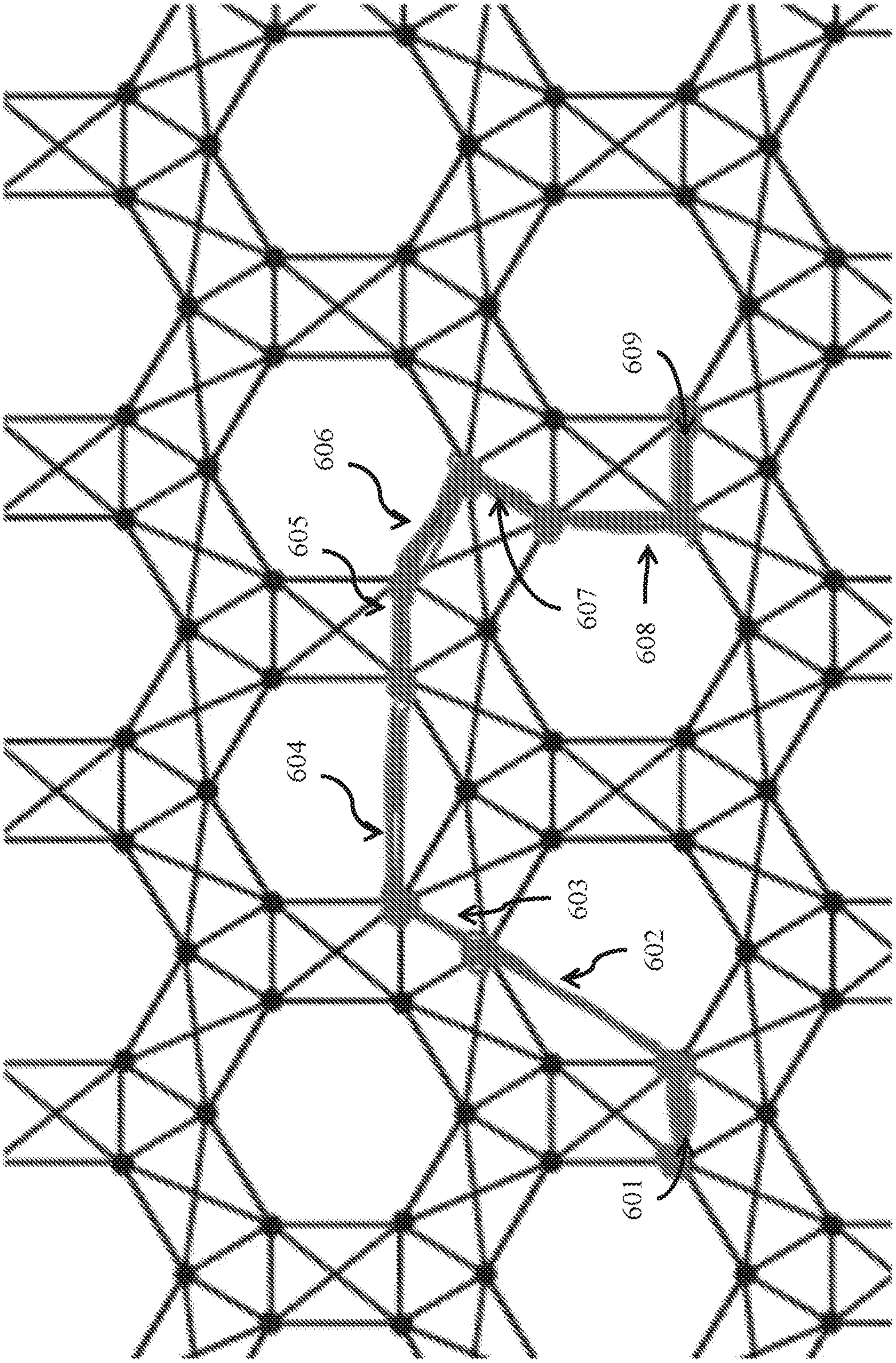
FIG. 7 illustrates an exemplary m-type string according to embodiments of the present disclosure.

Referring to FIG. 7, an exemplary m-type string is illustrated. An m-type string is assembled piecewise from segments, each of which extends along either an edge of a triangle portion of the ruby lattice, or extends across a chord of the hexagonal cell of the ruby lattice. A chord in this context refers to a line extending between two vertices of a hexagon.

In the example of FIG. 7, segments 601, 603, 605, 607, and 609 extend along an edge of a triangular portion of the lattice. Segments 602, 604, 606, and 608 extend across chords of a hexagonal cell.

The parity of an m-type string extending between different edges having the m-type boundary condition corresponds to the logical state of a topological qubit as described further below.

Figure 8:
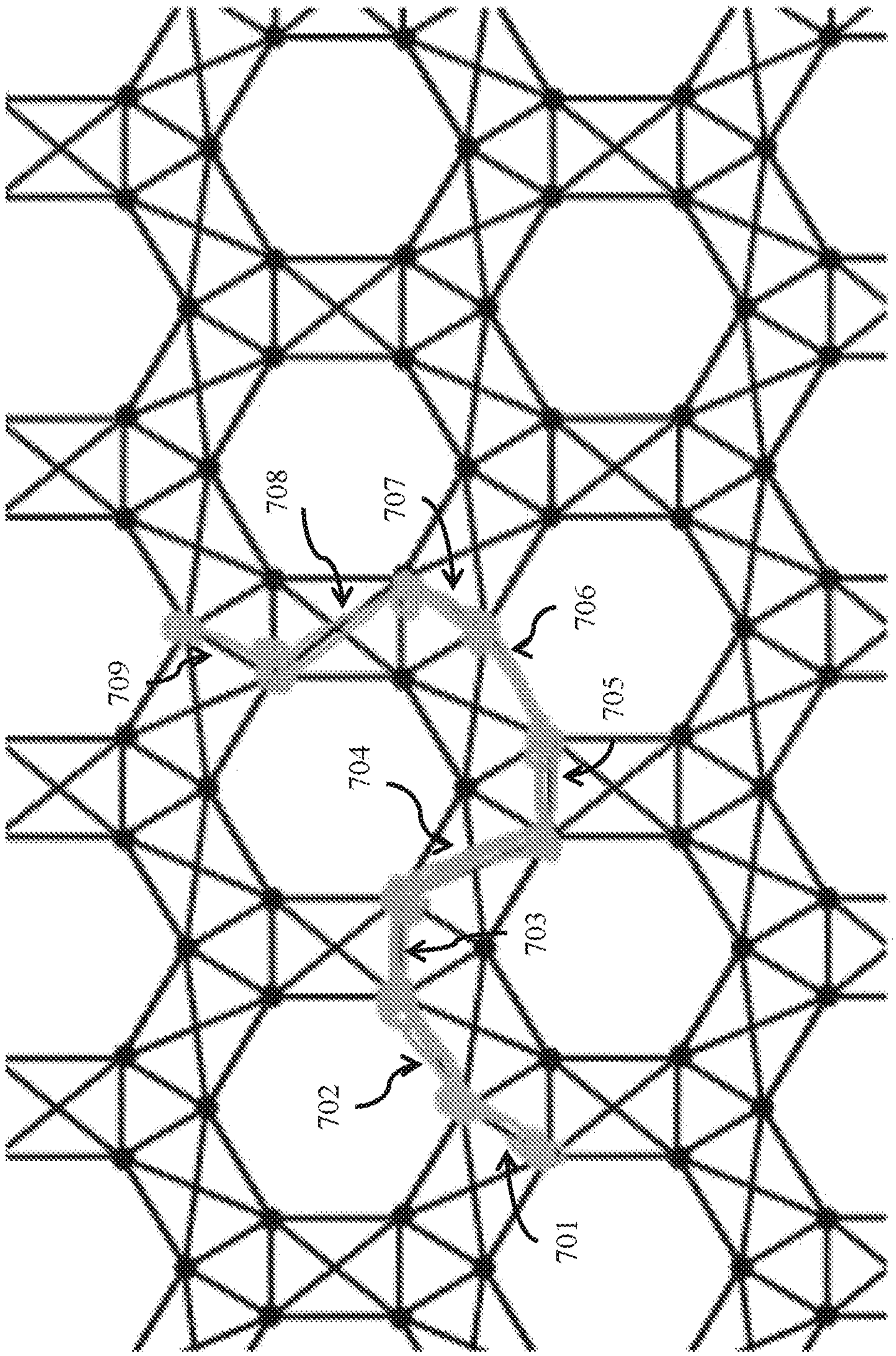
FIG. 8 illustrates an exemplary e-type string according to embodiments of the present disclosure.

Referring to FIG. 8, an exemplary e-type string is illustrated. An e-type string is assembled piecewise from segments, each of which extends along either an edge of a triangle portion of the ruby lattice or along an edge or diagonal of a rectangular portion of the ruby lattice. In addition, an e-type string must not contain more than one edge of a given triangular portion of the lattice, and must not contain more than one edge or diagonal of a given rectangular portion of the lattice (that is, each triangular portion or rectangular portion must contribute no more than one segment to the string).

In the example of FIG. 8, segments 701, 703, 705, 707, and 709 extend along an edge of a triangular portion of the lattice. Segments 702 and 706 extend along an edge of a rectangular portion of the lattice. Segments 704 and 708 extend along a diagonal of a rectangular portion of the lattice.

Figure 9:
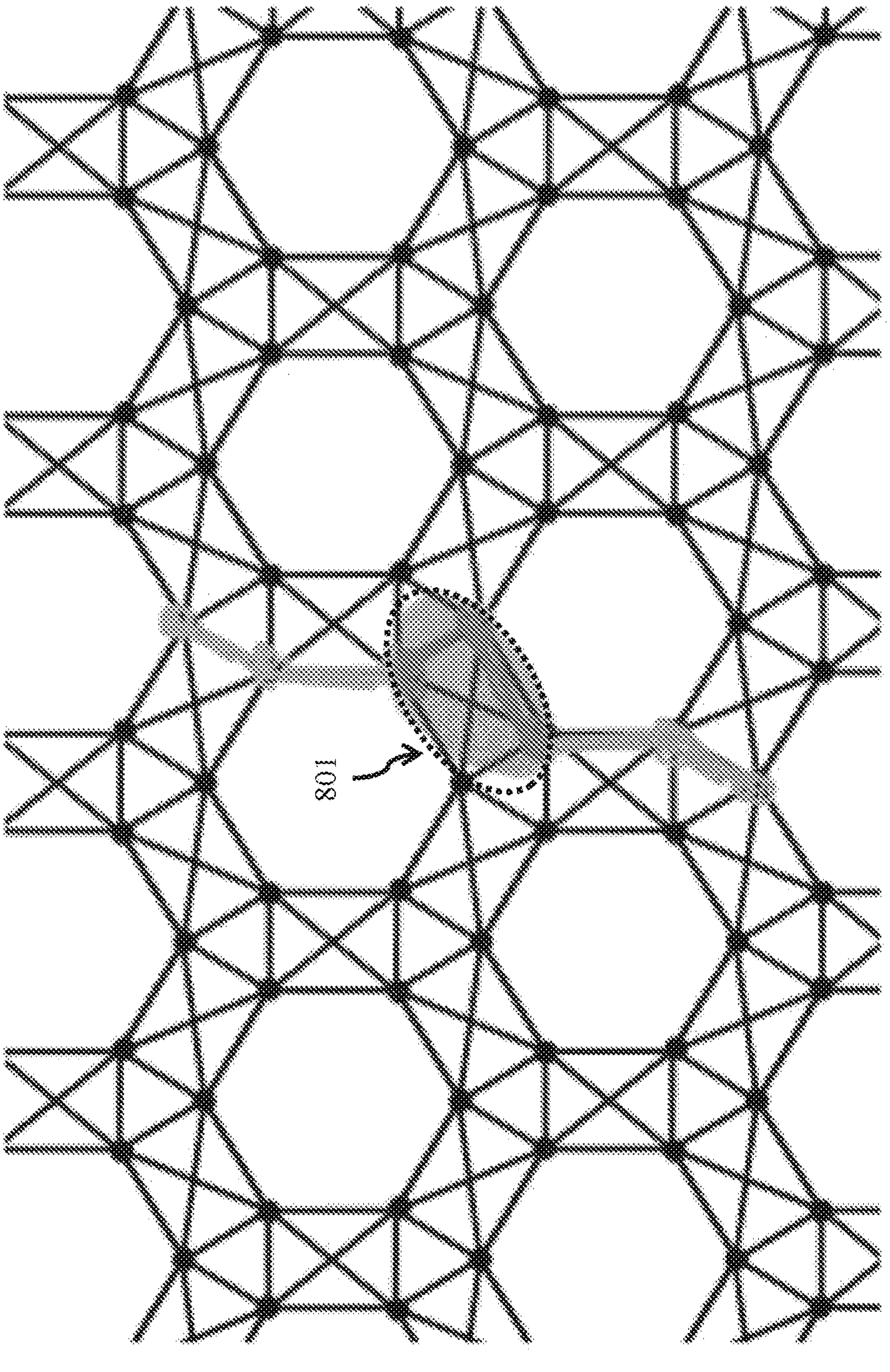
FIG. 9 illustrates an invalid e-type string according to embodiments of the present disclosure.

Referring to FIG. 9, an invalid e-type string is illustrated. While the remainder of the string meets the criteria for an e-type string, rectangular portion 801 contains two segments, and so violates one of the e-type string criteria.

To measure the parity of a string, the state of each vertex on the string is determined, for example by fluorescence imaging. Each vertex is assigned a parity or +1 for the ground state and −1 for the excited state. These values are multiplied together to yield a parity of +1 or −1 for the string.

In the experimental context, a single string measured in a single snapshot will always yield a value of +1 or −1. However, as these are probabilistic values, simulation will yield a fractional value tending towards +1 or −1, reflecting the quantum superposition of states. Likewise, in order to achieve a value that reflects the probability distribution of the QSL, multiple measurements of the same string may be performed and averaged.

Confirmation of Quantum Spin Liquid

The presence of a QSL can be experimentally confirmed by measuring the parity of particular m-type and e-type strings. In the following discussion, both closed loops and open strings are considered.

Figure 10A:
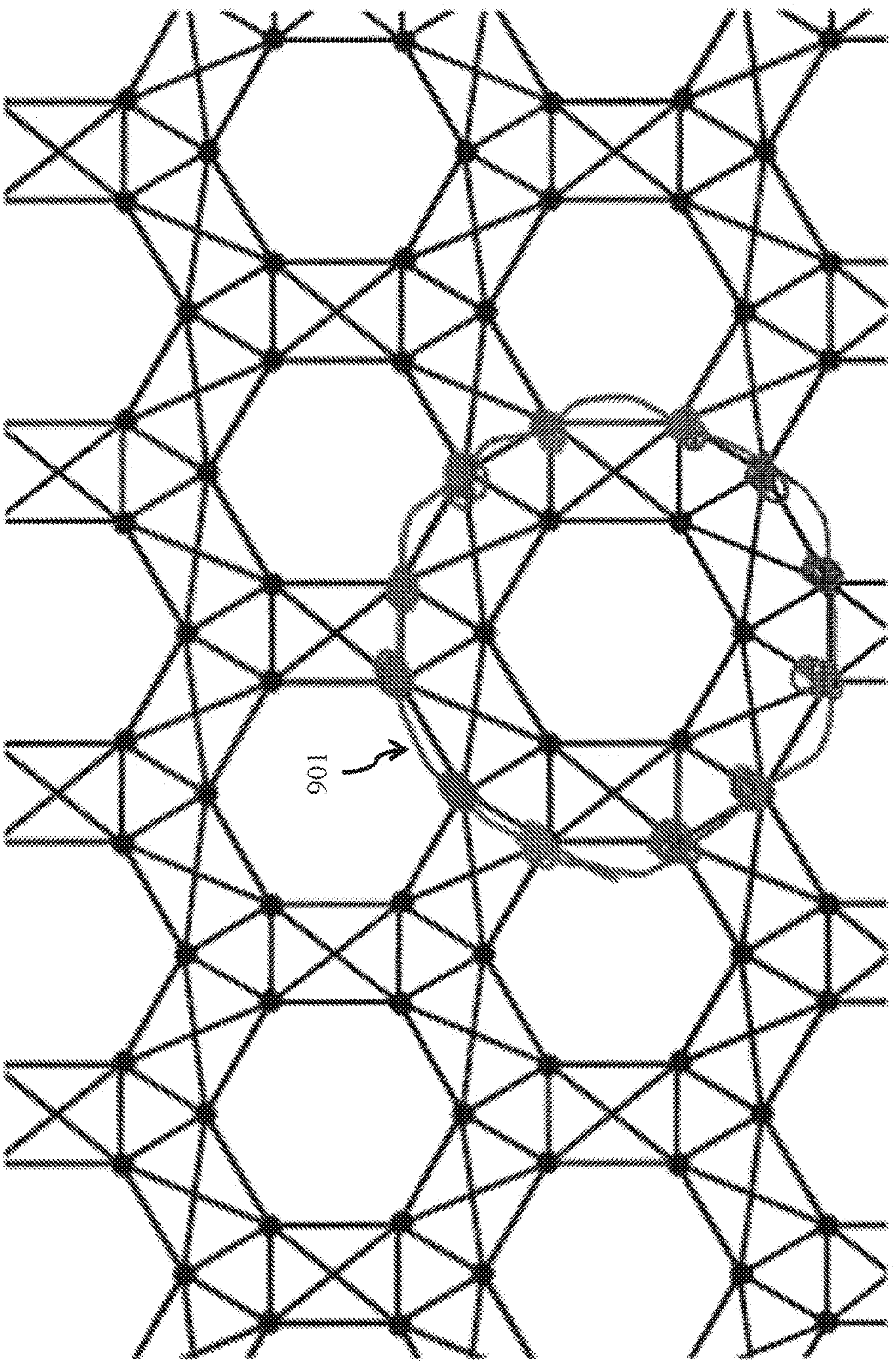
FIGS. 10A-C illustrate an exemplary closed m-type string and corresponding open strings according to embodiments of the present disclosure.
Figure 10B:
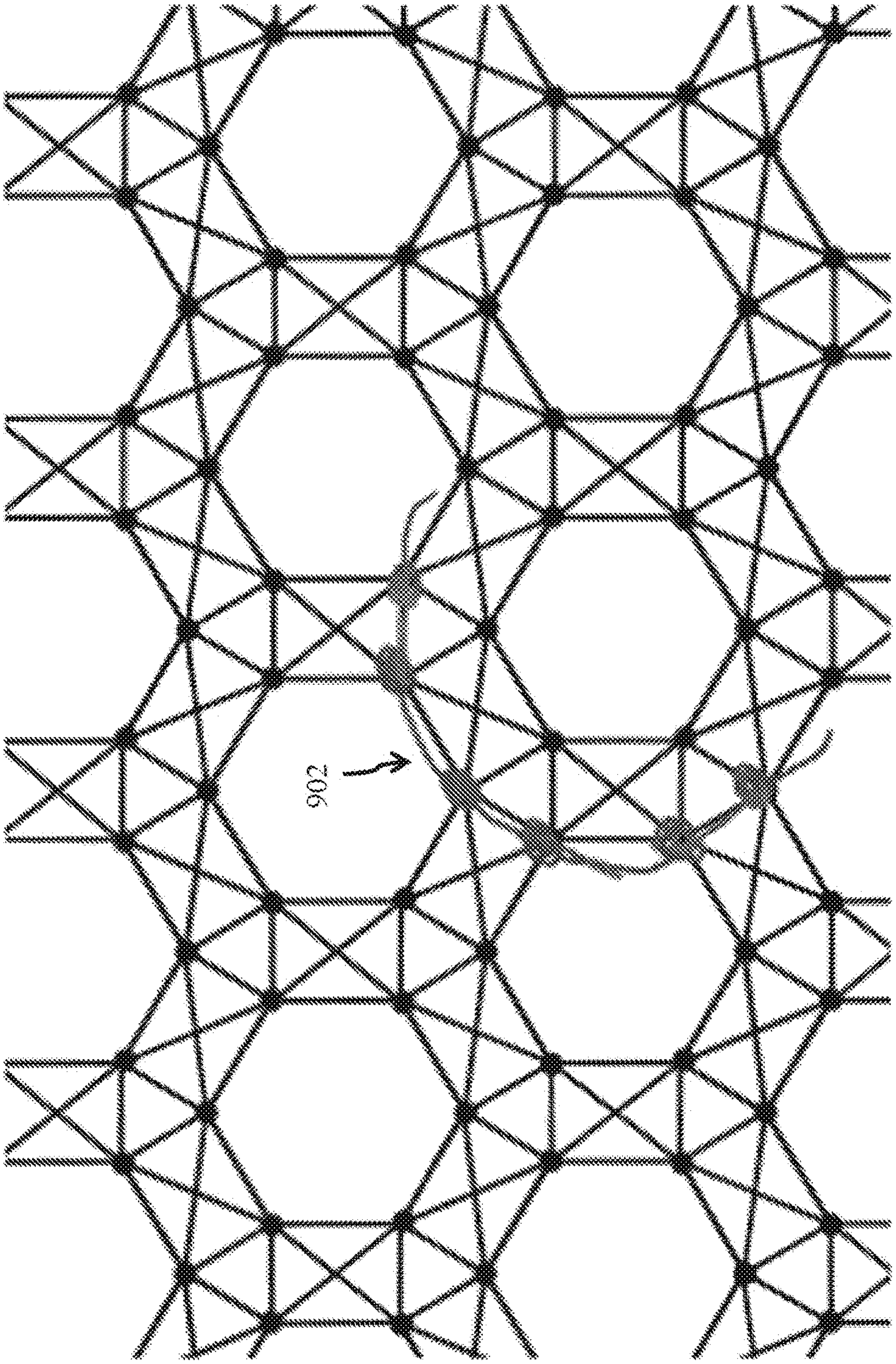
Figure 10C:
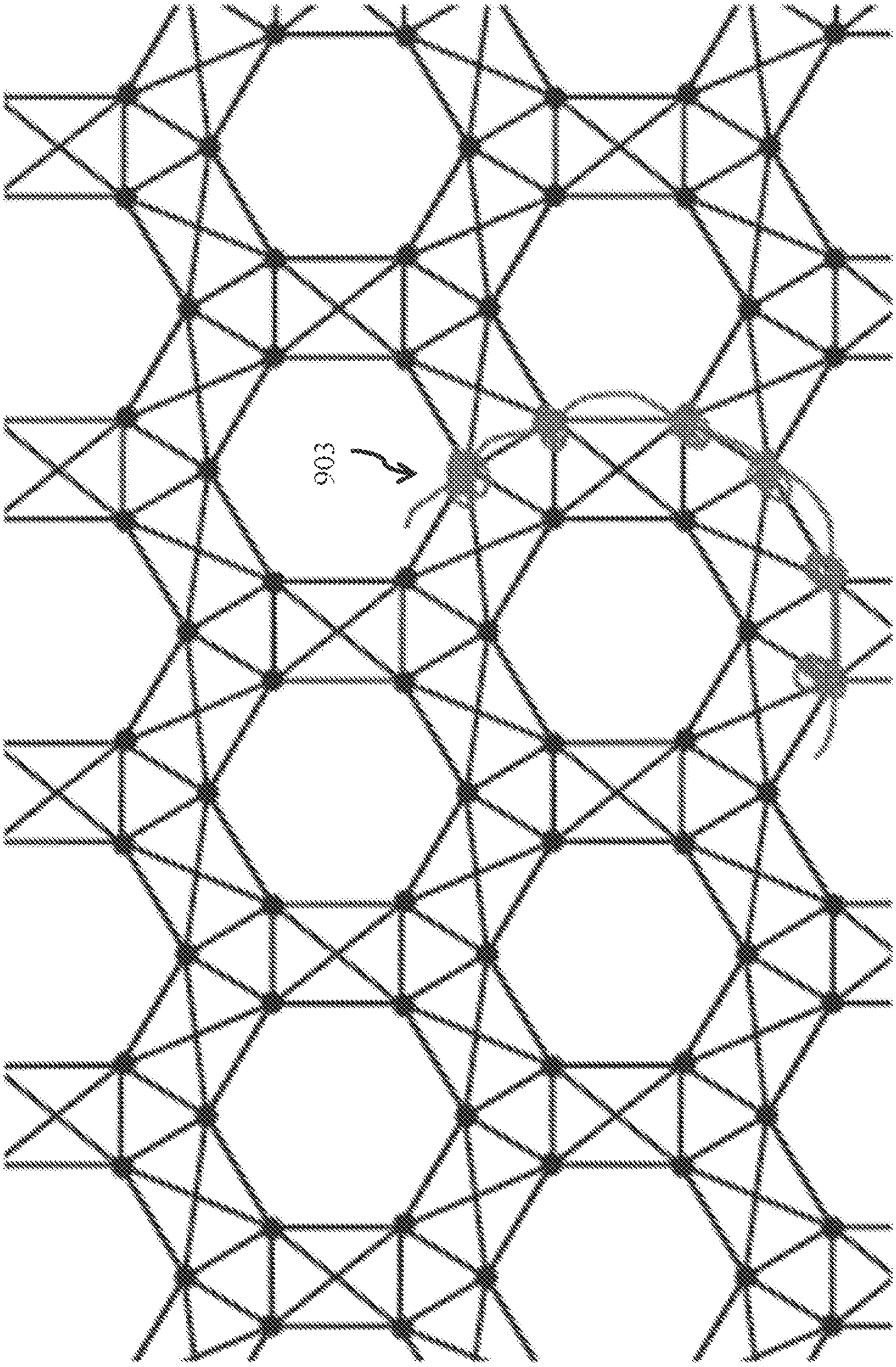

Referring to FIG. 10A, an exemplary closed m-type string 901 is illustrated. This string both meets the criteria for an m-type string and also has no endpoints. As described above, one can measure the parity of the 12 atoms in string 901. For ease of reference, the resulting value can be denoted $P_{12}$. Referring to FIGS. 10B and 10C, open string 902 and 903 are shown, which together make up closed loop 901. The parity of open string 902 (which includes 6 atoms) is denoted $P_{6,left}$. The parity of open string 903 (which also includes 6 atoms) is denoted $P_{6,right}$.

Figure 11A:
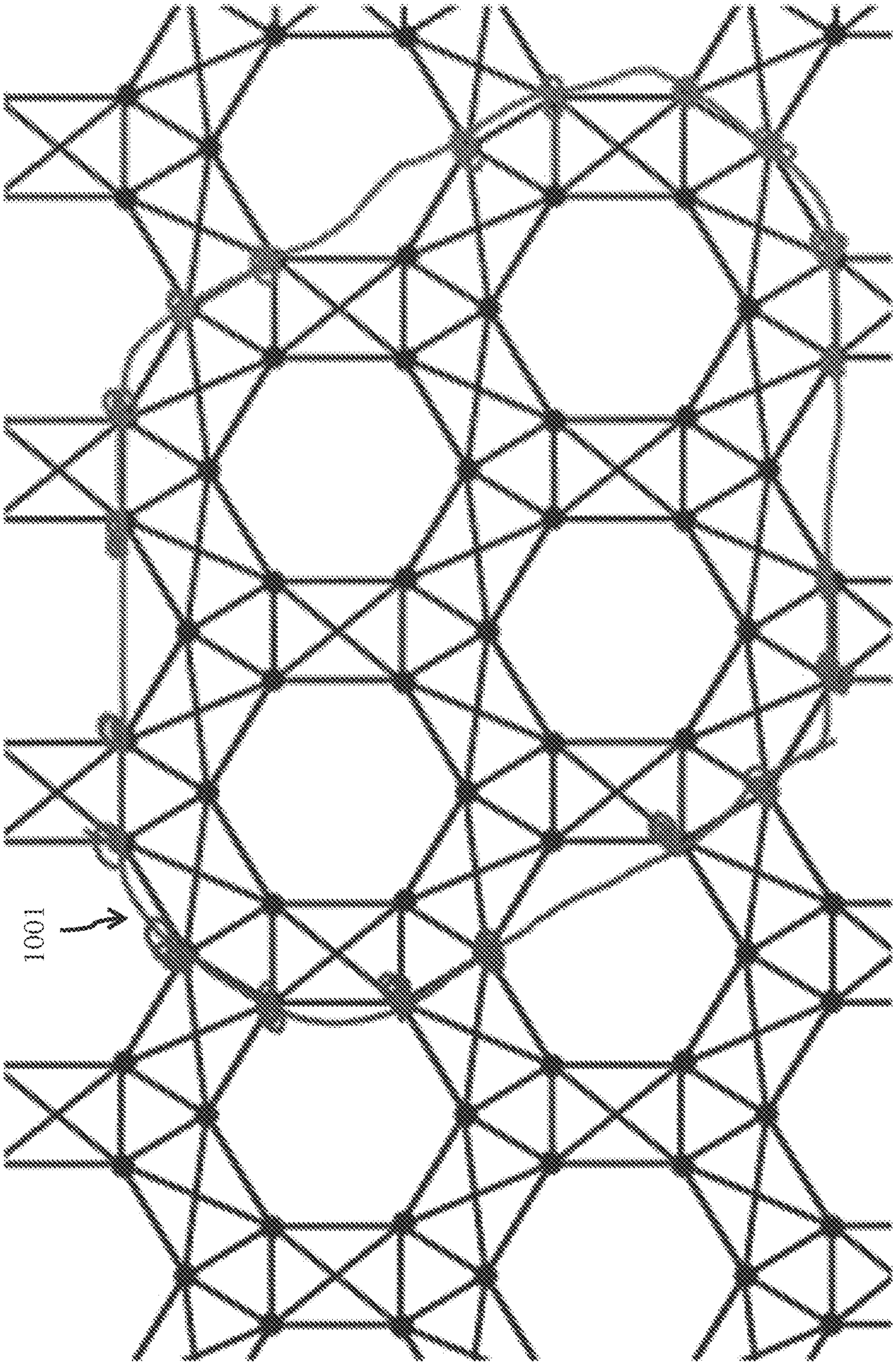
FIGS. 11A-C illustrate an exemplary closed m-type string and corresponding open strings according to embodiments of the present disclosure.
Figure 11B:
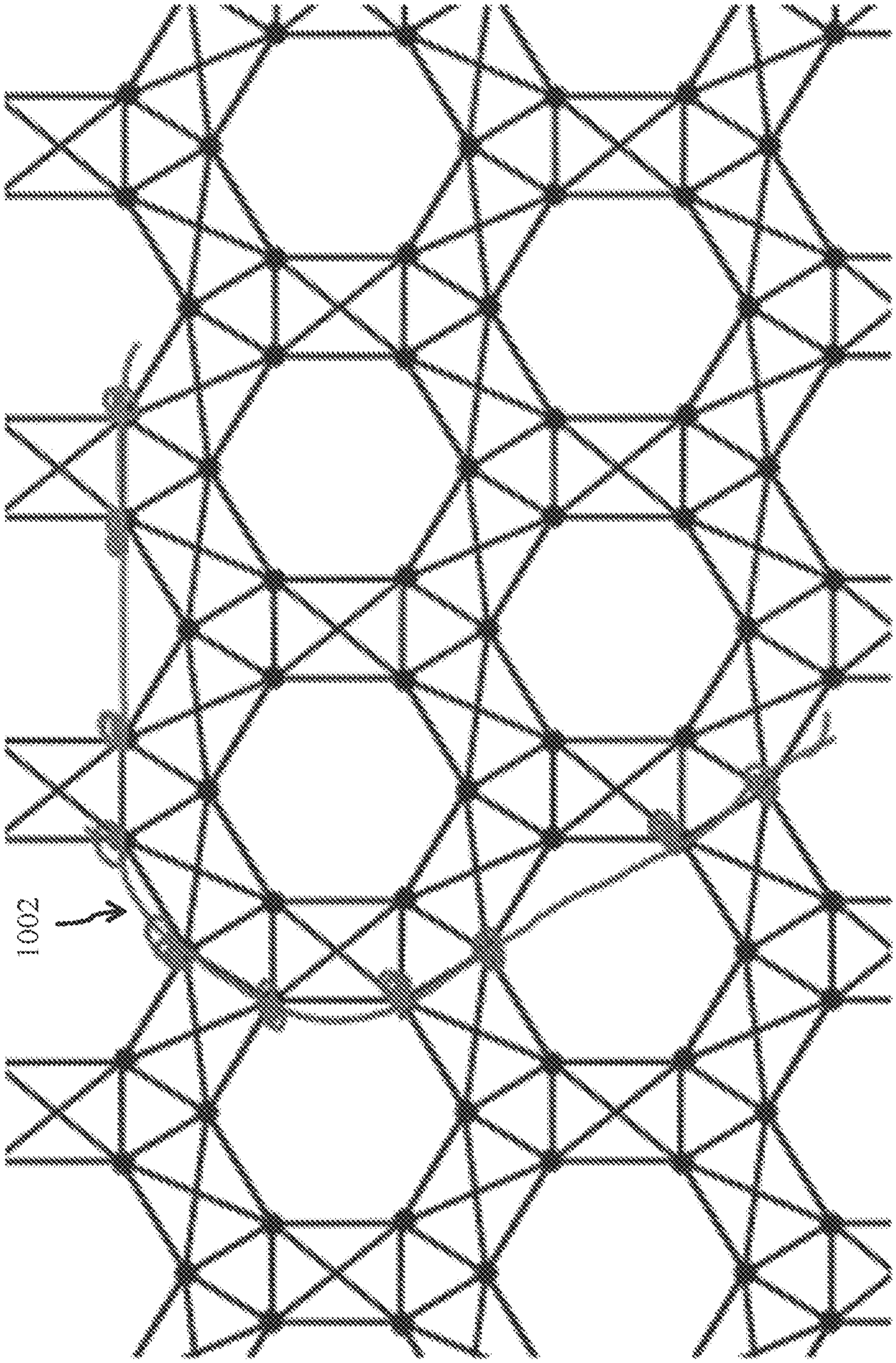
Figure 11C:
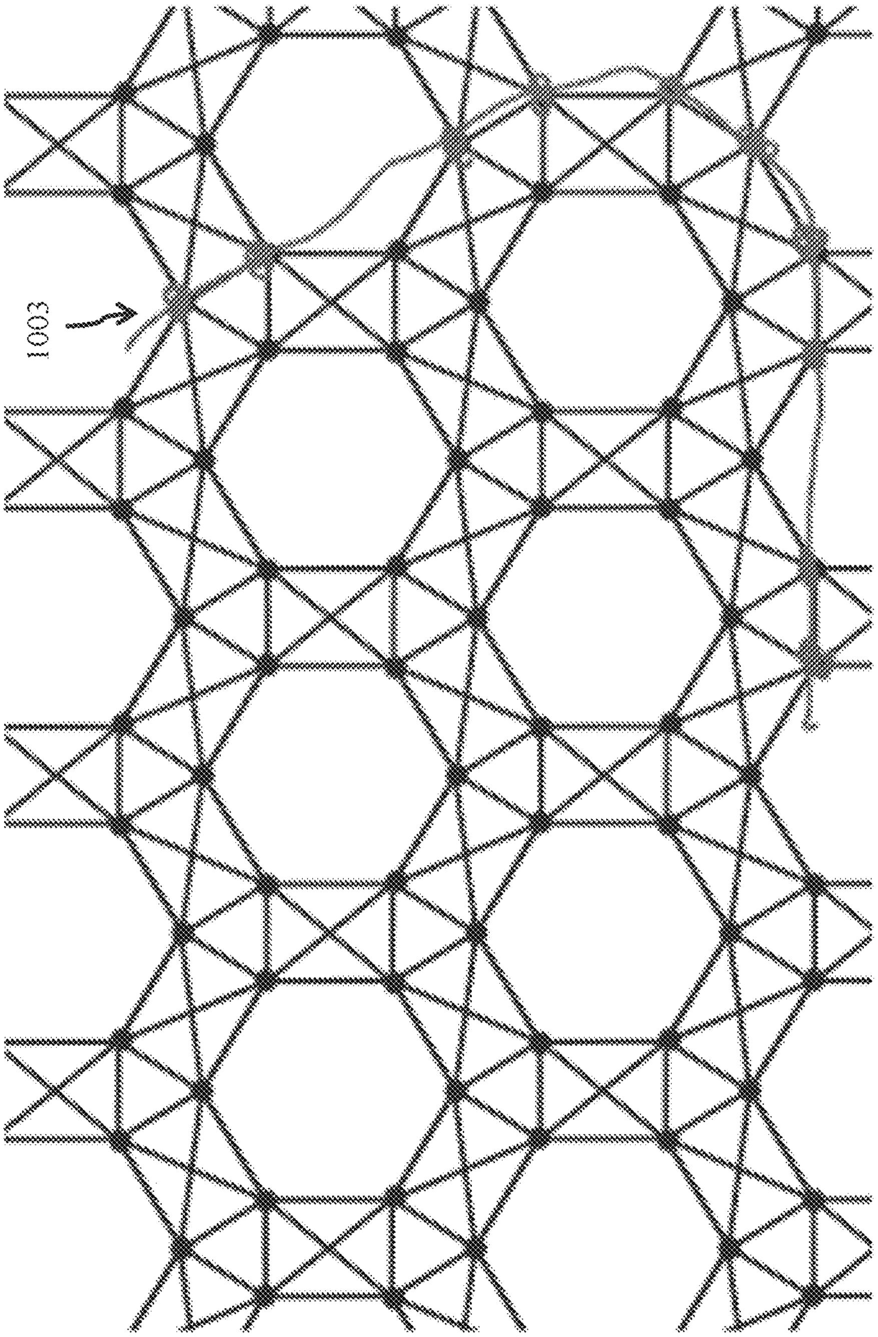

If the topological state of the atoms in the lattice is a QSL, then the ratio of the open and closed strings must be very small. More precisely: $P_{6,left}\ P_{6,right}/P_{12}$ must be exponentially small in the length of the string. Indeed, one can measure the same ratio for bigger strings, as illustrated in FIGS. 11A-C. In the denominator would be the parity associated with the closed loop 1001, whereas the numerator would be the product of the parity of the open strings 1002 and 1003. Thus, the ratio of the longer string would be denoted $P_{10,left}P_{10,right}/P_{20}$. For a QSL, this quantity would decrease exponentially fast with string length. Similarly, in the QSL phase, the parity of closed loops (both e and m) must be finite, while the ratio of open to closed strings must be vanishingly small.

The same analysis may be applied using e-type strings, and likewise the above ratio will be exponentially small in string length for a QSL. The adherence to this property for both m-type and e-type strings provides a unique fingerprint for a QSL. For a given set of configuration parameters, the existence of a QSL can be determined once. Accordingly, a device with predetermined configuration parameters need not be retested for the presence of a QSL between operations.

Realizing Boundary Conditions

In order to use the $\mathbb{Z}_2$ QSL for topological quantum computation purposes, two distinct boundary conditions are realized. These are referred to as e-condensed and m-condensed boundaries.

As demonstrated numerically in the examples below, a termination of the lattice without modification of other parameters gives rise to an m-condensed boundary. That is, for a given lattice and δ and Ω yielding a QSL, termination of the lattice without modification of δ yields an m-condensed boundary.

Figure 12:
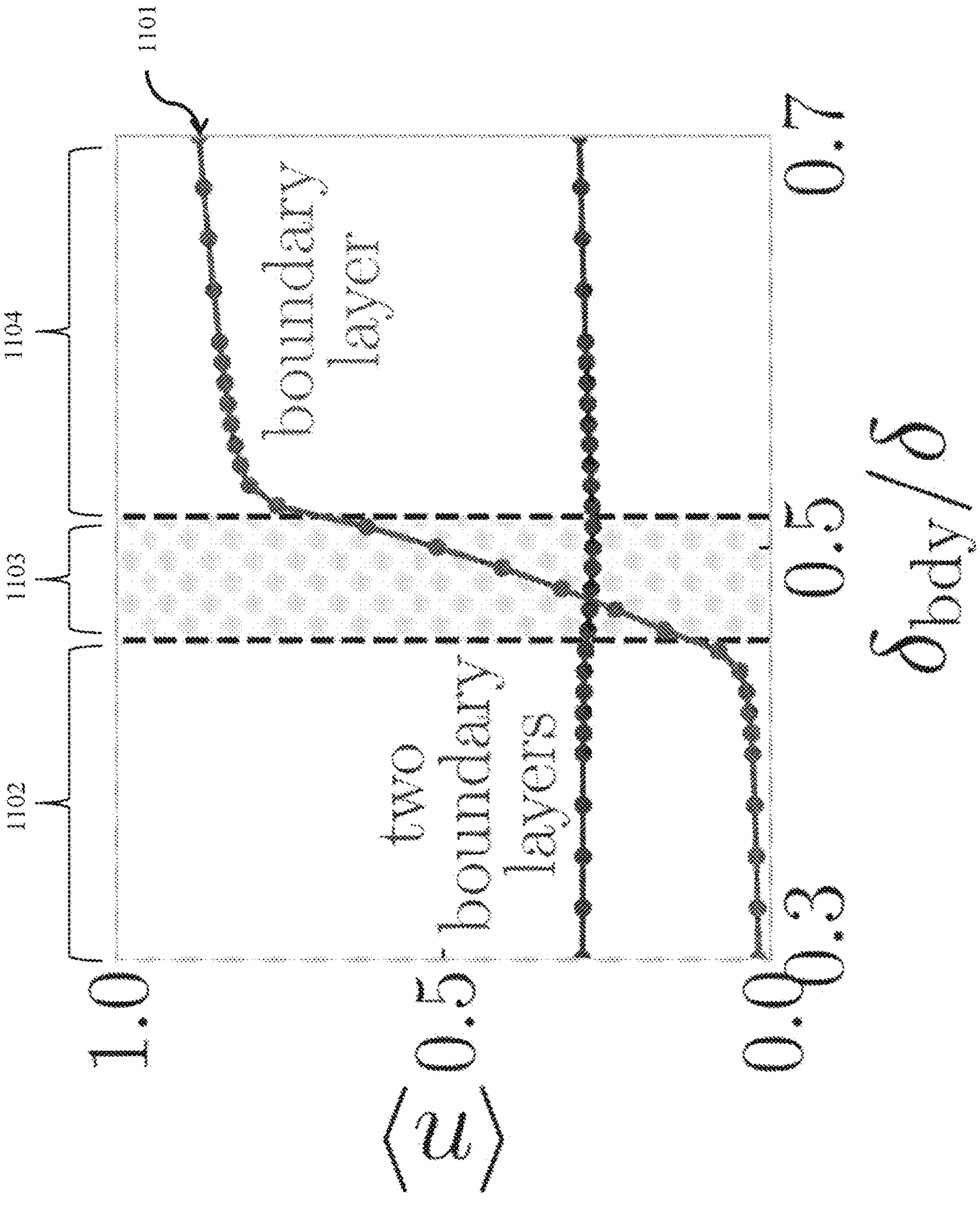
FIG. 12 is a plot is of (n) on the atoms at the boundary of an exemplary lattice according to embodiments of the present disclosure.

By changing the detuning δ at the edge, a phase transition is induced along the edge from the m-condensed boundary condition to a second boundary condition, e-condensed. Referring to FIG. 12, a plot is provided of ⟨n⟩ on the atoms at the boundary relative to the ratio $$\frac{\delta_{bdy}}{\delta}$$

between the detuning on the boundary of the lattice and detuning in the remainder of the lattice. In this example, curve 1101 illustrates that the m-condensed boundary condition is characterized by a density ⟨n⟩ which is quite insensitive to the choice of detuning at the boundary, that is, curve 1101 is quite flat in region 1102 and 1104. In contrast, the e-condensed boundary condition is characterized by a density (n) that is very sensitive to $\delta_{bdy}$, as evidenced by the large nonzero slope of curve 1101 in the region 1103.

Thus, measuring (n) can already be used to distinguish the two boundary conditions. In addition, the correlation length along the boundary diverges at the boundary phase transition when tuning from the m-boundary condition to the e-boundary condition and vice versa. Accordingly, measuring the correlation length along the boundary is another way to locate the boundary transitions.

For a given choice of bulk parameters that realizes the $\mathbb{Z}_2$ QSL (e.g., the values for ρ, δ, and $R_b$ given above) and for a particular choice of lattice edge geometry (which is also configurable), one can then map out the boundary phase diagram by changing delta at the boundary site(s) (as shown in the plot of FIG. 12). Based on the results for ⟨n⟩, one can determine which value of $\delta_{bdy}$ is necessary to realize the e-boundary condition. As noted above, without tuning & at the boundary, one will generically get the m-boundary condition.

The above method of achieving desired boundary conditions by tuning δ is only one possible way of doing this. Other options include, e.g., bringing additional atoms close to the edge, whose repulsive forces can effectively act like a chemical potential for the atoms in the system. In this example, instead of $\delta_{bdy}$, the tunable parameter would be the distance between the additional atoms and the system's boundary, which would also cause a boundary phase transition from the m-boundary condition to the e-boundary condition.

Figure 13:
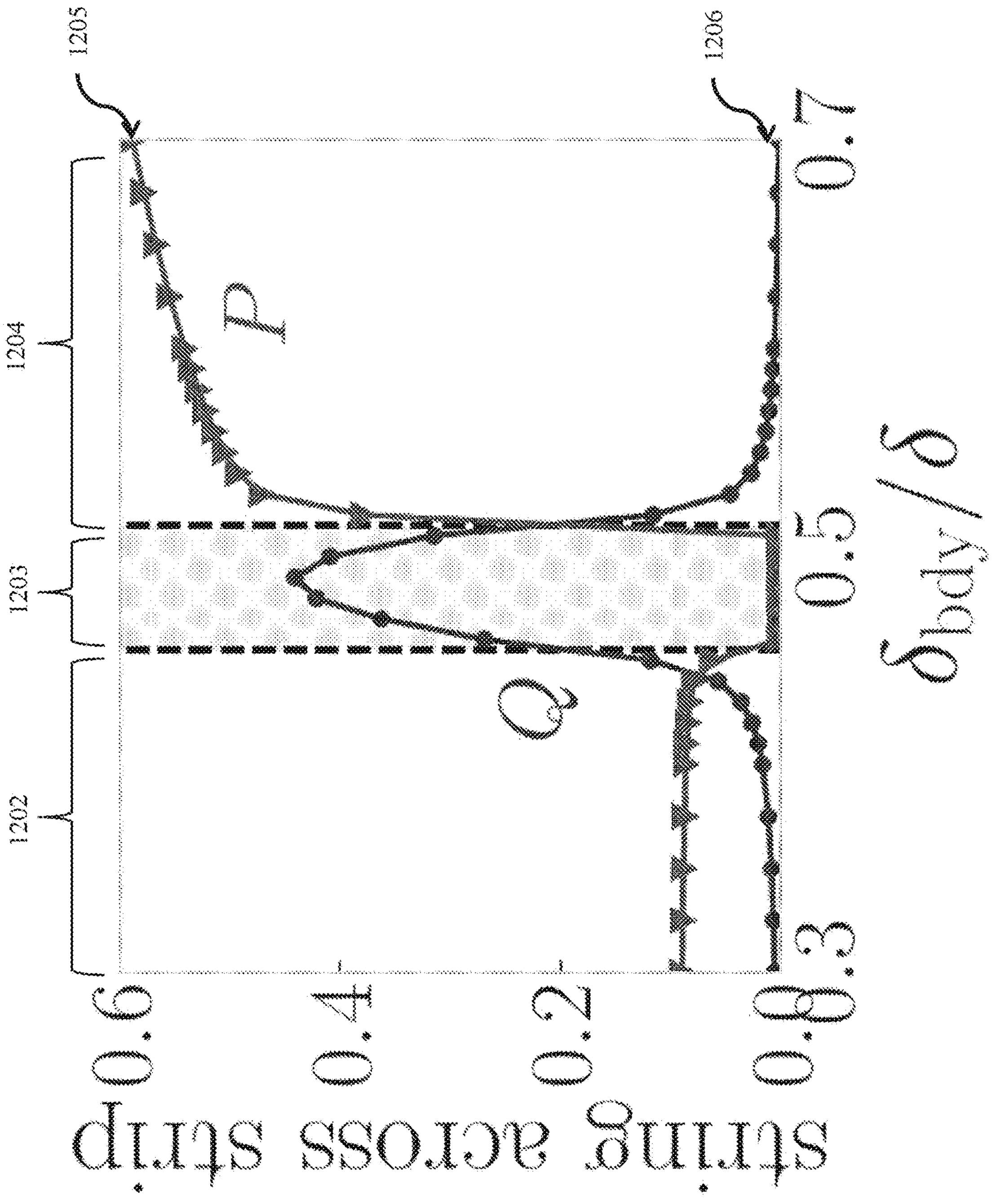
FIG. 13 is a plot of boundary to boundary P and Q string correlations according to embodiments of the present disclosure.

In addition to identifying a boundary condition as described above, one can also use string correlations to identify the boundary conditions. As shown in FIG. 13, boundary to boundary P and Q string correlations (as defined in the examples) vary with $$\frac{\delta_{bdy}}{\delta}.$$

As shown, in the m-boundary condition (in regions 1202 and 1204), the P correlation 1205 is large and the Q correlation 1206 is vanishing, with the magnitudes being reversed in the e-boundary condition (in region 1203).

Creating, Pinning, and Moving e-Anyons

As discussed above, an e-anyon corresponds to a defect in the dimer covering when viewed in terms of a kagome lattice. In particular, it is said that there is an e-anyon at the vertex of the kagome lattice if there are no dimers touching it, or if there are two dimers touching it.

It will be appreciated that the $\mathbb{Z}_2$ QSL can contain virtual e-anyons even in the ground state. This is a similar phenomenon to regular particle physics, where quantum fluctuations in the vacuum allow for the spontaneous creation/destruction of electron pairs. Although the aforementioned defect of dimer covering corresponds to a bare e-anyon (similar to the concept of a bare electron in particle physics), the ground state will contain some fluctuating anyons.

Figure 14:
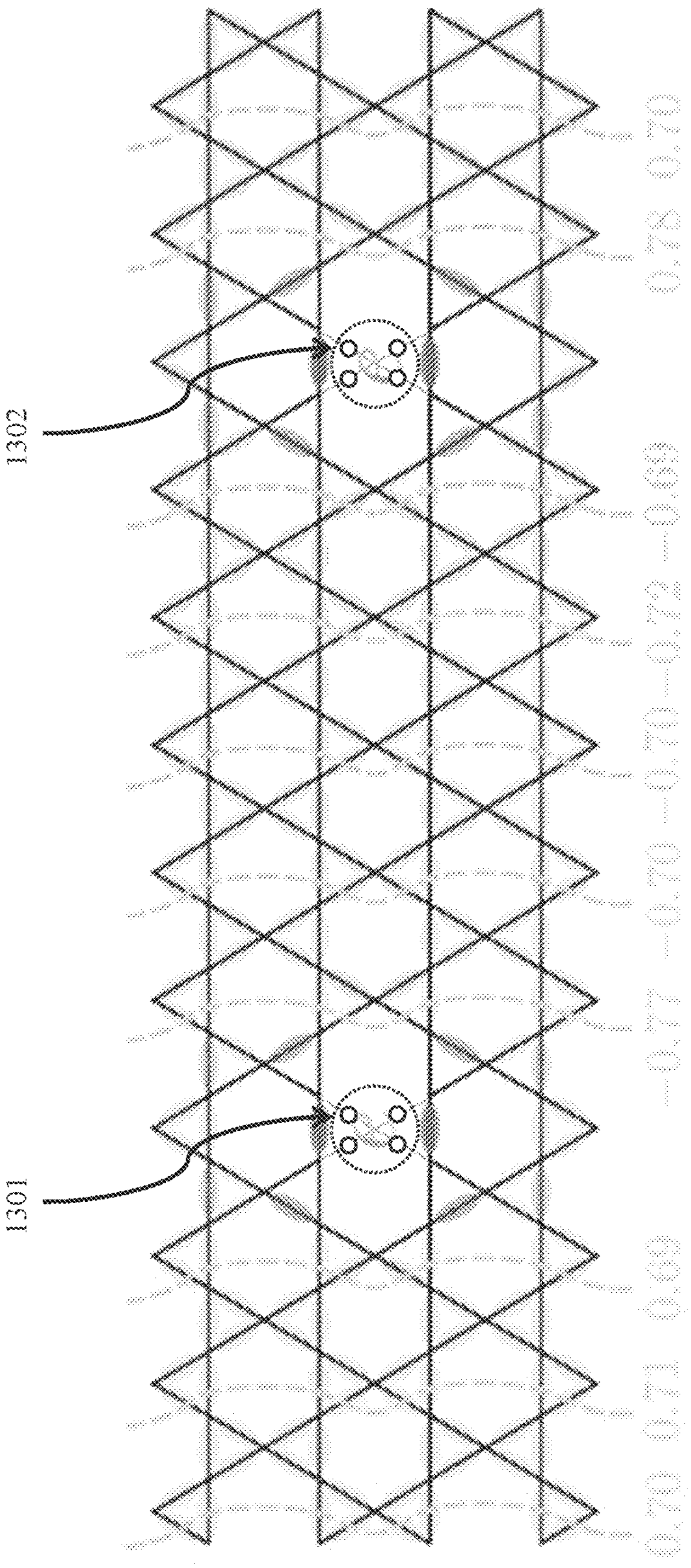
FIG. 14 is a schematic view of an exemplary lattice with e-anyons illustrated according to embodiments of the present disclosure.

Exemplary e-anyons are illustrated on a kagome lattice in FIG. 14. An e-anyon exists at the vertex of the kagome lattice in region 1301 and 1302. In each instance the four atoms (hollow circles) neighboring the vertex are in the ground state. Accordingly, in the dimer model one would say that there are no dimers touching the vertex.

In one method of generating an e-anyon, the detuning applied to the four atoms neighboring a vertex of the kagome lattice is adjusted to keep those atoms in the ground state during state preparation. Referring back to FIG. 14, a laser beam having large negative & applied to region 1301 biases the atoms towards their ground state.

The exemplary system illustrated in FIG. 14 is cylindrical and periodic in the y-direction. Accordingly, the dashed lines are closed loops around the circumference. The numbers associated with each string give the results of measuring each string's parity. The string parity is positive to the left and right, and it is negative in between the two e-anyons. This provides an example of how parity string measurements can be used to measure the presence of an e-anyon. By locally changing the detuning as a function of space and time, one can move these e-anyons around—illustrated further below.

Instead of changing $\delta$ on four atoms as described above (which pins an e-anyon at the vertex), one can change $\delta$ for a single atom. This will create two e-anyons on the two vertices of the kagome lattice neighboring this atom. However, these anyons will not be pinned and will tend to move away unpredictably due to thermal or quantum fluctuations.

Figure 15A:
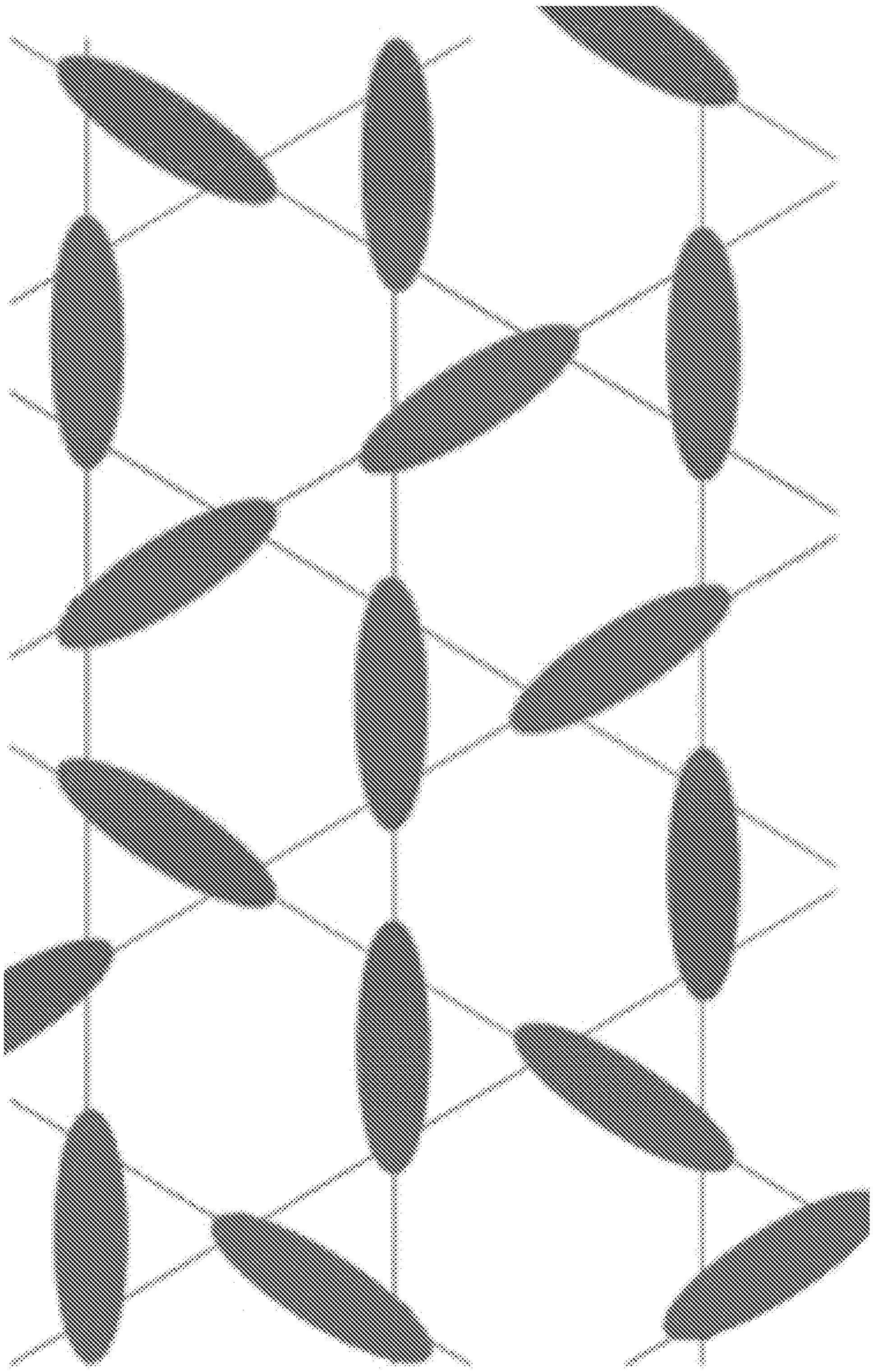
FIGS. 15A-E show exemplary dimer covers of lattice according to embodiments of the present disclosure.
Figure 15B:
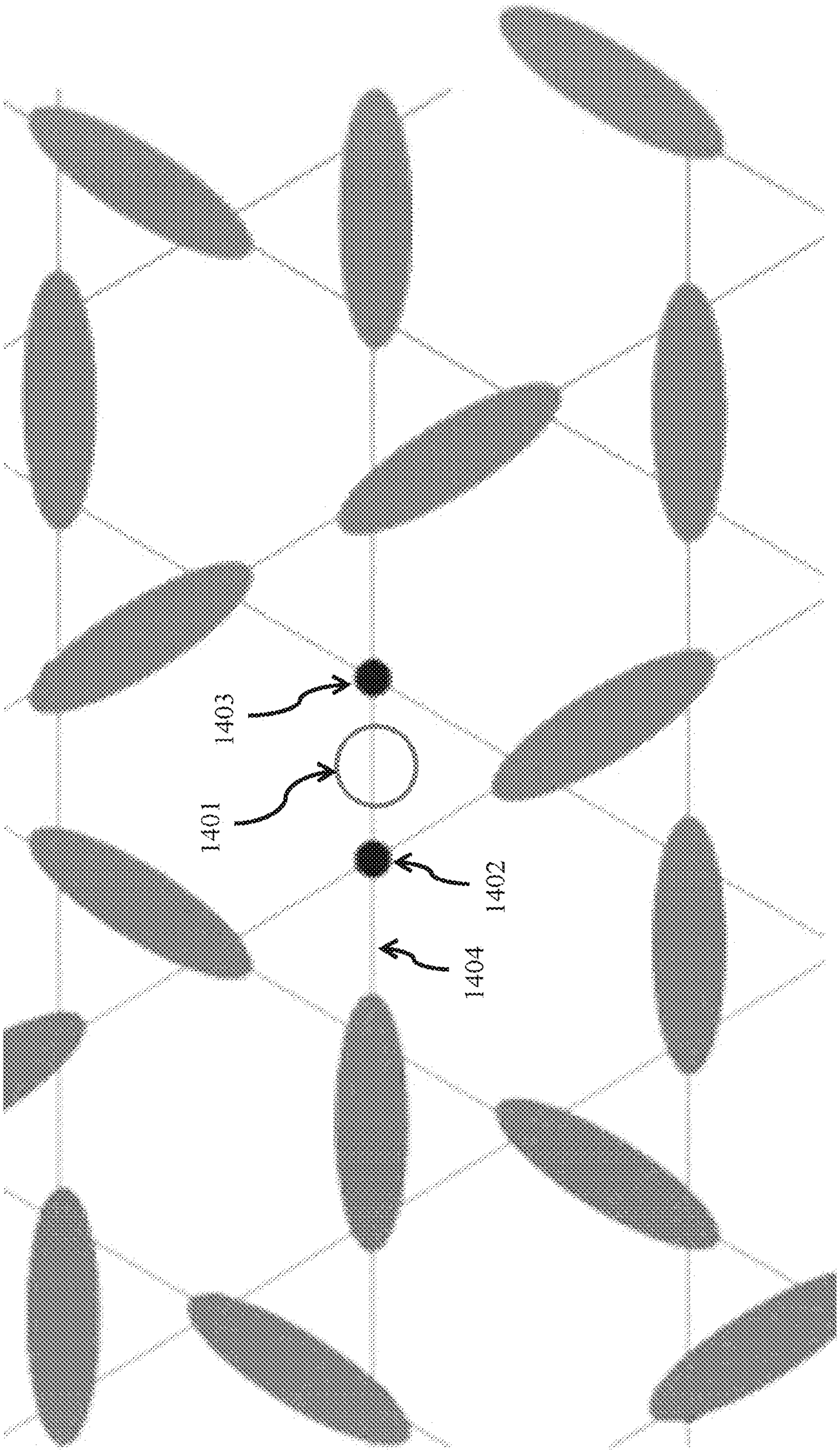

This is illustrated in FIG. 15A-B. In particular, FIG. 15A shows a dimer cover that lacks an e-anyon. In FIG. 15B, the atom at 1401 is driven to the ground state by adjustment of the detuning & applied to it by a laser source. This creates a pair of anyons 1402, 1403 at the neighboring vertices of the kagome lattice. As shown, the detuning at 1401 does not preclude a dimer from occupying edges adjacent to anyons 1402, 1403, for example edge 1404. Accordingly, anyons 1402, 1403 are unconstrained from moving across the lattice.

To create a pair of e-anyons whose motion is controlled, the method described in connection with FIG. 14 is employed to simultaneously create a pair of pinned anyons and to move them across the lattice. This is illustrated in FIGS. 15C-E.

Figure 15C:
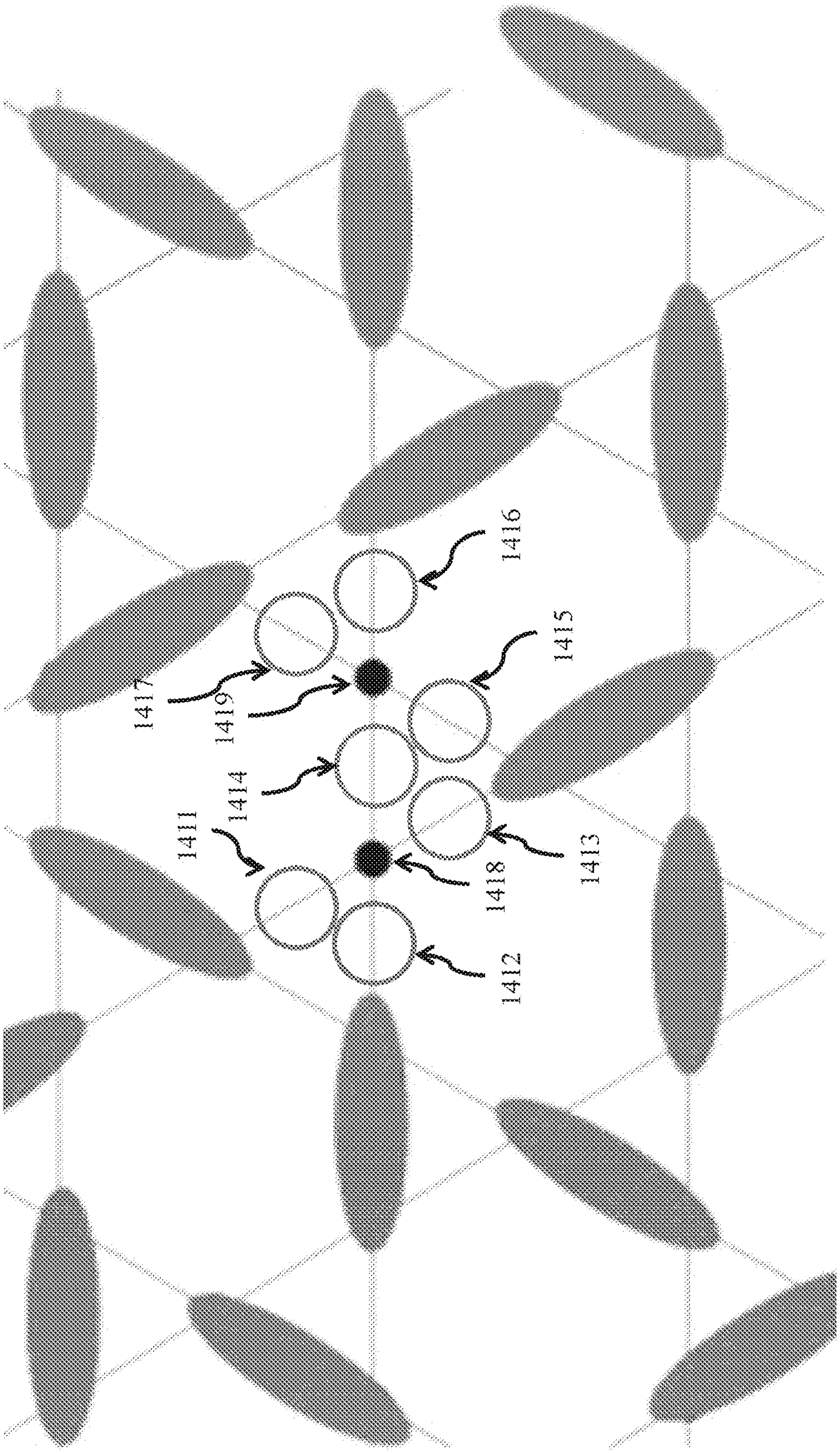
Figure 15D:
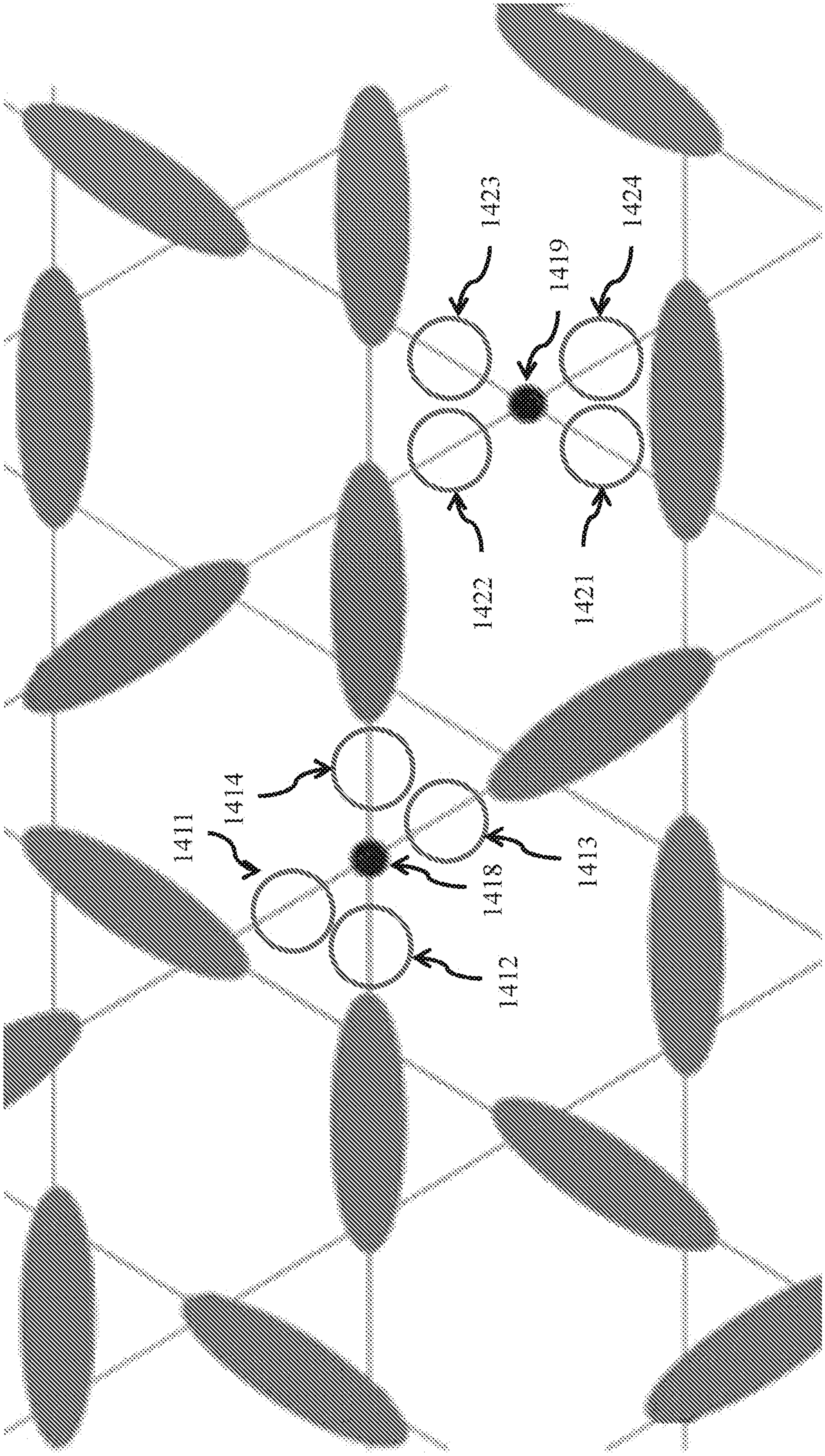
Figure 15E:
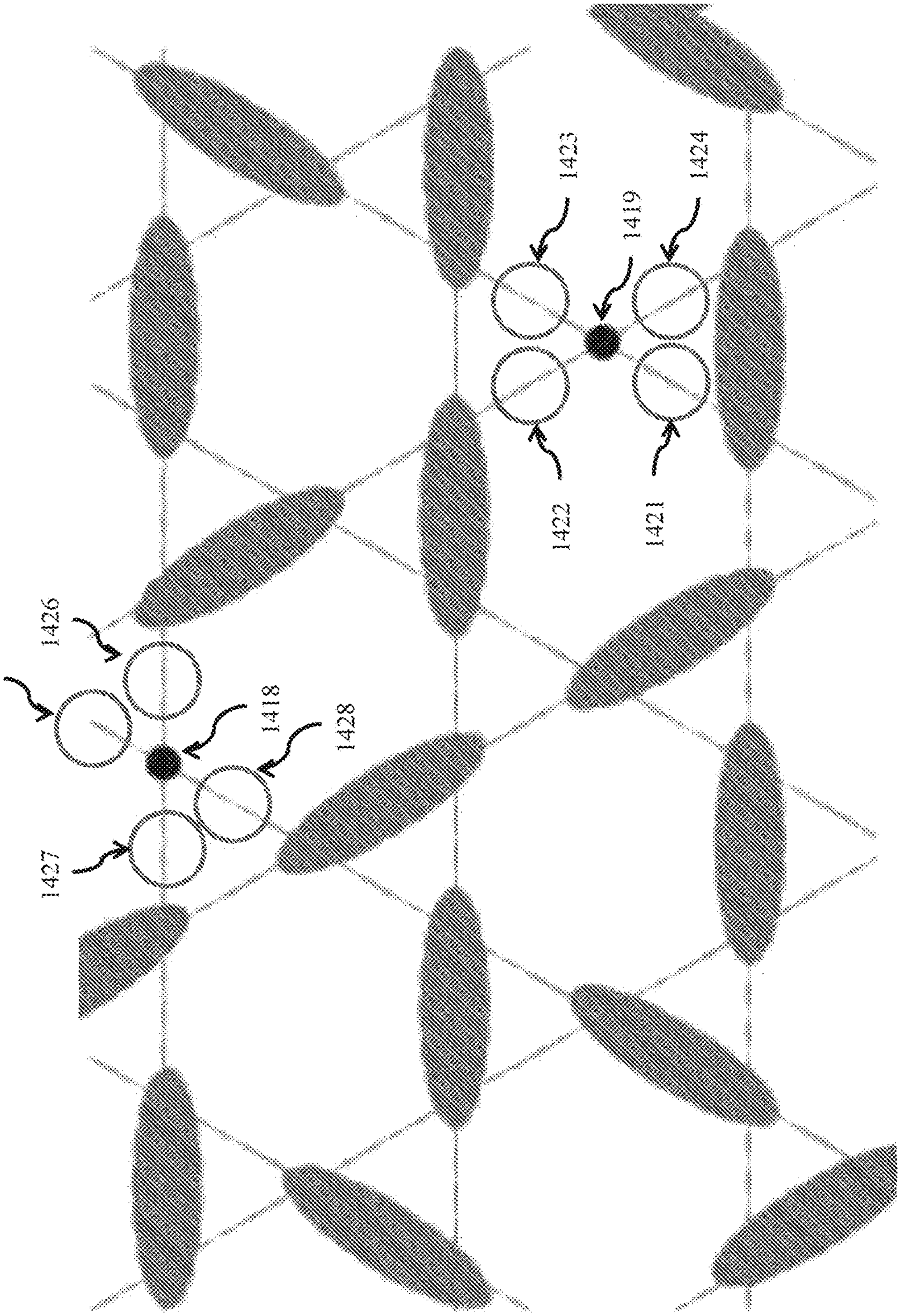

As shown in FIG. 15C, by changing the detuning on the atoms at 1411 . . . 1417, anyons 1418, 1419 are created and pinned. These e-anyons can then be gradually moved around and separated. In FIG. 15D, anyon 1419 is moved from its original position by returning the detuning of the atoms at 1416 . . . 1417 to the bulk value and driving the atoms at 1421 . . . 1424 to the ground state. Similarly, in FIG. 15D, anyon 1418 is moved from its original position by returning the detuning at 1411 . . . 1414 to the bulk value and driving the atoms at 1425 . . . 1428 to the ground state.

In general, an anyon may be pinned by adjusting the detuning applied to the four neighboring atoms. With reference to the prior figures, it will be appreciated that this configuration will prevent the e-anyon from moving unless the detuning is further adjusted, because dimers are prohibited from reaching its vertex. In contrast, an anyon that is created by adjusting the detuning on one atom may move more freely across the lattice.

In an exemplary protocol, the detuning of atoms in the direction of travel is gradually decreased while the detuning of atoms in the opposite direction is gradually increased. In this way, a gradual fade between pinned positions is achieved in order to relocate a given anyon between adjacent vertices. This may be achieved by moving the local detuning beam gradually across the lattice. The timescale of these transition should be slow compared to the energy cost of creating one of the anyons (for $\hbar=1$, there is a natural conversion between inverse energy scales and time scales).

An e-anyon may also be created by removing Rydberg atoms from the lattice rather than driving them to the ground state. However, it will be appreciated that the selective adjustment of detuning has various engineering advantages over physical removal of atoms.

Initializing One or More Topological Qubit

Prior sections describe the realization of a $\mathbb{Z}_2$ QSL, the control of its two boundary conditions, and the creation, pinning and moving of e-anyons. These are all the ingredients needed to create a topological qubit, initialize it, and implement single-qubit gates. To read out the state of a qubit, measurements of string correlations are used.

There are two categories of ways to create qubits using the tools described above. The first option is to create a ruby lattice with an m-boundary condition and then create several interior edges also having an m-boundary condition. The interior edges may encompass cither particle-occupied or unoccupied vertices of the ruby lattice. In the case of occupied vertices, the particles circumscribed by the inner edge are driven to the ground state by adjusting laser detuning in the same manner as discussed above. As with outer edges, an interior edge will be in the m-boundary condition without further adjustment of the detuning at the edge. The region inside an interior edge of this type may be referred to as a "hole."

Figure 16:
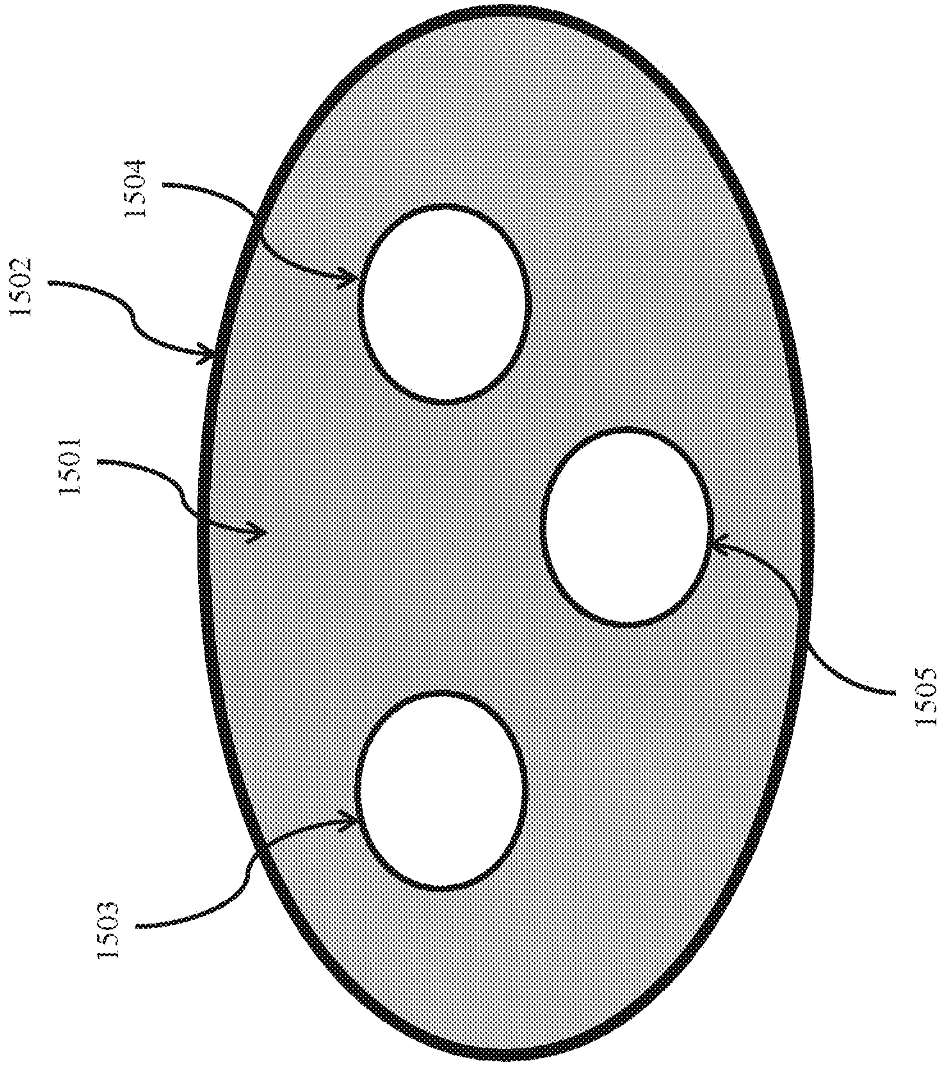
FIG. 16 is a schematic view of an exemplary lattice having an outer edge and three interior edges according to embodiments of the present disclosure.

Referring to FIG. 16, a schematic is provided of an exemplary lattice having an outer edge and three interior edges. Lattice 1501 has outer edge 1502, which has a m-condensed boundary condition. Lattice 1501 also includes interior edges 1503, 1504, 1505. The ground state degeneracy of such a system scales as $2^N$ where N is the number of interior edges. Accordingly, in a configuration using interior edges, each interior edge corresponds to one topological qubit.

The second option is to create a system without any interior edges. This requires the creation of both m-condensed and e-condensed boundary conditions.

Figure 17:
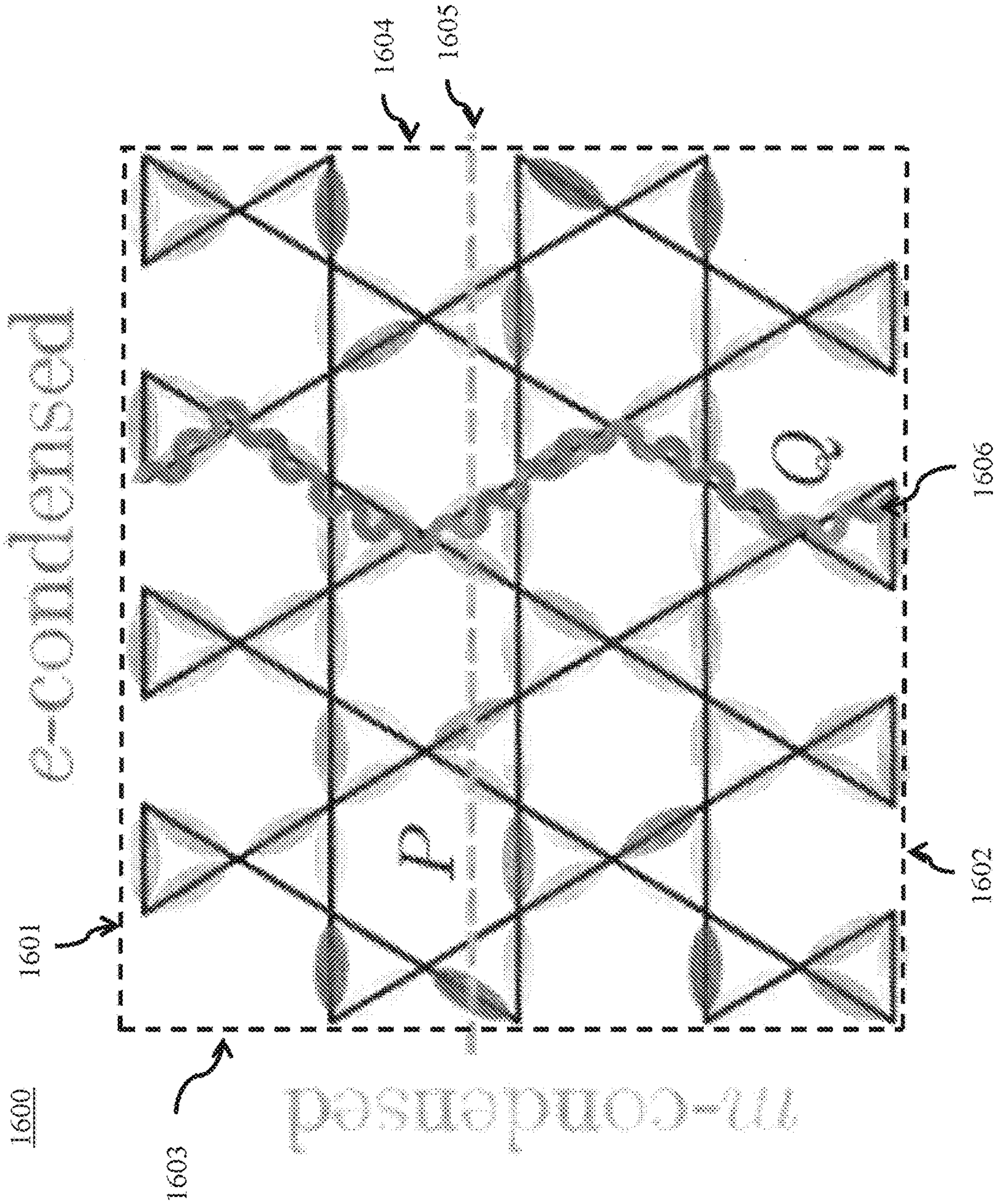
FIG. 17 is a schematic view of an exemplary lattice having four outer edges according to embodiments of the present disclosure.

Referring to FIG. 17, an exemplary lattice having four outer edges is illustrated. In this example, lattice 1600 forms a square slab having four edges 1601 . . . 1604. The detuning on the boundary links of the edges is chosen so that edges 1603, 1604 have an m-boundary condition while edges 1601, 1602 have an e-condensed boundary condition. Such a system will have a twofold ground state degeneracy, which can encode a single logical qubit. More generally, if one has some finite region with 2N alternations of boundary conditions (alternating between the e-boundary condition and the m-boundary condition), then this region hosts N−1 topological qubits (FIG. 17 correspond to N=2).

Reading a Topological Qubit Corresponding to an Outer Edge in the Z Basis

Referring again to FIG. 17, the state of a topological qubit in the case of outer edges may be read by determining the parity of particular strings. In particular, dashed line 1605 corresponds to an m-type string extending between edges 1603, 1604, which have an m-boundary condition. As discussed above, the parity of this string may be determined by multiplying together the parities of each vertex of the ruby lattice traversed by the string (which is +1 for the ground state and −1 for the excited state). In the context of the kagome lattice, this may be equivalently described as counting whether the string intersects an odd or even number of dimers. An odd number of intersections results in a parity of −1, while an even number of intersections results in a parity of +1.

The quantum state is a superposition of distinct dimer coverings. To measure this number the quantum state can be sampled multiple times. For each sample, a classical snapshot is obtained for which parity can be computed. The results may then be averaged over multiple snapshots. The resulting number constitutes the read-out of the logical qubit in the Z-basis. This string correlation may be referred to as a P string, short for (dimer) Parity.

Since the system does not constitute a perfect dimer covering, it is desirable to normalize the above parity measurement. This may be done by measuring two strings at the same time, each extending between edges 1603 and 1604. The parity of the first string is divided by the square root of the product of the parities of the two strings, as shown in Equation 3.

Equation 3

$$\langle \sigma^z_{logic} \rangle = \frac{\left\langle \boxed{\underset{------}{P}} \right\rangle}{\sqrt{\left\langle \boxed{\substack{------\\------}} \right\rangle}}$$

In Equation 3, the gray box is shorthand for the finite system shown in FIG. 17. The logical 0 and 1 states in the z basis can be said to correspond to cases where $$\sigma^z_{logic}$$

evaluates to −1 (odd dimers) or +1 (even dimers), respectively. For a generic topological qubit state, one can get a number in between these two limits, if it is in some superposition of logical 0 and logical 1.

As noted above, the number of topological qubits scales with the number of alternations between the e-boundary condition and the m-boundary condition. The above example contains four alternations, and thus one topological qubit. A system with six alternations, e.g., a lattice with approximately hexagonal outer edges, would encode two topological qubits. In that case, the above process may be applied with respective pairs of m-condensed boundaries to measure the two qubits.

Reading a Topological Qubit Corresponding to an Outer Edge in the X Basis

To measure the x-component of the qubit on the Bloch sphere $$\langle \sigma^x_{logic} \rangle,$$

a basis rotation is applied to the system, followed by a computation of the parity of an e-type string.

In particular, the system is exposed to a high-intensity laser (corresponding to a large value of Ω) for a fixed time. For a given large choice of Ω (constrained only by available laser power), the pulse has a duration of $$t = \frac{\frac{4\pi}{3\sqrt{3}}}{\Omega}$$

(this is in natural units where c=ℏ=1). This value is derived in the examples below. After this pulse, the state of the atoms is measured as discussed above (by obtaining a snapshot indicating whether each atom in the array is in the ground state or excited state). From the snapshot, the parity of an e-type string extending between the e-condensed boundaries is determined. Referring again to FIG. 17, e-type string 1606 extends between edges 1601 and 1602. The parity of the e-type string may be referred to as Q.

As above, the parity averaged over many different snapshots of the state yields the x-component. Also as above, it is desirable to normalize the value by the square root of the product of two strings next to each other. This is again illustrated in Equation 4.

Equation 4

$$\langle \sigma^x_{logic} \rangle = \frac{\left\langle \boxed{\square \; Q} \right\rangle}{\sqrt{\left\langle \boxed{\blacksquare \; \square} \right\rangle}}$$

Figure 18:
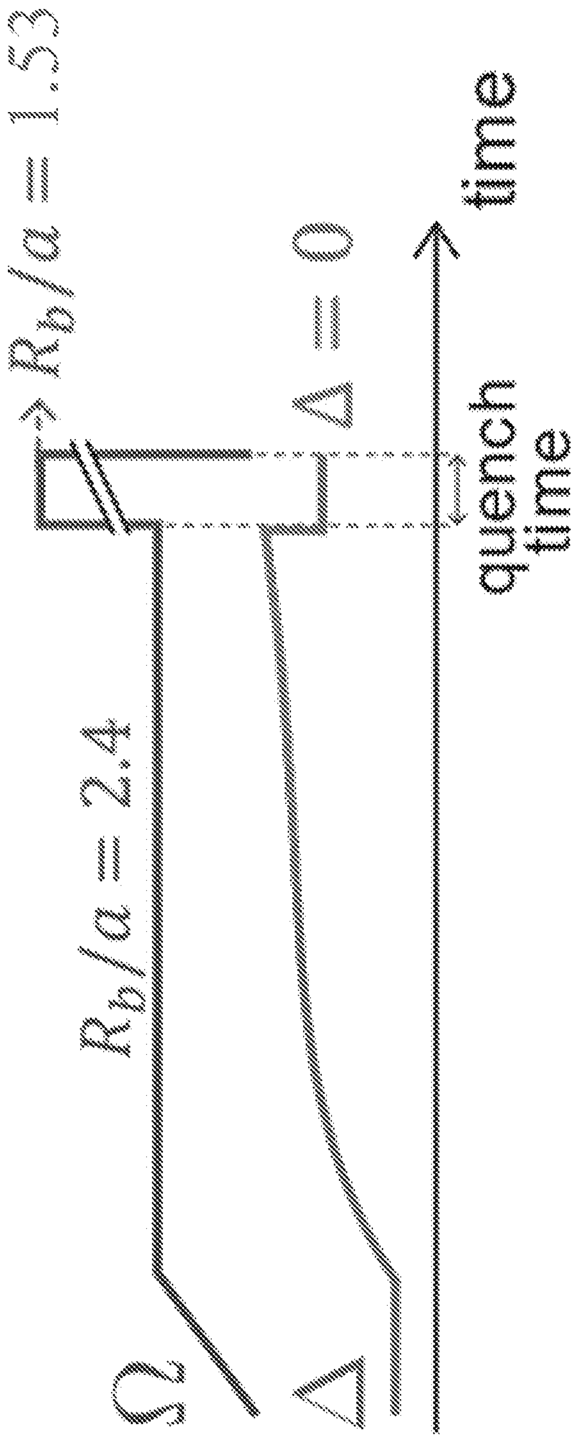
FIG. 18 illustrates an exemplary state preparation and quenching protocol according to embodiments of the present disclosure.

Referring to FIG. 18, an exemplary state preparation and quenching protocol is provided. The left portion of this graph corresponds to the state preparation of FIG. 6, with the protocol for basis rotation following in time. As pictured, after state preparation, the detuning Δ is rapidly changed to 0, and the blockade radius is reduced such that only the atoms within the same triangle of the ruby lattice are blockaded (that is, $R_b$ is reduced to cover only the two nearest neighbors of a given atom). In an exemplary configuration where $\rho=\sqrt{3}$, the blockade radius is varied from $$\frac{R_b}{a} = 2.4$$

(sufficient to blockade six nearest neighbors) to a quench value of $$\frac{R_b}{a} = 1.53$$

(sufficient to blockade two nearest neighbors). It will be appreciated that the requisite $R_b$ values will vary based on ρ, and that they can be computed as set forth elsewhere herein. The blockade radius is varied by varying the Rabi frequency Ω, increasing it by a factor of 14, by increasing the intensity of one of the Rydberg lasers by a factor of ~200. An alternative way to vary the blockade radius between state preparation and quench would be to use microwave dressing of the Rydberg state.

The system is then evolved under these conditions for a characteristic time $\tau=4\pi/(3\Omega\sqrt{3})$. The atomic states are then read out in the ground-Rydberg basis.

As above, the e-type string is measured with or without normalization. Alternative methods of understanding these measurements are discussed in the examples in connection with FIGS. 34, 44C, and 48.

Reading a Topological Qubit Corresponding to an Interior Edge

Figure 19:
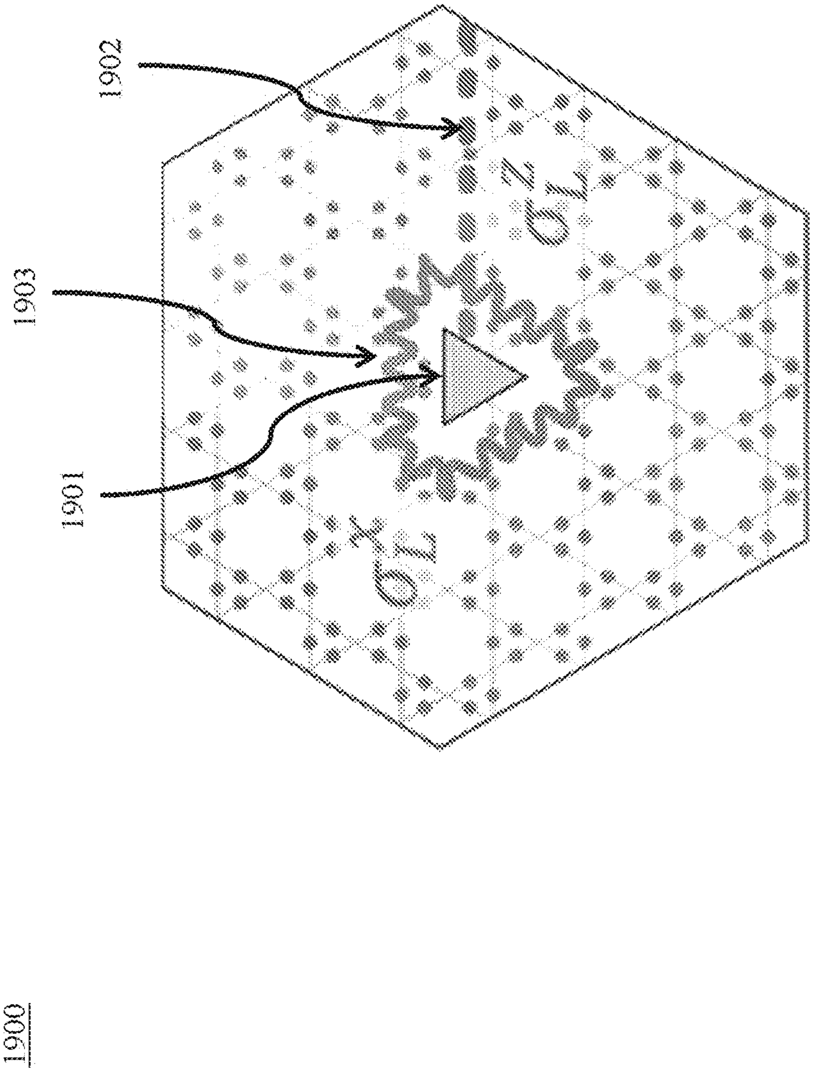
FIG. 19 is a schematic view of measurements of a topological qubit corresponding to an interior edge according to embodiments of the present disclosure.

The above examples focus on the case in which outer edges are used to correspond to topological qubits as exemplified in FIG. 17. Referring now to FIG. 19, measurement of a topological qubit corresponding to an interior edge is illustrated. In this example, lattice 1900 includes interior edge 1901. Measurement of the topological qubit in the z basis $$(\sigma^z_{logic})$$

corresponds to measuring the parity of an m-type string 1902 that extends from the outer edge to the interior edge 1901. As discussed above, multiple measurements may be taken over multiple snapshots and averaged to arrive at a final value. Measurement of the topological qubit in the x basis $$(\sigma^x_{logic})$$

corresponds to measuring the parity of an e-type string 1903 that extends in a closed loop around interior edge 1901. As discussed above, multiple measurements may be taken over multiple snapshots and averaged to arrive at a final value.

Single Qubit Operations

Referring again to the exemplary system depicted in FIG. 17, a 90 degree rotation around the x-axis of the Bloch sphere can be achieved by generating and moving a pair of e-anyons. Such a rotation generally results in a change in sign of $$\sigma^z_{logic}.$$

To achieve this rotation, a pair of e-anyons are generated in the system and then dragged apart as described above with reference to FIG. 15. As discussed above, varying the detuning $\delta$ at individual vertices of the ruby lattice allows the anyons to be dragged across the lattice. Referring again to the exemplary system of FIG. 17, to achieve this rotation, one anyon is dragged to edge 1601, and one is dragged to edge 1602. Upon arrival at the edge, the anyons are extinguished, returning the system to its original state but imparting a phase.

As discussed above with regard to measurement of qubits, this protocol generalizes to the case in which additional alternations in boundary condition allow the realization of additional topological qubits. In such a case, movement of the anyons to respective pairs of edges in the m-boundary condition corresponds to a rotation of one of the qubits.

Referring again to the exemplary system of FIG. 19, a single qubit operation on a topological qubit corresponding to an interior edge can be implemented by using local addressing laser beams.

In particular, to apply a rotation about the x-axis (and thus vary $\sigma_z$), a laser beam is localized on the atoms belonging to a hole-to-boundary m-type string (e.g., 1902) to create a local detuning different from the detuning elsewhere in lattice 1900, and thus apply a local phase shift on all the atoms belonging to the string at the same time. Any m-type string connecting interior edge 1901 to the outer edge can be used.

Figure 20:
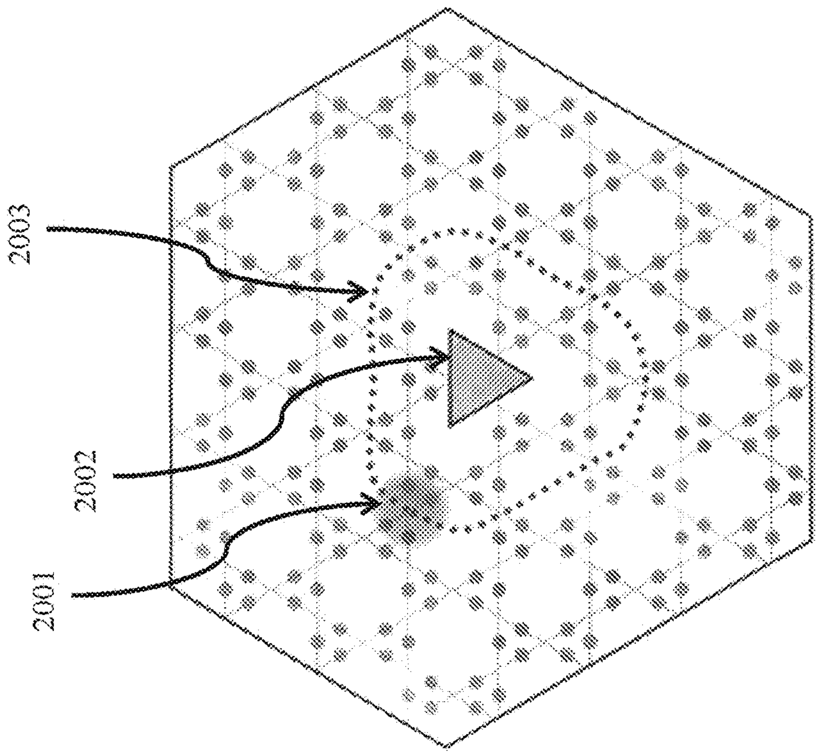
FIG. 20 is a schematic view of a lattice illustrating the application of a rotation to a topological qubit according to embodiments of the present disclosure.

Referring to FIG. 20, to apply a rotation about the z-axis (and thus vary $\sigma_x$), a laser beam localized on four atoms 2001 around a single vertex of the kagome lattice 2000 is turned on during the quasi-adiabatic state preparation to apply a local detuning $\delta_{vertex}$, such that none of those four atoms is excited to the Rydberg state (described further above with regard to e-anyon creation). This creates an e-anyon localized on that vertex. At the end of the state preparation the local addressing beam is moved adiabatically around the hole 2002 on a closed trajectory 2003, so that the e-anyon, following the beam, completes a closed trajectory around the hole. Any closed trajectory around the hole can be used.

Two Qubit Gates

Figure 21A:
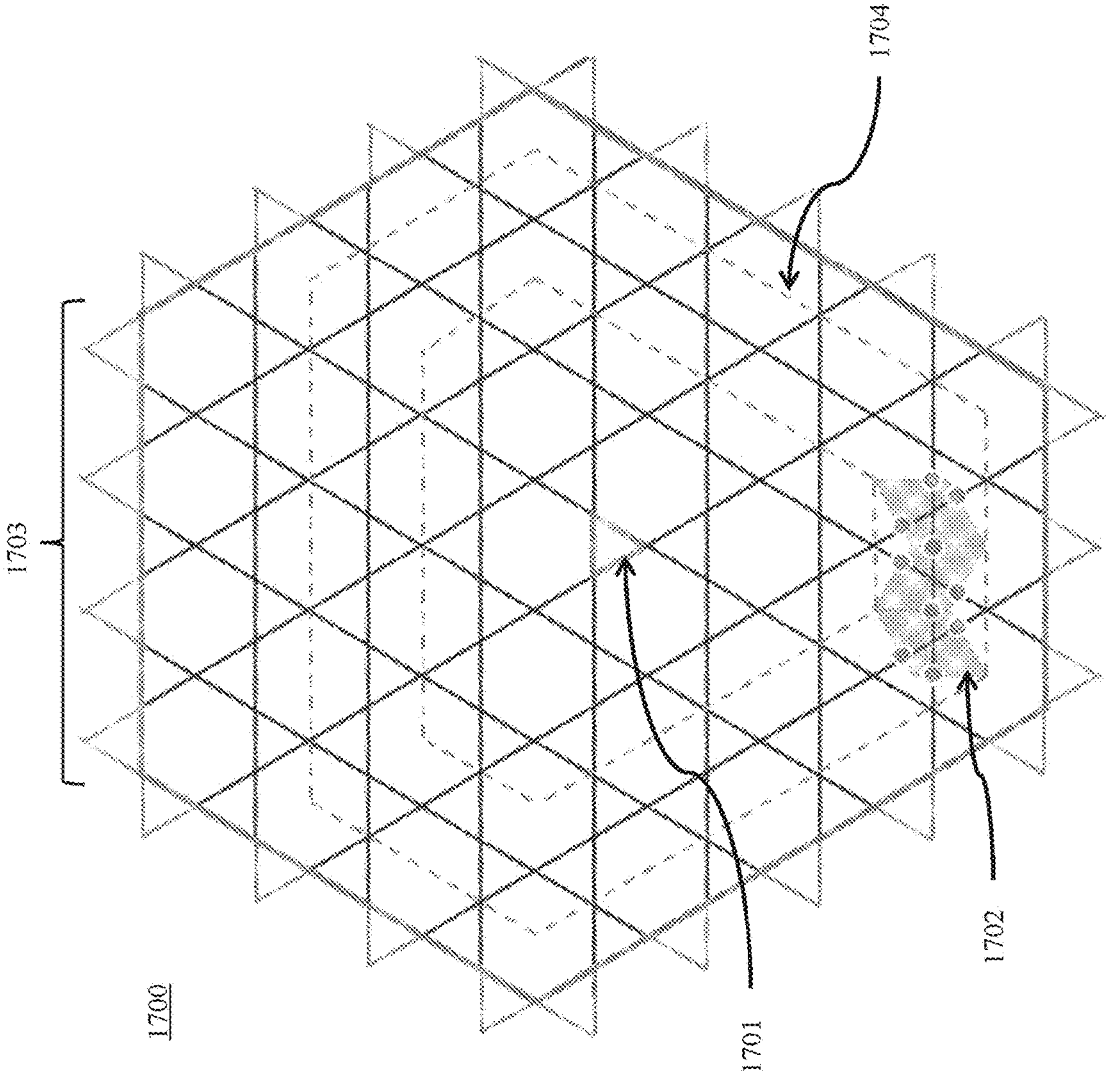
FIG. 21A-B is schematic view of a lattice illustrating the application of a CNOT gate to a pair of topological qubits according to embodiments of the present disclosure.
Figure 21B:
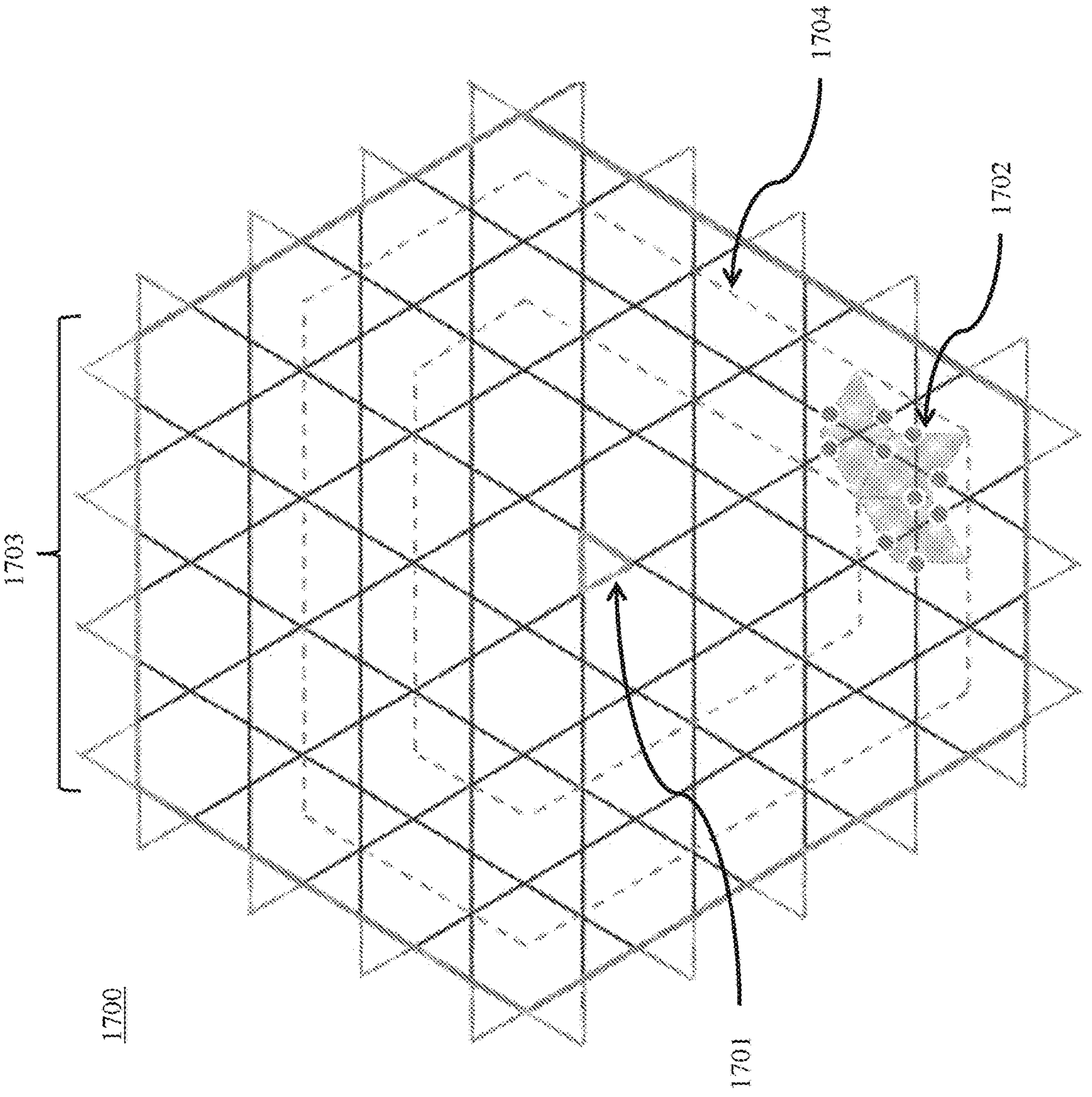

Referring to FIGS. 21A-B, a CNOT gate involving two topological qubits corresponding to interior edges is illustrated. Lattice 1700 includes two interior edges 1701, 1702. Interior edge 1701 has an e-condensed boundary condition, and interior edge 1702 has an m-condensed boundary condition. Lattice 1700 also includes two outer edges. A first outer edge 1703 spans one side of the hexagonal shape of lattice 1700 and has an e-condensed boundary condition, while a second outer edge spans the remaining side of lattice 1700 and has an m-condensed boundary condition. As discussed in the examples, this topology provides ground state degeneracy of the dimer model of 4 with additional degeneracy possible with the addition of more interior or outer edges.

As discussed above, an m-boundary can be prepared by removing atoms from the array or by biasing atoms into the ground state by application of a local detuning. Also as discussed above, an e-boundary can be prepared by shifting the detuning applied to the edge atoms to half the detuning of the atoms in the bulk of the lattice.

Similar to the procedure discussed with regard to moving anyons, an interior edge may be expanded, contracted, or moved within the bulk lattice by varying the local detuning for atoms at or near the edge. In particular, by decreasing the detuning in a direction of travel while increasing the detuning in the opposite direction, an edge may be induced to shift within the bulk. Movement may also be achieved through multiple expansion and contraction steps in which the detuning is first decreased in a direction of travel to expand the edge, followed by an increase in the detuning in the opposite direction to contract the edge.

This movement is reflected in FIGS. 21A-B. Comparing these two figures, it may be seen that a ten-atom interior edge 1702 is moved from one position to another position in lattice 1700 by varying the detuning in the direction of travel so as to bias atoms towards the ground state.

Referring again to FIGS. 21A-B, interior edge 1701 having an e-condensed boundary condition is held stationary in lattice 1701. At the same time, second interior edge 1702 having an m-condensed boundary condition is moved along a closed path 1704, circumscribing interior edge 1701. This applies a CNOT to the qubits corresponding to interior edges 1701 and 1702.

In some embodiments, interior edge 1702 is moved along closed path 1704 until it reaches its original location—when the same atoms are included in the edge as in the initial condition. In some embodiments, interior edge 1702 is moved along closed path 1704 until it overlaps its original location—when at least one atom included in the edge was included at the initial condition. It will be appreciated that an equivalent effect may be obtained by moving interior edge 1702 along the closed path by an amount sufficient to impart a quantum phase to the QSL—for example, 50%, 60%, 70%, 80%, or 90% of the way to its original location.

While the above example describes moving an edge having an m-condensed boundary condition about an edge having an e-condensed boundary condition, the same effect may be obtained by moving an edge having an e-condensed boundary condition about an edge having an m-condensed boundary condition. In addition, while the above example describes two interior edges and two outer edges, two qubits may also be realized using three interior edges and one outer edge. In this case, of the four edges (three interior and one outer), two must have m-boundaries and two must have e-boundaries. Accordingly, two of the interior edges must have the same boundary condition, while one of the interior edges must have the same boundary condition as the outer edge.

Figure 22:
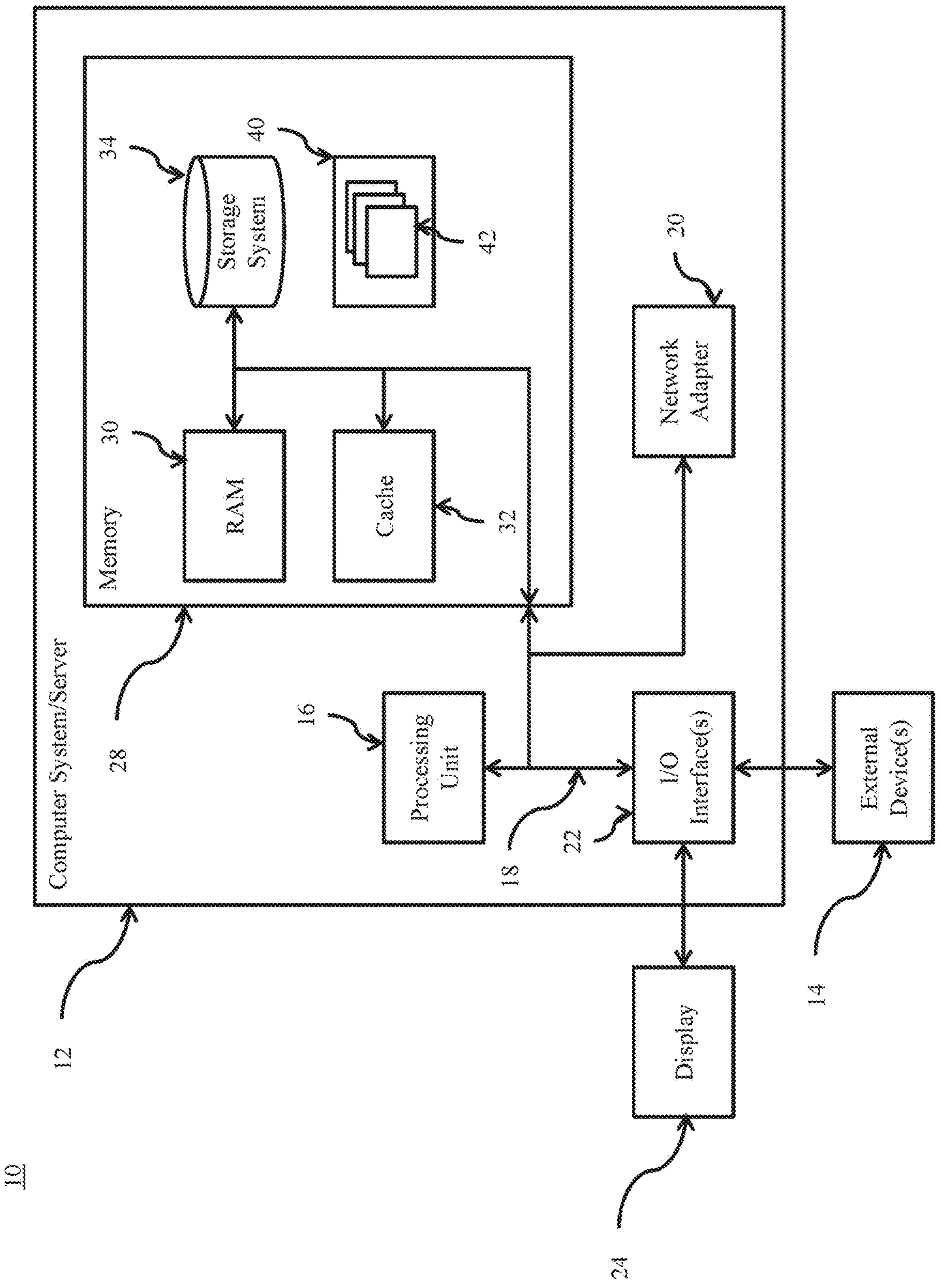
FIG. 22 depicts a computing node according to embodiments of the present disclosure.

Referring now to FIG. 22, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 22, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a “hard drive”). Although not shown, a magnetic disk drive for reading from and writing to a removable, non-volatile magnetic disk (e.g., a “floppy disk”), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A description of example embodiments of the invention follows.

Accordingly, in a $1^{st}$ example embodiment, the presence invention is a device. In the $1^{st}$ aspect, the device comprises a two-dimensional array of particles, each particle disposed at a vertex of a ruby lattice having a parameter ρ greater than $$\frac{1}{\sqrt{2}};$$

each particle having a first state and an excited state; each particle that belongs to at least three unit cells of the ruby lattice having a blockade radius, when in the excited state, sufficient to blockade each of at least six nearest neighboring particles in the ruby lattice from transitioning from its first state to its excited state, and wherein the array has at least one outer edge configured to be in a first boundary condition. In a $2^{nd}$ aspect of the $1^{st}$ example embodiment, the particle is an atom, an ion, or a molecule. Other aspects and example features of the $1^{st}$ example embodiment are as they are described with respect to the $1^{st}$ aspect.

In a $3^{rd}$ aspect of the $1^{st}$ example embodiment, the blockade is a dipole blockade, for example a Rydberg blockade. Other aspects and example features of the $1^{st}$ example embodiment are as they are described with respect to the $1^{st}$ and $2^{nd}$ aspects.

In a $4^{th}$ aspect of the $1^{st}$ example embodiment, the particle is an atom, the first state is ground state, and the blockade is a Rydberg blockade. Other aspects and example features of the $1^{st}$ example embodiment are as they are described with respect to the $1^{st}$ through $3^{rd}$ aspects.

In a $5^{th}$ aspect of the $1^{st}$ example embodiment, the array comprises at least a first outer edge and a third outer edge, each being in the first boundary condition, and at least a second outer edge and a fourth outer edge, each being in a second boundary condition, different from the first boundary condition. Other aspects and example features of the $1^{st}$ example embodiment are as they are described with respect to the $1^{st}$ through $4^{th}$ aspects.

In a $6^{th}$ aspect of the $1^{st}$ example embodiment, the array has plurality of outer edges, each outer edge being either in the first boundary condition or a second boundary condition, each outer edge being in a different boundary condition than any adjacent outer edge. Other aspects and example features of the $1^{st}$ example embodiment are as they are described with respect to the $1^{st}$ through $5^{th}$ aspects.

In a $7^{th}$ aspect of the $1^{st}$ example embodiment, the outer edges configured to be in the first boundary condition are e-condensed and the outer edges configured to be in the second boundary condition are m-condensed. Other aspects and example features of the $1^{st}$ example embodiment are as they are described with respect to the $1^{st}$ through $6^{th}$ aspects.

In an $8^{th}$ aspect of the $1^{st}$ example embodiment, the array comprises at least one interior edge. Other aspects and example features of the $1^{st}$ example embodiment are as they are described with respect to the $1^{st}$ through $7^{th}$ aspects.

In a $9^{th}$ aspect of the $1^{st}$ example embodiment, each vertex enclosed by the at least one interior edge is not particle-occupied. Other aspects and example features of the $1^{st}$ example embodiment are as they are described with respect to the $1^{st}$ through $8^{th}$ aspects.

In a $10^{th}$ aspect of the $1^{st}$ example embodiment, the at least one interior edge is at the same boundary condition as at least one outer edge. Other aspects and example features of the $1^{st}$ example embodiment are as they are described with respect to the $1^{st}$ through $9^{th}$ aspects.

In an $11^{th}$ aspect of the $1^{st}$ example embodiment, the at least one interior edge encloses at least four vertices. Other aspects and example features of the $1^{st}$ example embodiment are as they are described with respect to the $1^{st}$ through $10^{th}$ aspects.

In a $12^{th}$ aspect of the $1^{st}$ example embodiment, the at least one interior edge encloses particle-occupied vertices. Other aspects and example features of the $1^{st}$ example embodiment are as they are described with respect to the $1^{st}$ through $11^{th}$ aspects.

In a $13^{th}$ aspect of the $1^{st}$ example embodiment, the at least one interior edge is in the first boundary condition, different from at least one outer edge. Other aspects and example features of the $1^{st}$ example embodiment are as they are described with respect to the $1^{st}$ through $12^{th}$ aspects.

In a $14^{th}$ aspect of the $1^{st}$ example embodiment, the array has a plurality of interior edges, each interior edge enclosing a corresponding plurality of vertices, each of which is not particle-occupied. Other aspects and example features of the $1^{st}$ example embodiment are as they are described with respect to the $1^{st}$ through $13^{th}$ aspects.

In a $15^{th}$ aspect of the $1^{st}$ example embodiment, the array has a plurality of interior edges, each interior edge enclosing a corresponding plurality of vertices, wherein at least one enclosed vertex is particle-occupied. Other aspects and example features of the $1^{st}$ example embodiment are as they are described with respect to the $1^{st}$ through $14^{th}$ aspects.

In a $16^{th}$ aspect of the $1^{st}$ example embodiment, the interior edge enclosing the particle-occupied vertex is at a boundary condition different from at least one outer edge. Other aspects and example features of the $1^{st}$ example embodiment are as they are described with respect to the $1^{st}$ through $15^{th}$ aspects.

In a $17^{th}$ aspect of the $1^{st}$ example embodiment, edges configured to be at different boundary conditions are selected from e-condensed or m-condensed edges. Other aspects and example features of the $1^{st}$ example embodiment are as they are described with respect to the $1^{st}$ through $16^{th}$ aspects.

In a $18^{th}$ aspect of the $1^{st}$ example embodiment, the two-dimensional array comprises at least 96 particles, for example at least 200 particles. Other aspects and example features of the $1^{st}$ example embodiment are as they are described with respect to the $1^{st}$ through $17^{th}$ aspects.

In a $2^{nd}$ example embodiment, the present invention is a system. The system comprises a confinement system for arranging particles in a two-dimensional array, and an excitation source for exciting at least some of the particles from the first state to the excited state. The confinement system comprises a laser source arranged to create a plurality of confinement regions; a source of an atom cloud, the atom cloud capable of being positioned to at least partially overlap with the plurality of confinement regions. In a $1^{st}$ aspect of the $2^{nd}$ example embodiment, in the two-dimensional array, each particle is disposed at a vertex of a ruby lattice; each particle has a first state and an excited state; each particle that belongs to at least three unit cells of the ruby lattice has a blockade radius, when in the excited state, sufficient to blockade each of at least six nearest neighboring particles in the ruby lattice from transitioning from its first state to its excited state, and wherein the array has at least one outer edge configured to be at a first boundary condition.

In a $2^{nd}$ aspect of the $2^{nd}$ example embodiment, the particles are atoms, and wherein the excitation source is configured to excite at least some of the atoms into a Rydberg state. Other aspects and example features of the $2^{nd}$ example embodiment are as they are described with respect to the $1^{st}$ aspect.

In a $3^{rd}$ aspect of the $2^{nd}$ example embodiment, the two-dimensional array comprises at least 96 particles, for example, at least 200 particles. Other aspects and example features of the $2^{nd}$ example embodiment are as they are described with respect to the $1^{st}$ and $2^{nd}$ aspects.

In a $3^{rd}$ example embodiment, the present invention is a method of making a $\mathbb{Z}_2$ Quantum Spin Liquid ($\mathbb{Z}_2$ QSL). In a $1^{st}$ aspect, the method comprises arranging a two-dimensional array of particles, wherein each particle is disposed at a vertex of a ruby lattice having a parameter ρ greater than $$\frac{1}{\sqrt{2}};$$

each particle has a first state and a excited state; and the array has at least one outer edge. The method further comprises exciting about 25% of the particles into the excited state, thereby causing each particle in the excited state that belongs to at least three unit cells of the ruby lattice to have a blockade radius sufficient to blockade at least six nearest neighboring particles in the ruby lattice; and, optionally, imposing a first boundary condition on the at least one outer edge.

In a $2^{nd}$ aspect of the $3^{rd}$ example embodiment, the particles are atoms and the excited state is a Rydberg state. Other aspects and example features of the $3^{rd}$ example embodiment are as they are described with respect to the $1^{st}$ and $2^{nd}$ aspects.

In a $4^{th}$ example embodiment, the present invention is a method of encoding a topological qubit in a $\mathbb{Z}_2$ Quantum Spin Liquid ($\mathbb{Z}_2$ QSL). The method comprises preparing a $\mathbb{Z}_2$ QSL according to the method defined in the $3^{rd}$ example embodiment and any of its aspects, as described above, In a $1^{st}$ aspect of the $4^{th}$ example embodiment, the array comprises at least a first outer edge, a second outer edge, a third outer edge, and a fourth outer edge; and imposing a first boundary condition on the first and third outer edges and imposing a second boundary condition on the second and fourth outer edges.

In a $2^{nd}$ aspect of the $4^{th}$ example embodiment, the array has a plurality of outer edges, the method further comprising imposing either the first boundary condition or the second boundary condition on each outer edge, each outer edge having a different boundary condition than any adjacent outer edge. Other aspects and example features of the $4^{th}$ example embodiment are as they are described with respect to the $1^{st}$ aspect.

In a $3^{rd}$ aspect of the $4^{th}$ example embodiment, the outer edges configured to be in the first boundary condition are e-condensed and the outer edges configured to be in the second boundary condition are m-condensed. Other aspects and example features of the $4^{th}$ example embodiment are as they are described with respect to the $1^{st}$ and $2^{nd}$ aspects.

In a $5^{th}$ example embodiment, the present invention is a method of encoding a topological qubit in a $\mathbb{Z}_2$ Quantum Spin Liquid ($\mathbb{Z}_2$ QSL). The method comprises preparing a $\mathbb{Z}_2$ QSL according to the method defined in the $3^{rd}$ example embodiment. In a $1^{st}$ aspect of the $5^{th}$ example embodiment, the array comprises at least one interior edge.

In a $2^{nd}$ aspect of the $5^{th}$ example embodiment, each vertex enclosed by the at least one interior edge is not particle-occupied. Other aspects and example features of the $5^{th}$ example embodiment are as they are described with respect to the $1^{st}$ and $2^{nd}$ aspects.

In a $3^{rd}$ aspect of the $5^{th}$ example embodiment, the at least one interior edge encloses at least four vertices. Other aspects and example features of the $5^{th}$ example embodiment are as they are described with respect to the $1^{st}$ and $2^{nd}$ aspects.

In a $4^{th}$ aspect of the $5^{th}$ example embodiment, the at least one interior edge encloses particle-occupied vertices. Other aspects and example features of the $1^{st}$ example embodiment are as they are described with respect to the $1^{st}$ through $3^{rd}$ aspects.

In a $5^{th}$ aspect of the $5^{th}$ example embodiment, the method further comprises imposing on the at least one interior edge a boundary condition that is different from the boundary condition of the at least one outer edge. Other aspects and example features of the $5^{th}$ example embodiment are as they are described with respect to the $1^{st}$ through $4^{th}$ aspects.

In a $6^{th}$ aspect of the $5^{th}$ example embodiment, the method further comprises imposing on the at least one interior edge a boundary condition that is the same boundary condition as that of the at least one outer edge. Other aspects and example features of the $5^{th}$ example embodiment are as they are described with respect to the $1^{st}$ through $5^{th}$ aspects.

In a $7^{th}$ aspect of the $5^{th}$ example embodiment, the array has a plurality of interior edges, each interior edge enclosing a corresponding plurality of vertices, wherein at least one enclosed vertex is particle-occupied. Other aspects and example features of the $5^{th}$ example embodiment are as they are described with respect to the $1^{st}$ through $6^{th}$ aspects.

In a $8^{th}$ aspect of the $5^{th}$ example embodiment, the method further comprises imposing a boundary condition on the interior edge enclosing the particle-occupied vertex that is different from the boundary condition of at least one outer edge. Other aspects and example features of the $5^{th}$ example embodiment are as they are described with respect to the $1^{st}$ through $7^{th}$ aspects.

In a $9^{th}$ aspect of the $5^{th}$ example embodiment, the edges configured to be at different boundary conditions are selected from e-condensed or m-condensed edges. Other aspects and example features of the $5^{th}$ example embodiment are as they are described with respect to the $1^{st}$ through $8^{th}$ aspects.

In a $6^{th}$ example embodiment, the present invention is a method of reading a state of a topological qubit encoded in a $\mathbb{Z}_2$ Quantum Spin Liquid ($\mathbb{Z}_2$ QSL). In a $1^{st}$ aspect of the $6^{th}$ example embodiment, the method comprises receiving an indication of a state of each particle of a two-dimensional array of particles, each particle disposed at a vertex of a ruby lattice; each particle having a first state and an excited state; each particle that belongs to at least three unit cells of the ruby lattice having a blockade radius, when in the excited state, sufficient to blockade each of at least six nearest neighboring particles in the ruby lattice from transitioning from its first state to its excited state, and wherein the array has a plurality of outer edges, each outer edge being either in a first boundary condition or in a second boundary condition, each outer edge being in a different boundary condition than any adjacent outer edge. The method further comprises determining a first path through the array from a first outer edge of the plurality of outer edges having the first boundary condition to a second outer edge of the plurality of outer edges having the first boundary condition via a first plurality of vertices of the ruby lattice having thereat a first plurality of particles; assigning a first value to the first path based on the state of each of the first plurality of particles; based on the first value, determining the state of a first topological qubit.

In a $2^{nd}$ aspect of the $6^{th}$ example embodiment, prior to determining the first path, a basis rotation is applied to the first topological qubit. Other aspects and example features of the $6^{th}$ example embodiment are as they are described with respect to the $1^{st}$ aspect.

In a $3^{rd}$ aspect of the $6^{th}$ example embodiment, the method further comprises determining a second path through the array from the first outer edge of the plurality of outer edges to the second outer edge of the plurality of outer edges via a second plurality of vertices of the ruby lattice having thereat a second plurality of particles; assigning a second value to the second path based on the state of each of the second plurality of particles; and based on the first and second values, determining the state of the first topological qubit. Other aspects and example features of the $6^{th}$ example embodiment are as they are described with respect to the $1^{st}$ and $2^{nd}$ aspects.

In a $4^{th}$ aspect of the $6^{th}$ example embodiment, the method further comprises determining a third path through the array from the first outer edge of the plurality of outer edges to a third outer edge of the plurality of outer edges having the first boundary condition, via a third plurality of vertices of the ruby lattice having thereat a third plurality of particles; assigning a third value to the third path based on the state of each of the third plurality of particles; and based on the third value, determining the state of a second topological qubit. Other aspects and example features of the $6^{th}$ example embodiment are as they are described with respect to the $1^{st}$ and $3^{rd}$ aspects.

In a $7^{th}$ example embodiment, the present invention is a method of reading a state of a topological qubit encoded in a $\mathbb{Z}_2$ Quantum Spin Liquid ($\mathbb{Z}_2$ QSL). In a $1^{st}$ aspect of the $7^{th}$ example embodiment, the method comprises: receiving an indication of a state of each particle of a two-dimensional array of particles, each particle disposed at a vertex of a ruby lattice; each particle having a first state, and an excited state; each particle that belongs to at least three unit cells of the ruby lattice having a blockade radius, when in the excited state, sufficient to blockade each of at least six nearest neighboring particles in the ruby lattice from transitioning from its first state to its excited state, and wherein the array comprises at least one outer edge and at least one interior edge; determining a first path through the array from the at least one interior edge to the at least one outer edge via a first plurality of vertices of the ruby lattice having thereat a first plurality of particles; assigning a first value to the first path based on the state of each of the first plurality of particles; and, based on the first value, determining the state of a first topological qubit.

In a $2^{nd}$ aspect of the $7^{th}$ example embodiment, the method further comprises determining a second path through the array from the at least one interior edge to the at least one outer edge via a second plurality of vertices of the ruby lattice having thereat a second plurality of particles; assigning a second value to the first path based on the state of each of the second plurality of particles; and, based on the first and second values, determining the state of the first topological qubit. Other aspects and example features of the $7^{th}$ example embodiment are as they are described with respect to the $1^{st}$ aspect.

In a $3^{rd}$ aspect of the $7^{th}$ example embodiment, the array has at least a second interior edge, the method further comprising: determining a third path through the array from the second interior edge to the at least one outer edge via a third plurality of vertices of the ruby lattice having thereat a third plurality of particles; assigning a third value to the third path based on the state of each of the third plurality of particles; based on the third value, determining the state of a second topological qubit. Other aspects and example features of the $7^{th}$ example embodiment are as they are described with respect to the $1^{st}$ and $2^{nd}$ aspects.

In an additional example embodiment of any of the aspects of the $6^{th}$ example embodiment or the $7^{th}$ example embodiment, determining any one of the paths comprises: assembling the path piecewise from a plurality of segments, each segment extending between two vertices in the ruby lattice wherein each segment either: extends between two vertices in a triangular portion of a unit cell of the ruby lattice, or extends between two vertices in different unit cells of the ruby lattice without crossing any unit cells of the ruby lattice. Other aspects and example features of the $6^{th}$ and the $7^{th}$ example embodiment are as they are described with respect to any of their aspects.

In an additional example embodiment of any of the aspects of the $6^{th}$ example embodiment and the $7^{th}$ example embodiment, determining any one of the paths comprises: assembling the path piecewise from a plurality of segments, each segment extending between two vertices in the ruby lattice wherein each segment extends between two vertices in a quadrilateral portion of a unit cell of the ruby lattice. Other aspects and example features of the $6^{th}$ and the $7^{th}$ example embodiment are as they are described with respect to any of their aspects.

In an $8^{th}$ example embodiment, the present invention is a method of operating on a topological qubit. The method comprises preparing a topological qubit according to the method defined by the $4^{th}$ example embodiment or any of its aspects. In a $1^{st}$ aspect of the $8^{th}$ example embodiment, the first boundary condition is the e-boundary condition, and the method comprises: creating a first and a second e-anyon in the array; removing the first e-anyon from the array via the first outer edge and removing the second e-anyon from the array via the third outer edge.

In a $9^{th}$ example embodiment, the present invention is a method of operating on a topological qubit. The method comprises preparing a topological qubit according to the method defined in the $5^{th}$ example embodiment or any of its aspects. In a $1^{st}$ aspect of the $9^{th}$ example embodiment, the method further comprises creating a first and a second e-anyon in the array; pinning the first e-anyon; and moving the second e-anyon along a circular path circumscribing the at least one interior edge and having the end point at the position of the first e-anyon, thereby destroying the first and the second e-anyons.

In a $10^{th}$ example embodiment, the present invention is a method of encoding a first and second topological qubit in a $\mathbb{Z}_2$ Quantum Spin Liquid ($\mathbb{Z}_2$ QSL), comprising preparing a $\mathbb{Z}_2$ QSL according to the method defined by the $4^{th}$ example embodiment or any of its aspects. In a $1^{st}$ aspect of the $10^{th}$ example embodiment, the array comprises a first interior edge and a second interior edge, the first interior edge having a first boundary condition and the second interior edge having a second boundary condition different from the first boundary condition, the first topological qubit corresponding to the first interior edge and the second topological qubit corresponding to the second interior edge, and the array comprises a first outer edge, the first outer edge having the first boundary condition, and the array comprising an additional edge, the additional edge having the second boundary condition and being either an interior edge or an outer edge.

In an $11^{th}$ example embodiment, the present invention is a method of operating on a first and second topological qubit, comprising encoding the first and second topological qubit according to the method defined by the $10^{th}$ example embodiment. In a $1^{st}$ aspect of the $11^{th}$ example embodiment, the method further comprises moving the first interior edge along a closed continuous path circumscribing the second interior edge.

In a $2^{nd}$ aspect of the either the $10^{th}$ or the $11^{th}$ example embodiment, either (i) the first boundary condition is m-condensed and the second boundary condition is e-condensed, or (ii) the first boundary condition is e-condensed and the second boundary condition is m-condensed. Other aspects and example features of the $10^{th}$ and $11^{th}$ example embodiments are as they are described with respect to the $1^{st}$ aspects of each of these embodiments.

In a $12^{th}$ example embodiment, the present invention is a computer program product comprising a computer readable storage medium having program instructions embodied therewith, the program instructions executable by a processor to cause the processor to perform the method defined any one of the $3^{rd}$ through $11^{th}$ example embodiments or any of its aspects.

In one example embodiment, the present invention is a device, comprising a two-dimensional array of particles, each particle disposed at a vertex of a ruby lattice having, each particle that belongs to at least three unit cells of the ruby lattice having a ground state and an excited state, the excited state having a blockade radius sufficient to blockade at least six nearest neighboring particles in the ruby lattice.

In another example embodiment, the present invention is a system comprising a confinement system for arranging particles in a two-dimensional array, each particle disposed at a vertex of a ruby lattice, each particle that belongs to at least three unit cells of the ruby lattice having a ground state and an excited state, the excited state having a blockade radius sufficient to blockade at least six nearest neighboring particles in the ruby lattice; the confinement system comprising a laser source arranged to create a plurality of confinement regions; a source of an atom cloud, the atom cloud capable of being positioned to at least partially overlap with the plurality of confinement regions; and an excitation source for evolving at least some of the plurality of particles from the ground state into the excited state.

In another example embodiment, the present invention is a method of reading a state of a topological qubit, the method comprising receiving an indication of a state of each particle of a two-dimensional array of particles, each particle disposed at a vertex of a ruby lattice, each particle that belongs to at least three unit cells of the ruby lattice being in a ground state or an excited state, the excited state having a blockade radius sufficient to blockade at least six nearest neighboring particles in the ruby lattice, the ruby lattice having a plurality of edges, each edge having either a first boundary condition or a second boundary condition, each edge having a different boundary condition than any adjacent edge; determining a first path through the ruby lattice from a first edge of the plurality of edges having the first boundary condition to a second edge of the plurality of edges having the first boundary condition via a first plurality of vertices of the ruby lattice having thereat a first plurality of particles; assigning a first value to the first path based on the state of each of the first plurality of particles; determining a second path through the ruby lattice from a third edge of the plurality of edges having the second boundary condition to a fourth edge of the plurality of edges having the second boundary condition via a second plurality of vertices of the ruby lattice having thereat a second plurality of particles; assigning a second value to the second path based on the state of each of the second plurality of particles; based on the first and second values, determining the state of the topological qubit.

In various embodiments, a method of preparing a spin liquid state is provided. A coherent light beam is directed to a two-dimensional array of particles. Each particle is disposed at a vertex of a ruby lattice. Each particle that belongs to at least three unit cells of the ruby lattice having a ground state and an excited state, the excited state having a blockade radius sufficient to blockade at least six nearest neighboring particles in the ruby lattice. A detuning of the coherent light beam is changed from negative to positive values using a frequency sweep. In some embodiments, the frequency sweep is cubic. In some embodiments, Rydberg coupling is activated prior to said changing the detuning. In some embodiments, the activating is performed over a period at least equal to the inverse of a Rabi frequency of each particle.

Example A: Prediction of Toric Code Topological Order from Rydberg Blockade

The physical realization of $\mathbb{Z}_2$ topological order as encountered in the paradigmatic toric code has proven to be an elusive goal. We describe that this phase of matter can be realized in a two-dimensional array of Rydberg atoms placed on the ruby lattice, at specific values of the Rydberg blockade radius. First, we show that the blockade model—also known as a 'PXP' model—realizes a monomer-dimer model on the kagome lattice with a single-site kinetic term. This can be interpreted as a $\mathbb{Z}_2$ gauge theory whose dynamics is generated by monomer fluctuations. We obtain its phase diagram using the numerical density matrix renormalization group method and find a topological quantum liquid (TQL) as evidenced by multiple measures including (i) a continuous transition between two featureless phases, (ii) a topological entanglement entropy of ln2 as measured in various geometries, (iii) degenerate topological ground states and (iv) the expected modular matrix from ground state overlap. Next, we show that the TQL persists upon including realistic, algebraically-decaying van der Waals interactions V(r) ~$1/r^6$ for a choice of lattice parameters. Moreover, we can directly access topological loop operators, including the Fredenhagen-Marcu order parameter. We show how these can be measured experimentally using a dynamic protocol, providing a "smoking gun" experimental signature of the TQL phase. Finally, we show how to trap an emergent anyon and realize different topological boundary conditions, and we discuss the implications for exploring fault-tolerant quantum memories.

INTRODUCTION

Nearly five decades ago, Anderson proposed that quantum fluctuations could lead to a liquid of resonating valence bonds, stimulating a vast theoretical effort that continues to this day. Further work related this idea to the more precise notion of a gapped quantum spin liquid, an exotic state potentially realized in frustrated magnets. At the same time, it was understood that such gapped quantum liquids involve topological order, the simplest example being $\mathbb{Z}_2$ topological order in two spatial dimensions. In this work, we will interchangeably refer to this as a topological quantum liquid or spin liquid-even if the bosonic degrees of freedom are not spins but represent, e.g., a two-level atomic state.

Phases of matter with topological order exhibit a number of remarkable properties. First, they imply the emergence of gauge fields, analogous to those describing the fundamental forces, although the gauge group and other details differ. Thus, $\mathbb{Z}_2$ topological order is associated with a deconfined $\mathbb{Z}_2$ (Ising) gauge group. Second, despite being built from bosonic degrees of freedom, the excitations of such quantum spin liquids are quasiparticles with nontrivial quantum statistics. For example, the $\mathbb{Z}_2$ spin liquid includes three nontrivial excitations, two of which, the electric and magnetic particles, e and m, are bosons, while their combination f=em is a fermion. All three particles acquire a sign change on circling another anyon, i.e., they have semionic mutual statistics. These nontrivial statistics immediately lead to the remarkable property that the ground states of a topologically ordered system must be degenerate when realized on certain manifolds, such as a torus. Third, there is a remarkable link between superconductivity and $\mathbb{Z}_2$ quantum spin liquids—while the fermion f can be associated with Bogoliubov quasiparticles, the e, m excitations are related to the superconductor vortices. This led to earlier proposals suggesting that $\mathbb{Z}_2$ topological order might be key to understanding the phenomenon of high-temperature superconductivity.

Finally, a key characteristic of topological order—the long-ranged nature of its entanglement—was pointed out. On the one hand, this implies that topologically ordered states of matter realize an entirely new form of entangled quantum matter, unlike any other conventional ground states realized to date. On the other hand, this observation also has profound implications in areas such as quantum error correction and fault-tolerant quantum computation. The $\mathbb{Z}_2$ topological order underlies the 'toric code' and 'surface code' models for topologically protected quantum memory, which encode logical quantum bits in degenerate ground states. Since these degenerate ground states cannot be distinguished by local measurements, quantum information encoded in them is naturally protected from decoherence. Such intrinsic topological fault tolerance is of great consequence in the quest to build robust quantum information processing devices.

Due to these considerations, realizing $\mathbb{Z}_2$ topological order has been a major goal of condensed matter research. Unfortunately, despite several decades of theoretical and experimental effort, no clear-cut realization of $\mathbb{Z}_2$ topological order has been obtained to date. While topologically ordered states appear in the context of the fractional quantum Hall effect, they are realized under rather special conditions of strong magnetic fields. In contrast, realizing topological order in a time-reversal invariant system remains a major unfulfilled research goal. Such a realization would avoid the need for applying strong magnetic fields, which is particularly challenging for neutral objects. Furthermore, non-chiral topological orders can be achieved, in which a gap can be maintained even at the boundaries. In fact, we note that no realization of topological order in an intrinsically bosonic or spin system has been conclusively identified to date.

Figure 23A:
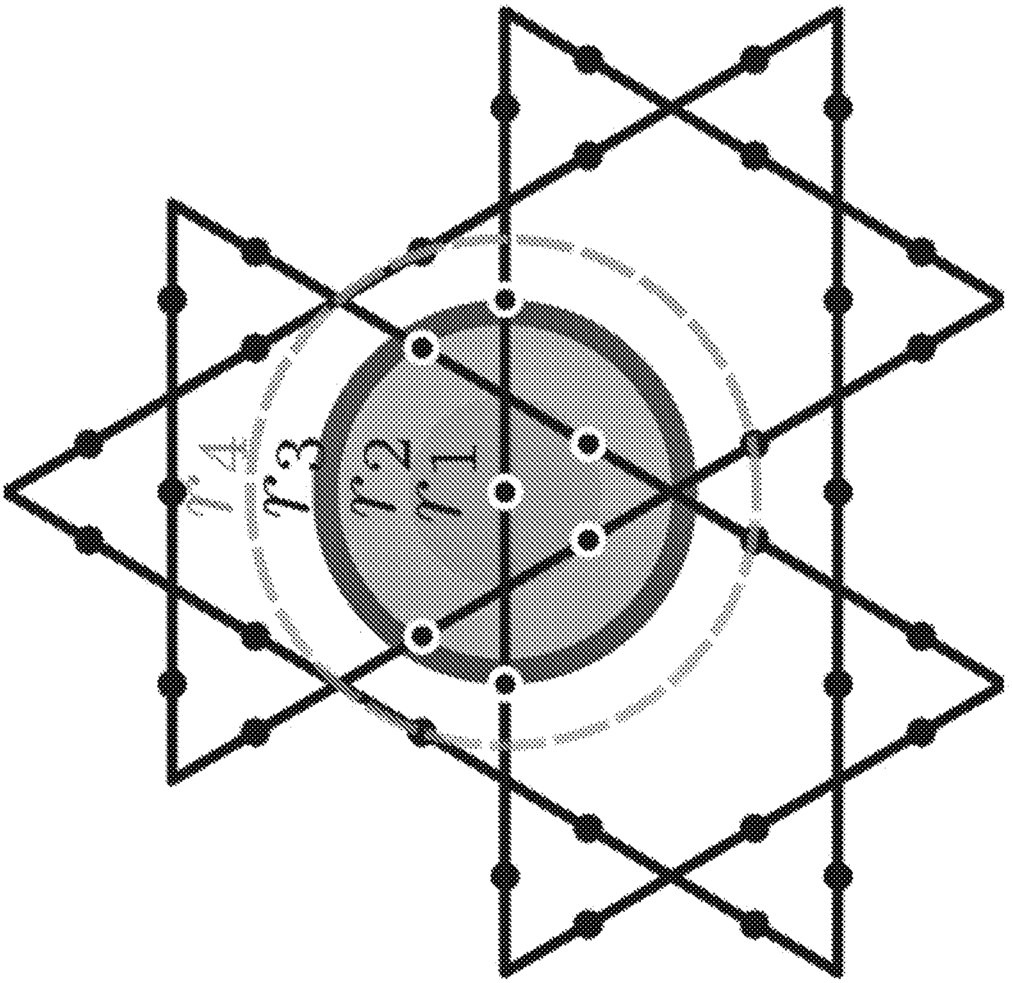
FIG. 23A-C illustrates the Rydberg blockade model and its relation to dimer model according to embodiments of the present disclosure.
Figure 23B:
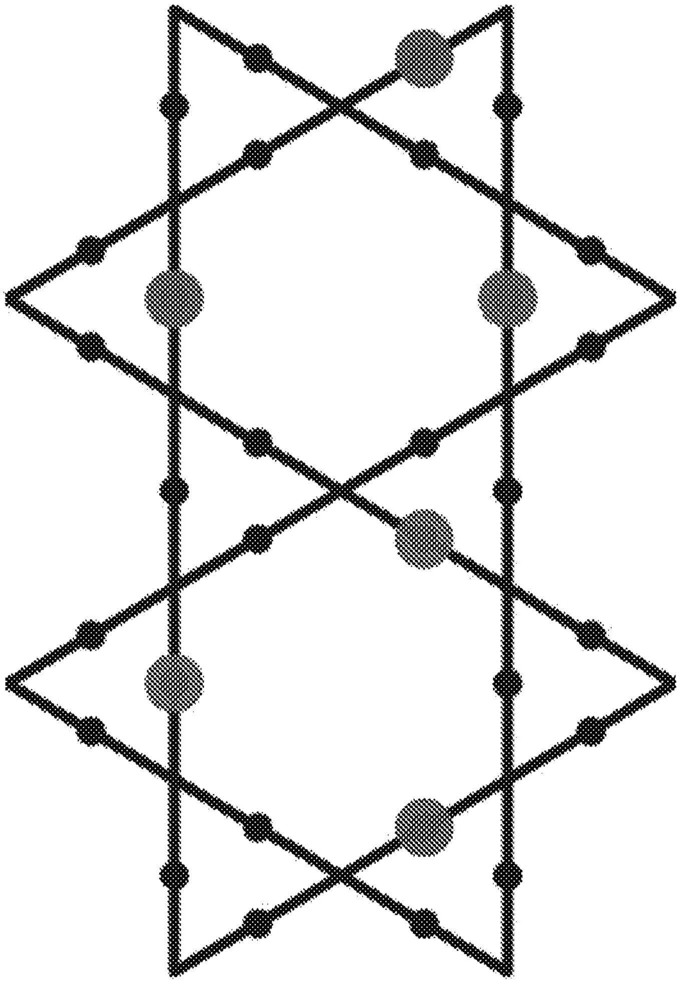
Figure 23C:
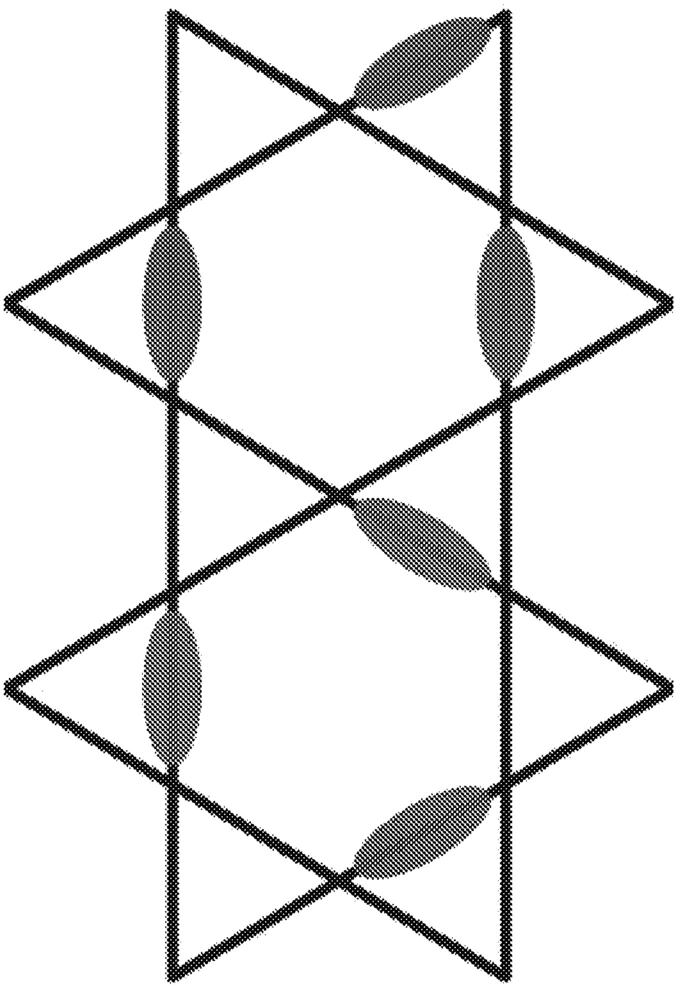

Referring to FIG. 23, the Rydberg blockade model and relation to dimer model are illustrated. (FIG. 23A) Hardcore bosons on the links of the kagome lattice (forming the ruby lattice) are strongly-repelling, punishing double-occupation within the disk $r \le r_3 = 2a$. (FIG. 23B) An example of a state consistent with the Rydberg blockade at maximal filling. (FIG. 23C) Since the blockade forbids occupation of any two touching bonds, we can equivalently draw the configuration as a dimer covering on the kagome lattice.

Recently, a new approach for exploring quantum many body physics has emerged. It is based on neutral atom arrays trapped in optical tweezer arrays. Tunable atom interactions can be engineered in such systems using the Rydberg blockade mechanism, mediated by laser excitation of atoms into the Rydberg states. Significant progress in realizing two dimensional quantum lattice models from the atom arrays was achieved, and a rich phase diagram of symmetry breaking orders has been predicted and observed. At the same time, the special features of the Rydberg atom interactions make them attractive platforms for realizing emergent lattice gauge theories and quantum dimer models. We note that a symmetry-protected topological phase has been realized in one-dimensional Rydberg chains; this is distinct from the intrinsic topological order considered in this work, which does not require any symmetries and is characterized by emergent anyons.

Here we introduce a new approach for realizing a $\mathbb{Z}_2$ topologically ordered state as the ground state of a 2D Rydberg atom array. We show that this approach does not require careful engineering or fine-tuning of the constraints, enabling the first realization and direct probing of a time reversal and parity invariant topological order, and of emergent deconfined gauge fields in a quantum model on a near-term quantum device.

Our approach for realizing a topological spin liquid is based on the Rydberg blockade: when a neutral atom is excited into a Rydberg state with a high principal quantum number, the resonant excitation of the nearby atoms is suppressed due to strong atom-atom interactions. A minimal effective Hamiltonian for the Rydberg array—where the possibility of exciting an atom into a Rydberg state is described by two-level system—is the so-called PXP model $$H = \frac{1}{2}\sum_i (\Omega P \sigma_i^x P - \delta \sigma_i^z).$$

Here P projects out states that violate the blockade, and Ω is the Rabi frequency between the two levels, which is driven by a laser with detuning δ. For a fixed blockade radius, the PXP model, which depends on a single parameter has been explored in $$\frac{\delta}{\Omega},$$

has been explored in great detail in one dimension—both theoretically and experimentally—where it led to a rich phenomenology including quantum scars and lattice gauge theories. Recently, 2D PXP models have also been studied in the context of quantum scars. In this work, we show that for a particular choice of two-dimensional atom arrangement, Rydberg blockade radius and laser detuning, a $\mathbb{Z}_2$ spin liquid is stabilized as the ground state of this model.

To be specific, we first focus on the PXP model on the so-called ruby lattice—equivalently, the links of the kagome lattice—with the blockade radius containing six nearby sites (see FIG. 23A). By tuning δ, we find a phase transition from the trivial phase into another featureless phase of matter. We determine that the latter is a $\mathbb{Z}_2$ spin liquid using a variety of probes, including the topological entanglement entropy, ground state degeneracies, and modular transformations. We note that there are previous works considering spin liquids on the ruby lattice, although they are all distinct from the present work; in particular they feature fundamentally distinct spin interactions and do not invoke a Rydberg blockade.

These results can be understood by noting that for the above lattice and Rydberg blockade radius, the Hamiltonian becomes equivalent to a dimer-monomer model on the kagome lattice. While it is known that dimer models on non-bipartite lattices (such as the triangular and kagome lattice) can realize a $\mathbb{Z}_2$ spin liquid, they are notoriously hard to implement in experiment. Indeed, even to realize the Hilbert space of a dimer model requires special interactions. Furthermore, one needs the right Hamiltonian to drive the model into a spin liquid phase. For instance, a remarkable exactly-soluble $\mathbb{Z}_2$ dimer liquid can exist on the kagome lattice, which however requires 32 distinct dimer resonances. If one only includes the lowest order dimer moves, a valence bond solid is realized rather than a spin liquid. The novel insight in the present work is that by including monomers, the effective Hamiltonian only needs a single-site kinetic term (the creation and destruction of monomers) to perturbatively generate the multi-site dimer resonances necessary for a spin liquid. While dimer-monomer models have a rich history, to the best of our knowledge they have not yet been studied with a minimal kinetic term generating a rich phenomenology. Dimer-monomer models of this type could provide a new paradigm for the physical realization of lattice gauge theories, going well beyond the example studied in this work.

Furthermore, we show that the above findings are not fine-tuned to the PXP model. More precisely, we numerically confirm that the spin liquid can also be found in the full-fledged Hamiltonian with realistic $V(r)\sim 1/r^6$ Van der Waals interactions between the Rydberg atoms on a particular instance of the ruby lattice.

In addition to realizing a $\mathbb{Z}_2$ spin liquid in an experimentally-relevant model, a very useful property of this model is that it also gives a direct handle on the two topological string operators. In the language of lattice gauge theory, these are the Wilson and 't Hooft lines. In the context of topological order, these are the strings whose endpoints host an e- and m-anyon, respectively. We explicitly construct these operators on the lattice and confirm the expected behavior of loop operators in the spin liquid, as well as re-interpret the nearby phases as e- and m-condensates using the Fredenhagen-Marcu string order parameter.

These string operators also serve as very useful probes to detect the spin liquid in experiments. The possibility of measuring nonlocal observables is truly a remarkable advantage of certain cold-atom platforms. In more conventional solid state systems, one must rely on local probes which are suited to identifying local order parameters but cannot directly detect topological order. In contrast, Rydberg platforms allow one to take snapshots of the quantum state with single-site resolution, opening up the possibility of extracting nonlocal correlation functions. We describe in detail how this feature can be deployed to diagnose topological order. While the diagonal string operator can be readily measured, we further show how the string operator for the e-anyon—which a priori involves off-diagonal operations which are hard to measure in the lab—can be converted into a diagonal string operator by time-evolving with a Hamiltonian whose blockade radius has been quenched. Thus, we show that both string operators become measurable in the diagonal basis Finally, we discuss methods to create and manipulate quantum information stored in topologically degenerate ground states, paving the way for potential exploration of topological quantum memories. Two crucial pieces of the puzzle we identify are the ability to trap an e-anyon and to create distinct topological boundary conditions-both are straightforwardly achieved by locally changing the laser detuning. As we will explain, these two ingredients already give access to topologically-degenerate qubits in the plane which can be initialized and read out.

The remainder of this example contains a discussion of the Rydberg blockade model, including comparing it to and distinguishing it from conventional dimer models. Its phase diagram is obtained, containing a trivial phase, a $\mathbb{Z}_2$ spin liquid, and a valence bond solid. We confirm that the intermediate phase is indeed a spin liquid in terms of its topological entanglement entropy, its topological string operators and its topologically-distinct ground states from which we extract part of the modular matrices. The experimental setup is discussed, including showing that the spin liquid persists upon including the $V(r)\sim 1/r^6$ potential and explaining how the off-diagonal string operator can be reduced to a diagonal observable. Steps are provided towards using this novel realization for creating a fault-tolerant quantum memory by showing how to trap e-anyons and how to realize distinct boundary conditions; we then give examples of how this can be applied.

Rydberg Blockade 'PXP' Model

We consider hardcore bosons on the links of the kagome lattice with a two-dimensional version of the Fendley-Sengupta-Sachdev model:

$$H = \frac{\Omega}{2}\sum_i (b_i + b_i^\dagger) - \delta\sum_i n_i + \frac{1}{2}\sum_{i,j} V(|i-j|)\, n_i n_j. \quad \text{Equation 5}$$

We set $\Omega>0$. Note that the sign of $\Omega$ can be toggled by replacing $b_i$ to $-b_i$, which leaves $n_i$ invariant. The only place in this paper where the sign of $\Omega$ matters is in the definition of the topological string operators. For Rydberg atoms, $V(r)\sim 1/r^6$. We defer that case to discussion below. Here, we instead focus on the simpler model where V(r) forms a blockade in a particular disk:

$$V(r) = \begin{cases} +\infty & \text{if } r \le 2a \\ 0 & \text{if } r > 2a \end{cases} \quad \text{Equation 6}$$

Here the lattice spacing a is the shortest distance between two atoms. As shown in FIG. 23A, with this interaction range, a given site is coupled to six other sites, which are ordered in pairs at distances $r_1=a$, $r_2=\sqrt{3}a\approx 1.73a$ and $r_3=2a$ (the next distance would be $r_4=\sqrt{7}a\approx 2.65a$, denoted by the dashed circle in FIG. 23A). The Rydberg blockade implies that any two sites within this distance cannot both be occupied (FIG. 23B), which we can interpret as a dimer state on the kagome lattice if the system is at maximal filling (see FIG. 23C). We note that this blockade Hamiltonian is equivalent to the PXP model mentioned in the introduction.

Connection to and Differences from Dimer Models

For a dimer state on the kagome lattice, each vertex is touched by exactly one dimer, such that $$\langle n \rangle = \frac{1}{4}.$$

Our model can have $$\langle n \rangle < \frac{1}{4},$$

in which case certain vertices have no dimers—referred to as a monomer. This distinguishes our system from a usual dimer model. Let us briefly discuss the implications of this difference. The reader interested in the numerical results for our model can skip ahead.

The constraint of a dimer model—having exactly one dimer per vertex—can be interpreted as a Gauss law. More precisely, the presence or absence of a dimer represents a $\mathbb{Z}_2$-valued electric field, with the dimer constraint enforcing the lattice version of the Gauss law $\nabla. E=1 \pmod 2$. Each vertex thus carries a classical/static electric charge e. For this reason, a dimer model is also referred to as an odd $\mathbb{Z}_2$ gauge theory. The absence of dynamic matter in a dimer model implies that it is a pure $\mathbb{Z}_2$ gauge theory, which has two possible phases: a deconfined (this refers to the freedom of test charges which in this case are monomers) and a confined phase. The former is our desired $\mathbb{Z}_2$ spin liquid (or equivalently, dimer liquid or a resonating valence bond state), whereas the latter is a valence bond solid. The confined phase is a condensate of the magnetic excitation m. As explained in herein, this anyon carries a projective representation under translation such that its condensation implies translation symmetry breaking. Stabilizing the spin liquid requires dimer resonances in the Hamiltonian, but due to the local constraint of a dimer model, these terms typically span many sites. The smallest resonance acts on the six sites around a hexagon of the kagome lattice. A solvable dimer model generally requires 32 distinct types of resonances, the largest spanning 12 sites. While these conditions can be somewhat relaxed, the direct implementation of dimer models, tuned to a regime of parameter space where a liquid phase is known to emerge, remains extremely challenging.

In contrast, the Rydberg blockade model (Equation 5) is a dimer-monomer model. In other words, the Gauss law of the lattice gauge theory is now $\nabla\cdot E=\rho$, where $\rho$ is a quantum-mechanical two-level degree of freedom. This has two advantages. Firstly, the only explicit dynamics in our model is a single-site term which creates and destroys pairs of monomers/charges (the Rabi oscillation $\Omega$ in Equation 5). In the limit of large $$\frac{\delta}{\Omega},$$

the low-energy theory is projected into the macroscopically degenerate space of (maximally-filled) dimer states. Virtual monomer excitations induce dimer resonances between these states. For instance, at leading order in perturbation theory, we obtain $$H_{eff} = -\frac{2\Omega^\circ}{32\delta^\circ}\Sigma_O(|\ \rangle\langle\ | + h.c.\Big),$$

describing hexagon resonances. Second, since monomers are now dynamical degrees of freedom, they can be condensed, driving the system to a translation-symmetric trivial state. In the language of $\mathbb{Z}_2$ gauge theory coupled to matter, this corresponds to the Higgs phase. This gives a clear-cut instance of a continuous phase transition between two featureless phases of matter (as opposed to the valence bond solid, which has long-range order), which does not involve any symmetries.

While there are thus clear advantages to not realizing a strict dimer model but rather a dimer-monomer model, it is also advantageous to nevertheless be proximate to a dimer model (i.e., have low monomer density). Firstly, it is a good place to hunt for a spin liquid, since—as discussed above—a dimer model on the kagome lattice cannot realize a trivial phase of matter. Secondly, one has a direct handle on the topological string operators associated to the $\mathbb{Z}_2$ gauge theory, with anyons living at their endpoints. We discuss this in detail below.

Figure 24:
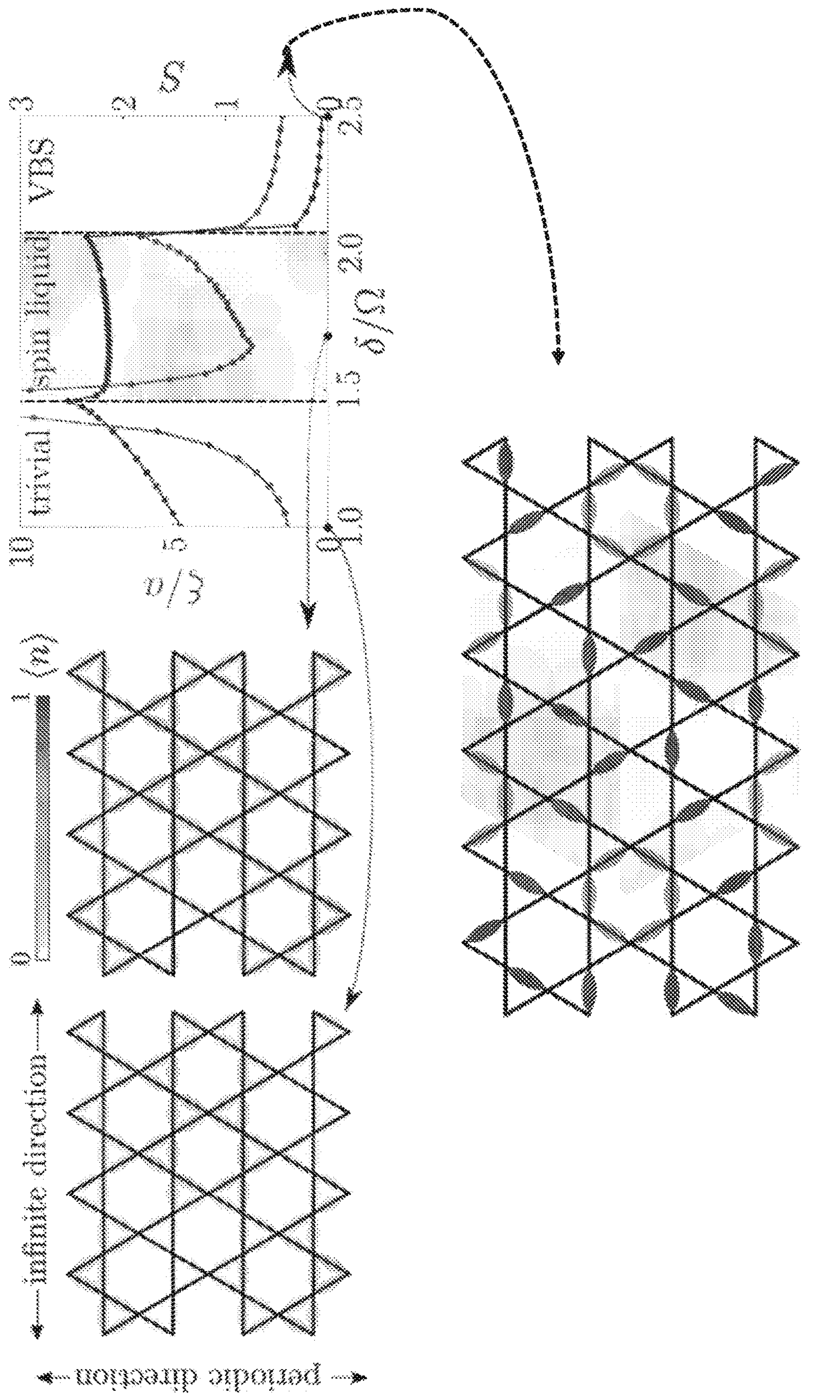
FIG. 24 is a phase diagram of Rydberg blockade model on the links of the kagome lattice according to embodiments of the present disclosure.

Referring to FIG. 24, a phase diagram of Rydberg blockade model on the links of the kagome lattice is provided. The trivial phase at small $$\frac{\delta}{\Omega}$$

is separated from the valence bond solid (VBS) at large $$\frac{\delta}{\Omega}$$

by an intermediate phase which has a large entanglement plateau. We show an exemplary density plot for each of the three phases, which shows that the intermediate phase is featureless. The VBS phase has a 36 site unit cell (72 atoms on the links) highlighted by the gray shaded region—this pattern has been studied in the context of the $$\text{spin}-\frac{1}{2}$$

Heisenberg model on the kagome lattice. Numerical results are for a cylinder with XC-8 geometry, as depicted.

Phase Diagram

We now study the phase diagram of the model in Equation 5 with the blockade in Equation 6 using the density matrix renormalization group (DMRG). We can explicitly enforce $V(r_1)=+\infty$ by working in the reduced Hilbert space where each triangle of the kagome lattice (containing three atoms) only has four states: empty or a dimer on one of the three legs. We cannot straightforwardly set $V(r_2)=V(r_3)=+\infty$ since the resulting Hilbert space is no longer a tensor product-indeed, this is the magic of dimer models. Hence, we enforce these constraints energetically by choosing a very large $V(r_2)=V(r_3)=50\Omega$. We have confirmed that our results do not depend on the details of this choice. We study the model on a cylinder geometry of fixed circumference (up to XC-12) and infinite extent. Details about the numerical method are provided below.

When $$\frac{\delta}{\Omega}$$

is low enough, the system is adiabatically connected to the empty state and is thereby completely trivial. For very large $$\frac{\delta}{\Omega}$$

we enter the regime that is perturbatively described by a dimer model, as explained below. We find that its ground state spontaneously breaks crystalline symmetries and forms a valence bond solid (VBS). Remarkably, for intermediate $$\frac{\delta}{\Omega},$$

these two phases are separated by another featureless phase, as shown in FIG. 24 by the diverging correlation length $\xi$ and the entanglement entropy S between two rings of the cylinder. We will argue that this is a $\mathbb{Z}_2$ spin liquid.

Figure 25A:
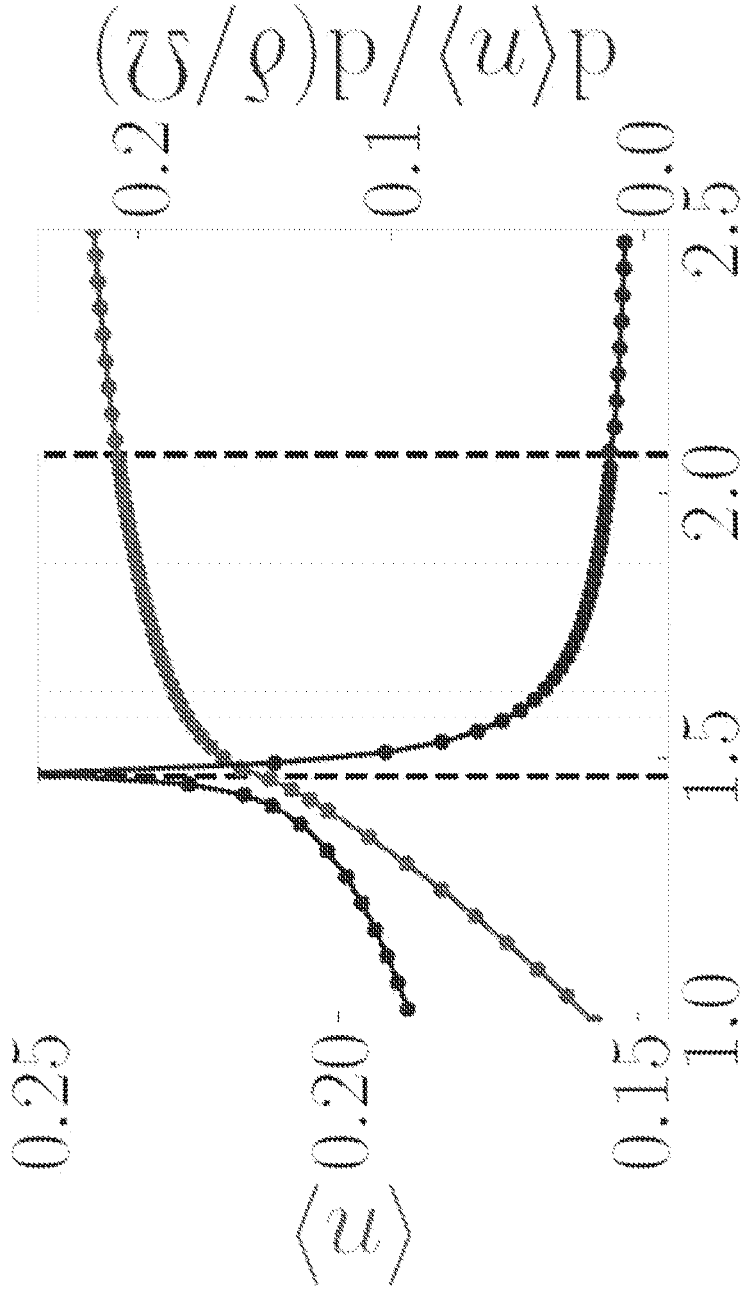
FIG. 25A-B illustrates detecting phase transitions via filling fraction according to embodiments of the present disclosure.

As a first indication that this intermediate phase is still within the approximate dimer model, we consider the filling fraction ⟨n⟩, shown by the red curve in FIG. 25A. We see that as $$\frac{\delta}{\Omega} \to \infty,$$

the filling ⟨n⟩ approaches the maximal ¼ consistent with a fully packed dimer picture. In the intermediate regime (shaded in the plot) we are no longer in the VBS phase, but ⟨n⟩ is still large. It is only when $$\frac{\delta}{\Omega}$$

is decreased further—entering the trivial phase—that ⟨n⟩ sharply drops. This is in line with the possible scenario of exiting the spin liquid by condensing monomers—as explained below—which would exhibit itself in a rapid drop of filling density.

Figure 25B:
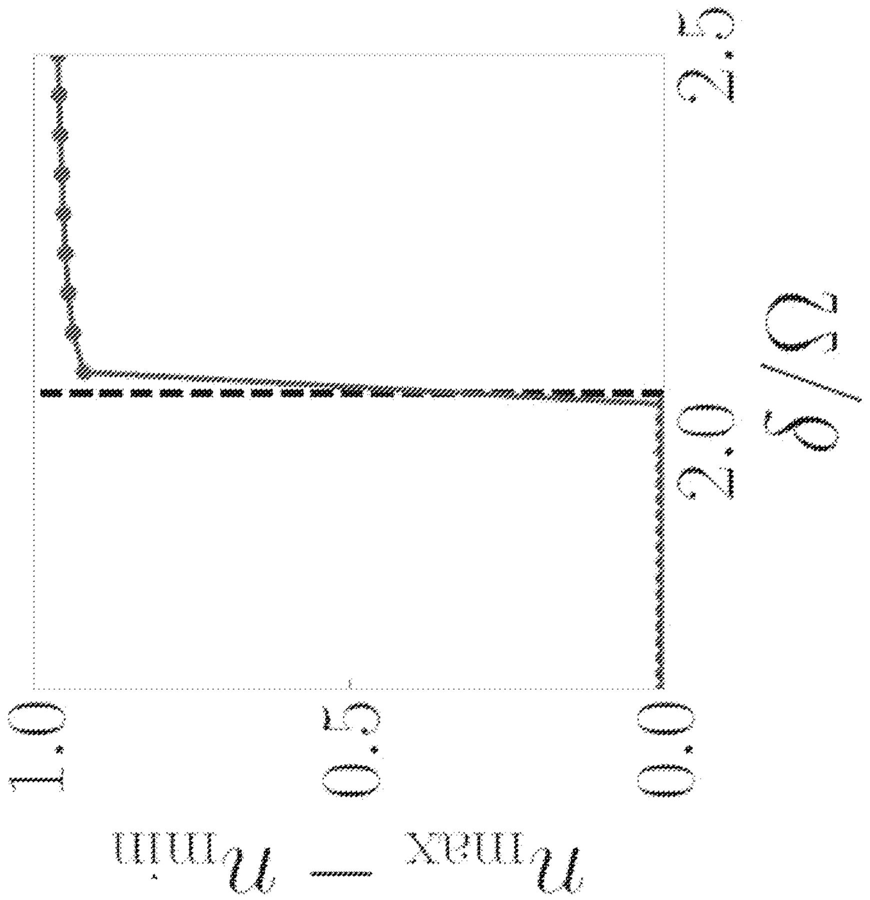

Moreover, the derivative of ⟨n⟩ diverges at the transition between the trivial phase and the spin liquid, signaling a continuous transition. Indeed, the theoretical expectation is that this belongs to the 2+1D Ising universality class (with the trivial phase corresponding to the 'ordered' side), but our available system sizes are not big enough to accurately extract scaling dimensions. FIG. 25A shows no such singularity between the spin liquid and VBS phase. However, it turns out that it is a first order transition which is very hard to diagnose this way (due to the small energy scales associated to the VBS phase). This is much more easily demonstrated by considering the variation of ⟨n⟩ between different sites: FIG. 25B shows that this jumps discontinuously.

Topological Entanglement Entropy

One characteristic feature of topological phases of matter can be found in the scaling of the entanglement entropy. Gapped phases of matter satisfy an area law: for a region with perimeter L, we have $S(L)=\alpha L-\gamma$. The constant offset $\gamma$ is a universal property called the topological entanglement entropy, encoding information about the quantum dimensions of the anyons of the topological order. For a $\mathbb{Z}_2$ spin liquid, $\gamma=\ln 2$.

Figure 26A:
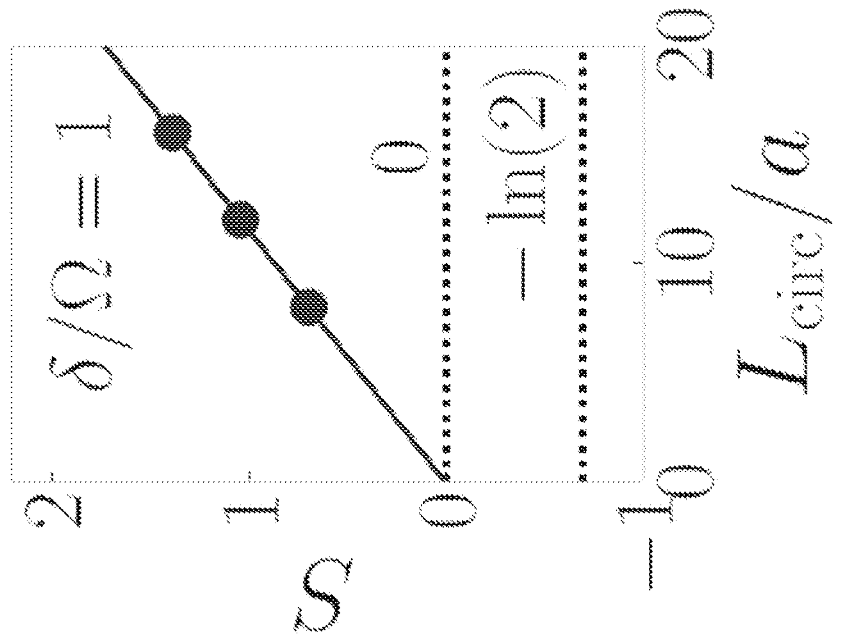
FIG. 26A-C illustrates topological entanglement entropy according to embodiments of the present disclosure.

The topological entanglement entropy can be efficiently extracted from a cylinder geometry. We take a point in the middle of the presumed spin liquid in FIG. 24, $\delta/\Omega=1.7$, and numerically obtain the entanglement entropy upon bipartitioning the infinitely-long cylinder in two halves. Doing this for different circumferences, we extract $\gamma\approx\ln 2$, as shown in FIG. 26C. There are degenerate ground states on the cylinder. To make sure we are comparing apples to apples, we choose the $|1\rangle$ ground state on each cylinder as determined by the string operators discussed elsewhere herein.

Importantly, it has been observed before that one can obtain a spurious value of $\gamma$ for specific cuts in certain lattice models, i.e., one can be deceived into thinking a trivial phase is in fact topologically ordered. For all such reported cases, the spurious value can be detected by comparing the results for different cuts. For this reason, we have extracted $\gamma$ for two distinct geometries: XC (where the finite periodic direction bisects triangles of the kagome lattice) and YC (where the circumference runs parallel to one of the axes of the kagome lattice); for an explanation of this naming convention, see below. Both linear fits give a topological entanglement entropy which is remarkably close to ln2. For comparison, for a point in the trivial phase ($\delta/\Omega=1$) we obtain $\gamma=0$ (FIG. 26A).

Referring to FIG. 25, detecting phase transitions via filling fraction is illustrated. This data is obtained for an infinitely-long cylinder with XC-8 geometry. (FIG. 25A) The filling fraction has a singular behavior upon transitioning from the trivial phase into the spin liquid, after which the system enters a regime where $\langle n\rangle\approx 0.25$, consistent with it being an approximate dimer state. Note that the first derivative of ⟨n⟩ corresponds to a second derivative of the energy; the observed singularity is thus a sign of a second-order phase transition between the trivial phase and the spin liquid. (FIG. 25B) The spin liquid and VBS phase are separated by a first order transition.

To confirm that the above is not a fine-tuned feature of a particular point in the phase diagram, we extract $\gamma$ as a function of $$\frac{\delta}{\Omega}.$$

Figure 26B:
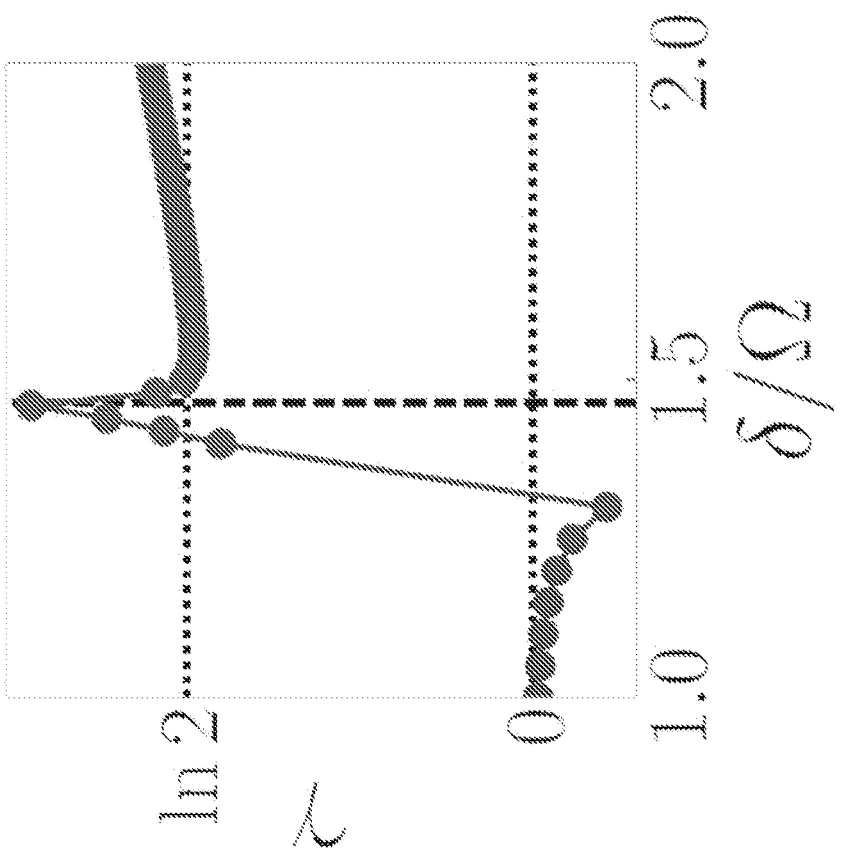
Figure 26C:
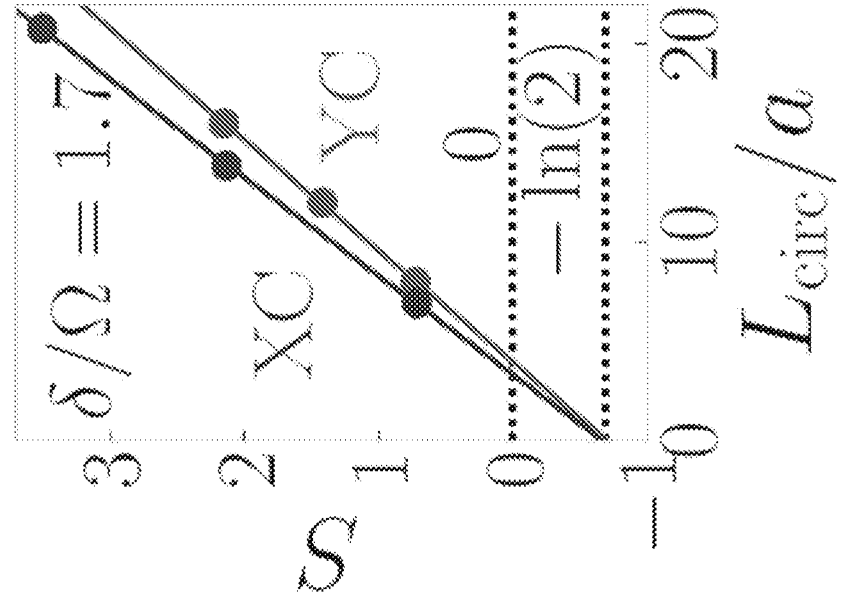

FIG. 26B indeed shows a plateau where $\gamma\approx\ln 2$, consistent with a $\mathbb{Z}_2$ spin liquid. Since this plot only relies on XC-4 and XC-8 data, there is still some minor variation within this plateau. Deep in the spin liquid, $$\frac{\delta}{\Omega} = 1.7,$$

we were also able to converge to the ground state on the bigger cylinder XC-12, confirming $\gamma\approx\ln 2$ (FIG. 26C). Note that we do not consider $\gamma$ in the VBS phase since due to the large unit cell (shown in FIG. 24) the next consistent geometry is XC-16, which is out of reach with current methods. There is also a VBS phase on, e.g., XC-4 and XC-12, but they have different patterns and it is thus not meaningful to compare their entropies.

Referring to FIG. 26, topological entanglement entropy is illustrated. We determine the offset $\gamma$ in the area law $S=\alpha L-\gamma$. (a) For the trivial phase, this is zero. (b) As we increase $$\frac{\delta}{\Omega},$$

we enter the spin liquid where $\gamma\approx\ln 2$. Here, we plot $S_{L=8}-2S_{L=4}$ where $S_{L=n}$ is the bipartition entanglement entropy for the XC-n geometry. (c) For an exemplary point in the spin liquid, we extract $\gamma$ for two distinct geometries (up to XC-12 and YC-8). Note that XC-n (YC-n) has circumference $L_{circ}/a=$ ③n (2n).

Referring to FIG. 27, topological string operators are illustrated. (a) The two different string operators are defined by their action on a single triangle. We call the diagonal and off-diagonal string operators P and Q, respectively. (b) An example of the action of the string operators on a classical dimer state. (c) The definition of the Fredenhagen-Marcu order parameter is shown for the diagonal string, $\langle P\rangle_{FM}$, which measures the condensation of the m-anyon. The analogous definition for $\langle Q\rangle_{FM}$ (not shown) measures an e-condensate.

String Operators and Anyon Condensation

The advantage of measuring topological entanglement entropy is that it is well-defined for any model even in the absence of microscopic identification of operators corresponding to emergent gauge theory. However, in our Rydberg blockade model, a more microscopic understanding of the spin liquid is available. Here, we can identify the topological string operators associated with this $\mathbb{Z}_2$ lattice gauge theory, similar to the toric code model. Such an explicit representation of a topological quantum liquid has a variety of uses: in identifying the spin liquid and its nearby phases (especially in an experimental set-up where, e.g., topological entanglement entropy is not readily accessible), in creating anyons, in distinguishing topological ground states and also perhaps for quantum information applications, such as the initialization and read-out of topological qubits.

A $\mathbb{Z}_2$ lattice gauge theory comes with two string operators determined by the electric field e (defined modulo 2) and its conjugate variable, the gauge field A. These strings are the 't Hooft line $e^{55\ i\pi\int E}$ and the Wilson line $e^{i\int A}$, which anticommute at intersection points. As already mentioned, the binary-valued electric field corresponds to a dimer configuration, with the hardcore dimer constraint acting as a Gauss law. The string operator $e^{i\pi\int E}$ thus corresponds to the parity of dimers along a string. To be precise, we define its action on a single triangle in FIG. 27A (orange dashed line); we refer to this diagonal parity string as P. For an explicit matrix representation, see below. Due to the Gauss law, evaluating it along any closed loop—which has to run perpendicular to the bonds of the kagome lattice—measures the charge inside of it. In the absence of monomers—i.e., gauge charge excitations—this is simply $(-1)^{\#vertices\ enclosed}$ for a contractible loop, as expected of an odd $Z_2$ gauge theory. In contrast, non-contractible loops distinguish topologically-distinct sectors of the dimer Hilbert space (since this value cannot be changed by any local operator).

Figure 27A:
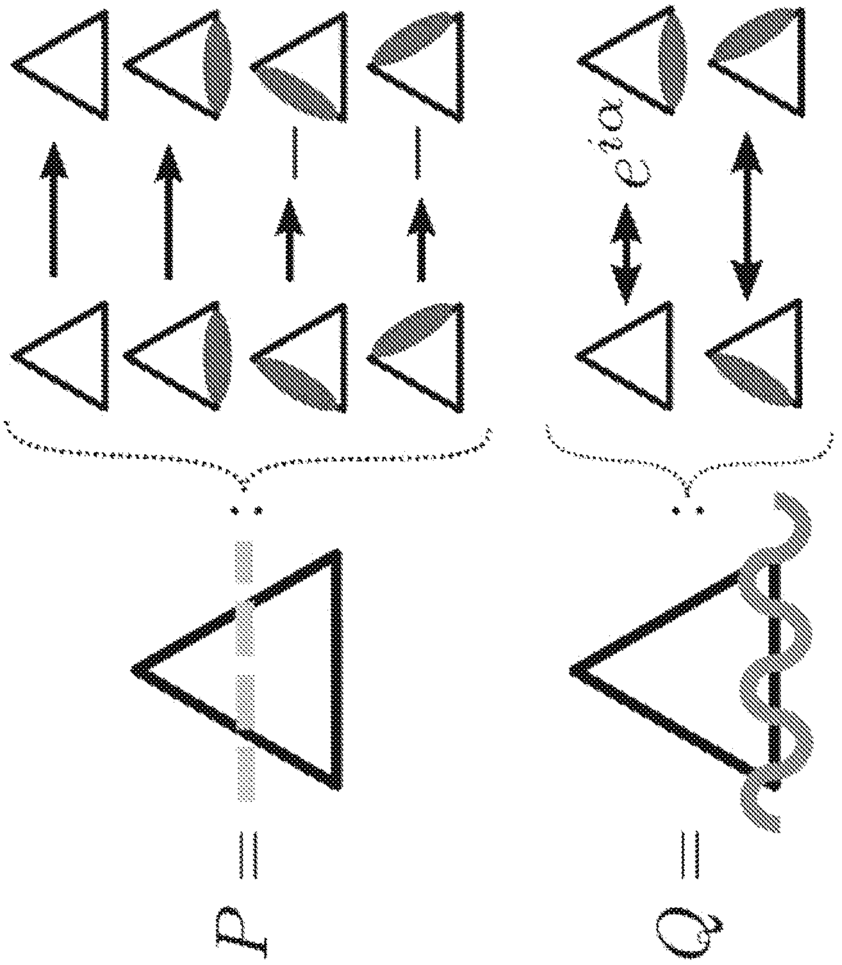
FIG. 27A-C illustrates topological string operators according to embodiments of the present disclosure.
Figure 27B:
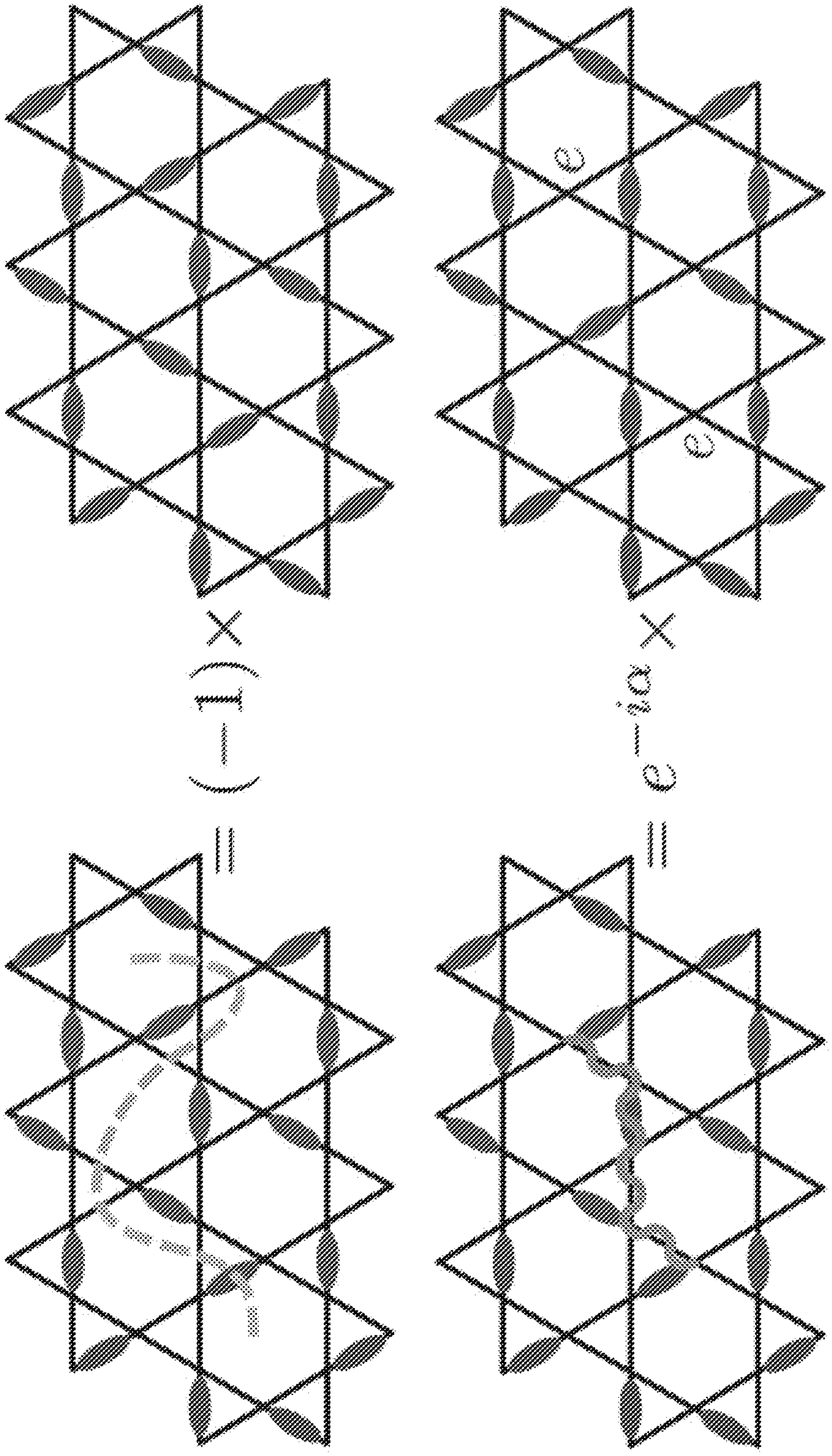

In the dimer basis, the dual string $e^{i\int A}$ has to be off-diagonal, shuffling the dimers. There is essentially a unique way of defining such a string that has a well-defined action on single triangles, as shown in FIG. 27A (solid blue line); we refer to this string as Q. An example is shown in FIG. 27B. Note that any closed string that runs parallel to the bonds of the kagome lattice indeed maps a valid dimer configuration to another valid dimer configuration, and it is also easy to see that this string Q anticommutes with P whenever the strings intersect. To the best of our knowledge, this definition of the Q string is novel; for dimer models, one often considers the more restrictive strings that have to pass through an alternating series of empty and filled bonds. The advantage of this more general definition is twofold: (1) it is also well-defined for states that contain monomers, and (2) with the definitions for P and Q in FIG. 27A, there is in fact a duality transformation that interchanges them, as discussed elsewhere herein.

The electric e and magnetic m excitations of this $\mathbb{Z}_2$ lattice gauge theory live at the endpoints of the Q and P strings, respectively. For instance, FIG. 27B shows how an open Q string indeed creates a monomer at each end. These e and m excitations are topological since they can only be created in pairs. Moreover, whilst they are individually bosonic, the anticommuting property of the P and Q string encodes the fact that e and m have non-trivial mutual statistics; equivalently, the endpoint of the product string PQ carries an emergent fermion f. Similarly, the open string P in FIG. 27B creates m excitations, but this is hard to see since it is acting on a classical dimer state, which is an m-condensate.

The spin liquid is defined by the deconfinement of these excitations. The nearby phases correspond to condensing either the e or the m, which respectively confines m or e due to the mutual statistics. Historically, the e-condensate is called the Higgs phase, whereas the m-condensate is called the confined phase (due to the charged e excitations becoming confined). In an odd gauge theory, with nonzero background gauge charge at each lattice site, the latter in fact implies spontaneous symmetry breaking (i.e., a valence bond solid). The reason for this is that the m-anyon carries a projective representation under the $\mathbb{Z}\times\mathbb{Z}$ translation symmetry. This is a restatement of the Gauss law that the parity along a loop surrounding a vertex is −1: this parity loop can be interpreted as the anticommutator $$T_x T_y T_x^{-1} T_y^{-1}$$

for the action of translations $T_{x,y}$ on the endpoint of a parity string P, i.e., the m-anyon.

Figure 27C:
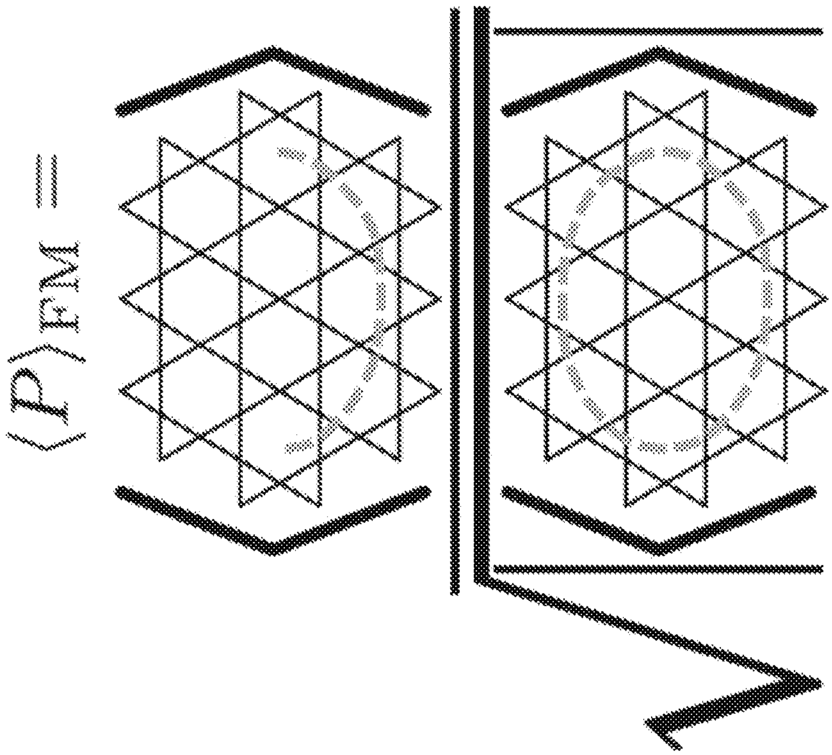

These condensates can be diagnosed by the open P or Q strings attaining long-range order. To properly define what this means, it is important to normalize these string operators. Indeed, generically these strings will decay to zero since the ground state has virtual e and m fluctuations. For this reason, the normalized string operator in FIG. 27C is introduced, which we will refer to as the FM string order parameter. These two string order parameters are a very useful tool for diagnosing the different phases of a lattice gauge theory: although confinement in pure gauge theories can be probed by an area law, in the presence of dynamic matter (as we have in our model) loop operators typically scale with a perimeter law.

Figure 28:
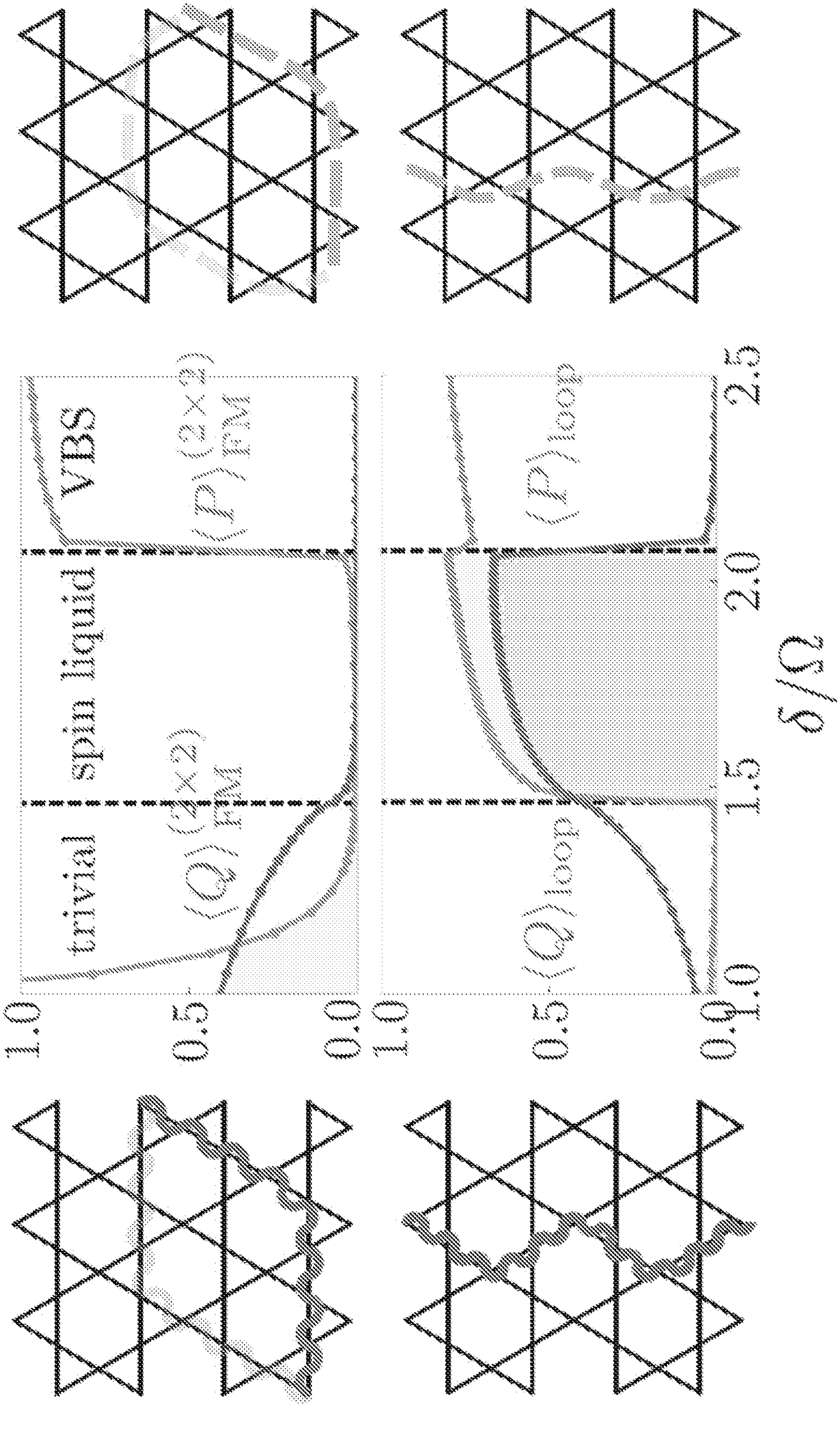
FIG. 28 illustrates diagnosing phases in terms of topological string operators according to embodiments of the present disclosure.

Referring to FIG. 28, diagnosing phases in terms of topological string operators is illustrated. Top panel: the Fredenhagen-Marcu (FM) string order parameters show that the trivial phase is an e-condensate (=Higgs phase) and the VBS phase is an m-condensate (=confined phase). These string order parameters decay to zero in the spin liquid, confirming that it is the deconfined phase of the $\mathbb{Z}_2$ lattice gauge theory. We sketch the strings used for calculating the FM order parameter (the transparent strings show the closed loop used to normalize the string; see FIG. 27C). Bottom panel: long-range order in the FM string for P (Q) suppresses the value of a closed Q (P) loop around the circumference. In the spin liquid, both loops are nonzero (we plot the absolute value: their signs label degenerate ground states, see FIG. 30). As in FIG. 24, results are for XC-8 (depicted) with the vertical (horizontal) direction being periodic (infinite).

The only remaining technicality to discuss is the phase factor $e^{i\alpha}$ in the definition of the off-diagonal string Q in FIG. 27A. In general, this phase factor cancels out unless the Q string changes the total number of dimers, such as for the open string in FIG. 27B. Hence, the optimal choice of $e_{i\alpha}$ depends on the phase difference between different branches of the ground state wave function with distinct particle number. In the present model, one can straightforwardly argue that if the Rabi frequency ω<0, then all amplitudes of the wave function have the same sign, whereas for Ω>0 it alternates with the parity of dimers. From now on, we thus fix $$e^{i\alpha} = -\frac{\Omega}{|\Omega|}.$$

We are now in a position to evaluate the open string and loop operators in the Rydberg blockade model. The results are shown in FIG. 28. As expected, we see that Q has long-range order in the trivial phase—corresponding to an e-condensate—whereas P has long-range order in the VBS phase—corresponding to an m-condensate. Note that P also attains long-range order deep in the trivial phase: this is allowed since the definition of (and distinction between) e and m anyons is only strictly meaningful in the deconfined phase. In the intermediate spin liquid, both FM order parameters decay to zero, consistent with the claim that this is the deconfined phase of the lattice gauge theory. While FIG. 28 shows the FM string order for only particular length of the string (as depicted on both sides of the panel), a more careful scaling analysis in below confirms that in the spin liquid, these strings decay to zero exponentially in the length of the string. We stress that this is a very nontrivial property that would be exceedingly difficult to explain without the presence of topological order. Correspondingly, in this regime, the loop operators evaluated around the circumference are not suppressed and have an appreciable value (which albeit decreases with circumference). In fact, the sign of this nonzero number labels topologically-distinct ground states, as we discuss next.

Indeed, due to the normalization of the strings, the only contribution can come from the endpoints, which naively only affect a finite region due to the finite correlation length. Generically, in the absence of additional symmetry properties, one expects the expectation value of operators with finite support to be nonzero. It is the emergent 1-form symmetry of the topologically ordered phase that constrains it to be zero (up to exponentially small corrections which couple the two endpoints).

Referring to FIG. 29, ground states and modular transformations are illustrated. From the ground states on the infinitely-long cylinder, we can obtain minimally-entangled ground states on the torus geometry. For the smaller geometry, we show that whilst the $$\frac{\pi}{3}-\text{rotation}$$

acts trivially on the trivial $$\left(\frac{\delta}{\Omega}=1\right)$$

or symmetry-breaking ($\delta/\Omega=2.5$) phases, it leads to a nontrivial overlap in the spin liquid ($\delta/\Omega=1.7$). We confirm for the larger torus (96 sites) that the overlaps for distinct ground states agree with the prediction Equation 7 based on the modular transformation of a $\mathbb{Z}_2$ spin liquid. The overlaps are shown as a function of the Monte Carlo sweeps, converging toward the value≈0.5.

Topological Ground State Degeneracy and Modular Matrices

Another fingerprint of a topological spin liquid is its topological ground state degeneracy on manifolds which are themselves topologically non-trivial. For Abelian topological order on an infinitely-long cylinder, one has a ground state corresponding to each anyon in the theory. Conceptually, these different states can be related by starting with one of the ground states and nucleating an anyon pair and separating them infinitely far along the infinite direction of the cylinder. One could of course instead choose to wrap them around the finite direction, which would generate a different basis in this four-dimensional space of states. However, these states will not be minimally-entangled on the cylinder, whereas DMRG optimizes for that. For the present case, we thus expect four distinct topological ground states, corresponding to 1, e, m and f lines threaded along the infinite axis. Due to the mutual statistics, these distinct ground states can be diagnosed by measuring the P and Q loops around the circumference.

Numerically, when we repeat DMRG with different random initializations, we find two (quasi-) degenerate ground states which are distinguished by the sign of $\langle P\rangle_{loop}$ around the circumference. Equivalently, if one creates an initial state with a given sign of the parity loop, we find that DMRG remains in this sector. This does not work for the Q loop, presumably because its finite-size effects along the circumference are big enough for DMRG to switch sectors. It is tempting to associate these to the trivial anyon and the electric charge, 1 and e.

Figure 30:
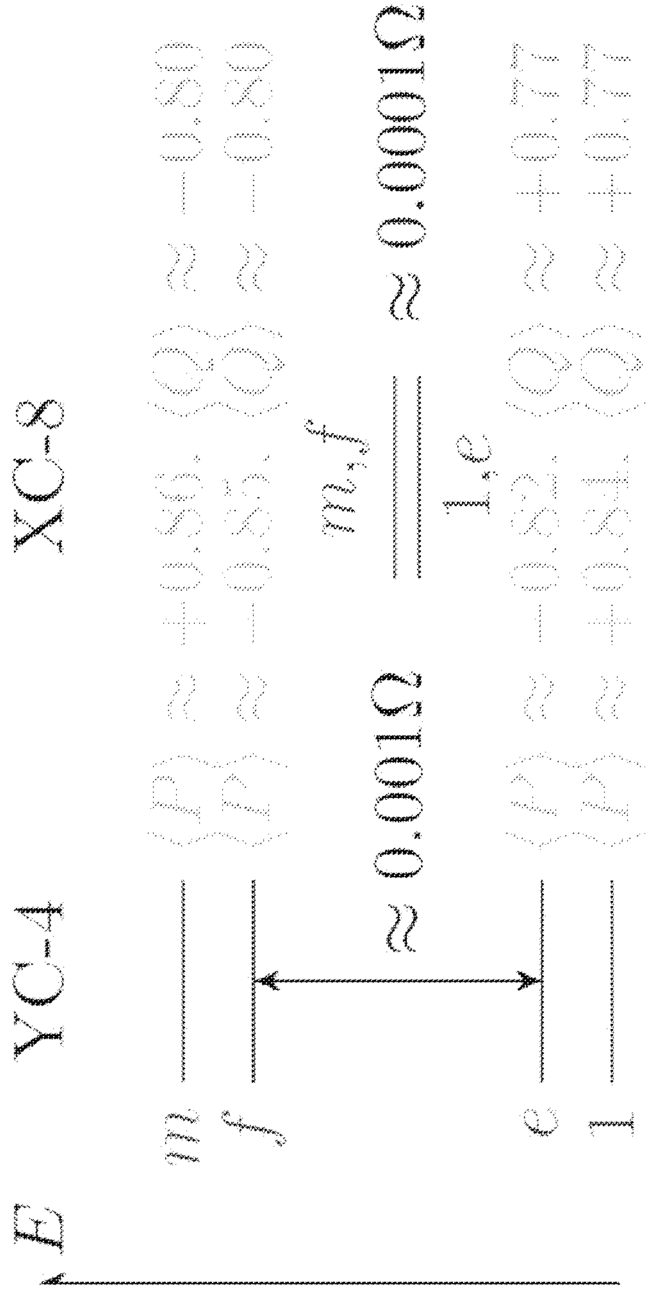
FIG. 30 illustrates topological ground state degeneracy according to embodiments of the present disclosure.

Referring to FIG. 30, topological ground state degeneracy is illustrated. In the topological phase, we obtain the 1 and e ground states from DMRG with random initial states. The m and f states are obtained by starting from fixed-point resonating dimer states and subsequently applying imaginary time-evolution. The energies shown are for $$\frac{\delta}{\Omega}=1.7.$$

In light gray we also show the eigenvalues of the P and Q loop operators around the circumference (for YC-4); the four ground states are characterized by the signs of these numbers.

Figure 29A:
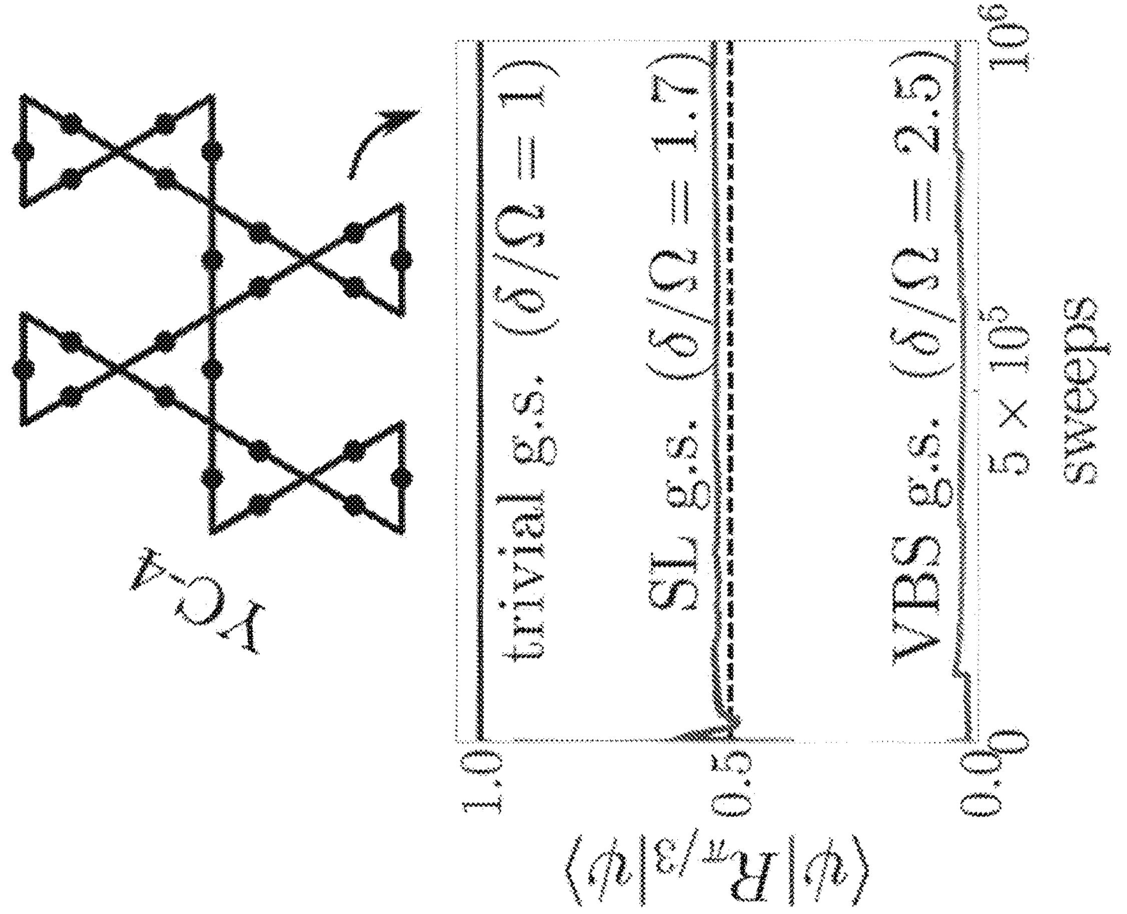
FIG. 29A-B illustrates ground states and modular transformations according to embodiments of the present disclosure.
Figure 29B:
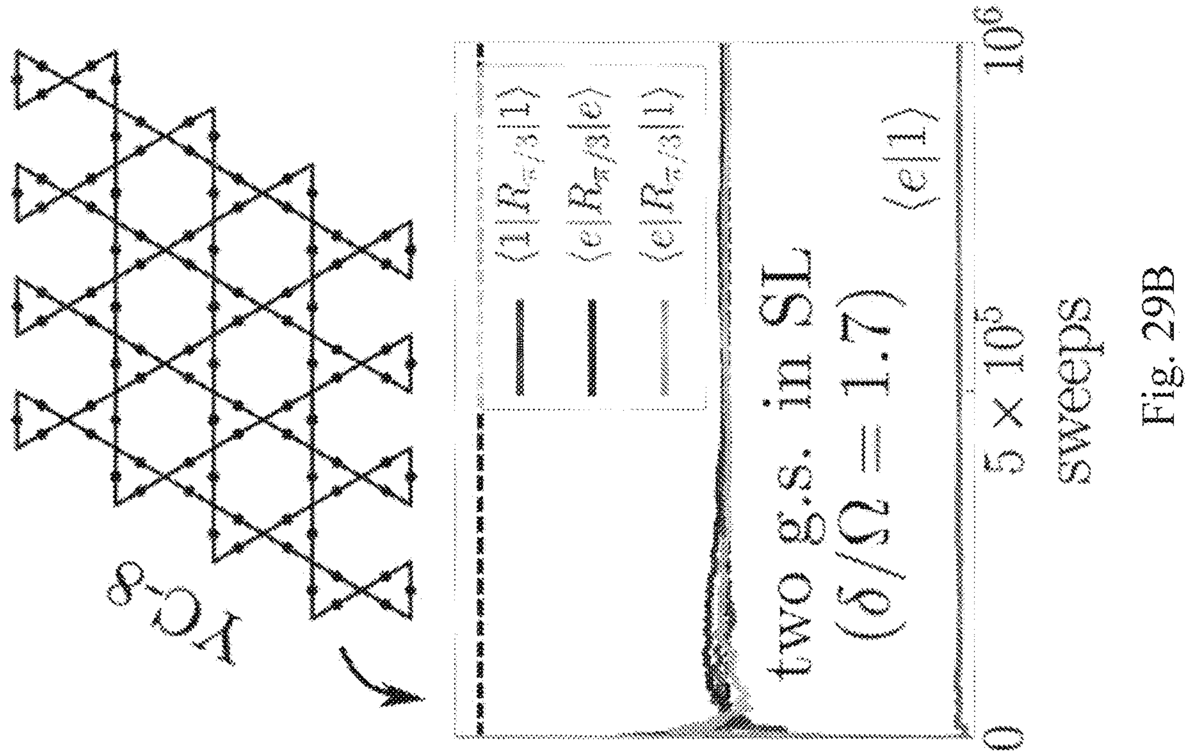

To make this concrete, we use the technique of making the resulting matrix product states (MPS) periodic along the second direction, one obtains wavefunctions on a torus geometry as shown in FIG. 29, which we denote by $|1\rangle$ and $|e\rangle$. It can be shown that a $\pi/3$-rotation mixes the topological ground states. Indeed, evaluating the overlap $\langle 1|R_{\pi/3}|1\rangle$ using quantum Monte Carlo, we see for the smaller torus (of 24 sites) in FIG. 29A that (i) the ground state of the trivial phase is completely symmetric, (ii) the ground state of the symmetry-broken phase gives a vanishing overlap with the rotated wavefunction, and (iii) the ground state in the presumed spin liquid gives a finite overlap, suggesting that it has overlap with a finite number of other states. In fact, its value is universal. In particular, the relevant 2×2-block of the modular matrix is $$\begin{pmatrix} \langle 1|R_{\pi/3}|1\rangle & \langle 1|R_{\pi/3}|e\rangle \\ \langle e|R_{\pi/3}|1\rangle & \langle e|R_{\pi/3}|e\rangle \end{pmatrix} = \frac{1}{2}\begin{pmatrix} 1 & 1 \\ 1 & 1 \end{pmatrix} \quad \text{Equation 7}$$

Whereas the value of $\langle 1|R_{\pi/3}|1\rangle$ for the smaller torus is slightly above ½ (see FIG. 29A), repeating it for a bigger torus with 96 sites (see FIG. 29B), we agree with the prediction Equation 7. For completeness, we also show $\langle 1|e\rangle$: while the two MPS are orthogonal on the infinitely-long cylinder, it is a priori not guaranteed that they should remain orthogonal when making the MPS periodic on the torus. Hence, the fact that we find a small value $\langle 1|e\rangle \approx 0.03$ confirms that the finite-size effects are rather small.

Another way of confirming that these two ground states correspond to the 1 and e anyon is by constructing the fixed-point wavefunctions, for which we find a large overlap. More precisely, we define $|1\rangle_{fix}$ as the state on the cylinder that corresponds to the superposition of all dimer configurations for which $\langle P\rangle_{loop}=\langle Q\rangle_{loop}=1$ around the circumference. The other three fixed-point wavefunctions $|e\rangle_{fix}$, $|m\rangle_{fix}$, $|f\rangle_{fix}$ are then obtained by respectively applying a Q, P and PQ string along the infinitely-long axis of the cylinder. We have confirmed that if we start from the fixed-point wavefunctions for $|1\rangle_{fix}$ and $|e\rangle_{fix}$ and perform imaginary time evolution, we converge toward the two ground states found by DMRG. This naturally gives us a way of also obtaining the ground states corresponding to the vison or magnetic particle m, and the fermion f. We have confirmed that the finite-size splitting of these four topological ground states decreases with circumference, plotted in FIG. 30 (for YC-4 and XC-8). Due to the inefficiency of imaginary time evolution compared to DMRG, we have not been able to prepare converged wavefunctions for $|m\rangle$ and $|f\rangle$ on YC-8, so we cannot consider their overlaps in FIG. 29.

Figure 31A:
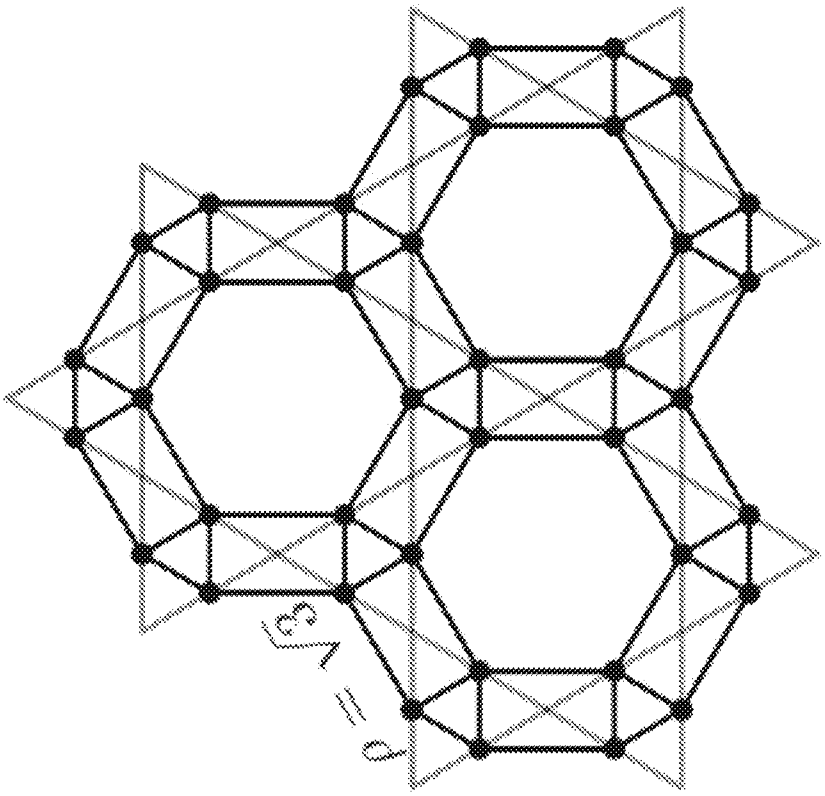
FIG. 31A-C illustrates a ruby lattice according to embodiments of the present disclosure.
Figure 31B:
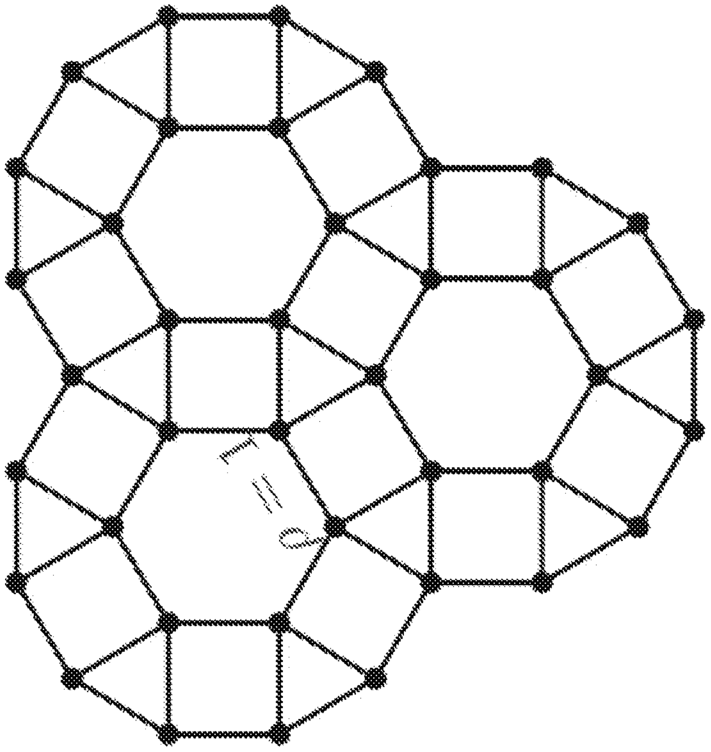

Referring to FIG. 31, the ruby lattice is illustrated. (a) Atoms on the links of the kagome lattice form the vertices of a ruby lattice where the rectangle has an aspect ratio $\rho=\sqrt{3}$. (b) The ruby lattice with $\rho=1$. (c) The ruby lattice with $\rho=3$. The colored disks show seven distinct interaction distances; the phase diagram in FIG. 32 is obtained by including $$V(r) = \Omega\left(\frac{R_b}{r}\right)^6$$

for 16 distinct distances, coupling each site to 44 other sites.

Figure 31C:
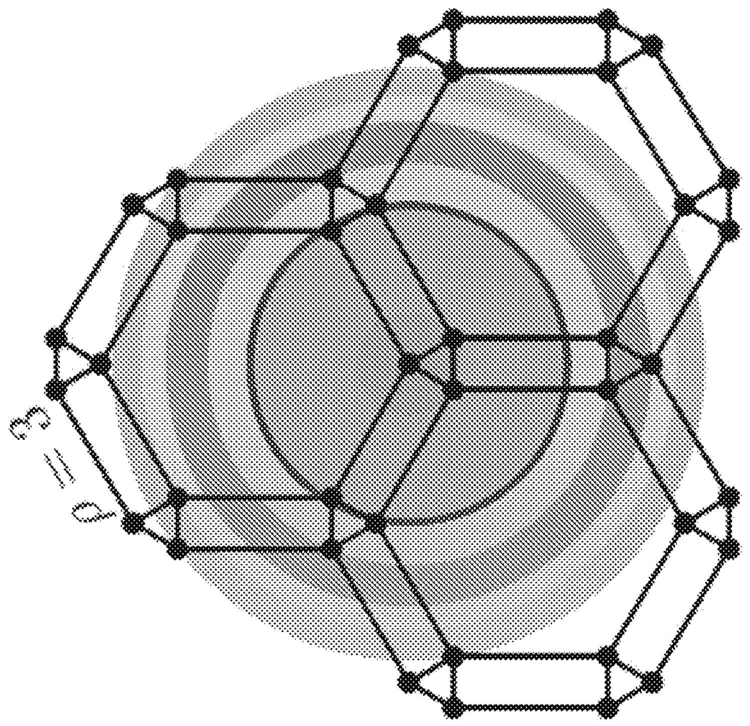
Figure 32:
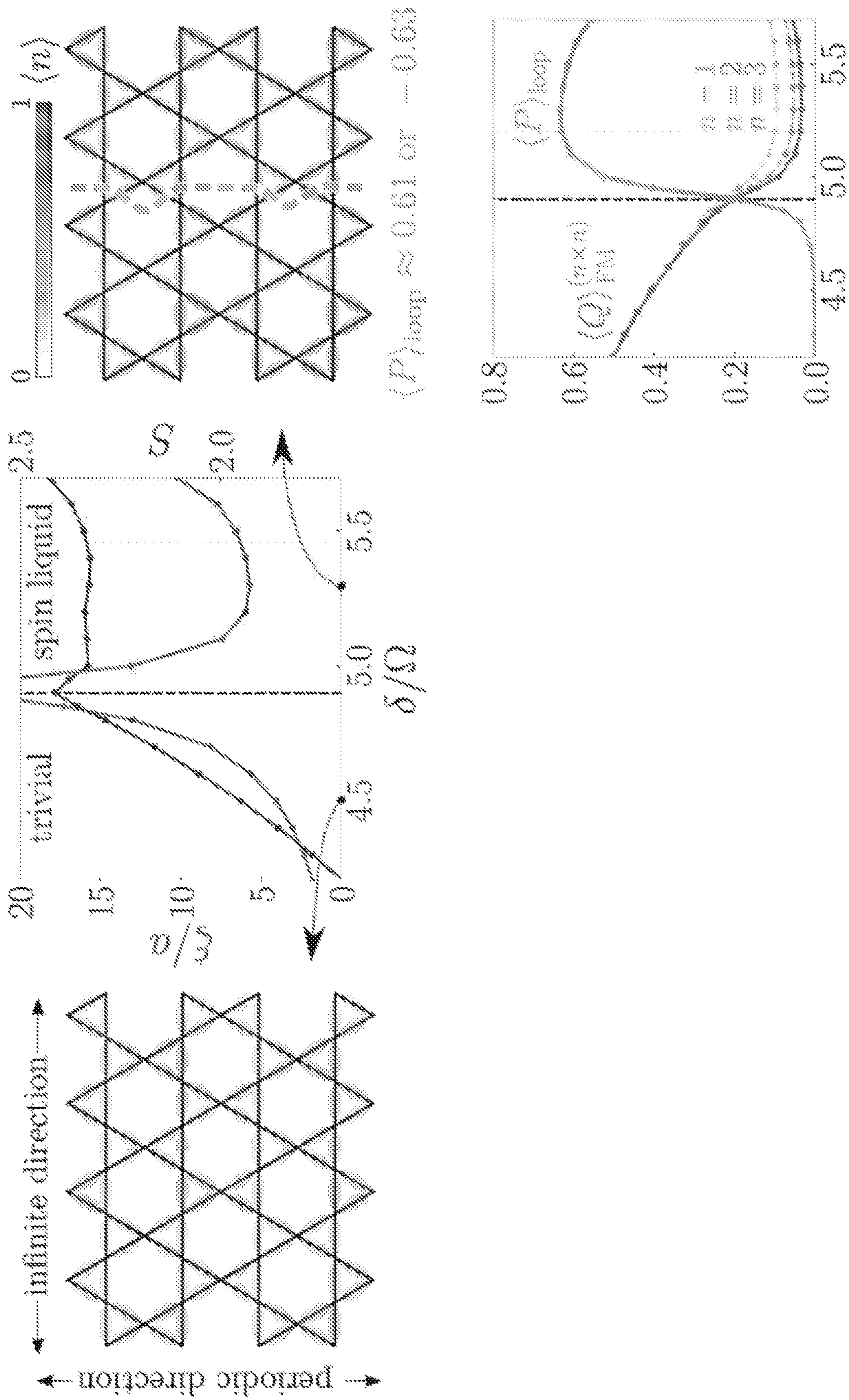
FIG. 32 illustrates a spin liquid on a ruby lattice according to embodiments of the present disclosure.

Referring to FIG. 32, a spin liquid on ruby lattice ($\rho=3$) with $V(r)\sim 1/r^6$. We consider the lattice in FIG. 31C for blockade radius $R_b=3.8a$, keeping all interactions within a radius $r\leq 9a$ on the XC-8 geometry. There is a phase transition between two featureless phases, the latter having a large entanglement plateau. The spin liquid is characterized by the simultaneous vanishing of the off-diagonal string operator (i.e., the trivial phase is an e-condensate) and emergence of a large signal for the parity loop around the circumference. The latter also labels two of the degenerate ground states, as annotated on the density plot. The fact that this approximates a dimer model is evidenced by, e.g., $\langle n\rangle \approx 0.249$ for $\delta/\Omega=5.3$. To emphasize the connection to a dimer model, we plot the density on the links of the kagome lattice (i.e., $\rho=\sqrt{3}$). The correlation length is also expressed for this kagome geometry (i.e., the length of a triangle of the kagome lattice is 2a).

A further characterization beyond topological order involves the implementation of symmetry, i.e., symmetry enrichment of topological order. This can be deduced from the relation to the kagome lattice dimer model, albeit in the absence of spin rotation symmetry (since monomers carry no spin). We expect the relevant projective symmetry group to be that of the bosonic mean field $Q_1=-Q_2$ state, which can be related to other mean field representations. The $Q_1=-Q_2$ state is equivalent to the [0Hex, 0Rhom], which is identified with the $Z_2[0, \pi]\beta$ fermionic state. A caveat is that lattice symmetry enrichment, which implies a background 'e' particle associated to each kagome site, can modify ground state overlap matrices for certain system sizes.

Prospects for Realization and Detection

We established that the Rydberg blockade model realizes a $\mathbb{Z}_2$ spin liquid for a range of parameters. The purpose of this section is twofold. First, we would like to show that this result is not limited to the blockade model in Equation 6: the spin liquid persists on adopting the realistic Rydberg potential. Second, we would like to have a way to diagnose the existence of the spin liquid using probes available in Rydberg experiments. In light of that, we discuss how the string operators can be measured in the lab.

Quantum Liquid for $\sim 1/r^6$ Potential and a Family of Ruby Lattices

We now consider the Rydberg Hamiltonian in Equation 5 with the algebraically-decaying potential $$V(r) = \Omega/\left(\frac{r}{R_b}\right)^6;$$

$R_b$ is commonly referred to as the (Rydberg) blockade radius due to sites well within this distance experiencing a large potential, effectively a blockade of the type discussed above. Since V(r) now explicitly depends on the distances between the atoms, it is important to discuss the geometry of the lattice. In the blockade model, we specified that the atoms live on the links of the kagome lattice (see FIG. 23A). These atoms form the vertices of the so-called ruby lattice, demonstrated in FIG. 31A. In this particular case, we see that the rectangles of the ruby lattice have an aspect ratio $\rho=\sqrt{3}$. However, $\rho$ is a free tuning parameter; as long as $$\rho > \frac{1}{\sqrt{2}} \approx 0.71,$$

the six sites nearest to a given site are the same set of points for which we defined the blockade in FIG. 23A. While only $\rho=1$ is an Archimedean lattice, the group of crystalline symmetries is the same for all $\rho$. If we thus choose $R_b$ to be large enough to enclose these six nearest sites (which are enclosed in a disk of radius $$\frac{r_3}{a}\sqrt{1+\rho^2}),$$

the resulting model approximates the blockade model. However, due to the $1/r^6$ interaction, we have additional longer-range couplings, and it is non-trivial to know whether or not the spin liquid will be stable to this. For this same reason, we will want to take $R_b$ smaller than the next interaction radius, i.e., as a rough guideline for where to search for the spin liquid:

$$\sqrt{1+\rho^2} < \frac{R_b}{a} < \min\left\{\sqrt{3}\rho, \sqrt{1+\sqrt{3}\rho+\rho^2}\right\} \qquad \text{Equation 8}$$

Figure 33:
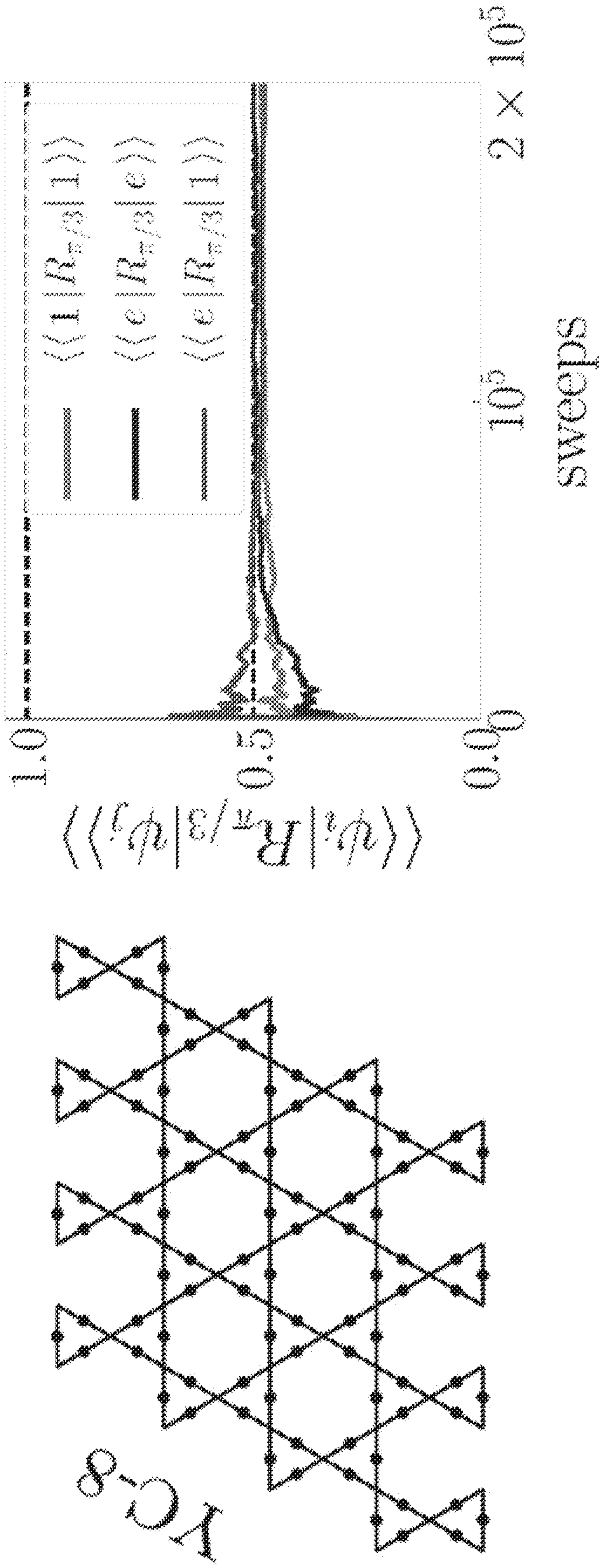
FIG. 33 illustrates modular transformations on a ruby lattice according to embodiments of the present disclosure.

For concreteness, we consider the ruby lattice with $\rho=3$, depicted in FIG. 31C. The rule of thumb in Equation 8 suggests that we should look for the spin liquid in the range of $3.2<R_b/a<3.9$. We indeed find a spin liquid for the choice $R_b$=3.8a as shown in FIG. 32 for the XC-8 geometry. There are at least four independent indicators of the spin liquid: (i) we observe a phase transition between two featureless states of matter. We find that the latter is characterized by a large entanglement plateau, and its density is close to that of an ideal dimer state: for instance, at $\delta \approx 5.3\Omega$, where the correlation length is minimal, we find $\langle n \rangle \approx 0.249$. (ii) Similar to the blockade model, the latter phase has a topological degeneracy: as shown in FIG. 32, DMRG finds degenerate ground states with opposite signs for the parity loop around the circumference. (iii) The FM order parameter for the Q string decays upon increasing the string length, signaling that we have exited the trivial (Higgs) phase (whereas absence of VBS order shows that we have not entered the confined phase). More precisely, we show $$\langle Q \rangle_{FM}^{(n \times n)}$$

where n×n counts the number of hexagons enclosed: see FIG. 28 for a sketch of n=2. (iv) We have also obtained $|1\rangle$ and $|e\rangle$ ground states on the YC-8 geometry. By putting these on a torus and properly orthogonalizing the resulting wavefunctions, we can calculate their overlaps after a $\pi/3$ rotation. As shown in FIG. 33, these agree with the universal value ½ predicted by the S and T matrices of $\mathbb{Z}_2$ topological order.

To numerically simulate the model with long-range interactions, we truncate $$V(r) = \Omega\left(\frac{R_b}{r}\right)^6$$

to zero beyond a distance $r > R_{trunc}$. The data for the XC-8 cylinder in FIG. 32 and the YC-8 cylinder in FIG. 33 is obtained for $R_{trunc}$=9a, which means that each site is coupled to 44 other sites. We have moreover confirmed that the results are stable upon changing the interaction cutoff $R_{trunc}$, which was explicitly checked for $R_{trunc}$=8a, 9.5a, 10a. As a note of caution, let us mention that if $R_{trunc}$ is small, the physics can depend on it. E.g., if only neighboring triangles are coupled (for ρ=3 this corresponds to $R_{trunc}=(3+\sqrt{3})a$, indicated by the dark blue disk in FIG. 31C), we indeed find a spin liquid phase with $R_b$=3.8a as above. However, upon including one further interaction radius, the spin liquid is destabilized. This result can be understood intuitively by noting that this additional coupling punishes hexagon flipping resonances which are essential for a spin liquid. Including yet more interactions again induces a spin liquid, eventually in a stable way as mentioned above. Note that since an XC-4 cylinder only has a circumference $L_{circ}=(\sqrt{3}+3\rho)a \approx 10.7a$, one should not compare entanglement entropies between XC-8 and XC-4 since we must always ensure that $R_{trunc} \le L_{circ}/2$. This explains why-unlike for the blockade model-we did not discuss topological entanglement entropy for this long-range interacting model.

The above establishes our main goal of showing the presence of a $\mathbb{Z}_2$ spin liquid for a model with Van der Waals interactions. Note that the model has multiple tuning parameters that could further stabilize this topological phase: the lattice aspect ratio ρ, the Rydberg blockade radius $R_b$ and the detuning $$\frac{\delta}{\Omega}.$$

It would be interesting to use this freedom to find the global minimum of the correlation length in the spin liquid phase. We leave such an exhaustive search through this three-parameter phase diagram to future work. For the case of the ruby lattice with $\rho=\sqrt{3}$ (corresponding to atoms living on the links of the kagome lattice), we find a spin liquid for $R_b \approx 2.4a$ upon including the first four interaction distances. However, we see indications that further-range interactions tend to destabilize the spin liquid at $\rho=\sqrt{3}$, unlike in the case reported with ρ=3. A detailed examination of the case $\rho=\sqrt{3}$ will appear in forthcoming work.

Referring to FIG. 33, modular transformations on ruby lattice (ρ=3) with $V(r) \sim 1/r^6$ are shown. For blockade radius $R_b$=3.8a and detuning $\delta/\Omega$=5.5, we consider two topologically distinct ground states on the YC-8 torus as shown. The overlaps after a $\pi/3$-rotation agree with the universal value predicted for a $\mathbb{Z}_2$ spin liquid. (As in FIG. 32, the simulation faithfully represents V(r) within a distance $r \le 9a$.)

Let us also briefly note that while our numerical results are for the cylinder geometry, an experimental realization would of course have open boundary conditions. The main difference is that then there are no topologically non-trivial loops (i.e., all loops are contractible) and correspondingly the ground state is unique. Nevertheless, a topological ground state degeneracy can be recovered by either puncturing the system, or by considering mixed boundary conditions. Both mechanisms are explained in detail below, where we also consider numerical results for the strip geometry.

Measuring an Off-Diagonal String by Transforming it into a Diagonal String

We introduced the two topological string operators associated to the $\mathbb{Z}_2$ lattice gauge theory. These can be very useful for identifying the spin liquid and its nearby phases (see FIG. 28). Fortunately, the parity string P can be straightforwardly measured in the lab since it is diagonal in the occupation basis and can be read off from the snapshots of the Rydberg states. The off-diagonal string Q is more challenging to measure directly. We now show that by time-evolving with a quenched Rydberg Hamiltonian, it becomes a diagonal observable, making it experimentally accessible. Aside from its practical significance, this result is also conceptually valuable since it gives a concrete duality transformation between the two strings. Due to the local constraint, such a duality is rather non-trivial.

Figure 34A:
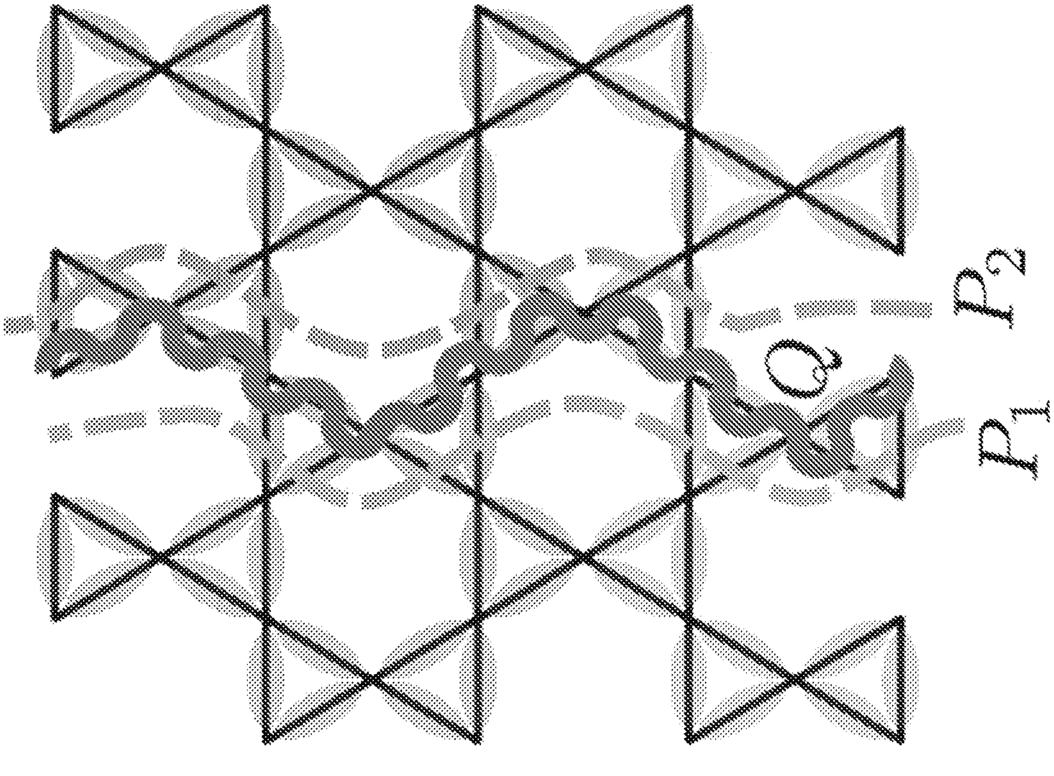
FIG. 34A-B illustrates measuring the off-diagonal string operator through a quench protocol according to embodiments of the present disclosure.
Figure 34B:
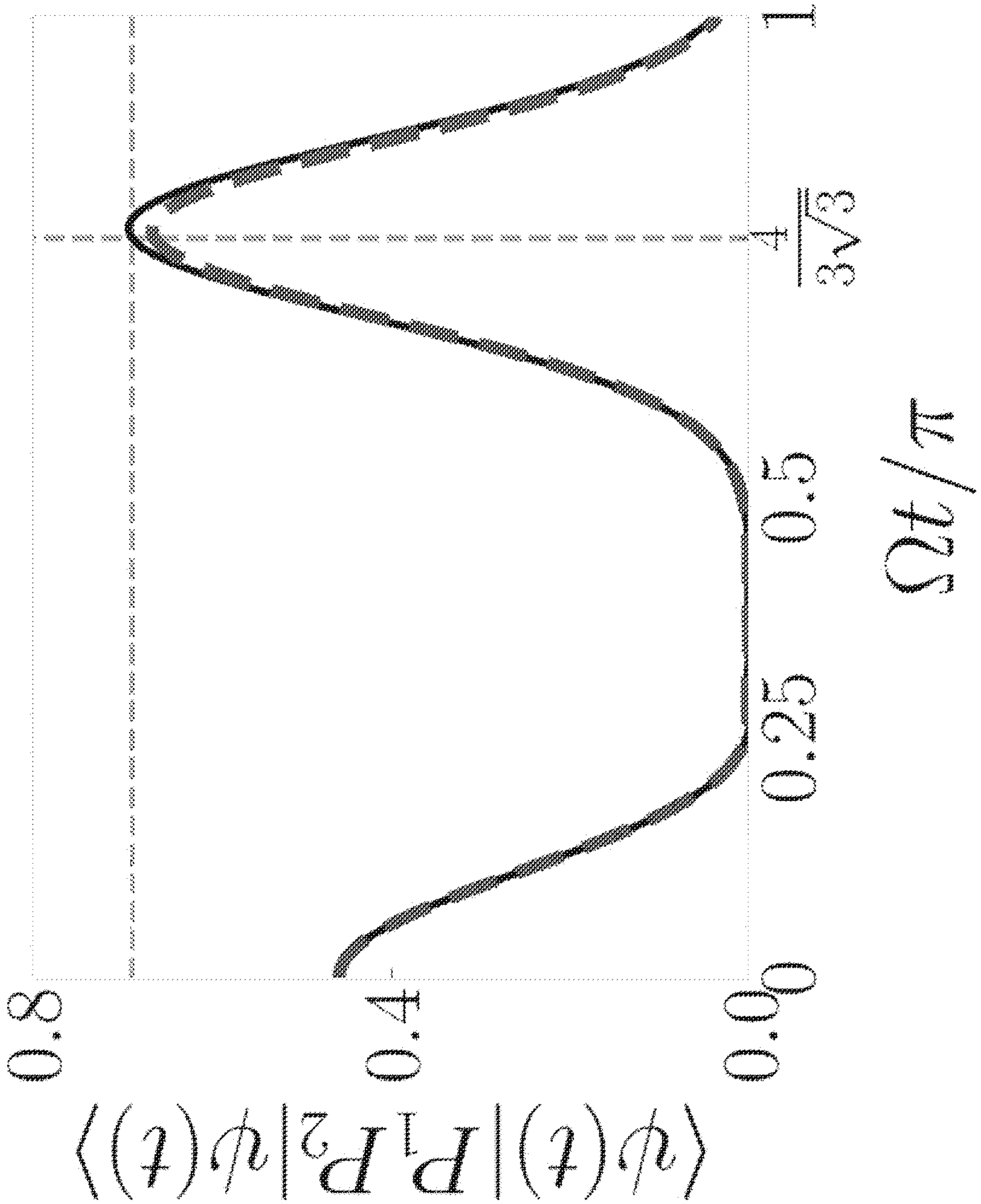

Referring to FIG. 34, measuring the off-diagonal string operator through a quench protocol is illustrated. (a) The vertical direction is periodic on the cylinder. The off-diagonal string Q (blue wiggly line) can be obtained by measuring the diagonal string $P_1P_2$ (orange dashed lines) after a time-evolution with a nearest-neighbor Rydberg blockade Hamiltonian to time $\Omega t = 4\pi/3\sqrt{3}$ (see Equation 10). (b) Starting from the spin liquid ground state of the Rydberg Hamiltonian with $R_b$=3.8a and $\delta/\Omega$=5.3 on a ruby lattice with aspect ratio ρ=3 (see FIG. 32), we measure $\langle P_1P_2 \rangle$ after time-evolving with either the nearest-neighbor Rydberg blockade model (solid black line) or the ground state Hamiltonian quenched to $R_b$=2 (red dashed line). The horizontal gray dashed line denotes the ground state value for (Q).

To implement this rotation, we consider the Rydberg Hamiltonian at zero detuning with a complex phase factor in the Rabi oscillation. This can be engineered by combining the original Hamiltonian with an appropriately-timed evolution where the detuning is dominant, i.e., using $e^{-i\alpha Y^2/2}\sigma^x e^{i\alpha\sigma^z/2} = \cos(\alpha)\sigma^x + i\sin(\alpha)\sigma^y$.

$$H' = \frac{\Omega}{2}\sum_i \left(iw^{i\alpha} b_i^\dagger + h.c.\right) + \frac{1}{2}\sum_{i,j} V(|i-j|)\ n_i n_j \qquad \text{Equation 9}$$

The essential idea is to consider the evolution under a Rydberg blockade localized on individual triangles of the ruby lattice, i.e., $V(r_1)=+\infty$ and $V(r)=0$ otherwise (see FIG. 23A for the definition of $r_1$).

Since the blockade now only acts within triangles of the ruby lattice, time-evolving with the above Hamiltonian amounts to an on-site unitary transformation. It is thus sufficient to consider a single triangle, and by writing the P and Q operators defined in FIG. 27A as 4×4-matrices acting on the Hilbert space of a single triangle, one derives:

$e^{iH't}$ () $e^{-iH't}$ =  for $\Omega t = \frac{4\pi}{3\sqrt{3}}$ Equation 10

Thus, one can effectively measure Q along a string by first time-evolving with H' and then measuring the P string on the resulting state.

If the aspect ratio ρ of the ruby lattice is not too close to unity, one can approximate this nearest-neighor blockade Hamiltonian by quenching $R_b$ in between the first two radii, i.e., $1<R_b/a<\rho$. For instance, we have confirmed that for $\rho=3$, a quench from $R_b=3.8a$ (where we found the spin liquid in FIG. 32) to $R_b=2a$ gives virtually indistinguishable results from time-evolving with the nearest-neighbor blockade (see FIG. 34). In either case, we confirm that the value of the diagonal correlator at $$\Omega t = \tau_{dual} := \frac{4\pi}{3\sqrt{3}} \approx 2.42$$

correctly reproduces the ground state expectation value for the off-diagonal string operator. Note that the Q-loop in FIG. 34 is dual to two parity strings. This is because it has triangles on both side of the string. Other loops with triangles on only one side-such as a loop around a hexagon-will be dual to a single parity string. In the experimental set-up, the blockade radius $R_b$ can be effectively tuned by changing Ω. In particular, since $$V(r) = \Omega\left(\frac{R_b}{r}\right)^6,$$

reducing $R_b$ from 3.8a to 2a (as in the above example) corresponds to changing Ω by a factor $$\left(\frac{3.8}{2}\right)^6 \approx 47.$$

While appreciable, this factor is achievable with current methods.

Figure 35:
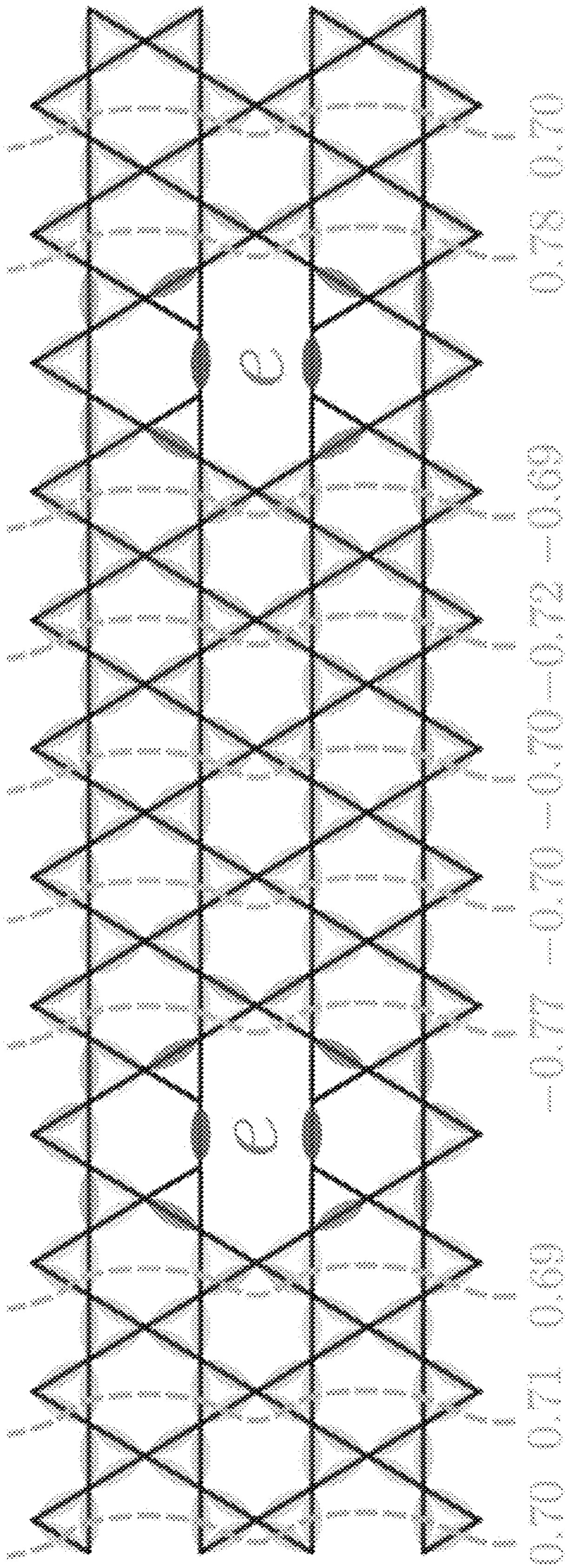
FIG. 35 illustrates a trapping potential for e-anyons according to embodiments of the present disclosure.
Figure 36A:
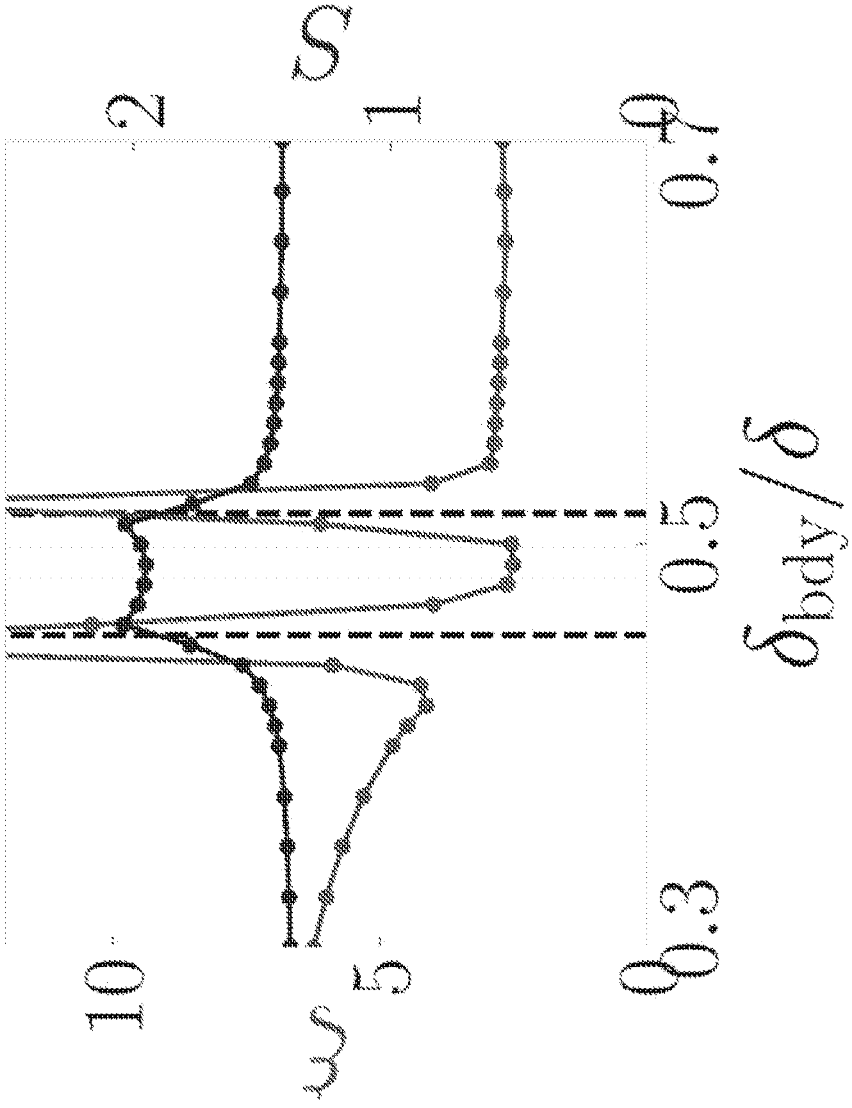
FIG. 36A-D is a boundary phase diagram of the blockade model according to embodiments of the present disclosure.
Figure 36B:
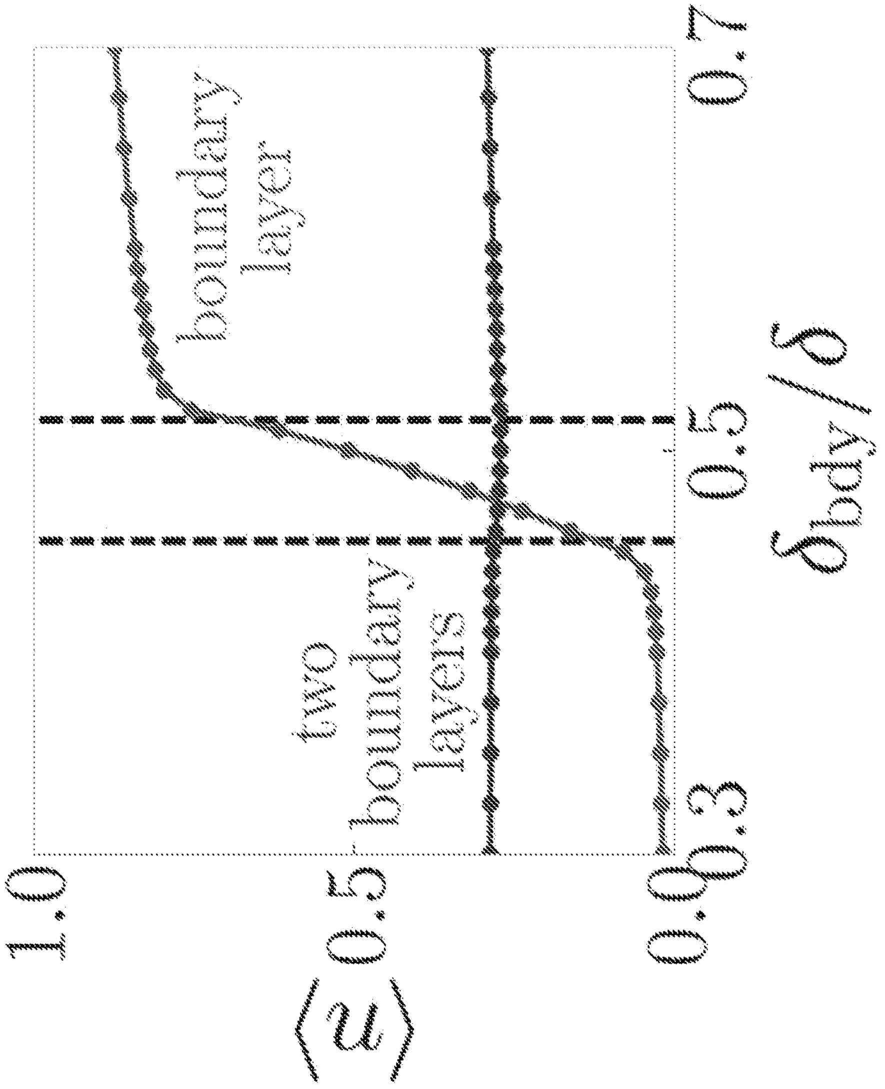
Figure 36C:
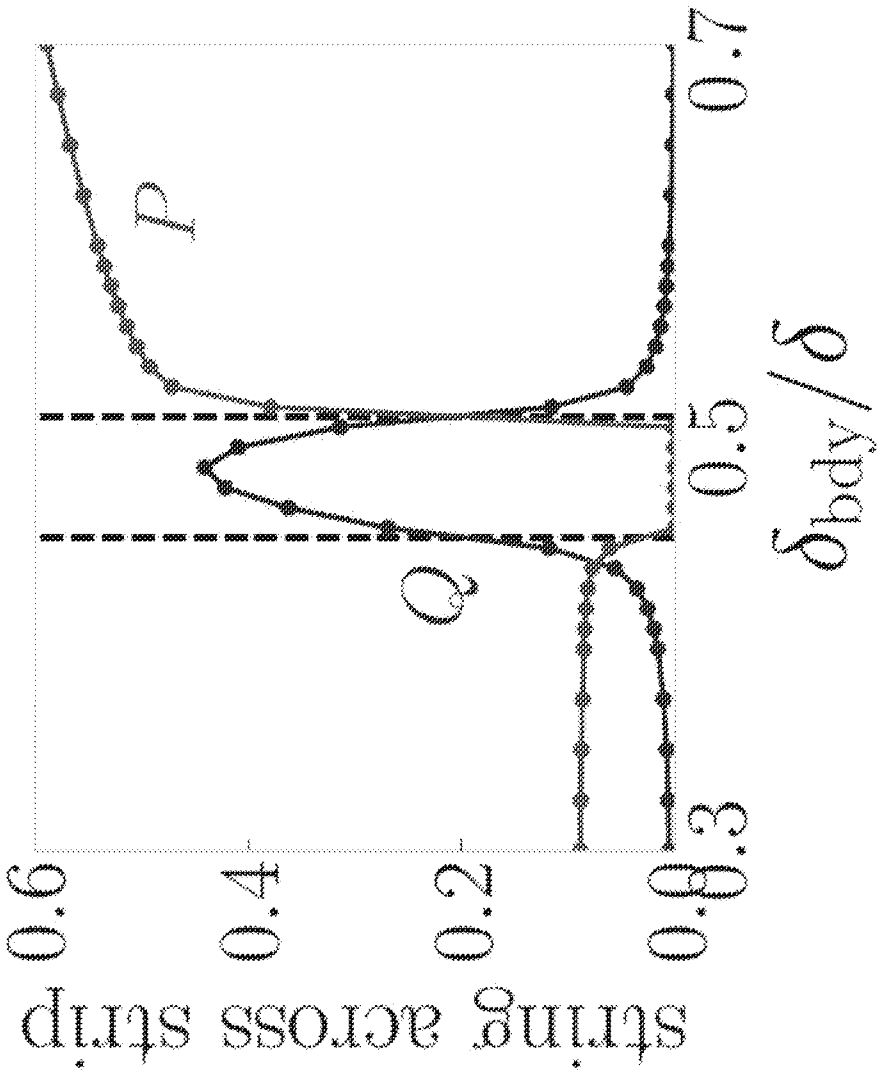
Figure 36D:
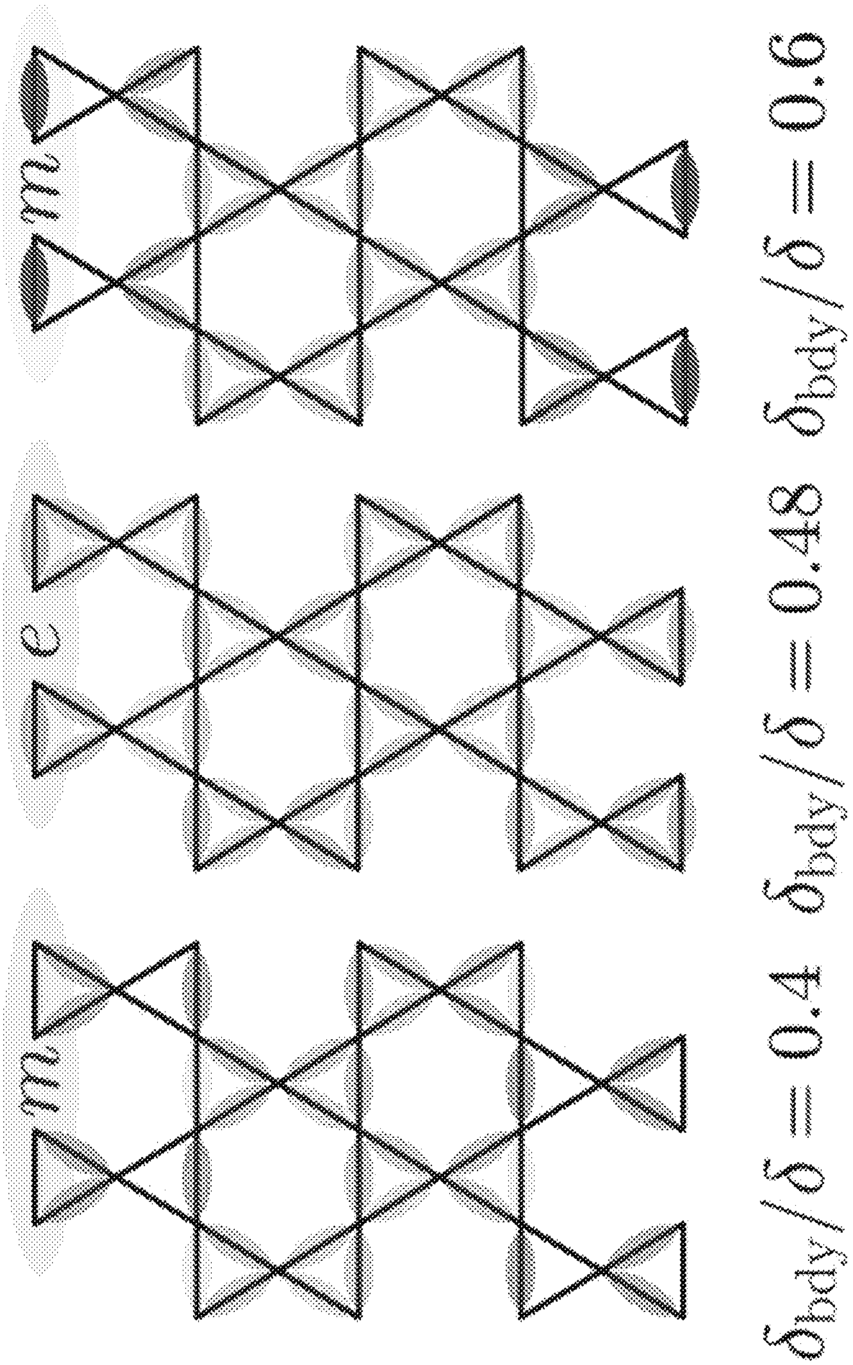

Referring to FIG. 35, a trapping potential for e-anyons is illustrated. The ground state (here on a cylinder) for a lattice where four sites around a vertex have been removed captures an e-anyon. This can be read off from the expectation value of the parity loops (dashed orange lines) around the circumference: if two neighboring loops have opposite sign, then a charge is enclosed.

Referring to FIG. 36, the boundary phase diagram of the blockade model is illustrated. We consider an infinitely long strip of the XC-8 geometry: the bulk is the spin liquid at $\delta/\Omega=1.7$, but we tune δ on the outermost boundary links. (a) The correlation length diverges at two boundary phase transitions; in the intermediate shaded regime, the entanglement is increased. (b) The small and large $\delta_{bdy}$ phases have a classical-like dimer filling at the boundary, whereas the intermediate regime has a compressible boundary. (c) By calculating the string operators from boundary-to-boundary, we diagnose the small and large (intermediate) $\delta_{bdy}$ phases as having m-condensed (e-condensed) boundaries. (d) Density plots (n) in the three boundary regimes. The strip is infinitely long (finite) in the horizontal (vertical) direction.

Towards Fault-Tolerant Quantum Memory

Part of the reason that topologically ordered phases of matter are of great interest is that they can serve as a means of potentially creating fault-tolerant quantum memories based on degenerate topological ground states. We have already encountered such degeneracies associated to a $\mathbb{Z}_2$ spin liquid above. However, this example utilized periodic boundary conditions, which is not natural in an experimental setting. Fortunately, topologically-distinct ground states can also arise for systems with boundaries. This can occur both for systems with punctures/holes (which one can interpret as a sort of boundary), as well as systems with mixed boundary conditions. Either of these options requires the knowledge of how to realize distinct topological boundary conditions. Another important ingredient is the trapping of anyons whose braiding implements gates on the quantum bits. We first analyze these two ingredients, after which we discuss what one can do with them.

Trapping an e-Anyon

If one wishes to braid with anyons, one has to be able to localize them to a particular region. Since the e-anyon in this model corresponds to a monomer, a natural way of trapping it is by forcing a certain vertex to have no dimer touching it. This can be done by either simply removing the atoms on these bonds, or by lowering the detuning δ. We numerically confirm that this works: FIG. 35 shows the result of removing two such vertices on XC-8 for the blockade model at $\delta/\Omega=1.7$. Since parity loops measure the charge enclosed in a given loop, the nonzero charge localized on these defects can be inferred from comparing the sign of the parity loops along the cylinder. In fact, we even see that the two e-anyons are connected by a gauge string where the parity loops are negative.

Note that the actual removal of atoms is not required: the same effect is obtained by locally setting the detuning $\delta \ll -|\Omega|$. By adiabatically changing the detuning, this anyon can potentially be moved around at will, allowing for control over an e-anyon. Similar approaches can potentially be explored to trap and control m-anyons as well. Even in the absence of such an m-anyon, the e-anyon can already be used for non-trivial braiding, as we will discuss below.

Boundary Phase Diagram

There are two topologically-distinct boundary conditions for a $\mathbb{Z}_2$ spin liquid. These are characterized by whether the e or m anyon condenses at the edge. It is no coincidence that the trivial and VBS phase are also described as condensates: if one interprets a boundary as a spatial interface from the topological phase to a non-topological phase, it is natural that the characterization of the nearby phases carries over to describe boundary conditions. Similarly, these e and m condensates along the boundary can be diagnosed using the string operators introduced herein. More precisely, m-boundaries (e-boundaries) have long-range order for the P-string (Q-string).

Simply terminating the lattice—keeping all the Hamiltonian terms that fit on the remaining geometry—will tend to stabilize the m-boundary. Indeed, since boundary dimers experience less repulsion, they will prefer to arrange in a classical pattern with few fluctuations, giving long-range order to the diagonal string operator P. To stabilize the e-boundary condition, we need to enhance such boundary fluctuations. One way of doing so is by changing the detuning δ along the boundary sites, searching for the sweet spot where the dimers are suspended between the two classical (empty or filled) configurations.

We numerically determine the resulting boundary phase diagram for the blockade model on an infinitely-long strip geometry, where we choose the bulk to be deep in the spin liquid at $\delta/\Omega=1.7$. The results are shown in FIG. 36. In line with the above expectation, we see that before we change the boundary detuning, i.e., $\delta_{bdy}=\delta$, the strip realizes an m-boundary as evidenced by the large response for the end-to-end parity string. As we reach $\delta_{bdy}\approx 0.5\delta$, there is a boundary phase transition (where the correlation length diverges along the infinite direction) after which the parity string dies out, making way for a strong signal for the Q string. In this regime, we stabilize the e-boundary. As we further decrease $\delta_{bdy}\rightarrow 0$, we are effectively removing these links from the model, with the remaining geometry again spontaneously realizing an m-boundary. This picture is also confirmed by the density plots and the $\langle n\rangle$ curve: it is only in the intermediate regime—corresponding to the e-boundary—that the edge dimers are fluctuating.

Topological Degeneracy on the Plane

Figure 37A:
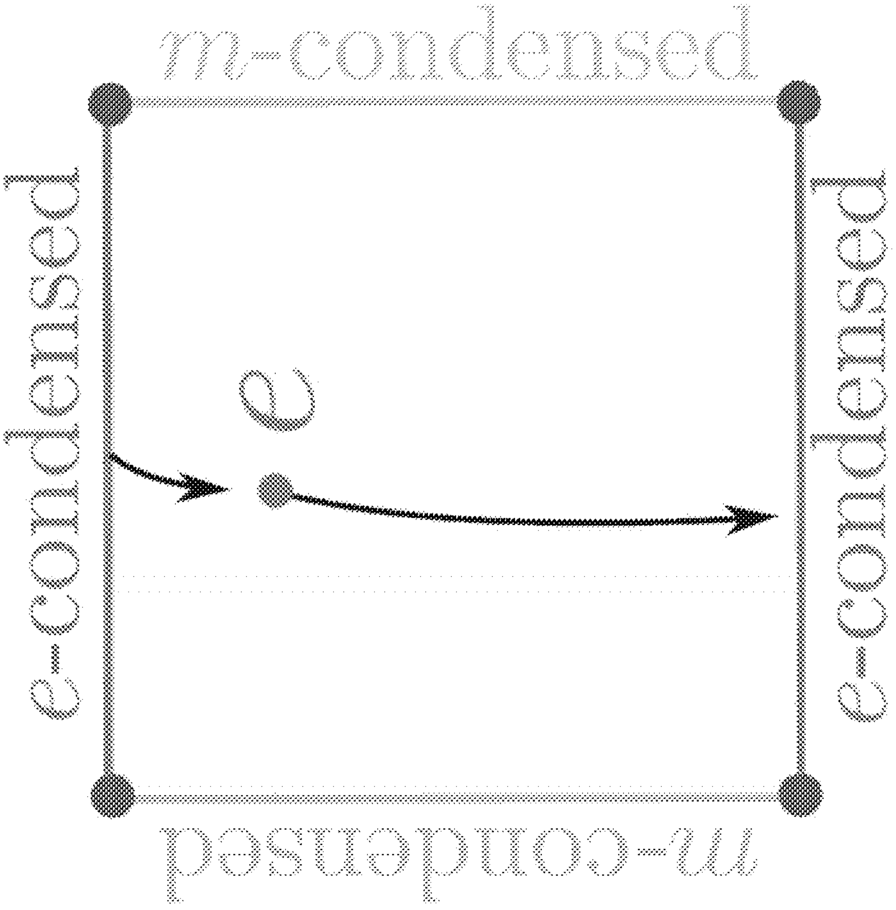
FIG. 37A-B illustrates topological degeneracy in planar geometry according to embodiments of the present disclosure.

With the knowledge of the above boundary phase diagram, it is now straightforward to construct a rectangular geometry with a topological ground state degeneracy. A schematic picture is shown in FIG. 37A: a square slab where the four boundaries are alternatingly e- and m-condensed. One way of understanding this twofold degeneracy is as follows: one can imagine extracting a single e-anyon from the top boundary (after all, it is an e-condensate), dragging it through the deconfined bulk, and depositing it at the bottom boundary. Similarly, one can do the same for an m-anyon from left to right. Due to the mutual statistics of e and m, these two processes anti-commute, implying a degeneracy.

Referring to FIG. 37, topological degeneracy in planar geometry is illustrated. (a) Alternating e- and m-condensed boundaries imply a twofold degeneracy. One way of understanding this is in terms of the Majorana zero modes (red dots) that live at the points where the boundary condition changes; due to the global emergent fermion parity having to be unity, these four Majorana modes only give rise to a twofold degeneracy. If we label states using the P-string connecting the left and right boundaries, then pulling an e-anyon out of one e-condensed boundary to another effectively toggles the states in this two-level system. (b) An annulus geometry with m-condensed boundaries also has a twofold degeneracy. Moving the e-anyon around the hole will toggle the states. Since e-anyons can only be created in pairs, there will be another e-anyon which we do not move (not shown).

Let us now address how to physically label this two-level system, or equivalently, how to read out a given state. If the spin liquid was in a fixed-point limit—similar to the toric code—then the topological string operators P and Q would be exact symmetries of the model. I.e., the logical $$\sigma^z_{logic}(\sigma^x_{logic})$$

operator could then be identified with any P-(Q-) string connecting the m-condensed (e-condensed) boundaries. However, our system is not at a fixed-point limit, such that acting with these P and Q string operators need not stay with this subspace; relatedly, we cannot label our system in terms of eigenstates of P or Q. Fortunately, using the idea of the FM order parameter encountered in FIG. 27, we can define properly-normalized expectation values as shown in FIG. 64.

Figure 64:
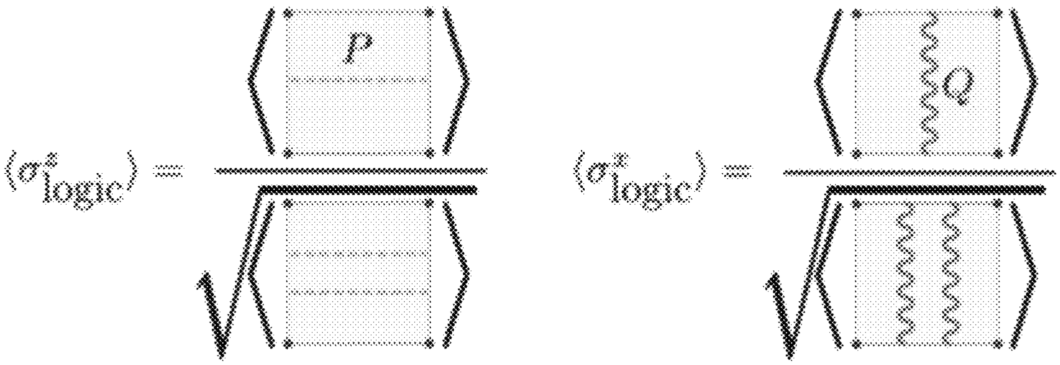
FIG. 64 shows the idea of the FM order parameter encountered in FIG. 27, with defined properly-normalized expectation values according to embodiments of the present disclosure; also referred to as Equation 11.

It is worth pointing out that unlike the numerators in Equation 11 (as shown in FIG. 64), the denominators do not depend on the logical state of the system and hence they only need to be determined once for any particular architecture. To see this, remember that the degeneracy could be interpreted as being a consequence of moving m- or e-anyons between the corresponding condensed boundaries, but these commute with pairs of topological string operators.

Figure 38:
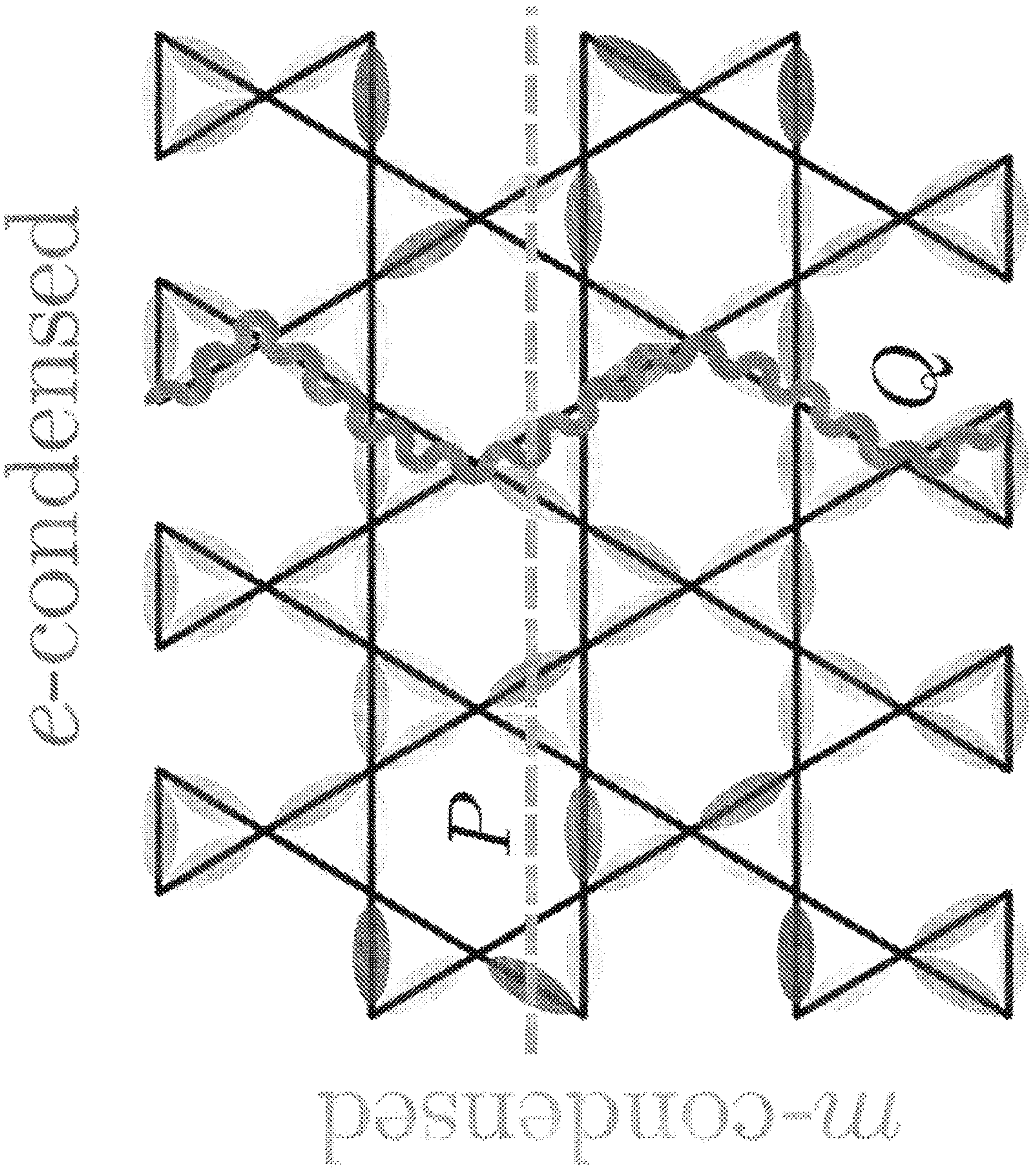
FIG. 38 illustrates the read-out of a topological ground state according to embodiments of the present disclosure.

Referring to FIG. 38, the read-out of a topological ground state is illustrated. We consider the blockade model for $\delta/\Omega=1.7$ on a finite sample with open boundaries, as shown. Moreover, we change the laser detuning on the top and bottom boundary to $\delta_{bdy}=0.488$. From the boundary phase diagram in FIG. 36, we know that this realizes the e-condensed boundary, whereas the left and right boundaries are m-condensates. For the ground state of this system, we show the values for the two types of topological string operators which connect their corresponding condensates. Upon using the FM normalization (see Equation 11—see FIG. 64), the read-out for the logical variables gives a state that lies along the x-axis of the Bloch sphere. Note that both string operators can be experimentally measured using the prescription provided herein.

To illustrate that this procedure is meaningful and well-defined, let us consider a simulated example, as shown in FIG. 38. The top and bottom boundaries were tuned to be e-condensed using the boundary phase diagram in FIG. 36, setting $\delta_{bdy}=0.488$. First, we observe that $\langle Q\rangle\neq 0$ when it connects the top and bottom boundaries; this is consistent with these being e-condensed. Moreover, we see that $\langle P\rangle\approx 0$ from left-to-right. This suggests that this state lies entirely along the logical-x axis (in the Bloch sphere picture). To confirm that $\langle P\rangle\approx 0$ is not due to an error in the boundary conditions (after all, the same result would arise for a parity string connecting two e-condensed boundaries), we confirm that for two parallel parity strings connecting the two m-condensed boundaries, we obtain the nonzero response $|\langle P_1P_2\rangle|\approx 0.46$. As an additional sanity check, we confirmed that this same double-parity-string gives a zero response when running from top-to-bottom. Finally, using the FM-prescription in Equation 11 (FIG. 64), we obtain that the logical state indeed lies along the x-axis:

$$\langle\sigma^x_{logic}\rangle\approx 1.$$

We thus have a way of labeling and reading out our topological quantum state. Let us now consider the question of initialization. We work with the logical basis {|0⟩, |1ℤ}, defined by $$\langle n|\sigma^z_{logic}|n\rangle = (-1)^n.$$

Figure 65:
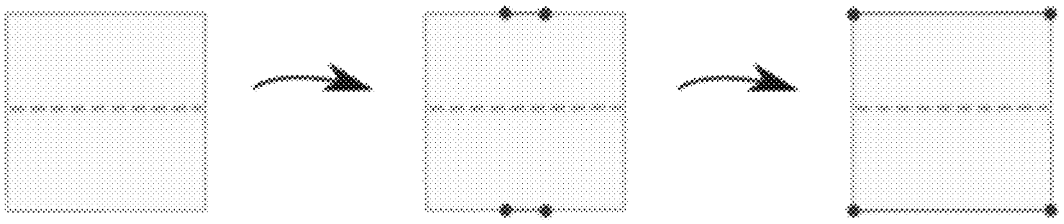
FIG. 65 shows a sequence used to create $|0\rangle$ by starting with a sample which only has an m-condensed boundary—such that the parity string is a fixed positive value—and then adiabatically create an e-condensed boundary according to embodiments of the present disclosure; also referred to as Equation 12.

We can create |0⟩ by starting with a sample which only has an m-condensed boundary—such that the parity string is a fixed positive value—and then adiabatically create an e-condensed boundary as shown in FIG. 65.

In the above sequence, we also show the parity string whose value will not change throughout this process, such that we arrive at |0⟩. To initialize into |1ℤ, we can now use the fact that we know how to pin an e-anyon. We can thus dynamically change the detuning to pull an e-anyon out the top e-condensed boundary and move it into the bottom e-condensed boundary, as sketched in FIG. 37A. This implements the logical $$\sigma^x_{logic}$$

gate, mapping |0⟩→|1⟩.

Figure 37B:
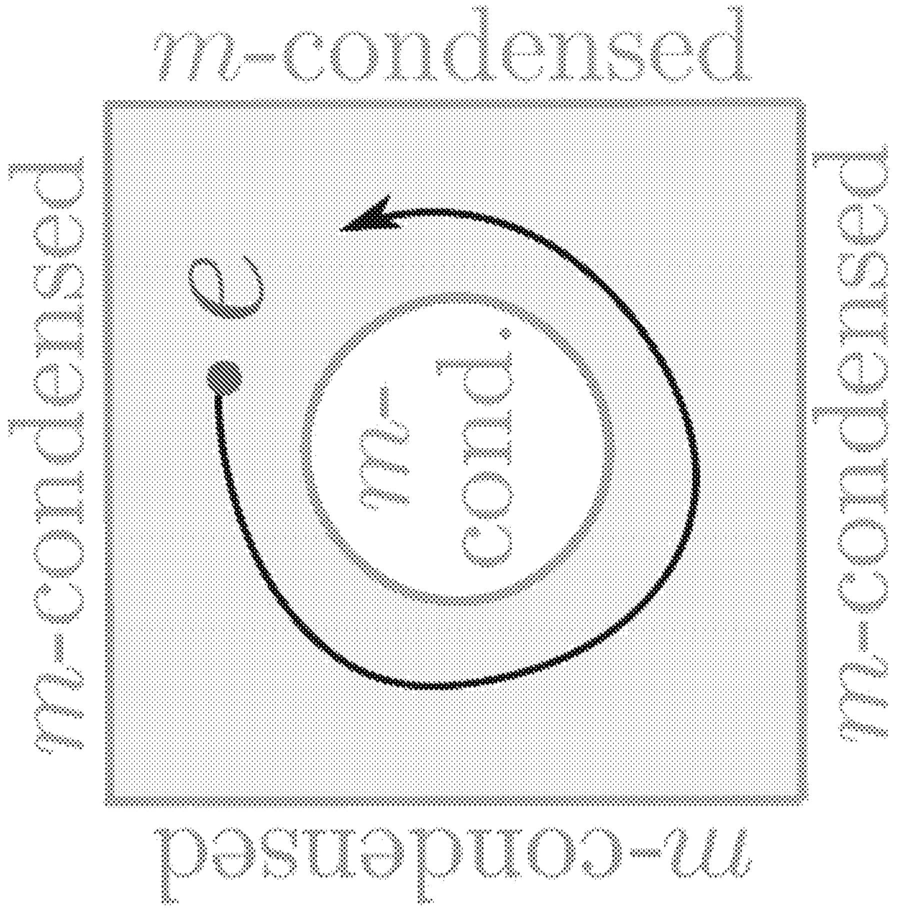

One can repeat the above steps for the alternative architecture of an annulus, shown in FIG. 37B. In particular, in this case the logical state is toggled by braiding the e-anyon around the m-condensed hole. More generally, one can create multiple e- and m-condensed holes in a given sample. Braiding these (by dynamically changing the parameters of the Hamiltonian) potentially gives another handle on topological processing of quantum information.

Outlook

We have demonstrated that Rydberg blockade on the ruby lattice can be utilized to stabilize a $\mathbb{Z}_2$ spin liquid. The underlying mechanism is that of a monomer-dimer model where single-site monomer fluctuations induce the dimer resonances necessary for a resonating valence bond state. This same picture also leads to a specific form of the two topological string operators. The spin liquid-stable to longer-range V(r)~1/r$^6$ interactions—can be characterized by these string observables in experiment where they are measurable by appealing to a dynamic protocol. Moreover, we showed that this system could be used to explore topological quantum memories by localizing anyons, realizing conjugate boundary conditions which create degeneracy on the plane, and reading out quantum states. We note that given the detailed differences between our platform and the exact toric code model, these implementations required new insights. While the robustness of these techniques in the presence of realistic imperfections (such as, e.g., spontaneous emission) will need to be carefully explored, it is important to emphasize that the atom array platform offers fundamentally new tools for probing and manipulating topological quantum matter.

Specifically, the theoretical predictions outlined above can be probed using programmable quantum simulators based on neutral atom arrays. In particular, the required atom arrangements can be realized using demonstrated atom sorting techniques, while relevant effective blockade range can be readily implemented using laser excitation into Rydberg states with large principal quantum number 60<n<100. Note that in designing the appropriate atom arrays, careful choice of atomic separations and Rydberg states should be made to avoid molecular resonances that could modify the blockade constraint. The spin liquid phase can be created via adiabatic sweep of laser detuning, starting from the disordered phase to a desired value of positive detuning, as demonstrated previously for one-dimensional and two-dimensional systems. For typical parameters, corresponding to effective Rabi frequencies in the range of few MHz, such adiabatic sweeps can be carried out with minimal decoherence in systems potentially exceeding 200 atoms. We note that the topologically ordered state is separated from the trivial product state by a single continuous transition which is favorable for preparation. A number of tools can be deployed to identify and study the transition into spin liquid state that lacks local order parameter. While the transition point can be identified by measuring filling fraction (see FIG. 25), much more detailed investigations can be carried out by measuring the expectation value of parity operators (FIG. 28) associated with various loops. Remarkably, both P and Q operators can be efficiently measured, by either directly analysing the signal shot images or carrying out this analysis following qubit rotation in the dimer basis associated with individual triangles. The latter can be realized using resonant atomic driving with appropriately chosen parameters. Moreover, the topological entanglement entropy can be potentially obtained by measuring the second Renyi entropy for different regions. Together with control over boundaries and exploration of samples with non-trivial topology, these methods constitute a unique opportunity for detailed explorations of spin liquid states with accuracy and sophistication not accessible with any other existing approaches.

Furthermore, this work opens up a number of very intriguing avenues that can be explored in the framework introduced here. These range from exploration of non-equilibrium dynamical properties of spin liquid states in response to rapid changes of various Hamiltonian parameters, to experimental realization and detection of anyons with non-trivial statistics. In particular, anyon braiding can be explored by using time-varying local potentials. Moreover, approaches to improve the stability of TQL and realization of more exotic spin liquid states can potentially be realized by additional engineering of interaction potentials, using e.g. long-lived hyperfine atomic states. In particular, approaches involving optical lattice and Rydberg dressing could be explored to realize a broader variety of spin liquid states. Finally, we note that the blockade model is essentially an Ising model on the ruby lattice. Such models could be implemented in other ways, e.g., in arrays of superconducting qubits, magnets with strongly-anisotropic exchange, or perhaps even in recently developed two-dimensional materials. Potentially, these systems can be used for the realization of topologically-protected quantum bits, with an eye towards developing new, robust approaches to manipulating quantum information.

Numerical Details

In this work we consider two types of cylinders of the kagome lattice, called XC or YC. If one considers the kagome lattice as depicted in FIG. 24 then the XC cylinder has its infinite direction along the x-axis, whereas for the YC cylinder this is along the y-axis (and in both cases, the 'C' simply stands for 'cylinder'). As a consequence, we see that the finite periodic direction of the YC cylinder runs along of the bonds of the kagome lattice.

The DMRG simulations were performed using the open-access Tensor Network Python (TeNPy) package developed by Johannes Hauschild and Frank Pollmann, version 0.7.2.

Although DMRG is a method for one-dimensional systems, it can be used for cylinder geometries by snaking through the system (i.e., giving all sites a one-dimensional labeling). The cost one pays for this is that couplings which used to be nearby in the two-dimensional geometry will typically become further-range couplings in this effective one-dimensional labeling. To obtain the ground state, we start with a low bond dimension, say $\chi=100$ or $\chi=200$, and repeat DMRG for successively larger values of $\chi$ until physical observables were no longer found to change. For most plots in this work, $\chi=1000$ is sufficient, although in certain cases we have gone up to $\chi=2000$. As an additional sanity check that the bond dimension was chosen large enough to accurately encode the ground state physics, it is very useful to consider the density $\langle n \rangle$ on sites which are equivalent on the cylinder but not equivalent in the effective one-dimensional labeling: if $\chi$ is too low, their expectation values will typically not coincide; it is only when the ground state correctly converges to a ground state on the two-dimensional cylinder that the densities on such sites will coincide. This is thus a very powerful indicator of convergence.

For systems on an infinitely-long cylinder, we used a translation-invariant ansatz consisting of a certain number of rings. If this number is chosen too small to fit a particular VBS pattern, this issue shows up in an inability of DMRG to converge to a stable state (and sometimes it leads to a large norm error due to the tendency to form a cat state). In such cases, the number of independent rings was increased until the state converged. This is how we found the VBS phase in FIG. 24. Sometimes this VBS phase can get stuck in a local minimum: for instance, we also found ground states where the two pinwheels in FIG. 24 had opposite orientations. For this reason, we started in a variety of distinct initial states, and we found that the global minimum occurred for the VBS pattern shown in FIG. 24. When the phase was trivial or a spin liquid phase, we found that an ansatz of a single ring was sufficient to obtain a converged state (although we confirmed that the result was unchanged upon increasing the number of rings), except for the YC-6 geometry (for which the entanglement entropy appears in FIG. 26) which has a Lieb-Schultz-Mattis anomaly—there a two-ring ansatz was necessary, even in the trivial and spin liquid phases. Let us also mention that the correlation length $\xi$ is obtained via the standard MPS procedure: one diagonalizes the transfer matrix—if its largest eigenvalue is normalized to be unity, then the absolute value of its second largest eigenvalue is $e^{-1/\xi}$.

Figure 39:
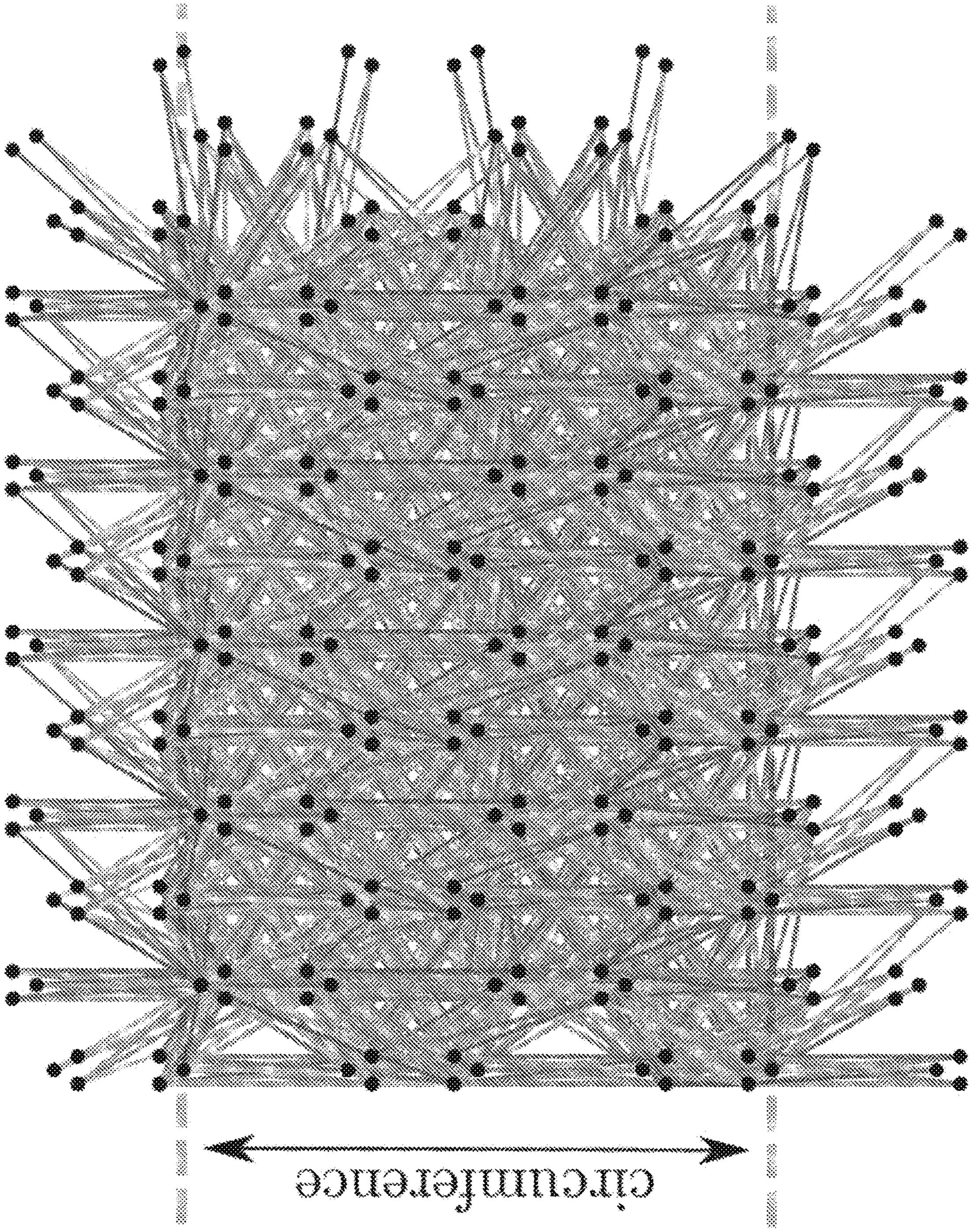
FIG. 39 is a connectivity graph for Van der Waals interactions on the ruby lattice according to embodiments of the present disclosure.

Referring to FIG. 39, a connectivity graph for Van der Waals interactions on the ruby lattice is provided. Black dots denote the ruby lattice with $\rho=3$ (also see FIG. 31C). Each line represents a coupling in $$V(r) = \Omega\left(\frac{R_b}{r}\right)^6$$

that is included in the numerics for the phase diagram in FIG. 32. The gray dashed lines denote how this is wrapped into an XC-8 cylinder; any site of the ruby lattice outside this region can be identified with a site inside this region. The cylinder is infinitely-long in the horizontal direction.

We considered a model on the ruby lattice with long-range Van der Waals interactions. In particular, for the ruby lattice with $\rho=3$ and blockade radius $R_b=3.8a$, the data in FIGS. 32 and 33 was obtained for $$V(r) = \Omega\left(\frac{R_b}{r}\right)^6$$

for $r \le 9a$ and $V(r)=0$ for $r>9a$. Its connectivity graph is shown in FIG. 39 for the XC-8 geometry.

Scaling of Fredenhagen-Marcu Order Parameter

Figure 40A:
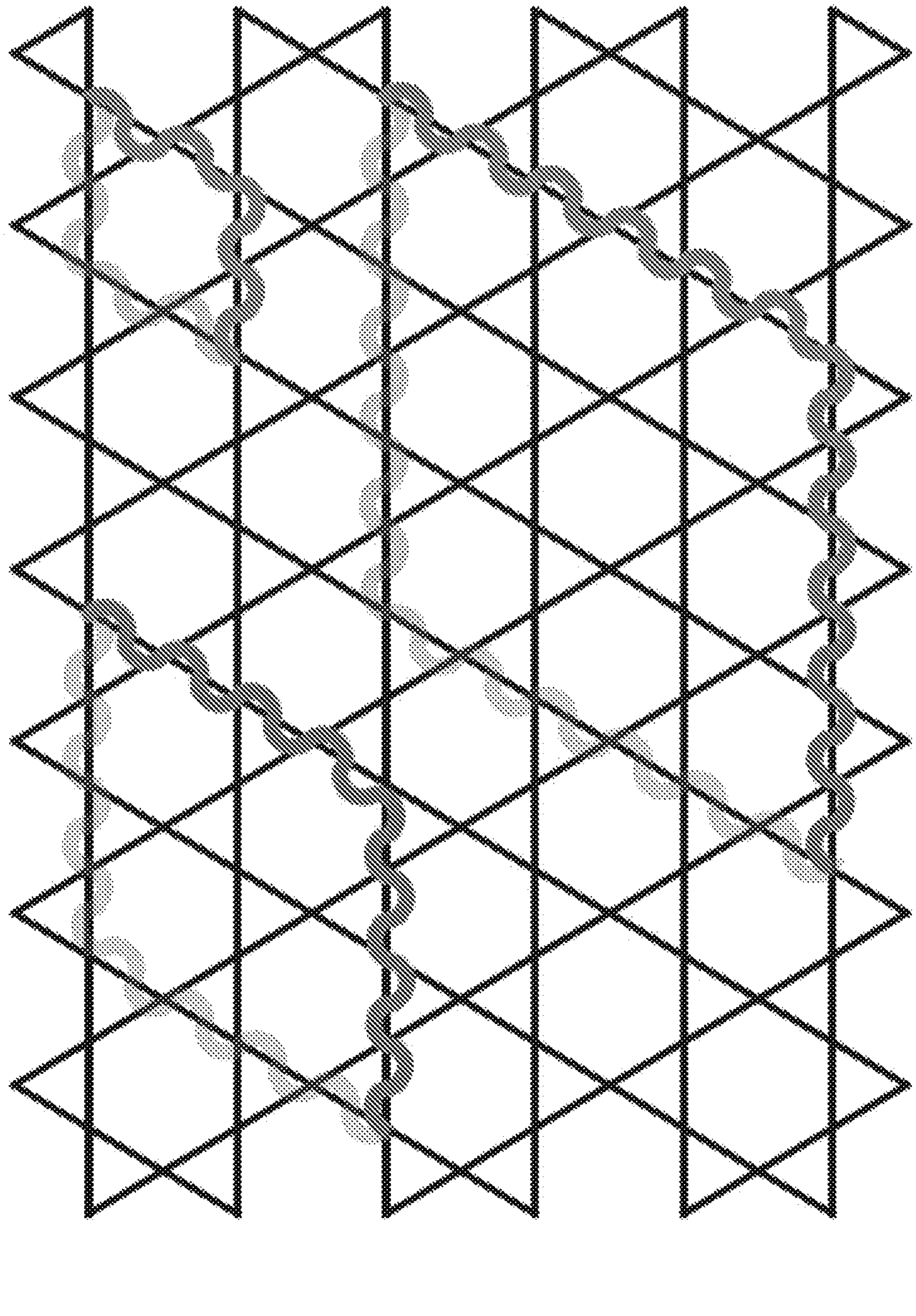
FIG. 40A-B illustrates the FM string order parameter in the blockade model according to embodiments of the present disclosure.

In FIG. 28, we show the FM string order parameters $$\langle Q\rangle_{FM}^{(n\times n)} \text{ and } \langle P\rangle_{FM}^{(n\times n)}$$

for n=2 (sketches of the string geometry are also shown in that figure). The plot suggests that these strings decay to zero in the intermediate phase, consistent with this being the deconfined phase. To confirm this claim, here we go deep in the spin liquid, $\delta/\Omega=1.7$, and scale the FM string order parameters with their length n. For clarity, we sketch the strings that define $$\langle Q\rangle_{FM}^{(n\times n)}$$

in FIG. 40A for n=1,2,3. The values for n=1,2,3,4,5 (for both types of strings) are shown in panel FIG. 40B which was obtained on the XC-12 geometry with bond dimension $\chi=1400$: we see that these values decay to zero exponentially with the length of the string, as expected in the deconfined phase.

Referring to FIG. 40, the FM string order parameter in the blockade model is illustrated. (a) The lattice shown is the XC-12 cylinder (periodic along vertical direction, infinite along horizontal direction). The blue lines denote the Q-strings defining the FM order parameter $$\langle Q\rangle_{FM}^{(n\times n)} (n = 1, 2, 3),$$

which is normalized by the square root of the closed string (see FIG. 27C for the general definition). (b) Values for the FM order parameters in the blockade model on XC-12 deep in the spin liquid, $\delta/\Omega=1.7$. Both strings decay to zero exponentially with the length of the string, a property that is unique to the deconfined phase.

Figure 40B:
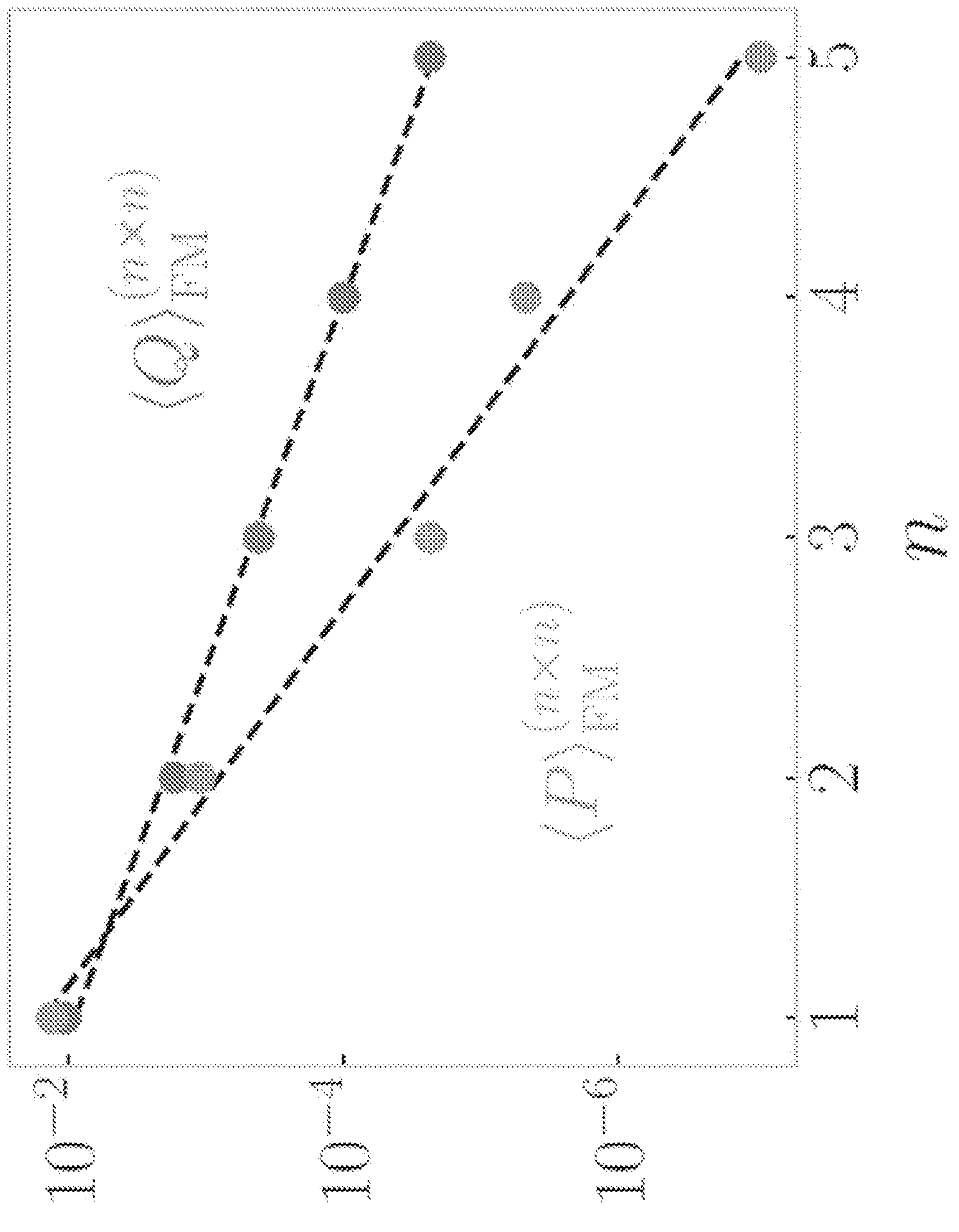
Figure 41A:
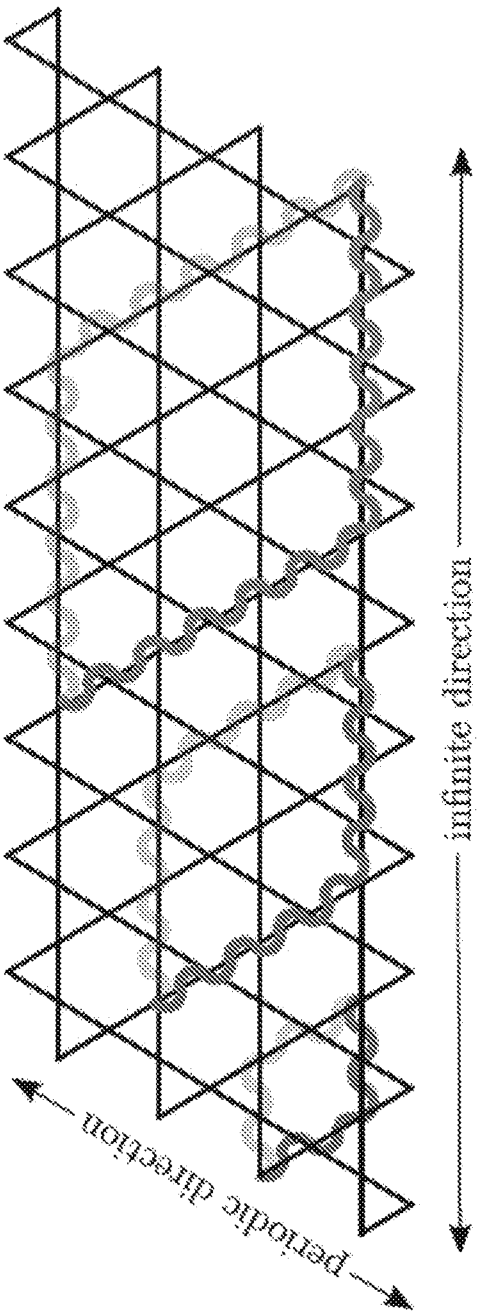
FIG. 41A-B illustrates the FM string order parameter according to embodiments of the present disclosure.
Figure 41B:
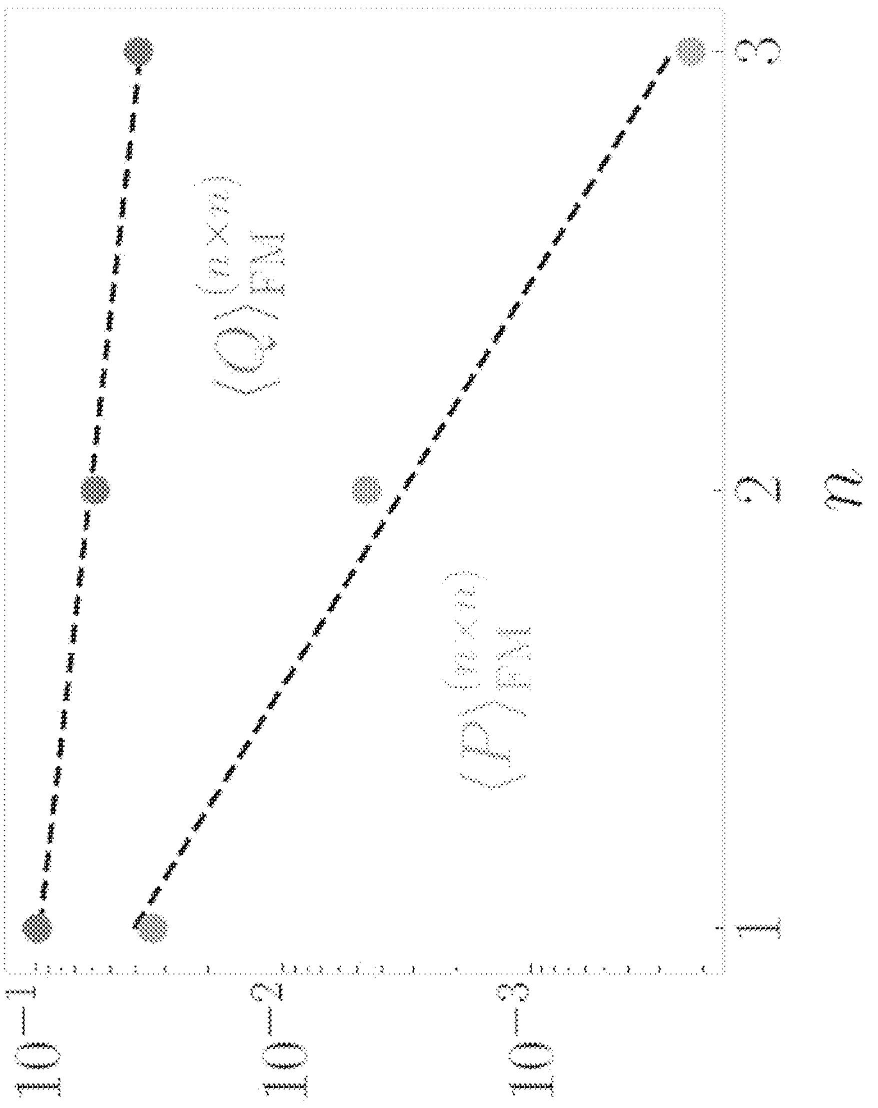

For the spin liquid in the model with $V(r)\sim 1/r^6$ interactions, we cannot go up to XC-12 cylinders. We are thus limited in repeating the same analysis, but for completeness, we present the results on the largest cylinder accessible in this case: YC-8, shown in FIG. 41A. Although FIG. 41B only presents results for three distinct FM string sizes, the qualitative behavior is consistent with that of a spin liquid, and is similar to what we observed in FIG. 40B. Indeed, both the P and Q-FM strings decay as a function of string length, with the former decaying faster. To give a more quantitative comparison, let us note that the dashed lines in FIG. 40B give exp $(-a\times n)$ with $a\approx 1.5$ for Q and $a\approx 2.9$ for P, whereas in FIG. 41B we obtained $a\approx 0.5$ for Q and $a\approx 2.5$ for P. Hence, the results for P-strings are similar, whereas the decay of the Q-string is three times steeper in the blockade model. This is consistent with the phase diagrams in FIG. 24 and FIG. 32, where we observed the blockade model is closer to a fixed-point model (i.e., it has a smaller correlation length).

Referring to FIG. 41, the FM string order parameter in the $V(r)\sim 1/r^6$ model is illustrated. Similar to FIG. 40, except: (a)

we work on the YC-8 cylinder; (b) the DMRG results for the FM order parameters are now for the ruby lattice model, in particular: the blockade radius is $R_b$=3.8a, the detuning δ/Ω=5.5, and we faithfully represent $$V(r) = \Omega\left(\frac{R_b}{r}\right)^6$$

within a distance r≤9a.

Topological Ground States on the Torus

Ground states on a torus geometry can be approximated by first using DMRG to obtain the ground state on an infinitely-long cylinder and then simply evaluating the resulting matrix product state wavefunction on the torus (by identifying the appropriate virtual indices). This may moreover be used to construct minimally entangled states (MES) on the torus: more precisely. The topologically distinct ground states found by DMRG on an infinitely-long cylinder are naturally MES, and if finite-size effects are small, this gives MES on the torus.

However, this need not be true if finite-size effects are strong enough to induce virtual anyon loops that wind around the torus. For concreteness, let us denote the direction along the circumference of cylinder as 'vertical' and the infinite direction along the cylinder axis as 'horizontal'. Upon putting this wavefunction on a torus (i.e., the horizontal direction is made finite and periodic), then virtual anyonic fluctuations could wind around the horizontal direction and connect distinct topological sectors. This mean that the resulting state is no longer a MES.

To make this more precise, it is useful to characterize MES as states which are eigenstates of the topological line operators along the vertical direction. Let us denote $P_{ver}$ and $Q_{ver}$ as the loop operators around this vertical direction; similarly, $P_{hor}$ and $Q_{hor}$ denote loops around the finite horizontal direction of the torus. We would like to obtain the MES$|\mathbf{1}\rangle\rangle$ and $|e\rangle\rangle$ which are characterized (in the idealized case) by eigenvalues $Q_{vert}$=+1 and $P_{vert}$=±1; this also means that while they are not eigenstates of the horizontal loops, they would have a vanishing expectation value, e.g., $\langle\langle 1|Q_{hor}|1\rangle\rangle$=0 (since $P_{vert}Q_{hor}=-Q_{hor}P_{vert}$). If we denote the states obtained from placing the cylinder ground states (with the same vertical loop observables) on the torus geometry as $|1\rangle$ and $|e\rangle$, then these do not automatically coincide with the aforementioned $|1\rangle\rangle$ and $|e\rangle\rangle$ states: finite-size fluctuations can induce a nonzero value for the horizontal strings, e.g., $\langle 1|Q_{hor}|\mathbf{1}\rangle\neq 0$. In the context of the present work, the dominant fluctuations are in the e-anyons (see also FIG. 40B). Indeed, phenomenologically we find that $\langle P_{hor}\rangle\approx 0$ for our torus ground states, both for the blockade and Van der Waals model. The fluctuations that induce $\langle Q_{hor}\rangle\neq 0$ are closely linked to $\langle 1|e\rangle\neq 0$: indeed, the $|1\rangle$ and $|e\rangle$ ground states are related by acting with a Q-string along the horizontal direction.

In the blockade model, we find that $\langle 1|e\rangle\approx 0$ (see FIG. 29), such that to a good approximation, $|1\rangle\rangle\approx|1\rangle$ and $|e\rangle\rangle\approx|e\rangle$. However, for the models with Van der Waals interactions, we find $\langle 1|e\rangle\approx 0.4$ on the YC-8 torus of the ruby lattice with ρ=3, blockade radius $R_b$=3.8a and detuning δ/Ω=5.5. In this case, we thus need to work some more to obtain a good approximation for $|\mathbf{1}\rangle\rangle$ and $|e\rangle\rangle$. Indeed, since Q-loops are more strongly fluctuating, it is better to consider the superpositions $|1\rangle\pm|e\rangle$. On the infinitely-long cylinder, these are eigenstates of $Q_{hor}$ and $Q_{ver}$. Since fluctuations in P-loops are found to be negligible, an accurate identification on the torus is $$\frac{|1\rangle\rangle\pm|e\rangle\rangle}{\sqrt{2}}\approx\frac{|1\rangle\pm|e\rangle}{\sqrt{2}Z_\pm}.$$

There is a proportionality factor $Z_\pm$ since $$\frac{|1\rangle\pm|e\rangle}{\sqrt{2}}$$

are not properly normalized: their norm is $$\frac{\langle 1|1\rangle+\langle e|e\rangle}{2}\pm\langle 1|e\rangle\approx 1\pm\langle 1|e\rangle$$

where we used the realness condition of the wavefunction), i.e., $Z_\pm=\sqrt{1\pm\langle 1|e\rangle}$.

In conclusion, we have:

$$\begin{aligned}|1\rangle\rangle &= (\alpha_+ + \alpha_-)|1\rangle + (\alpha_+ - \alpha_-)|e\rangle\\ |e\rangle\rangle &= (\alpha_+ - \alpha_-)|1\rangle + (\alpha_+ + \alpha_-)|e\rangle\end{aligned}\quad\text{with } \alpha_\pm = \frac{1}{2\sqrt{1\pm\langle 1|e\rangle}}\qquad\text{Equation 11}$$

It is for these MES that we plot the overlaps after π/3-rotation in FIG. 33, finding excellent agreement with the prediction for $\mathbb{Z}_2$ topological order.

Duality Between Topological String Operators

Here we prove Equation 10. For this, let us first label the four basis states in a single triangle as follows:

Equation 12

$|0\rangle$ =  $|1\rangle$ =  $|2\rangle$ =  $|3\rangle$ = 

Then the P and Q string operators (defined in FIG. 27A) can be written as:

$Q$ =  $= \begin{pmatrix}0 & q & 0 & 0\\ q^* & 0 & 0 & 0\\ 0 & 0 & 0 & 1\\ 0 & 0 & 1 & 0\end{pmatrix}$ Equation 13 and $P$ =  $= \begin{pmatrix}1 & 0 & 0 & 0\\ 0 & 1 & 0 & 0\\ 0 & 0 & -1 & 0\\ 0 & 0 & 0 & -1\end{pmatrix}$ Equation 14 where we introduced $q=e^{-i\alpha}$.

The Hamiltonian defined in Equation 9 does not couple distinct triangles, so it is sufficient to prove the claim for a single triangle. Then Equation 9 becomes Equation 15

$H' =$

-continued $$\frac{\Omega}{2}\sum_{i\in\Delta}P\left(iq^{*}b_{i}^{\dagger}-iqb\right)P=\frac{i\Omega}{2}\begin{pmatrix}0&-q&-q&-q\\q^{*}&0&0&0\\q^{*}&0&0&0\\q^{*}&0&0&0\end{pmatrix}=\frac{\Omega}{2}\times VDV^{\dagger}$$

Equation 16

$$\text{where } D=\sqrt{3}\begin{pmatrix}1&0&0&0\\0&-1&0&0\\0&0&0&0\\0&0&0&0\end{pmatrix}\text{ and}$$

Equation 17

$$V=\frac{1}{\sqrt{6}}\begin{pmatrix}-iq\sqrt{3}&iq\sqrt{3}&0&0\\1&1&-2&0\\1&1&1&-\sqrt{3}\\1&1&1&\sqrt{3}\end{pmatrix}$$

The time-evolution operator is thus

Equation 18

$$t=\frac{2}{\Omega}\times\frac{2\pi}{3}\times\frac{1}{\sqrt{3}}\Rightarrow e^{-iH't}=$$

$$V\begin{pmatrix}e^{-2\pi i/3}&0&0&0\\0&e^{2\pi i/3}&0&0\\0&0&1&0\\0&0&0&1\end{pmatrix}V^{\dagger}=-\frac{1}{2}\begin{pmatrix}1&q&q&q\\-q^{*}&-1&1&1\\-q^{*}&1&-1&1\\-q^{*}&1&1&-1\end{pmatrix}$$

Equation 19

$$\text{Then } e^{iHt}\begin{pmatrix}1&0&0&0\\0&1&0&0\\0&0&-1&0\\0&0&0&-1\end{pmatrix}e^{-iHt}=\begin{pmatrix}0&q&0&0\\q^{*}&0&0&0\\0&0&0&1\\0&0&1&0\end{pmatrix}\ Q.E.D.$$

Example B: Probing Topological Spin Liquids on a Programmable Quantum Simulator Quantum spin liquids, exotic phases of matter with topological order, have been a major focus of explorations in physical science for the past several decades. Such phases feature long-range quantum entanglement that can potentially be exploited to realize robust quantum computation. We use a 219-atom programmable quantum simulator to probe quantum spin liquid states. In our approach, arrays of atoms are placed on the links of a kagome lattice and evolution under Rydberg blockade creates frustrated quantum states with no local order. The onset of a quantum spin liquid phase of the paradigmatic toric code type is detected by evaluating topological string operators that provide direct signatures of topological order and quantum correlations. Its properties are further revealed by using an atom array with nontrivial topology, representing a first step towards topological encoding. Our observations enable the controlled experimental exploration of topological quantum matter and protected quantum information processing.

Motivated by visionary theoretical work carried out over the past five decades, a broad search is currently underway to identify signatures of quantum spin liquids (QSL) in novel materials. Moreover, inspired by the intriguing predictions of quantum information theory, techniques to engineer such systems for topological protection of quantum information are being actively explored. Systems with frustration caused by the lattice geometry or long-range interactions constitute a promising avenue in the search for QSLs. In particular, such systems can be used to implement a class of so-called dimer models, which are among the most promising candidates to host quantum spin liquid states. However, realizing and probing such states is challenging since they are often surrounded by other competing phases. Moreover, in contrast to topological systems involving time-reversal symmetry breaking, such as in the fractional quantum Hall effect, these states cannot be easily probed via, e.g., quantized conductance or edge states. Instead, to diagnose spin liquid phases, it is essential to access nonlocal observables, such as topological string operators. While some indications of QSL phases in correlated materials have been previously reported, thus far, these exotic states of matter have evaded direct experimental detection.

Programmable quantum simulators are well suited for the controlled exploration of these strongly correlated quantum phases. In particular, recent work showed that various phases of quantum dimer models can be efficiently implemented using Rydberg atom arrays and that a dimer spin liquid state of the toric code type could be potentially created in a specific frustrated lattice. We note that toric code states have been dynamically created in small systems using quantum circuits. However, some of the key properties, such as topological robustness, are challenging to realize in such systems. Spin liquids have also been explored using quantum annealers, but the lack of coherence in these systems has precluded the observation of quantum features.

Figure 42A:
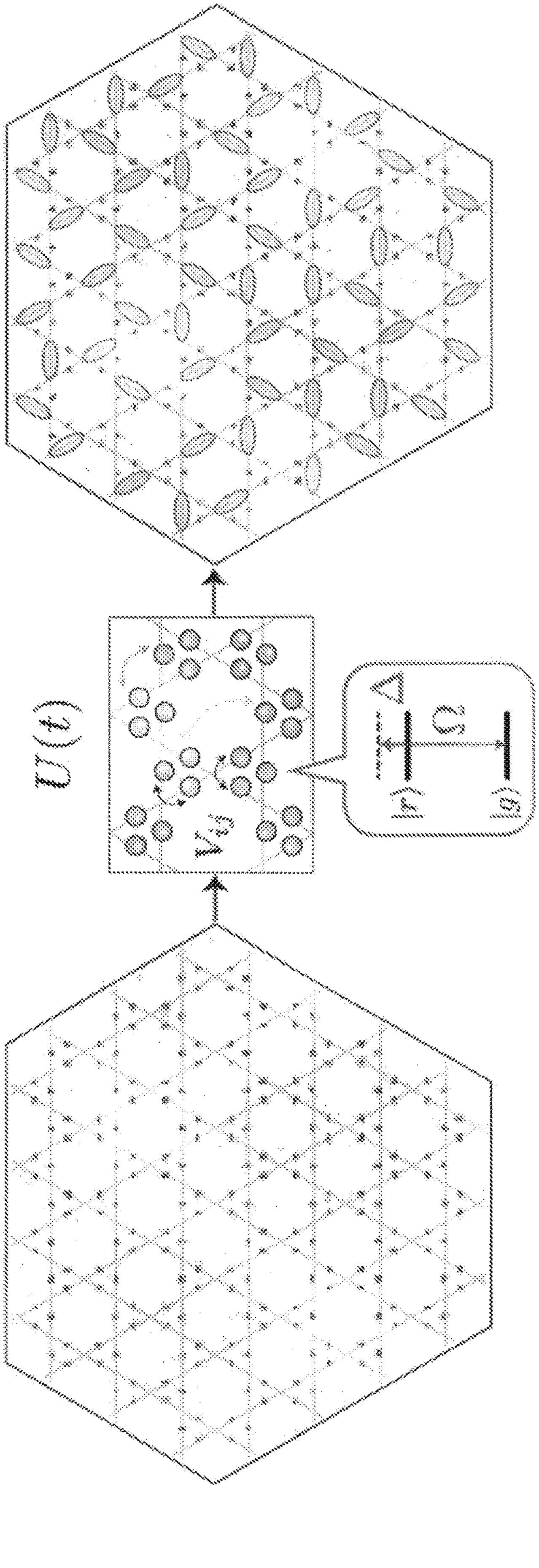
FIG. 42A-E illustrates the dimer model in Rydberg atoms arrays according to embodiments of the present disclosure.
Figure 42B:
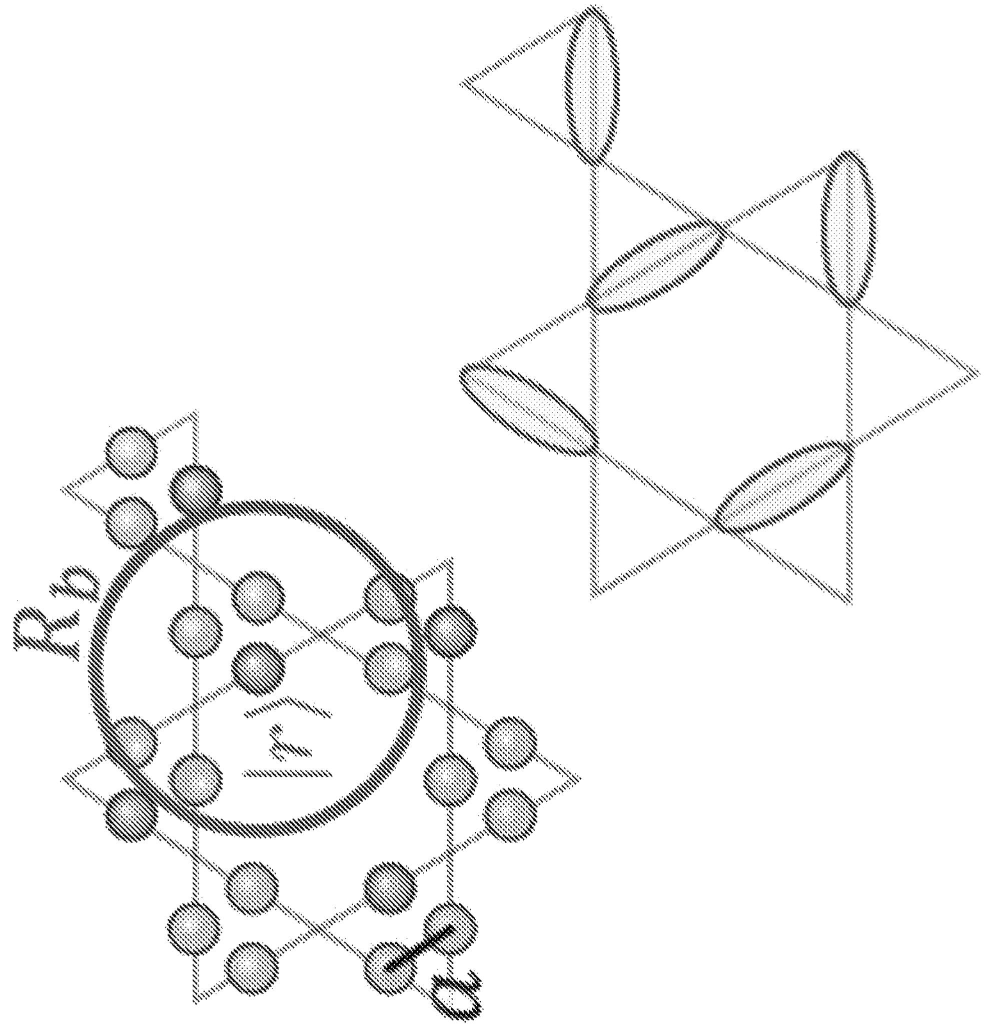
Figure 42C:
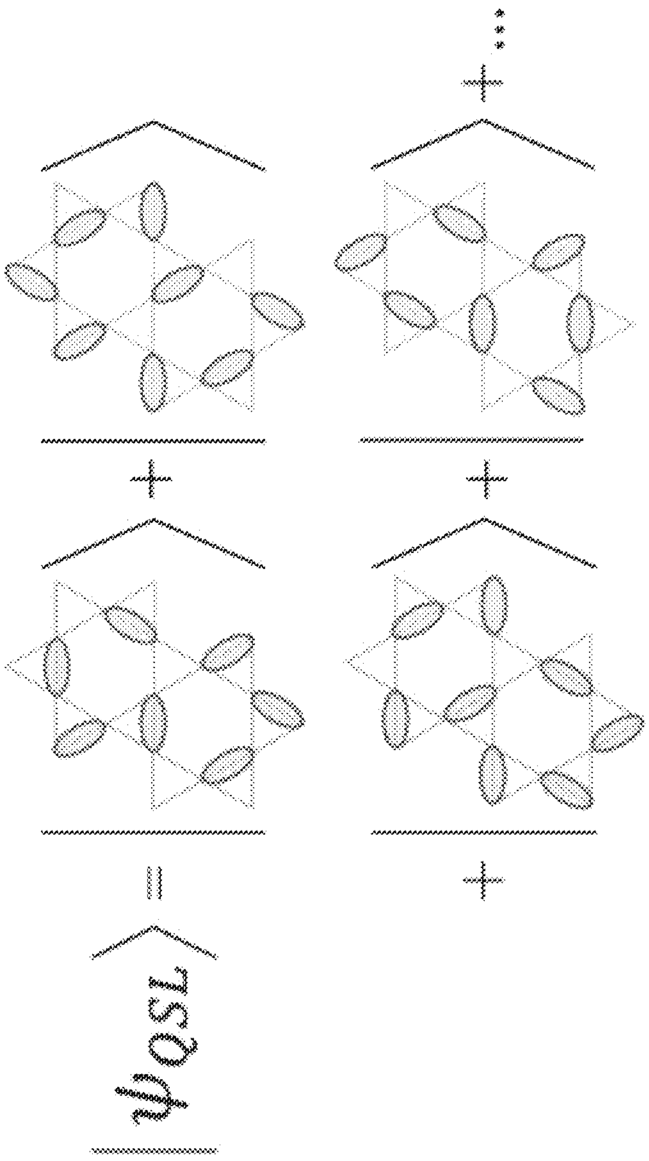

Dimer Models in Rydberg Atom Arrays. The key idea of our approach is based on a correspondence between Rydberg atoms placed on the links of a kagome lattice (or equivalently the sites of a ruby lattice), as shown in FIG. 42A, and dimer models on the kagome lattice. The Rydberg excitations can be viewed as "dimer bonds" connecting the two adjacent vertices of the lattice (FIG. 42B). Due to the Rydberg blockade, strong and properly tuned interactions constrain the density of excitations such that each vertex is touched by a maximum of one dimer. At ¼ filling, each vertex is touched by exactly one dimer, resulting in a perfect dimer covering of the lattice. Smaller filling fractions result in a finite density of vertices with no proximal dimers, which are referred to as monomers. A quantum spin liquid can emerge within this dimer-monomer model close to ¼ filling, and can be viewed as a coherent superposition of exponentially many degenerate dimer coverings with a small admixture of monomers (FIG. 42C). This corresponds to the resonating valence bond (RVB) state, predicted long ago but so far still unobserved in any experimental system.

Referring to FIG. 42, the dimer model in Rydberg atoms arrays is illustrated. FIG. 42A shows fluorescence image of 219 atoms arranged on the links of a kagome lattice. The atoms, initially in the ground state |g⟩, evolve according to the many-body dynamics U(t). The final state of the atoms is determined via fluorescence imaging of ground state atoms. Rydberg atoms are marked with red dimers on the bonds of the kagome lattice. In FIG. 42B, we adjust the blockade radius to $R_b/a=2.4$, by choosing $\Omega=2\pi\times1.4$ MHz and a=3.9 μm, such that all six nearest neighbors of an atom in |r) are within the blockade radius $R_b$. A state consistent with the Rydberg blockade at maximal filling can then be viewed as a dimer covering of the kagome lattice, where each vertex is touched by exactly one dimer. In FIG. 42C, the quantum spin liquid state corresponds to a coherent superposition of exponentially many dimer coverings. In FIG. 42D, detuning Δ(t) and Rabi frequency (t) used for quasi-adiabatic state preparation. In FIG. 42E, (Top) Average density of Rydberg excitations (n) in the bulk of the system, excluding the outer three layers. (Bottom) Probabilities of empty vertices in the bulk (monomers), vertices attached to a single dimer, or to double dimers (weakly violating blockade). After $$\frac{\Delta}{\Omega} \sim 3,$$

the system reaches ~¼ filling, where most vertices are attached to a single dimer, consistent with an approximate dimer phase.

Figure 42D:
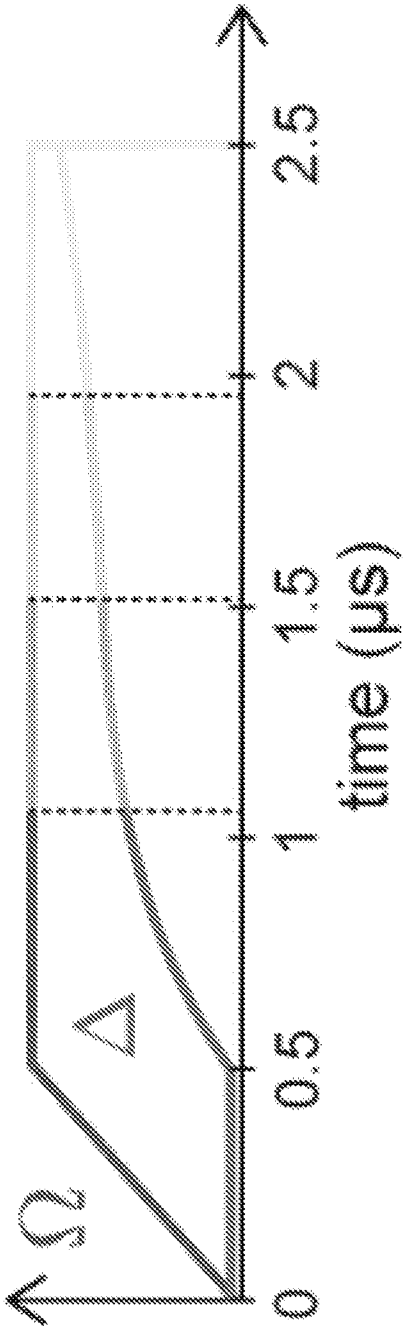
Figure 43A:
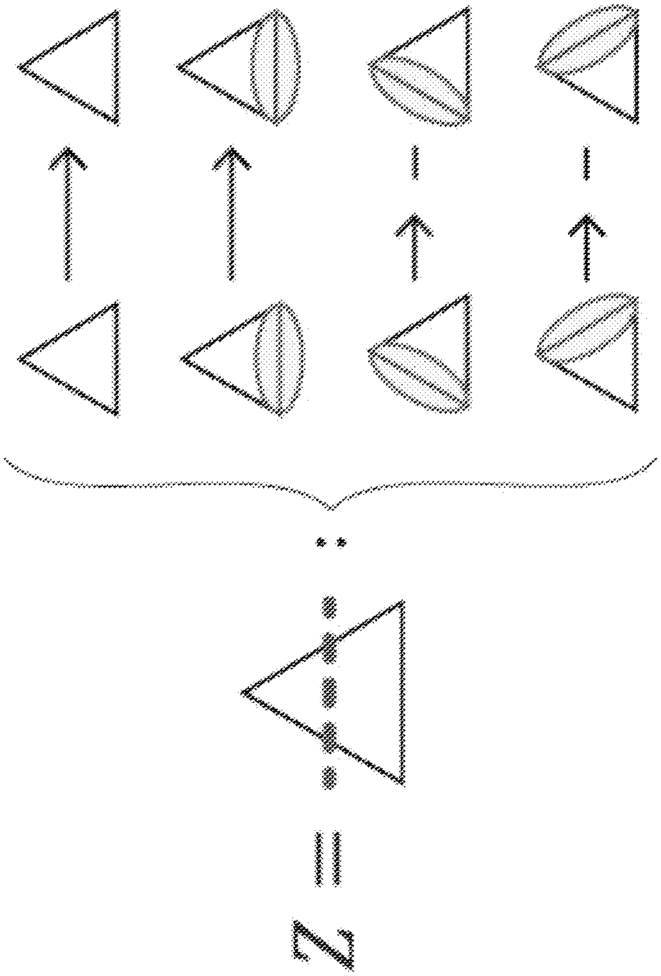
FIG. 43A-C illustrates is detecting a dimer phase via diagonal string operator according to embodiments of the present disclosure.
Figure 43B:
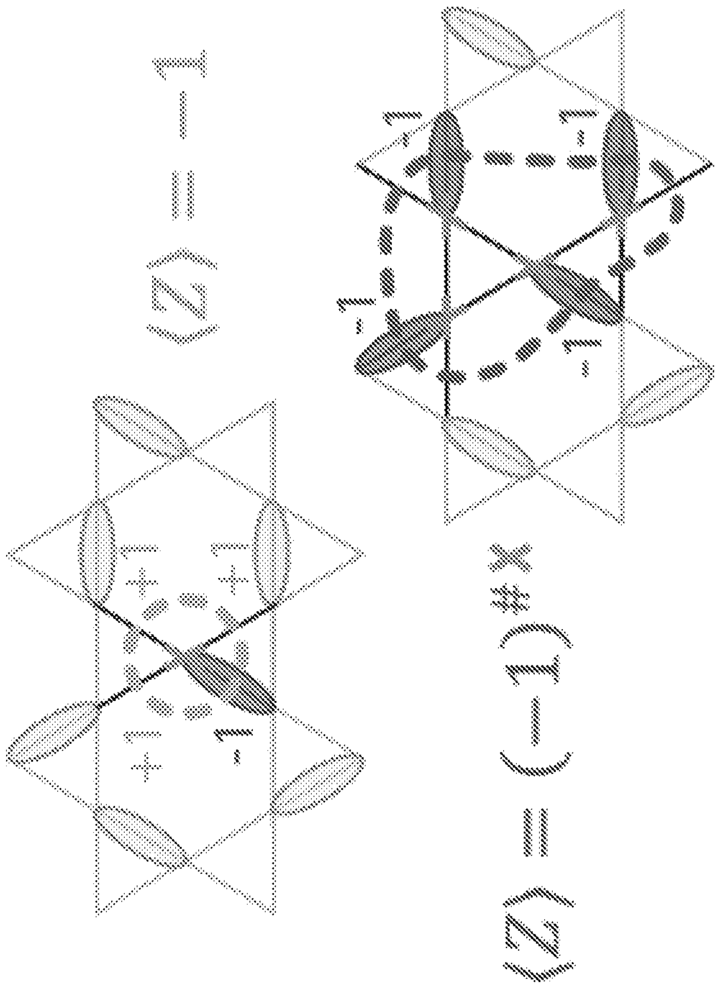
Figure 43C:
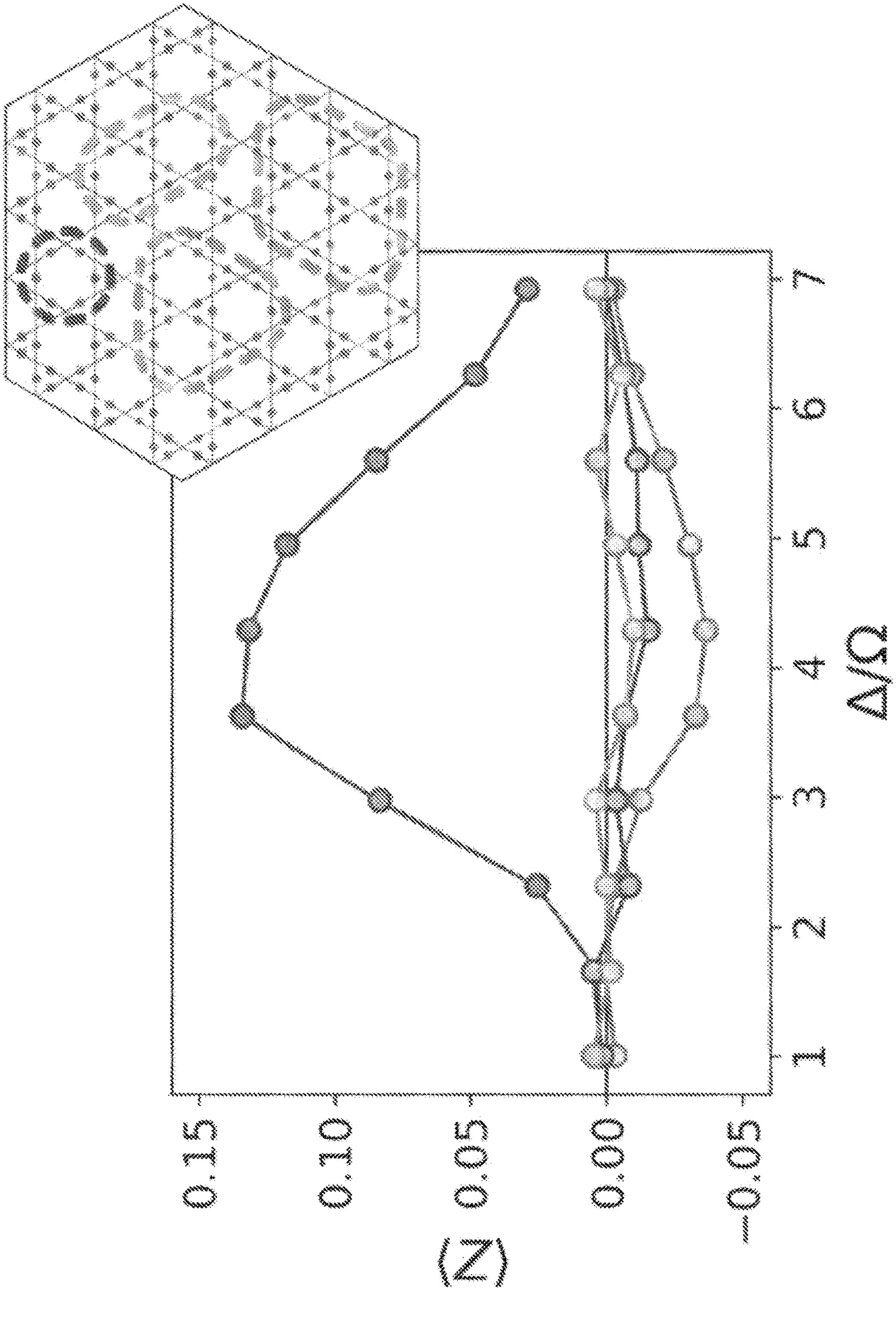

Referring to FIG. 43, detecting a dimer phase via diagonal string operator is shown. In FIG. 43A, the Z string operator measures the parity of dimers along a string. In FIG. 43B, a perfect dimer covering always has exactly one dimer touching each vertex of the array, so that $\langle Z \rangle = -1$ around a single vertex and $\langle Z \rangle = (-1)^{\#enclosed\ vertices}$ for larger loops. In FIG. 43C, Z parity measurements following the quasi-adiabatic sweep of FIG. 42D, with the addition of a 200 ns ramp-down of $\Omega$ at the end to optimize preparation. At different endpoints of the sweep and for different loop sizes (inset), we measure a finite $\langle Z \rangle$, consistent with an approximate dimer phase.

To create and study such states experimentally, we utilize two-dimensional arrays of 219 $^{87}Rb$ atoms individually trapped in optical tweezers and positioned on the links of a kagome lattice, as shown in FIG. 42A. The atoms are initialized in an electronic ground state $|g\rangle$ and coupled to a Rydberg state $|r\rangle$ via a two-photon optical transition with Rabi frequency $\Omega$. The atoms in the Rydberg state $|r\rangle$ interact via a strong van der Waals potential $V=V_0/d^6$, with d the interatomic distance. This strong interaction prevents the simultaneous excitation of two atoms within a blockade radius $$R_b = \left(\frac{V_0}{\Omega}\right)^{\frac{1}{6}}.$$

We adjust the lattice spacing a and the Rabi frequency $\Omega$ such that, for each atom in $|r\rangle$, its six nearest neighbors are all within the blockade radius (FIG. 42B), resulting in a maximum filling fraction of ¼. The resulting dynamics corresponds to unitary evolution U(t) governed by the Hamiltonian $$\frac{H}{\hbar} = \frac{\Omega(t)}{2}\sum_i \sigma_i^x - \Delta(t)\sum_i n_i + \sum_{i<j} V_{ij} n_i n_j \quad \text{Equation 20}$$

where $\hbar$ is the reduced Planck constant, $n_i = |r_i\rangle\langle r_i|$ is the Rydberg state occupation at site i, $$\sigma_i^x = |g_i\rangle\langle r_i| + |r_i\rangle\langle g_i|$$

and $\Delta(t)$ is the time-dependent two-photon detuning. After the evolution, the state is analyzed by projective readout of ground state atoms (FIG. 42A, right panel).

To explore many-body phases in this system, we utilize quasi-adiabatic evolution, in which we slowly turn on the Rydberg coupling $\Omega$ and subsequently change the detuning $\Delta$ from negative to positive values using a cubic frequency sweep over about 2 μs (FIG. 42D). We stop the cubic sweep at different endpoints and first measure the density of Rydberg excitations $\langle n \rangle$. Away from the array boundaries (which result in edge effects permeating just two layers into the bulk), we observe that the average density of Rydberg atoms is uniform across the array (see FIG. 49). Focusing on the bulk density, we find that for $$\frac{\Delta}{\Omega} \gtrsim 3,$$

the system reaches the desired filling fraction $$\langle n \rangle \sim \frac{1}{4}$$

Figure 42E:
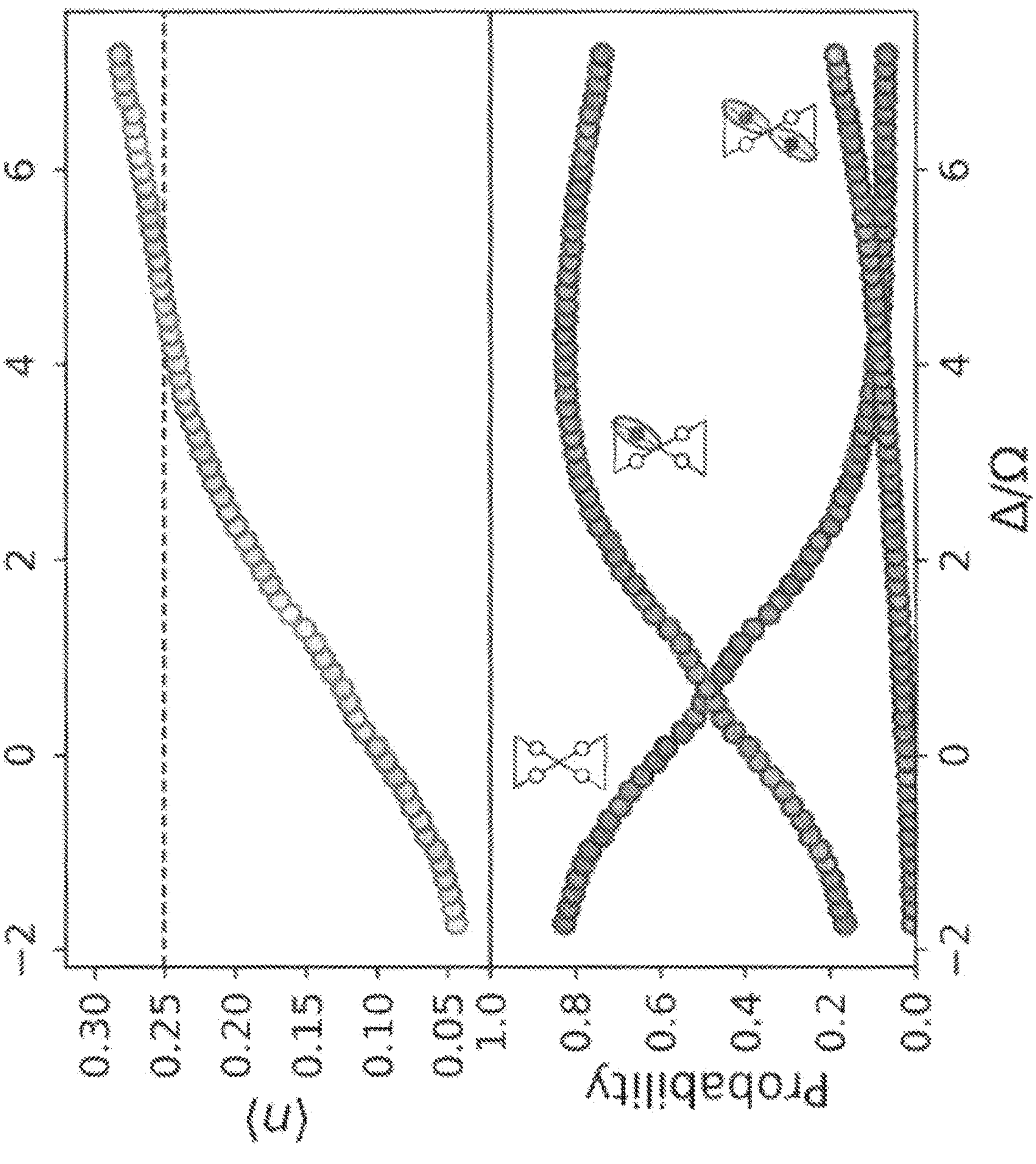

(FIG. 42E, top panel). The resulting state does not have any obvious spatial order (FIG. 42A) and appears as a different configuration of Rydberg atoms in each experimental repetition (see FIG. 50). From the single-shot images, we evaluate the probability for each vertex of the kagome lattice to be attached to: one dimer (as in a perfect dimer covering), zero dimers (i.e., a monomer), or two dimers (representing weak blockade violations). Around $$\frac{\Delta}{\Omega} \sim 4$$

we observe an approximate plateau where ~80% of the vertices are connected to a single dimer (FIG. 42E), indicating an approximate dimer covering.

Measuring topological string operators. A defining property of a phase with topological order is that it cannot be probed locally. Hence, to investigate the possible presence of a QSL state, it is essential to measure topological string operators, analogous to those used in the toric code model. For the present model, there are two such string operators, the first of which characterizes the effective dimer description, while the second probes quantum coherence between dimer states. We first focus on the diagonal operator $$Z = \prod_{i \in S} \sigma_i^z, \text{ with } \sigma_i^z = 1 - 2n_i,$$

that measures the parity of Rydberg atoms along a string S perpendicular to the bonds of the kagome lattice (FIG. 43A). For the smallest closed Z loop, which encloses a single vertex of the kagome lattice, $\langle Z \rangle = -1$ for any perfect dimer covering. Larger loops can be decomposed into a product of small loops around all the enclosed vertices, resulting in $\langle Z \rangle = (-1)^{\#enclosed\ vertices}$ (FIG. 43B). Note that the presence of monomers or double-dimers reduces the effective contribution of each vertex, resulting in a reduced $\langle Z \rangle$.

To measure $\langle Z \rangle$ for different loops (FIG. 43C), we evaluate the string observables directly from single-shot images, averaging over many experimental repetitions and over all loops of the same shape in the bulk of the lattice. In the range of detunings where $\langle n \rangle \sim$¼, we clearly observe the emergence of a finite $\langle Z \rangle$ for all loops, with the sign matching the parity of enclosed vertices, as expected for dimer states (FIG. 43B). The measured values are generally $|\langle Z \rangle| < 1$ and decrease with the loop size, suggesting the presence of a finite density of defects, as discussed below. Nevertheless, these observations indicate that the state we prepare is consistent with an approximate dimer phase.

Referring to FIG. 44, probing coherence between dimer states via off-diagonal string operator is illustrated. FIG. 44A shows definition of X string operator on a single triangle of the kagome lattice. FIG. 44B shows that on any closed loop, the X operator maps any dimer covering into another valid dimer covering, such that (X) measures the coherence between pairs of dimer configurations. In FIG. 44C, the X operator is measured by evolving the initial state under Hamiltonian (Equation 20) with Δ=0 and reduced blockade radius to encompass only atoms within each individual triangle, implementing a basis rotation that maps X into Z. FIG. 44D shows that in the experiment, after the state preparation, we set the laser detuning to $\Delta_q$=0 and we increase Ω to 2π×20 MHz to reach $$\frac{R_b}{a} = 1.53.$$

Figure 44A:
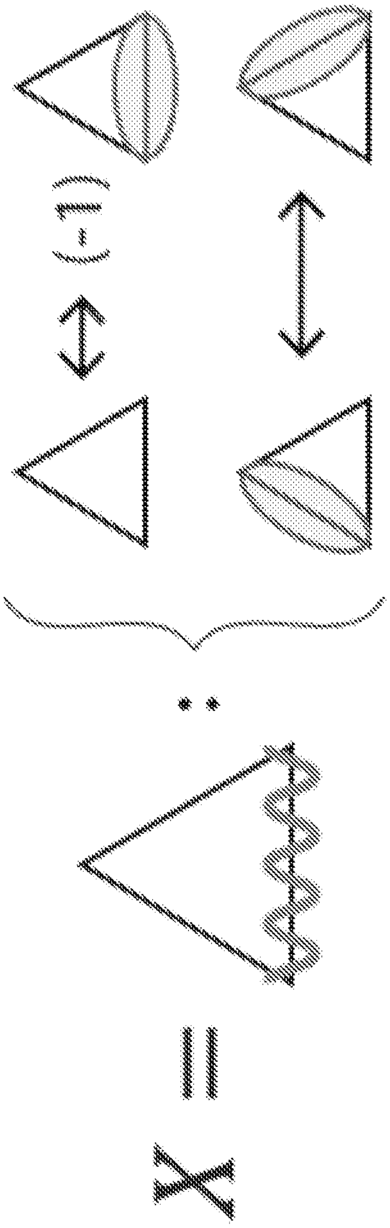
FIG. 44A-F illustrates probing coherence between dimer states via off-diagonal string operator according to embodiments of the present disclosure.
Figure 44B:
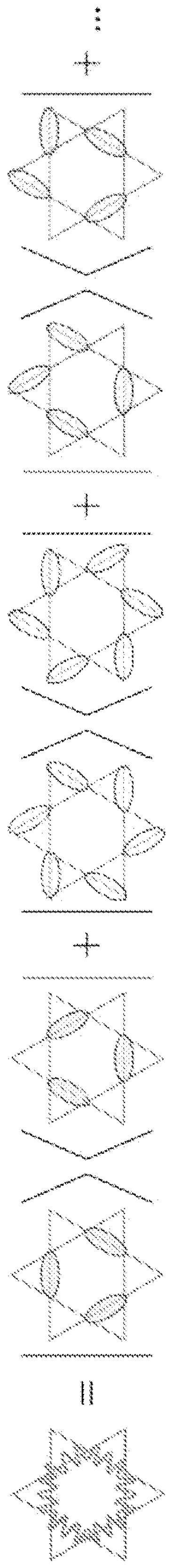
Figure 44C:
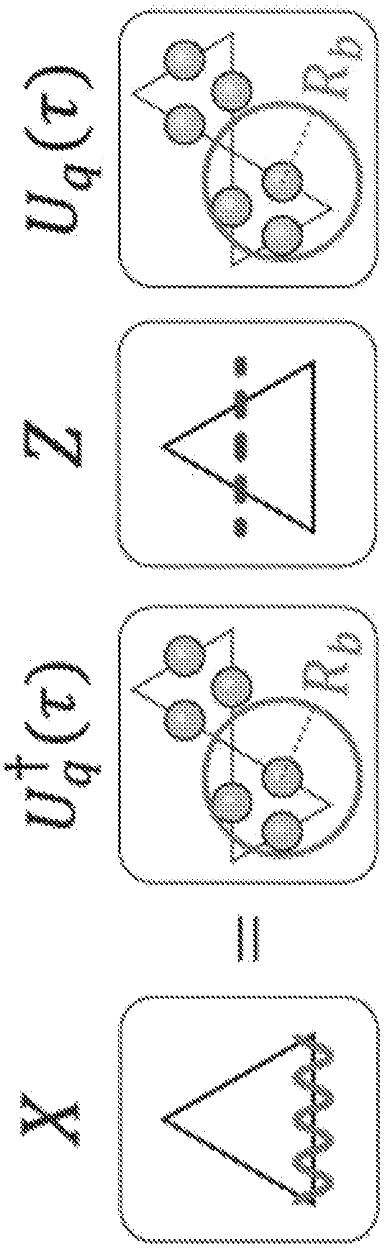
Figure 44D:
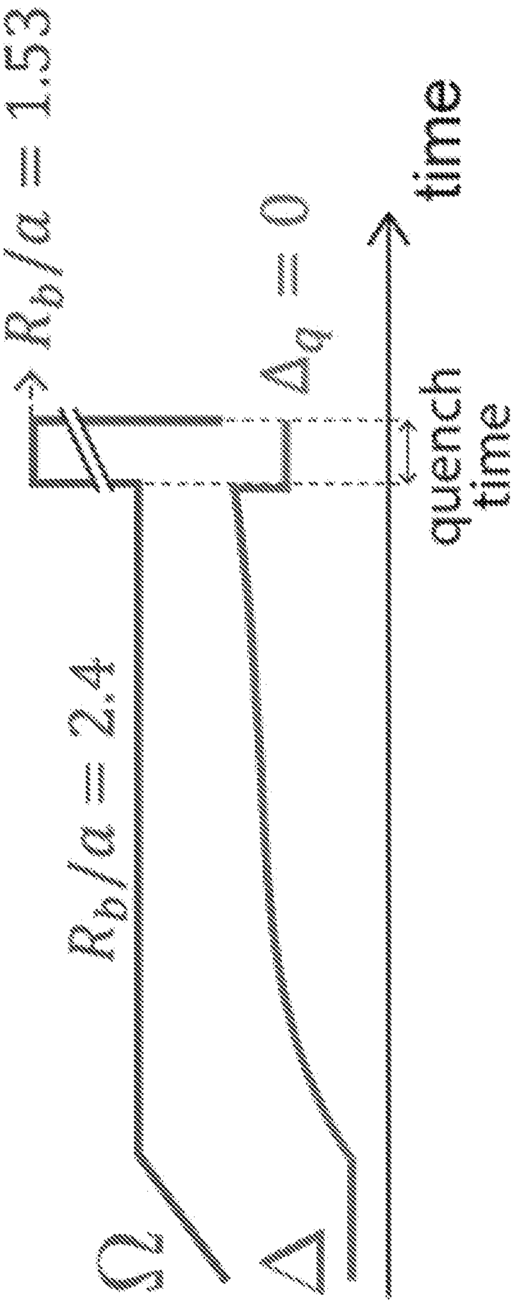
Figure 44E:
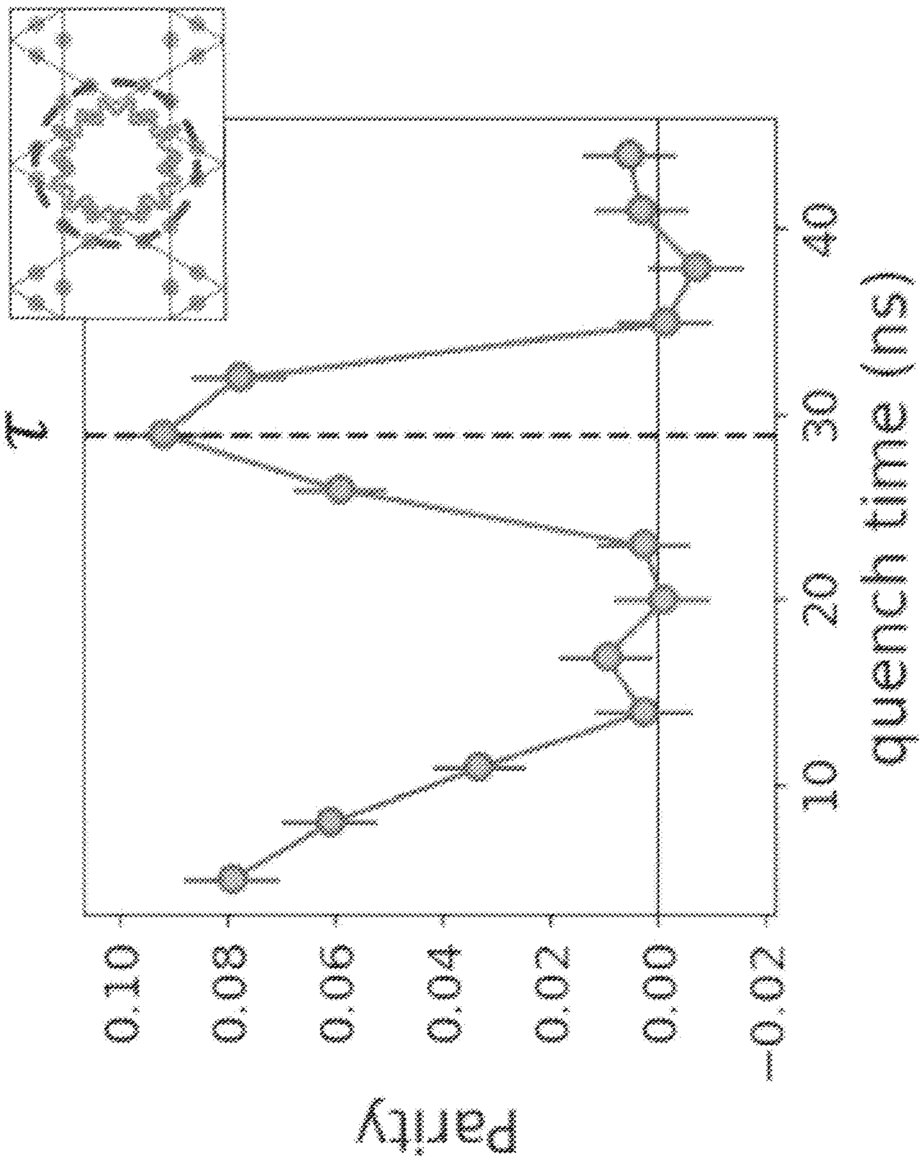
Figure 44F:
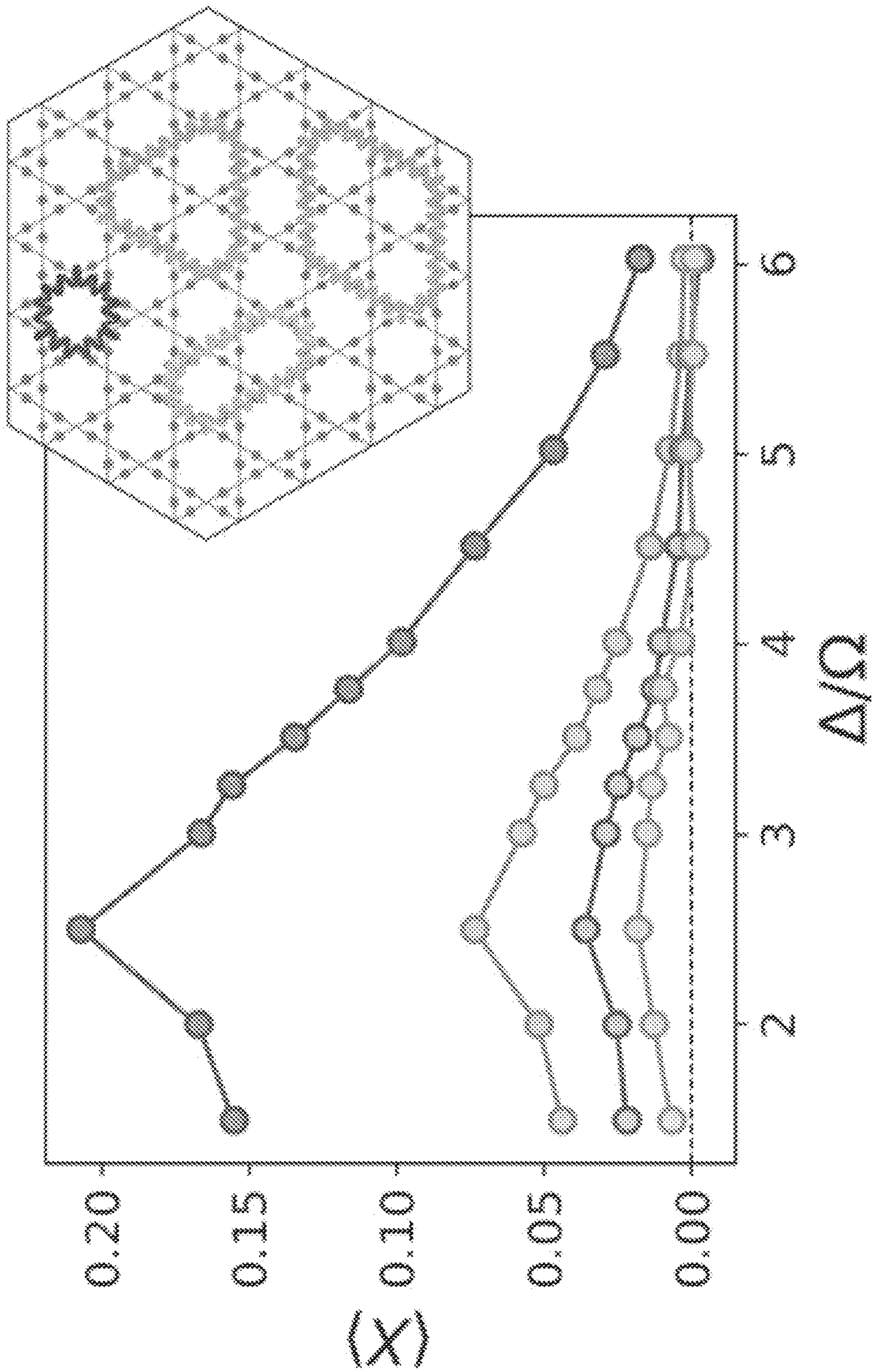

In FIG. 44E, by measuring the Z parity on the dual string (red) of a target X loop (blue) after a variable quench time, we identify the time τ for which the mapping in FIG. 44C is implemented. In FIG. 44F, we measure (X) for different final detunings of the cubic sweep and for different loop sizes (inset), and find that the prepared state has long-range coherence that extends over a large fraction of the array.

We next explore quantum coherence properties of the prepared state. To this end, we consider the off-diagonal X operator, which acts on strings along the bonds of the kagome lattice. It is defined in FIG. 44A by its action on a single triangle. Applying X on any closed string maps a dimer covering to another valid dimer covering (see, e.g., FIG. 44B for a loop around a single hexagon). A finite expectation value for X therefore implies that the state contains a coherent superposition of one or more pairs of dimer states coupled by that specific loop, a prerequisite for a quantum spin liquid. The measurement of X can be implemented by performing a collective basis rotation illustrated in FIG. 44C. This rotation is implemented by time-evolution under the Rydberg Hamiltonian (Equation 20) with Δ=0 and reduced blockade radius $$\frac{R_b}{a} = 1.53,$$

such that only the atoms within the same triangle are subject to the Rydberg blockade constraint. Under these conditions, it is sufficient to consider the evolution of individual triangles separately, where each triangle can be described as a 4-level system

Within this subspace, after a time $$\tau = \frac{4\pi}{3\Omega\sqrt{3}},$$

the collective 3-atom dynamics realizes a unitary $U_q$ which implements the basis rotation that transforms an X string into a dual Z string.

Experimentally, the basis rotation is implemented following the state preparation by quenching the laser detuning to $\Delta_g$=0 and increasing the laser intensity by a factor of ~200 to reduce the blockade radius to $R_b$/a=1.53 (FIG. 44D). We calibrate t by preparing the state at Δ/Ω=4 and evolving under the quench Hamiltonian for a variable time. We measure the parity of a Z string that is dual to a target X loop, and observe a sharp revival of the parity signal at τ~30 ns (FIG. 44E). Fixing the quench time t, we measure (X) for different values of the detuning Δ at the end of the cubic sweep (FIG. 44F) and observe a finite X parity signal for loops that extend over a large fraction of the array. We emphasize that, in light of experimental imperfections, the observation of finite parities for string observables of up to 28 atoms within μs-long experiments is rather remarkable. These observations clearly indicate the presence of long-range coherence in the prepared state.

Referring to FIG. 45, string order parameters and quasi-particle excitations are illustrated. FIG. 45A shows an open string operator $X_{open}$ acting on a dimer state |D⟩ creates two monomers (e-anyons) at its endpoints (see FIG. 55 for m-anyons). FIG. 45B-C show the definition of the string order parameters $\langle Z\rangle_{BFFM}$ and $\langle X\rangle_{BFFM}$. FIG. 45D shows a comparison between $\langle Z_{closed}\rangle$ and $\langle Z_{open}\rangle^2$ measured on the strings shown in the inset. The expectation value shown for the open string is squared to account for the different length of the strings. FIG. 45E shows an analogous comparison for X. FIG. 45F-G illustrates zooming in on the range with finite closed loop parities and measuring the BFFM order parameters for different open strings (insets). We find that $\langle Z\rangle_{BFFM}$ is consistent with zero on the entire range of Δ, while $\langle X\rangle_{BFFM}$ vanishes for Δ/Ω≳3.3, allowing us to identify a range of detunings consistent with the onset of a QSL phase (shaded area). FIG. 45H shows rescaled parities $\langle Z\rangle^{1/area}$ and $\langle Z\rangle^{1/perim}$ evaluated for Δ/Ω=3.6, where area and perimeter are defined as the number of vertices enclosed by the loop and the number of atoms on the loop, respectively. For small loops, Z scales with an area law, while it deviates from this behavior for larger loops, converging towards a perimeter law. FIG. 45I shows $\langle X\rangle^{1/area}$ (the area, in this case, is the number of enclosed hexagons) and $\langle X\rangle^{1/perim}$ evaluated for Δ/Ω=3.5, indicating an excellent agreement with a perimeter-law scaling.

Figure 45A:
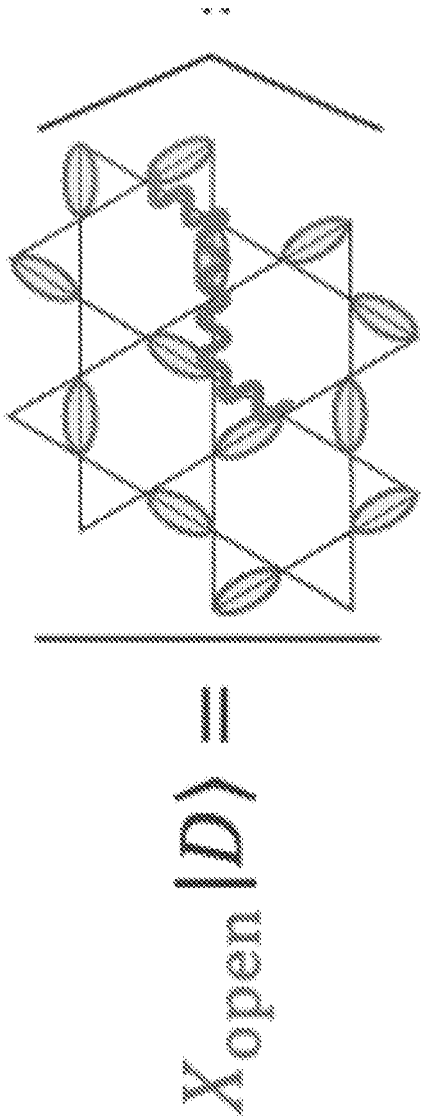
FIG. 45A-I illustrates string order parameters and quasi-particle excitations according to embodiments of the present disclosure.
Figure 45B:
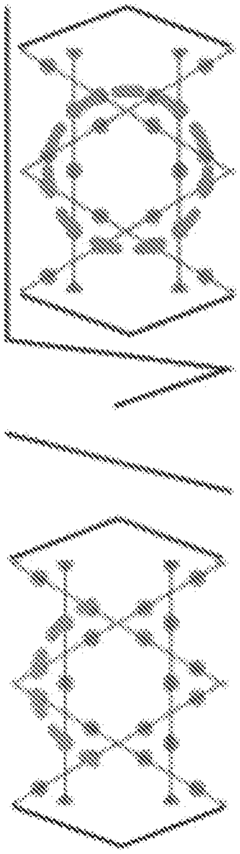
Figure 45C:
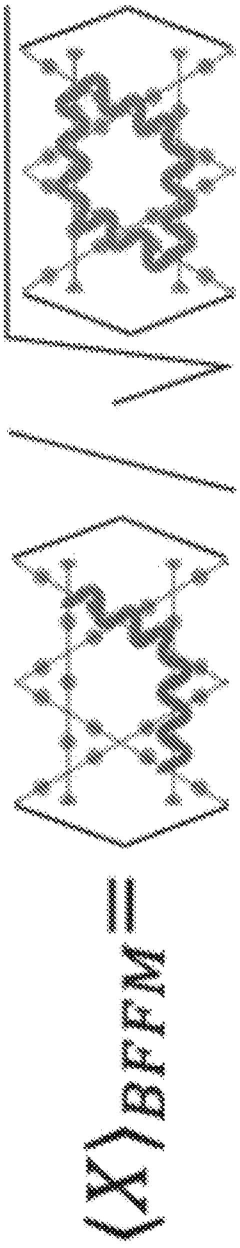
Figure 45D:
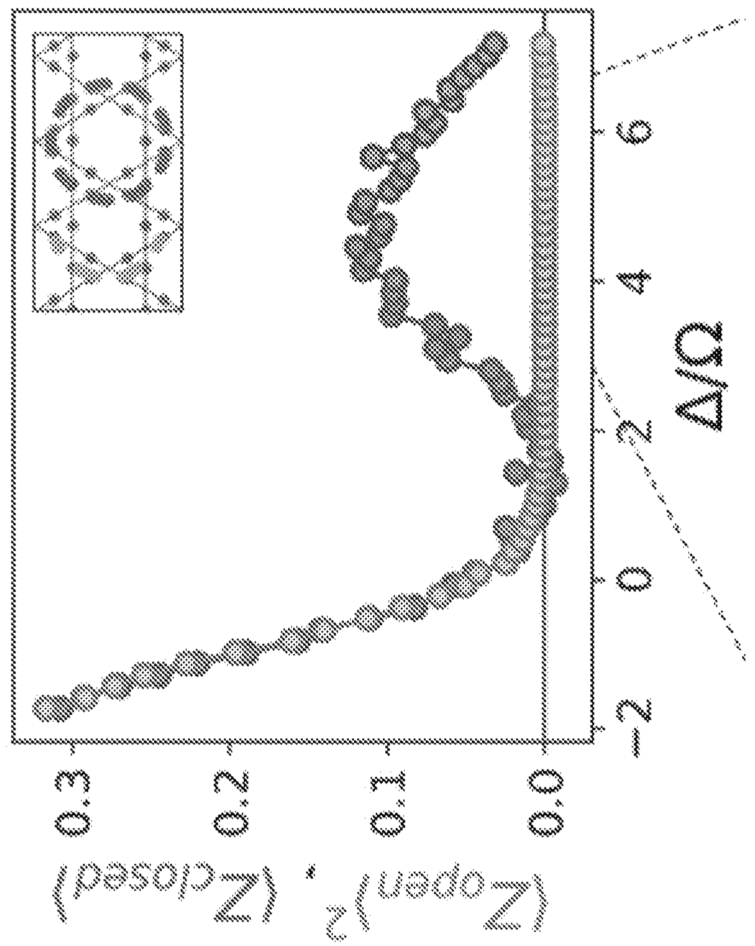
Figure 45E:
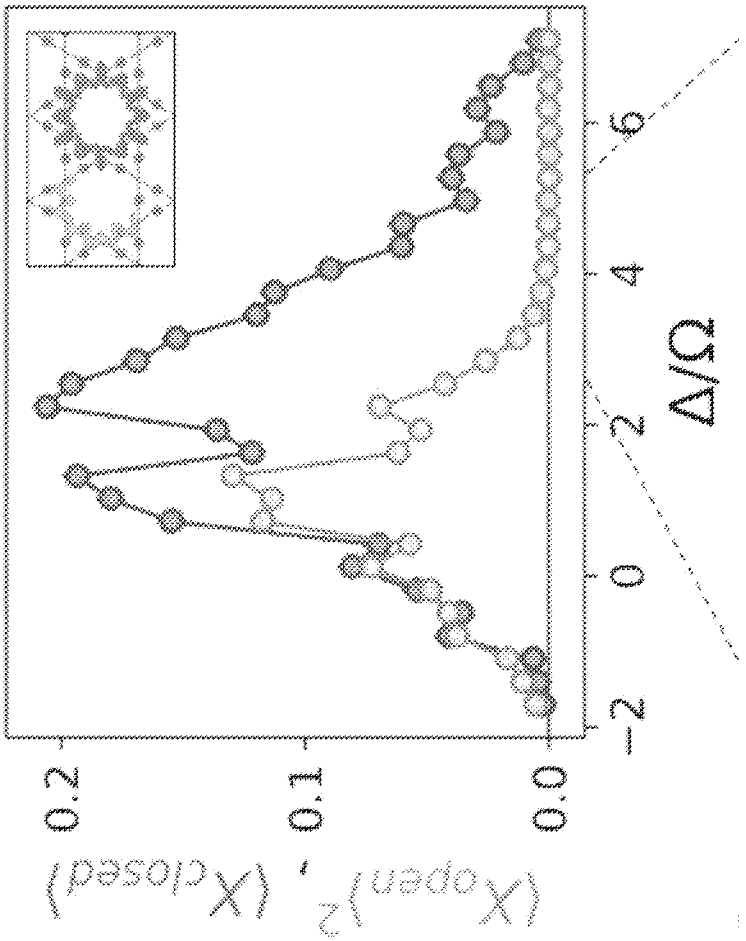

Probing spin liquid properties. The study of closed string operators shows that we prepare an approximate dimer phase with quantum coherence between dimer coverings. While these closed loops are indicative of topological order, it is important to compare their properties to those of open strings to distinguish topological effects from trivial ordering—the former being sensitive to the topology of the loop. This comparison is shown in FIG. 45D, E, indicating several distinct regimes. For small A, we find that both Z and X loop parities factorize into the product of the parities on the half-loop open strings—in particular, the finite (Z) is a trivial result of the low density of Rydberg excitations. In contrast, loop parities no longer factorize in the dimer phase (3≲Δ/Ω≲5). Instead, the expectation values for both open string operators vanish in the dimer phase, indicating the nontrivial nature of the correlations measured by the closed loops. More specifically, topological ordering in the dimer-monomer model can break down either due to a high density of monomers, corresponding to the trivial disordered phase at small $$\frac{\delta}{\Omega},$$

or due to the lack of long-range resonances, corresponding to a valence bond solid (VBS). Open Z and X strings distinguish the target QSL phase from these proximal phases: when normalized according to the definition from Bricmont, Frölich, Fredenhagen and Marcu (BFFM) (FIG. 45B, C), these open strings can be considered as order parameters for the QSL. In particular, open Z strings have a finite expectation value when the dimers form an ordered spatial arrangement, as in the VBS phase. At the same time, open X strings create pairs of monomers at their endpoints (FIG. 45A), so a finite $\langle X\rangle$ can be achieved in the trivial phase where there is a high density of monomers. Therefore, the QSL can be identified as the unique phase where both order parameters vanish for long strings.

Figure 45F:
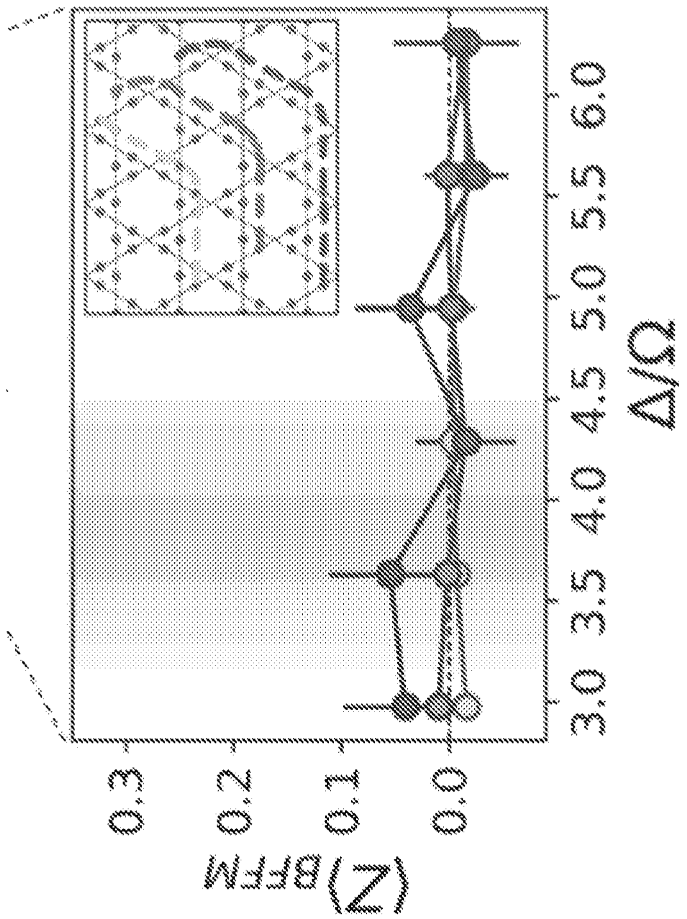
Figure 45G:
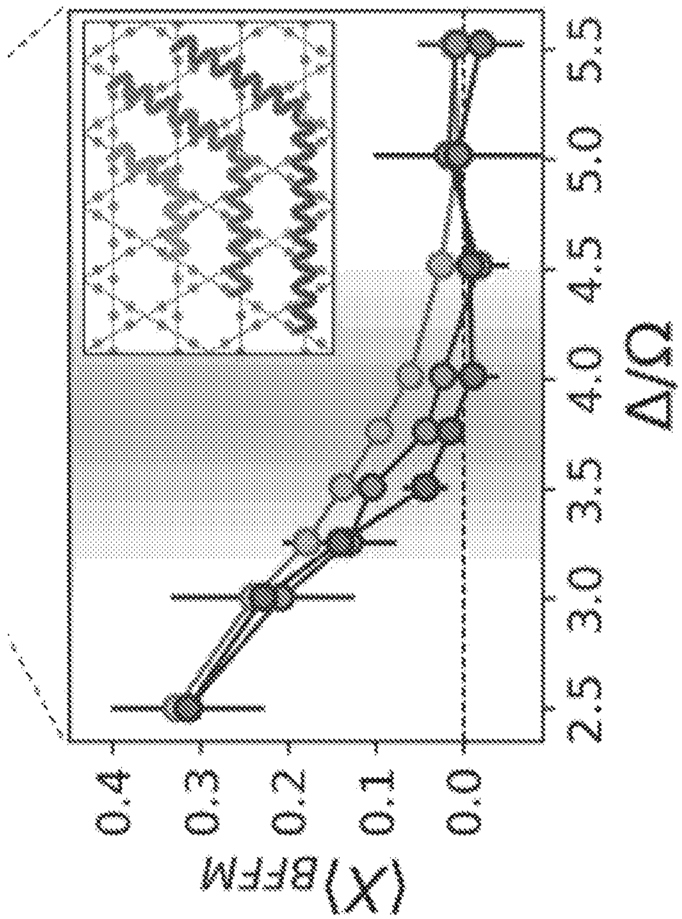
Figure 51:
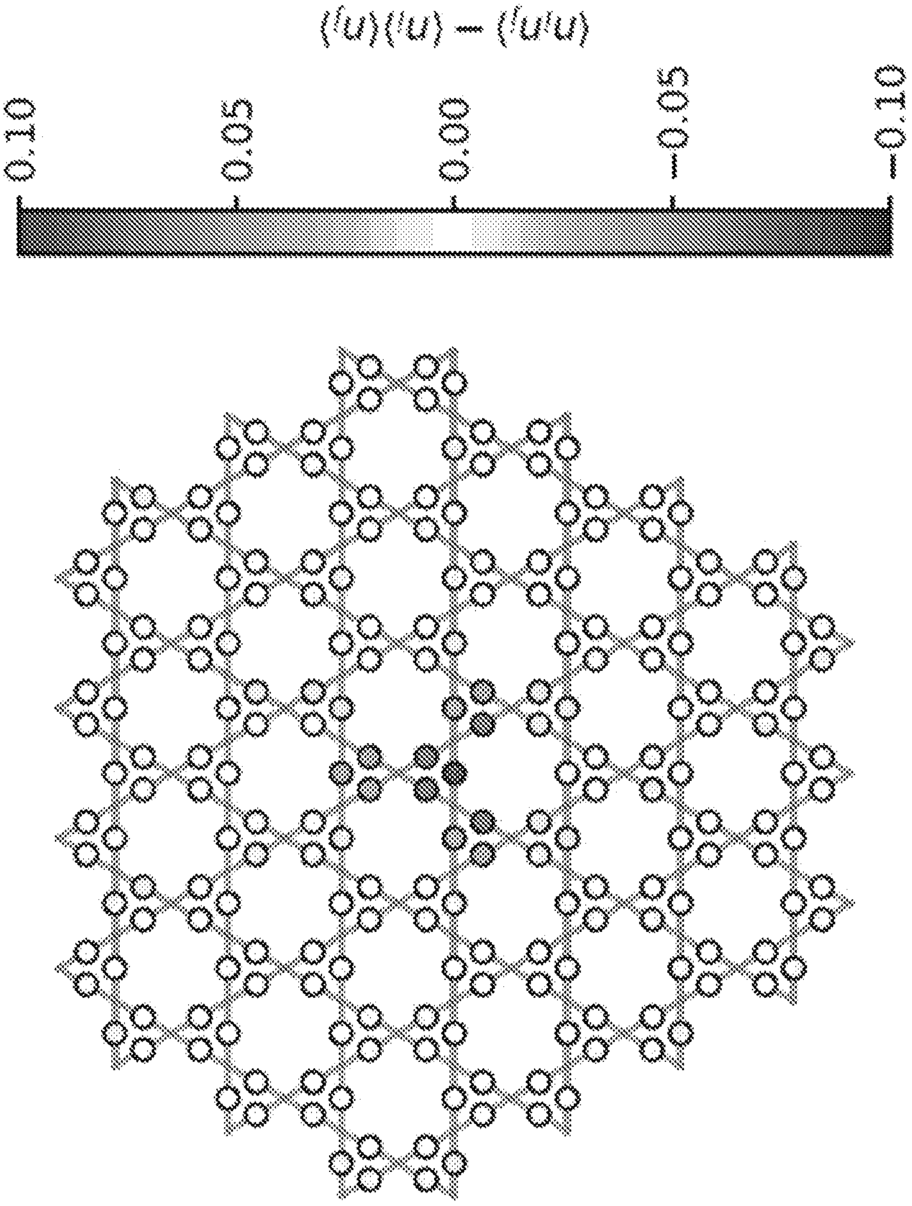
FIG. 51 illustrates density correlations between individual Rydberg excitations according to embodiments of the present disclosure.

FIGS. 45F, G show the measured values of these order parameters. We find that $\langle Z\rangle_{BFFM}$ is compatible with zero on the entire range of $$\frac{\delta}{\Omega}$$

where we observed a finite Z parity on closed loops, indicating the absence of a VBS phase (FIG. 45F), consistent with our analysis of density-density correlations (FIG. 51).

At the same time, $\langle X\rangle_{BFFM}$ converges towards zero on the longest strings for $\Delta/\Omega \gtrsim 3.3$ (FIG. 45G), indicating a transition out of the disordered phase. By combining these two measurements with the regions of non-vanishing parity for the closed Z and X loops (FIGS. 43, 44), we conclude that for $3.3 \lesssim \Delta/\Omega \lesssim 4.5$ our results constitute a direct detection of the onset of a quantum spin liquid phase (shaded area in FIG. 45F, G).

Figure 45H:
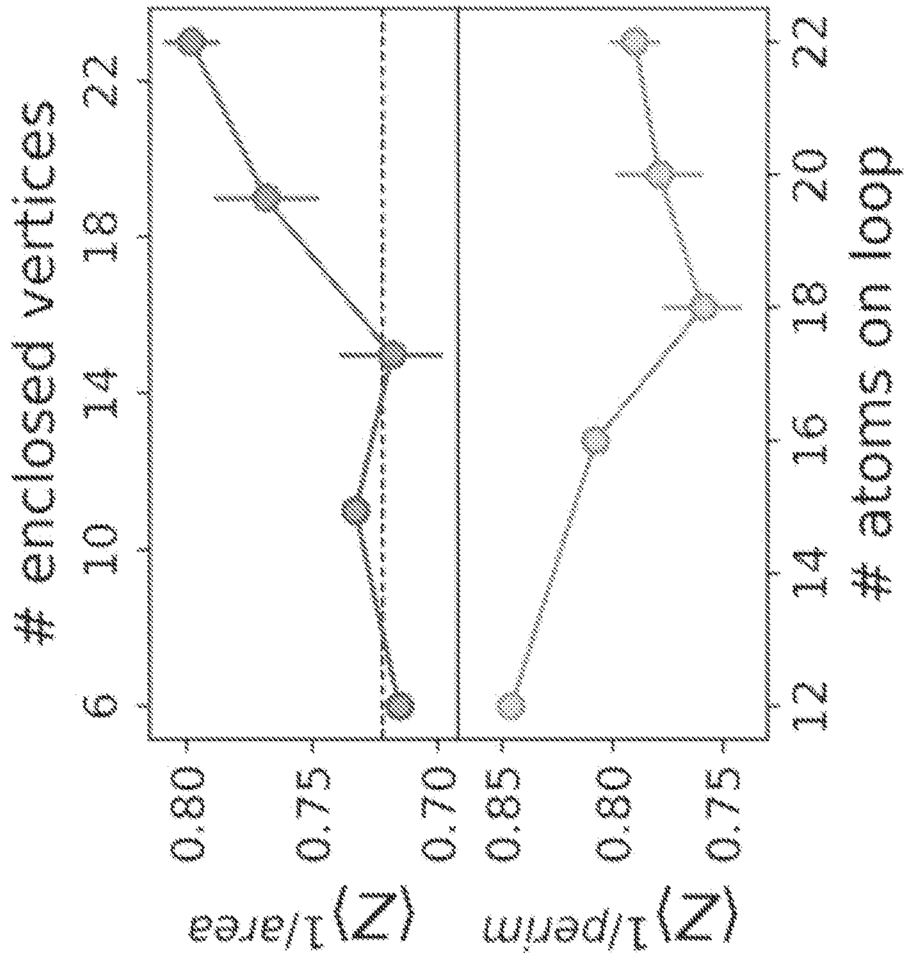
Figure 45I:
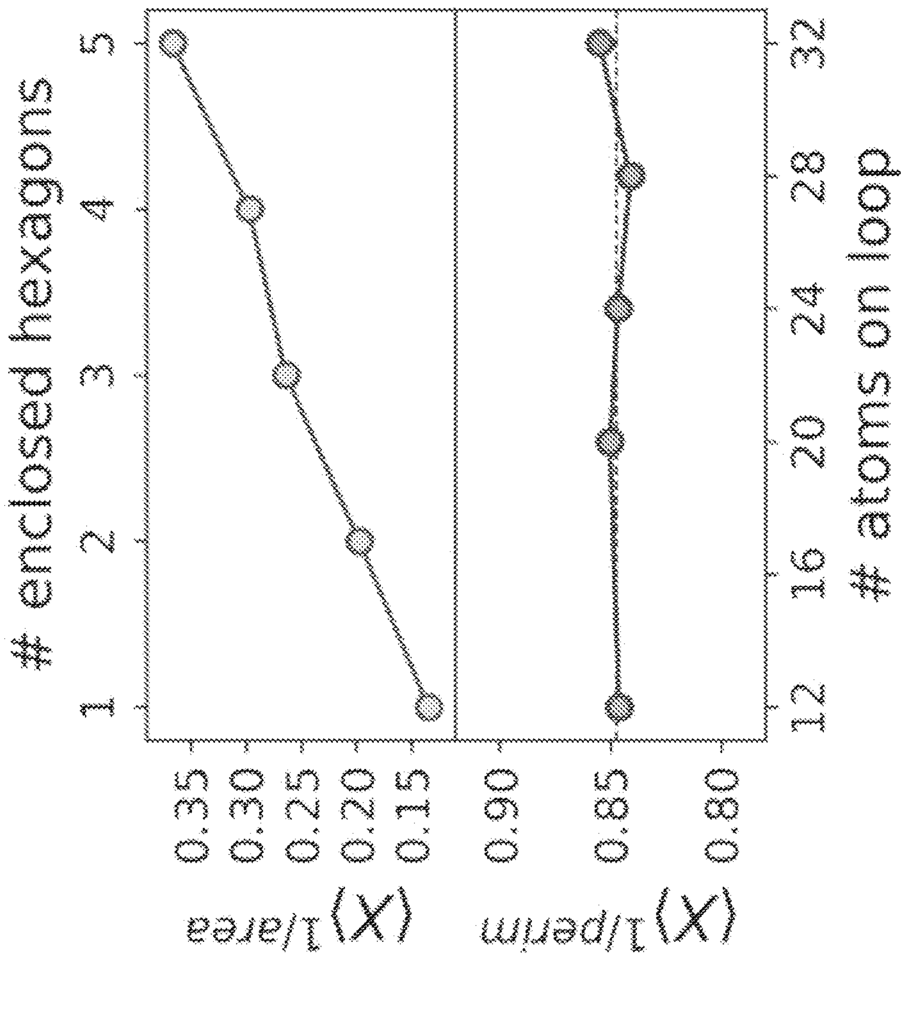

The measurements of the closed loop operators in FIGS. 43,44 show that $|\langle Z\rangle|$, $|\langle X\rangle|<1$ and that the amplitude of the signal decreases with the loop size, which results from a finite density of quasiparticle excitations. Specifically, defects in the dimer covering such as monomers and double-dimers can be interpreted as electric (e) anyons in the language of lattice gauge theory. Since the presence of a defect inside a closed loop changes the sign of Z, the parity on the loop is reduced according to the number of enclosed e-anyons as $|\langle Z\rangle|=|\langle(-1)^{\#enclosed\ e\text{-}anyons}\rangle|$. The average number of defects inside a loop is expected to scale with the number of enclosed vertices, i.e., with the area of the loop, and indeed we observe an approximate area-law scaling of $|\langle Z\rangle|$ for small loop sizes (FIG. 45H). However, for larger loops we notice a deviation towards a perimeter-law scaling, which can emerge if pairs of anyons are correlated over a characteristic length scale smaller than the loop size (see below for a discussion of the expected scaling). Pairs of correlated anyons which are both inside the loop do not change its parity since their contributions cancel out; they only affect (Z) when they sit across the loop, leading to a scaling with the length of the perimeter. These pairs can be viewed as resulting from the application of X string operators to a dimer covering (FIG. 45A), originating, e.g., from virtual excitations in the dimer-monomer model or from errors due to state preparation and detection. Note that state preparation with larger Rabi frequency (improved adiabaticity) results in larger Z parity signals and reduced e-anyon density (see FIG. 53).

Figure 55:
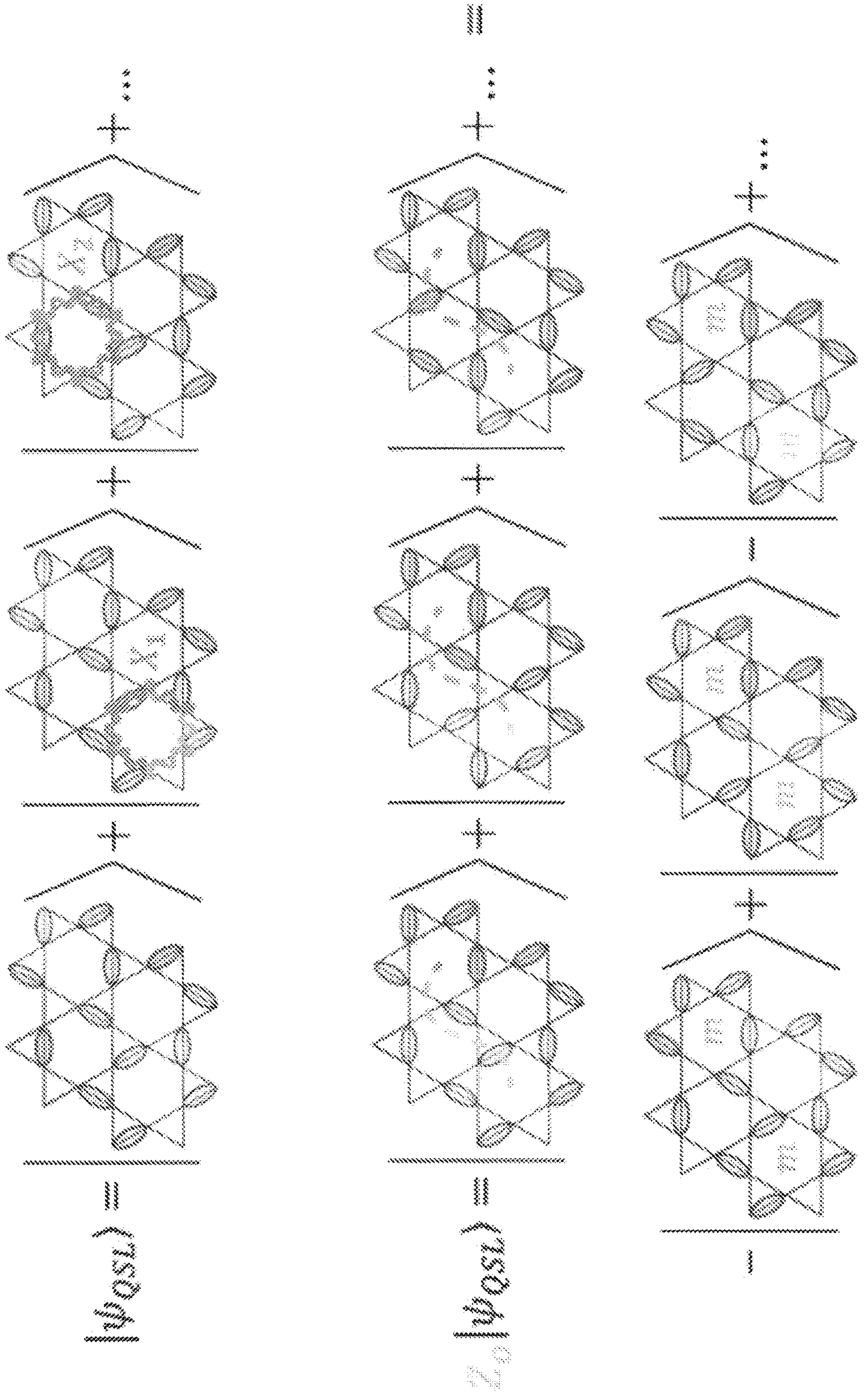
FIG. 55 illustrates magnetic anyons according to embodiments of the present disclosure.
Figure 56A:
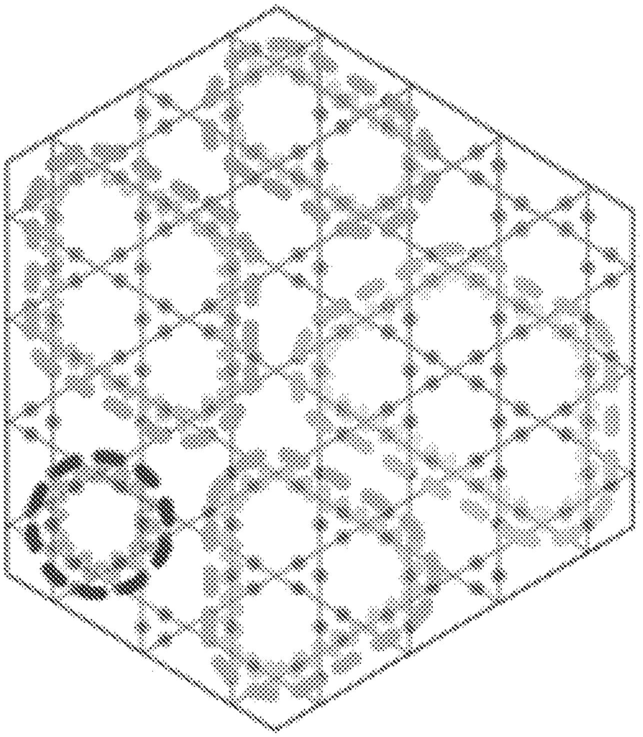
FIG. 56A-D illustrates scaling of Z and X parities with the loop size according to embodiments of the present disclosure.
Figure 56B:
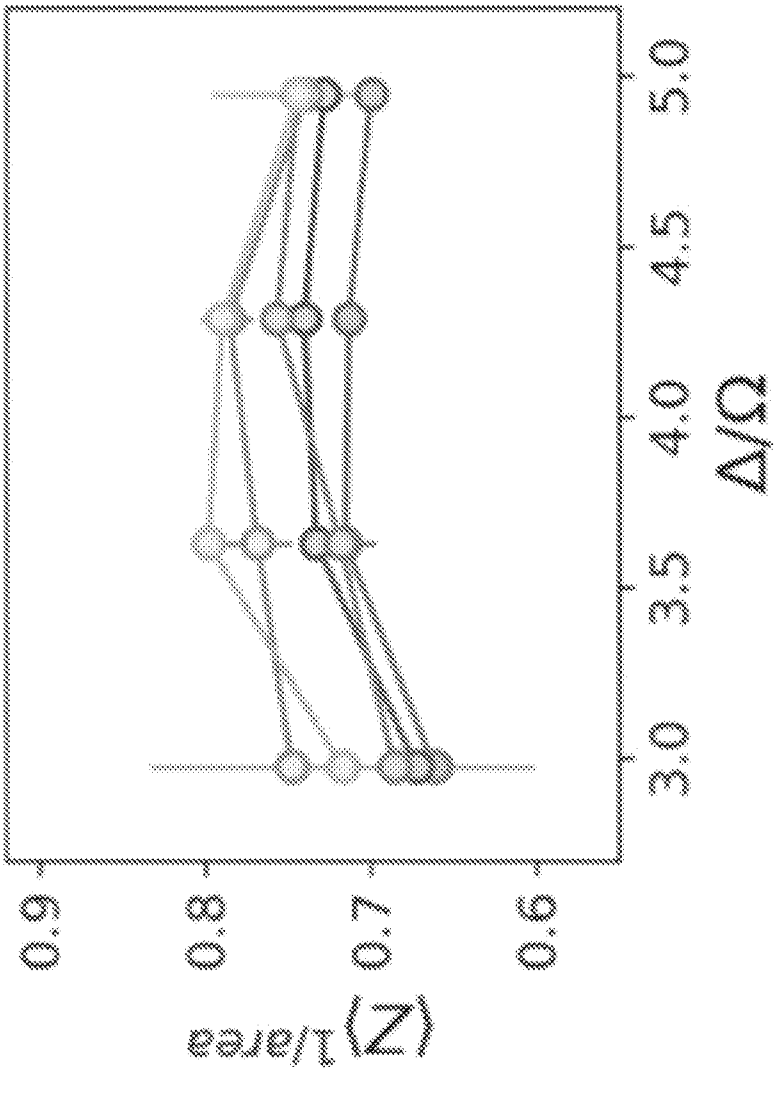
Figure 56C:
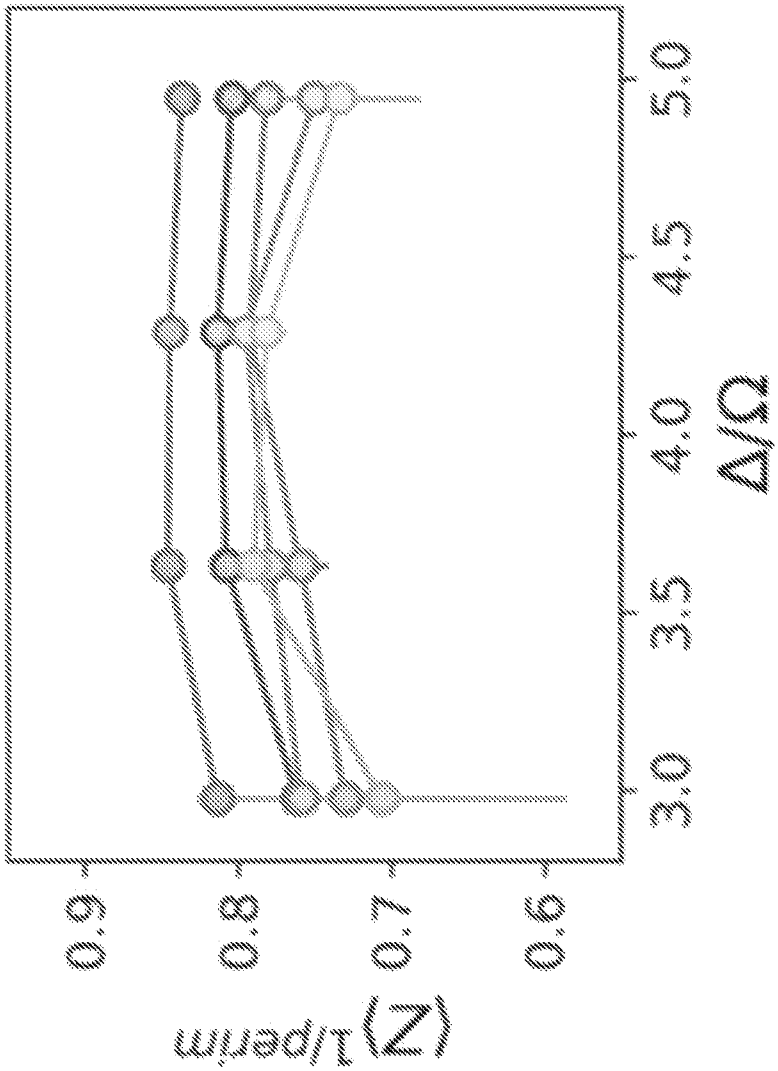
Figure 56D:
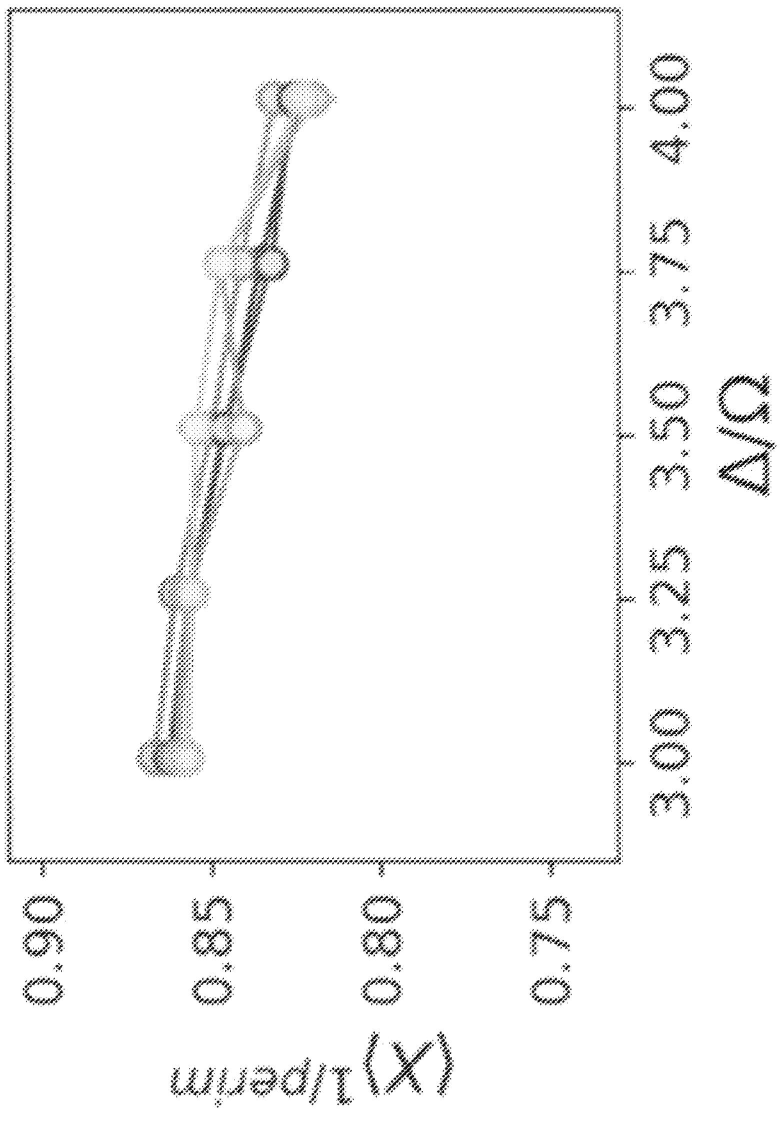

A second type of quasiparticle excitation that could arise in this model is the so-called magnetic (m) anyon. Analogous to e-anyons which live at the endpoints of open X strings (FIG. 45A), m-anyons are created by open Z strings and they correspond to phase errors between dimer coverings (FIG. 55). These excitations cannot be directly identified from individual snapshots, but they are detected by the measurement of closed X loop operators. The remarkable perimeter law scaling observed in FIG. 45I indicates that m-anyons only appear in pairs with short correlation lengths. These observations highlight the prospects for using topological string operators to detect and probe quasiparticle excitations in the system.

Figure 46A:
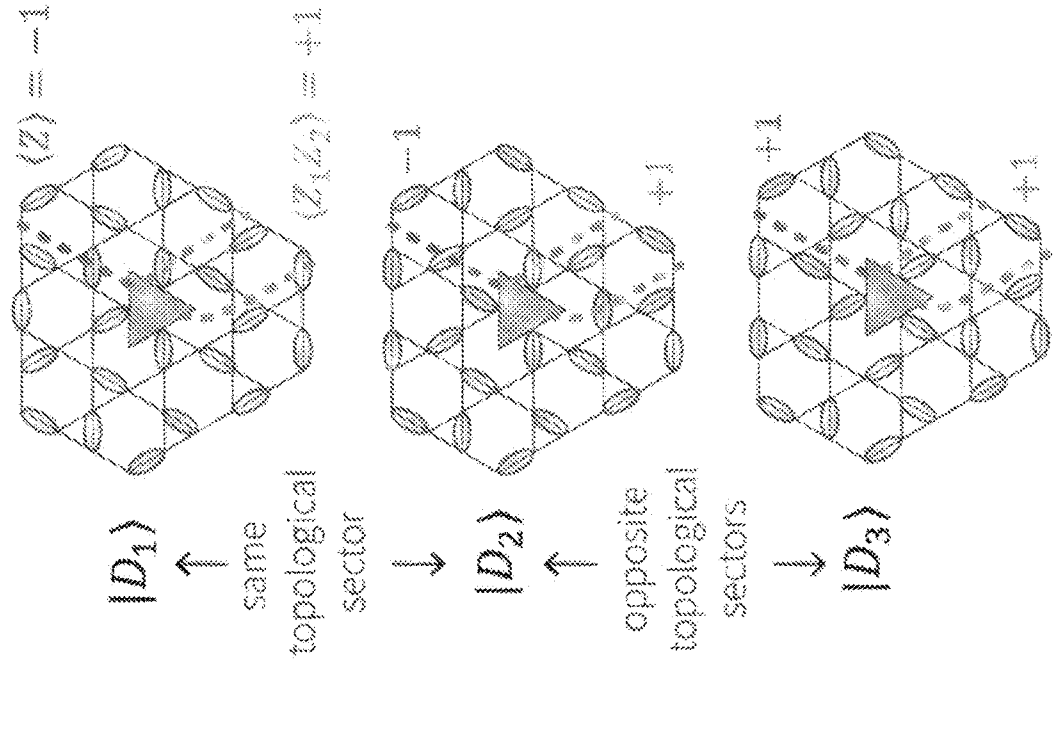
FIG. 46A-C illustrates topological properties in array with a hole according to embodiments of the present disclosure.
Figure 46B:
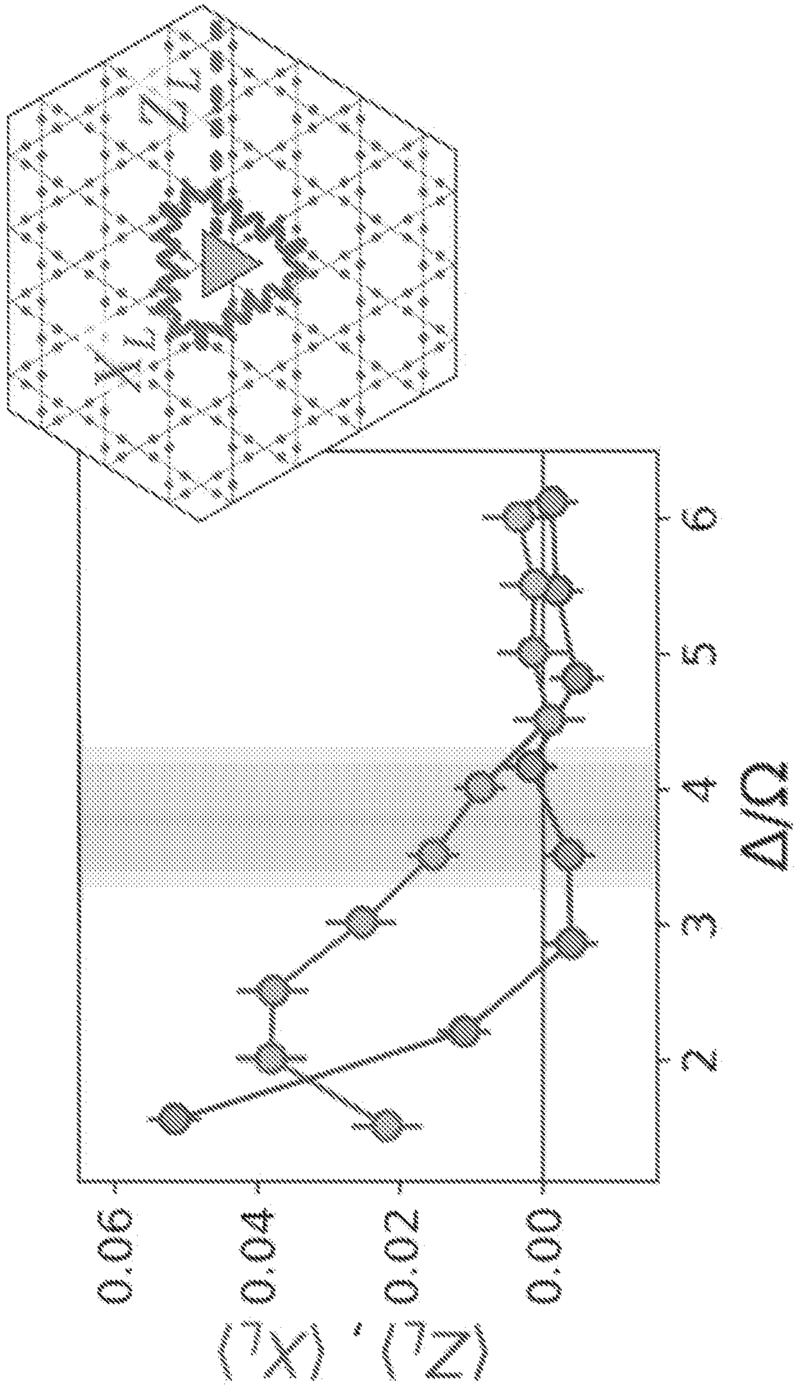
Figure 46C:
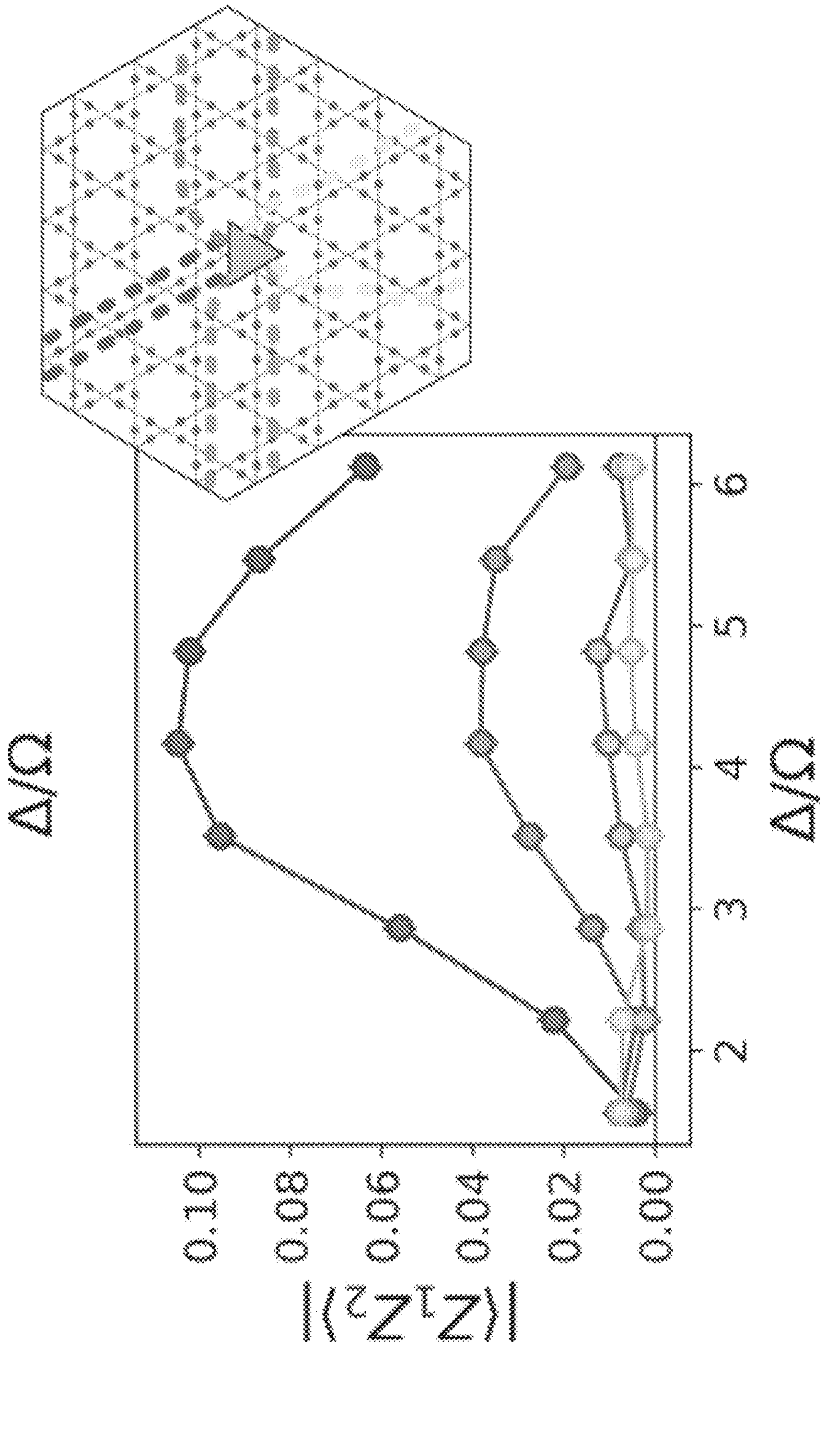

Referring to FIG. 46, topological properties in array with a hole are illustrated. FIG. 46A shows a lattice with nontrivial topology is obtained by removing three atoms at the center to create a small hole. The dimer states can be divided into two distinct topological sectors 0 and 1. Z strings connecting the hole to the boundary always have a well-defined expectation value within each sector and opposite sign between the two sectors, while the correlations between two such strings $Z_1Z_2$ are identical for both sectors. FIG. 46B shows measured expectation values for the operators $Z_L$ and $X_L$ defined in the inset, indicate that in the QSL region (shaded area) we prepare a superposition state of the two topological sectors ($\langle Z\rangle=0$) with a finite overlap with the $|+\rangle$ state ($\langle X_L\rangle>0$). FIG. 46C shows finite expectation values for the correlations between pairs of hole-to-boundary Z strings (inset), consistent with FIG. 46A.

Figure 57:
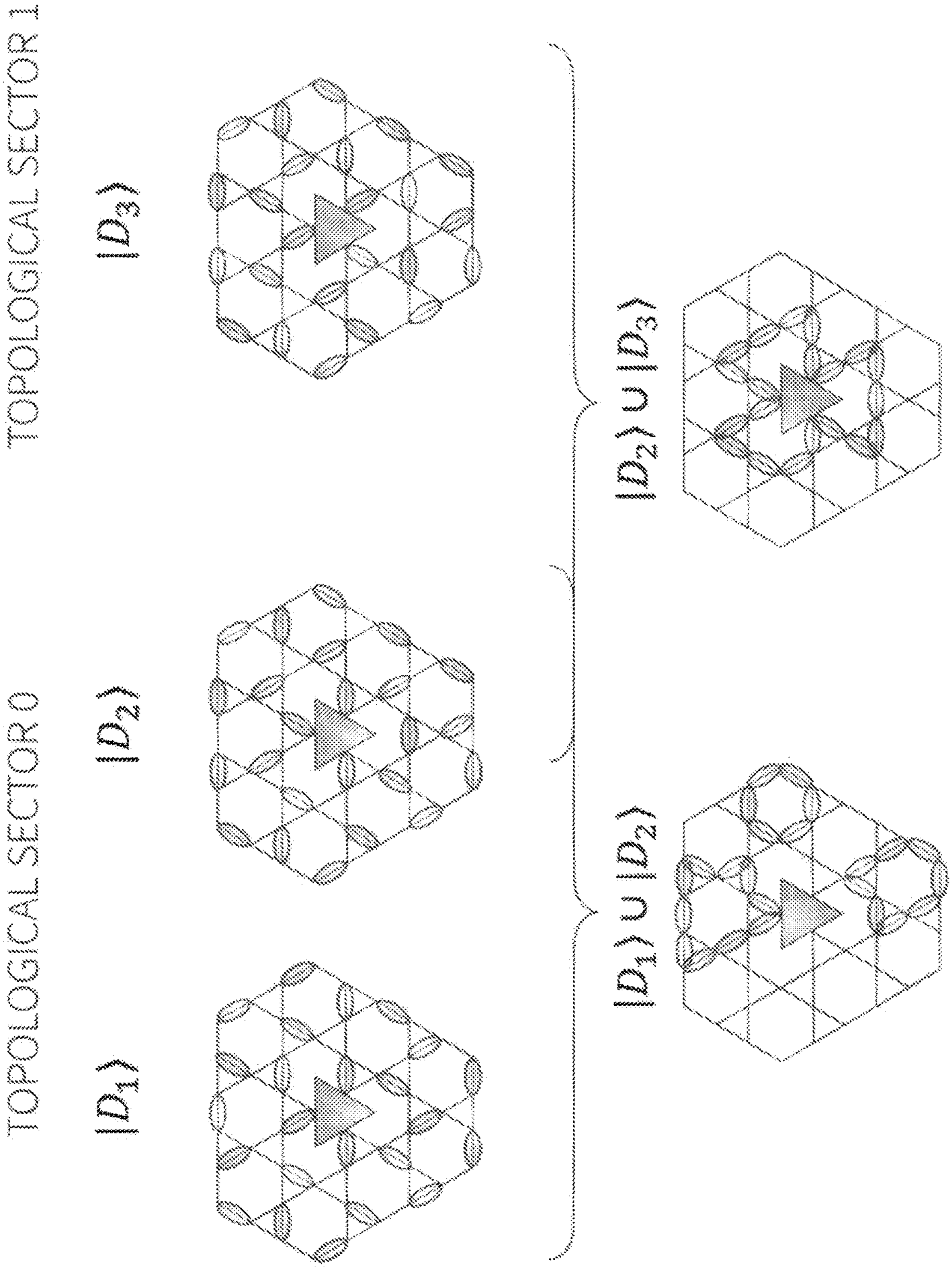
FIG. 57 illustrates distinction between topological sectors according to embodiments of the present disclosure.
Figure 58A:
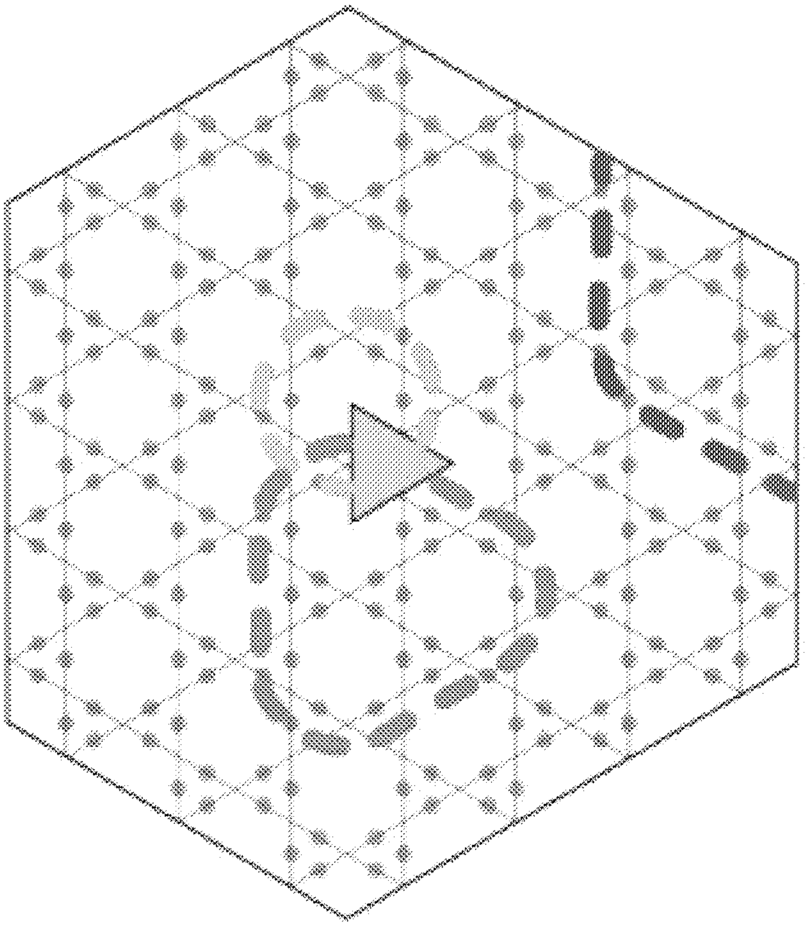
FIG. 58A-F illustrates boundary-to-boundary string operators according to embodiments of the present disclosure.
Figure 58B:
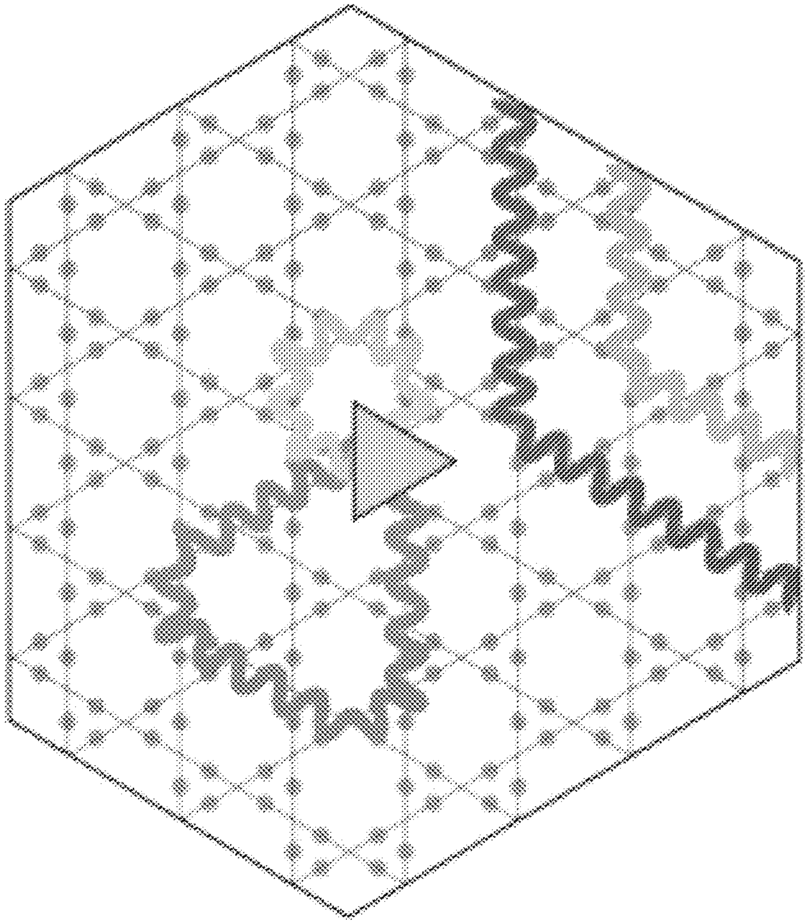
Figure 58C:
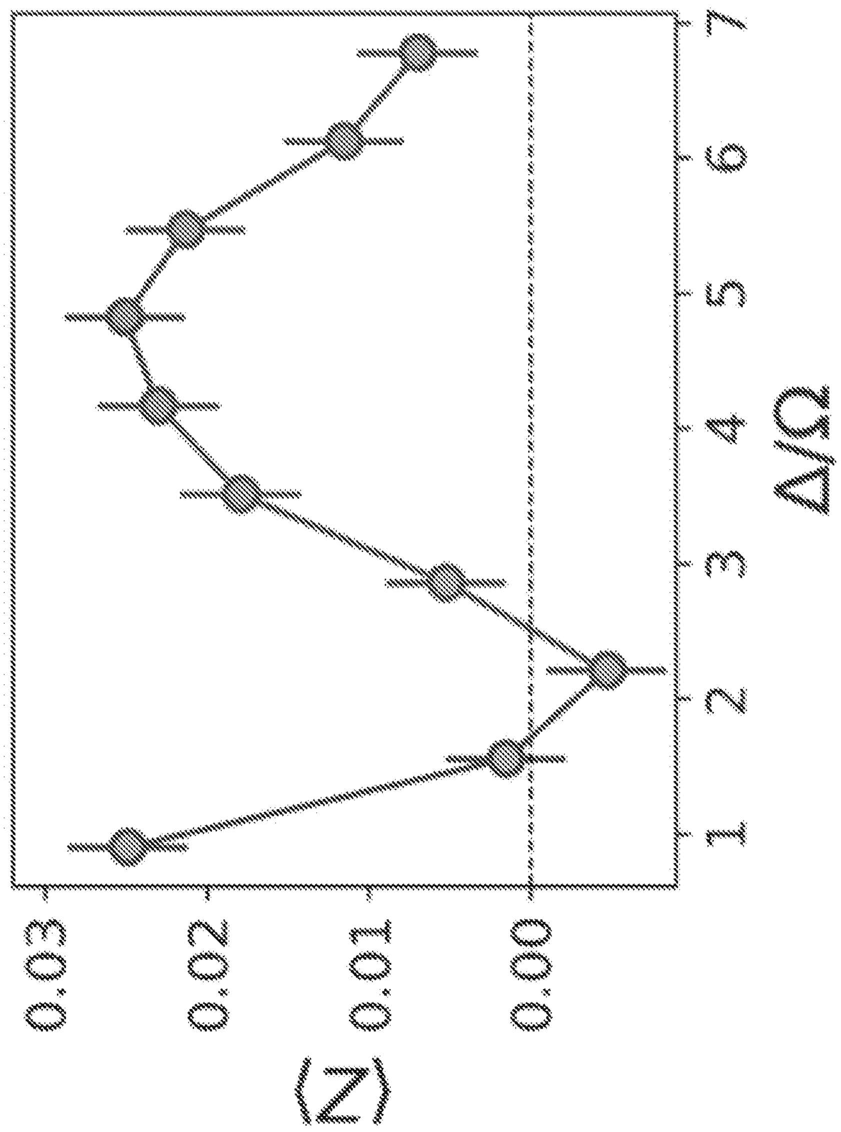
Figure 58D:
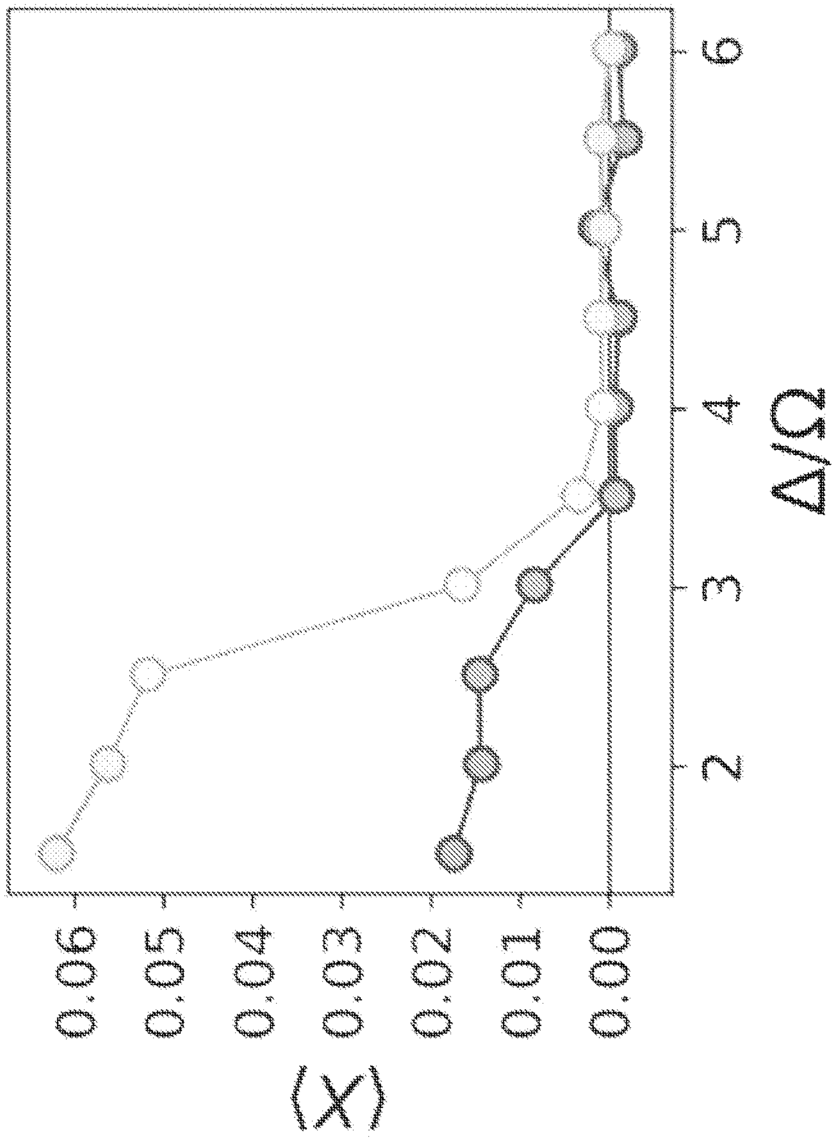
Figure 58E:
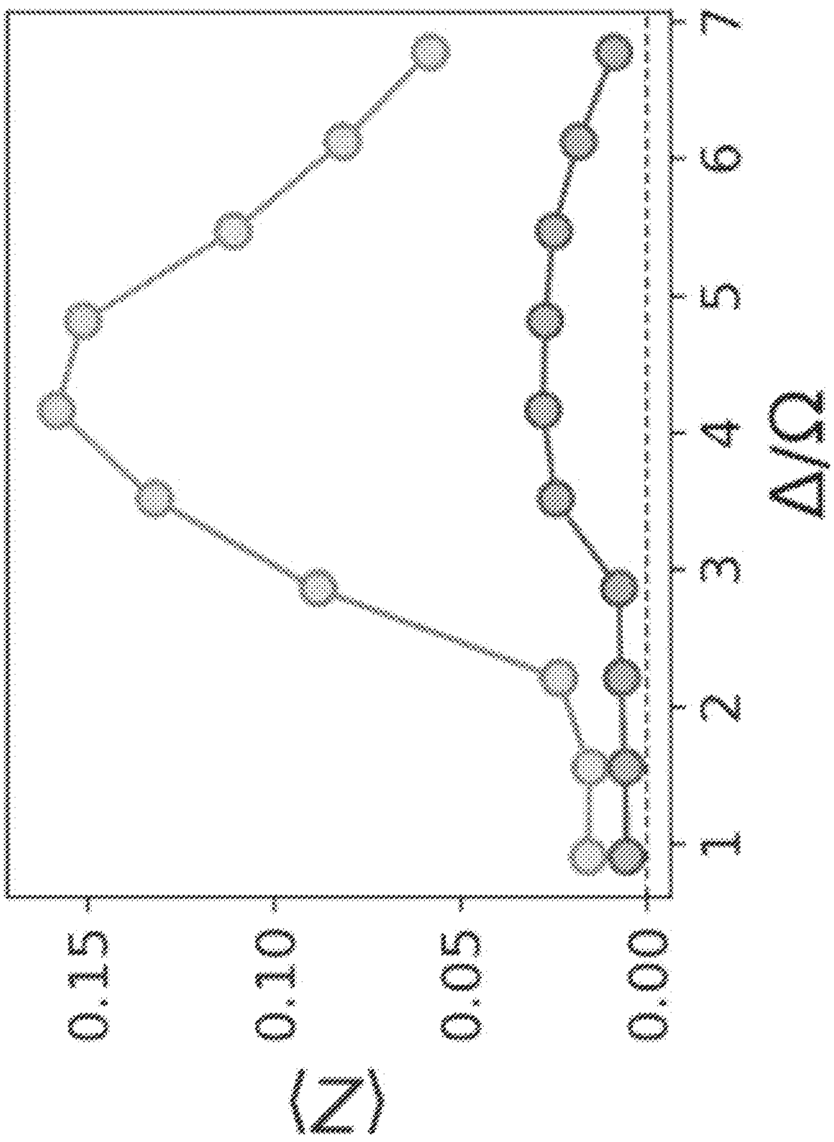
Figure 58F:
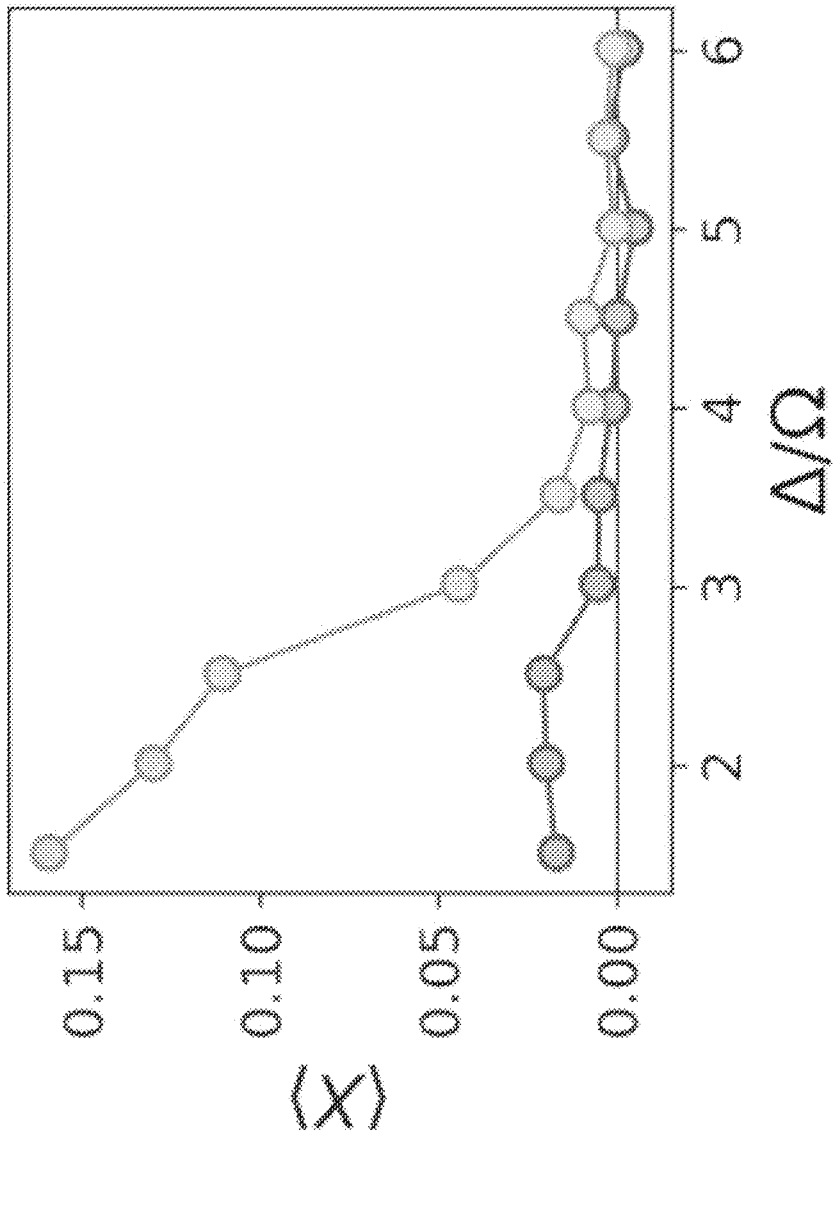

Towards a topological qubit. To further explore the topological properties of the spin liquid state, we create an atom array with a small hole by removing three atoms on a central triangle, which creates an effective inner boundary (FIG. 46). This results in two distinct topological sectors for the dimer coverings, where states belonging to different sectors can be transformed into each other only via large X loops which enclose the hole, constituting a highly nonlocal process (involving at least a 16-atom resonance) (FIG. 57). We define the logical states $|0_L\rangle$ and $|1_L\rangle$ as the superpositions of all dimer coverings from the topological sectors 0 and 1, respectively. One can define the logical operator $$\sigma_L^z$$

as proportional to any $Z_L$ string operator that connects the hole with the outer boundary, since these have a well-defined eigenvalue±1 for all dimer states in the same sector but opposite for the two sectors. The logical $$\sigma_L^x$$

is instead proportional to $X_L$, which is any X loop around the hole. This operator anticommutes with $Z_L$ and has eigenstates $|+\rangle\sim(|0_L\rangle+|1_L\rangle)/\sqrt{2}$ and $|-\rangle\sim(|0_L\rangle-|1_L\rangle)/\sqrt{2}$.

We measure $Z_L$ and $X_L$ on the strings defined in the inset of FIG. 46B, following the same quasi-adiabatic preparation as in FIG. 42D. We find that in the range of $$\frac{\delta}{\Omega}$$

associated with the onset of a QSL phase, $\langle Z_L \rangle=0$, and $\langle X_L \rangle>0$, indicating that the system is in a superposition of the two topological sectors, with a finite overlap with the $|\pm\rangle$ state (FIG. 46B). To further support this conclusion, we evaluate correlations $\langle Z_1 Z_2 \rangle$ between hole-to-boundary strings, which are expected to have the same expectation values for both topological sectors (FIG. 46A). In agreement with this prediction, we find that the correlations between different pairs of strings have finite expectation values, with amplitudes decreasing with the distance between the strings (FIG. 46C) due to imperfect state preparation. These measurements represent the first steps towards initialization and measurement of a topological qubit.

Discussion and outlook. Noting that it is not possible to classically simulate quantum dynamics for the full experimental system, we compare our results with several theoretical approaches. We first note that our observations qualitatively disagree with the ground state phase diagram obtained from density-matrix-renormalization-group (DMRG) simulations on infinitely-long cylinders. For the largest accessible system sizes, including van der Waals interactions only up to intermediate distances (~4a), we find a $\mathbb{Z}_2$ spin liquid in the ground state. However, unlike in deformed lattices, longer-range couplings destabilize the spin liquid in the ground state of the Hamiltonian (Equation 20) on the specific ruby lattice used in the experiment, leading to a direct first-order transition from the disordered phase to the VBS phase. In contrast, we experimentally observe the onset of the QSL phase in a relatively large parameter range, while no signatures of a VBS phase are detected.

To develop additional insight, we perform time-dependent DMRG calculations simulating the same state preparation protocol as in the experiment on an infinitely-long cylinder with a seven-atom-long circumference. The results of these simulations are in good qualitative agreement with our experimental observations (see FIG. 63). Specifically, similar to the results in FIG. 45, we find that the region $$\frac{\Delta}{\Omega}\sim 3.5-4.5$$

hosts nonzero signals for closed Z and X loops which cannot be factorized into open strings, a characteristic fingerprint of spin liquid correlations. In addition, exact diagonalization studies of a simplified blockade model reveal how the dynamical state preparation creates an approximate equal-weight and equal-phase superposition of many dimer states, instead of the VBS ground state. We conclude that quasi-adiabatic state preparation occurring over a few microseconds is insensitive to longer-range couplings and generates states that retain the QSL character. While this phenomenon deserves further theoretical studies, these considerations point towards the creation of a novel metastable state with key characteristic properties of a quantum spin liquid.

Our experiments offer unprecedented insights into elusive topological quantum matter, and open up a number of new directions in which these studies can be extended, including: improving the robustness of the QSL by using modified lattice geometries and boundaries, as well as optimizing the state preparation to minimize quasiparticle excitations; understanding and mitigating environmental effects associated, e.g., with dephasing and spontaneous emission; optimizing string operator measurements using quasi-local transformations, potentially with the help of quantum algorithms. At the same time, hardware-efficient techniques for robust manipulation and braiding of topological qubits can be explored. Furthermore, methods for anyon trapping and annealing can be investigated, with eventual applications towards fault-tolerant quantum information processing. With improved programmability and control, a broader class of topological quantum matter and lattice gauge theories can be efficiently implemented, opening the door to their detailed exploration under controlled experimental conditions, and providing a novel route for the design of quantum materials that can supplement exactly solvable models and classical numerical methods.

Experimental System

Our experiments make use of the second generation of the atom array setup, described in Ebadi, et al., Quantum Phases of Matter on a 256-Atom Programmable Quantum Simulator (https://arxiv.org/abs/2012.12281). In our experiments, atoms are excited to Rydberg states using a two-photon excitation scheme, consisting of a 420 nm laser from the ground state $5S_{1/2}$ to the intermediate state $6P_{3/2}$, and a 1013 nm laser from the intermediate state to the Rydberg state $70S_{1/2}$.

In the present work, we tune the lasers to have a detuning of $\delta=2\pi\times-450$ MHz from the intermediate $6P_{3/2}$ state, where the 420 nm laser is red-detuned from the intermediate state. The 1013 nm laser is always applied at maximum optical power (~3 W total on the atoms), and results in a single-photon Rabi frequency $\Omega_{1013}=2\pi\times50$ MHz. The 420 nm laser power varies depending on the protocol. During the quasi-adiabatic preparation of the dimer phase, we apply the 420 nm light at low power, which reduces the two-photon Rabi frequency and therefore increases the blockade radius to the target $R_b/a=2.4$. This low power setting consists of a total of ~0.5 mW on the atoms, with a single-photon Rabi frequency $\Omega_{420}=2\pi\times25$ MHz. During the quasi-adiabatic preparation, we therefore have a two-photon Rabi frequency of $$\Omega=\frac{\Omega_{420}\Omega_{1013}}{2\delta}=2\pi\times 1.4\text{ MHz}$$

Figure 47:
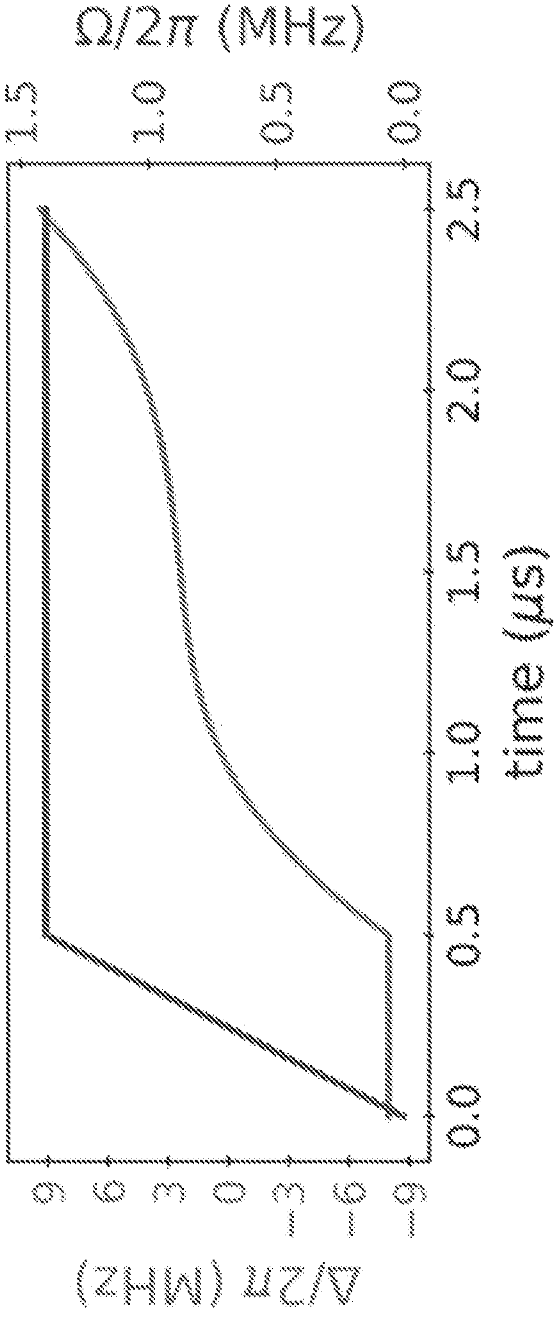
FIG. 47 illustrates quasi-adiabatic state preparation according to embodiments of the present disclosure.

(details of $\Omega(t)$ and $\Delta(t)$ used for state preparation are reported in FIG. 47). Under these conditions, we estimate the rate of off-resonant scattering from $|g\rangle$ due to the 420 nm laser to be ~1/(150 μs), and the decay rate of $|r\rangle$ to be 1/(80 μs) (including radiative decay, blackbody stimulated transitions, and off-resonant scattering from the 1013 nm laser). State detection fidelity for both ground state and Rydberg atoms is 99%.

Referring to FIG. 47, quasi-adiabatic state preparation is illustrated. $\Omega(t)$ and $\Delta(t)$ used for state preparation. To probe the phase diagram at different $\Delta$, we stop the cubic sweep at different endpoints and correspondingly turn off $\Omega$.

To measure the X operator, following the dimer phase preparation, we apply short quenches at significantly higher blue power. This high power setting consists of a maximum power of ~100 mW on the atoms, corresponding to a single-photon Rabi frequency $\Omega_{420}=2\pi x$ 360 MHz. The corresponding two-photon Rabi frequency is $\Omega=2\pi\times 20$ MHz, and $R_b/a=1.53$. In this configuration, the 420 nm laser introduces a substantially larger light shift on the Rydberg transition of $2\pi\times 36$ MHz. To avoid systematic offsets in the effective detuning from resonance, we separately calibrate the resonance condition at both low power and high power. The 420 nm laser amplitude is controlled using a double-pass AOM with a rise time of ~10 ns. In the ideal model for the quench, the optimal quench time would be $$\tau = \frac{4\pi}{3\Omega\sqrt{3}} = 19 \text{ ns}$$

for the high-power Rabi frequency. However, the 10 ns rise time extends the necessary quench time to the experimentally optimized ~30 ns. We note that during the rise time, the laser power is increasing to its maximum value, leading to deviations from the ideal model for the quench; this may contribute to a reduction in the measured value of X-string parities.

Throughout this work, measurements of Z and X parities are averaged over identical loops, including reflection and rotation symmetries, across the system. However, loops which touch the edge of the system are excluded to avoid boundary effects. Error bars are calculated as the standard error of the mean as $\sigma(P)/\sqrt{R}$, where R is the number of repetitions and $\sigma(P)$ is the standard deviation of the parity P, which is the average over all identical loops for each repetition.

Basis Rotation for X and Z Parity Loops

The basis rotation used to measure X parity loops is applied with a reduced blockade radius which, in the ideal limit, removes interactions between separate triangles while maintaining a hard blockade constraint on Rydberg excitations within single triangles. The rotation can therefore be understood by its action on individual fully-blockaded triangles.

The Hilbert space for each triangle is four-dimensional, allowing for either zero Rydberg excitations, or one Rydberg excitation on any of the three links. Taking

as the basis states, the Hamiltonian for the quench in the limit of perfect intra-triangle blockade is described by the following matrix:

$$H = \frac{\Omega}{2}\begin{pmatrix} 0 & -i & -i & -i \\ i & 0 & 0 & 0 \\ i & 0 & 0 & 0 \\ i & 0 & 0 & 0 \end{pmatrix} \quad \text{Equation 21}$$

The basis rotation shown in FIG. 44C, which relates X and Z parity under evolution through this quench Hamiltonian Equation 21, which may be proven by direct computation. Here we provide an alternative derivation. Firstly, we note that the Z operator acting on the upper two edges of a triangle ()

and the X operator acting on the lower edge of a triangle (), defined in FIGS. 43,44, are given by:

 $= \begin{pmatrix} 1 & 0 & 0 & 0 \\ 0 & 1 & 0 & 0 \\ 0 & 0 & -1 & 0 \\ 0 & 0 & 0 & -1 \end{pmatrix}$ Equation 22

 $= \begin{pmatrix} 0 & -1 & 0 & 0 \\ -1 & 0 & 0 & 0 \\ 0 & 0 & 0 & 1 \\ 0 & 0 & 1 & 0 \end{pmatrix}$ Equation 23

The X and Z parity operators can be mutually diagonalized by changing to an appropriate symmetrized basis:

| Basis state | | | |  |  |
|---|---|---|---|---|---|
| \|0> = |  | + |  | +1 | −1 |
| \|1> = |  | + |  | −1 | +1 |
| \|2> = |  | − |  | +1 | +1 |
| \|3> = |  | − |  | −1 | −1 |

In this basis, the quench Hamiltonian Equation 21 is expressed as:

$$H = \frac{\Omega}{2}\begin{pmatrix} 0 & i & -i & 0 \\ -i & 0 & -i & 0 \\ i & i & 0 & 0 \\ 0 & 0 & 0 & 0 \end{pmatrix} \quad \text{Equation 24}$$

This Hamiltonian generates cyclic permutations among the basis states $|0\rangle$, $|1\rangle$, and $|2\rangle$, while leaving $|3\rangle$ invariant. The permutation $|0\rangle\rightarrow|1\rangle\rightarrow|2\rangle\rightarrow|0\rangle$ maps the  eigenvalue to the  eigenvalue for each initial state. Moreover, the invariant state $|3\rangle$ has both  =  =−1, so it automatically satisfies the target eigenvalue mapping. Thus, after an appropriate evolution time corresponding to a single cyclic permutation $$\left(\tau = \frac{4\pi}{3\sqrt{3}\,\Omega}\right),$$

all  eigenvalues have been mapped to  eigenvalues, which is diagonal in the measurement basis. Formally, this can be expressed as:

Equation 25

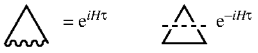

We further note that this relationship holds also for parity operators defined on other sides of the triangle, e.g.,

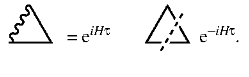

Figure 48:
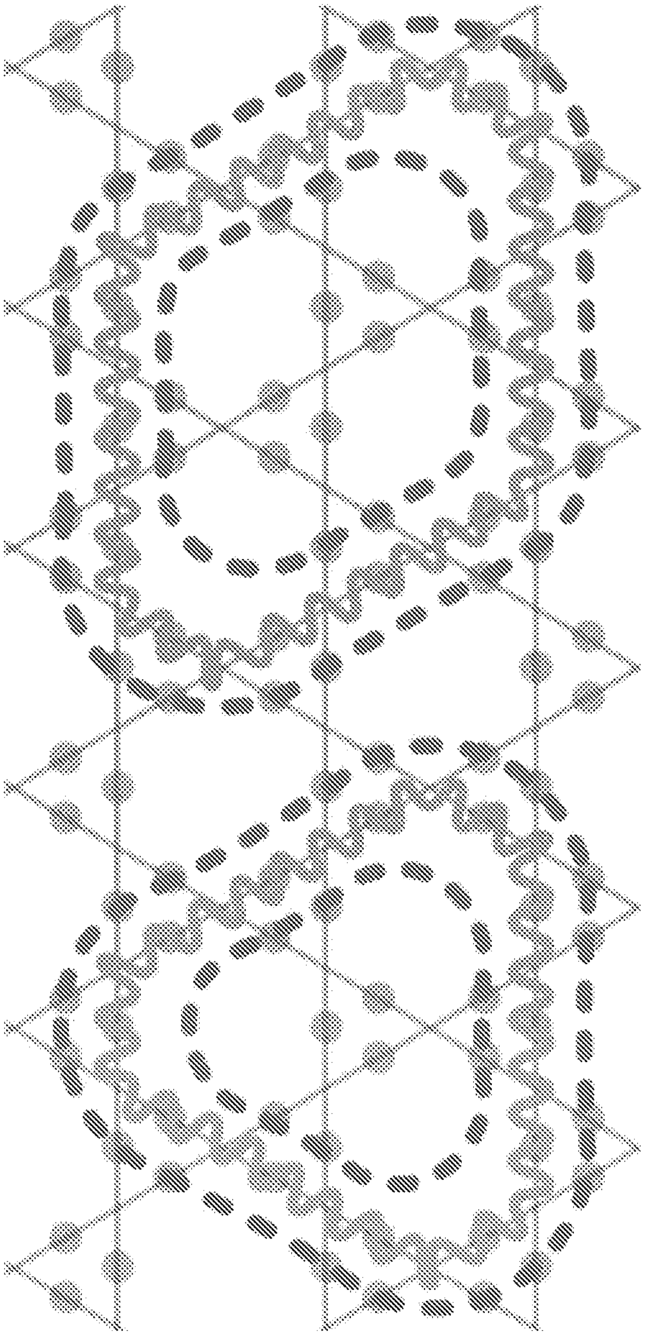
FIG. 48 illustrates dual Z and X loops according to embodiments of the present disclosure.

Large X parity strings or loops can be decomposed in terms of their action on individual triangles, and since the basis rotation acts on each triangle individually, this extends the mapping from X strings to corresponding dual Z strings in the rotated basis, as illustrated in FIG. 48.

Referring to FIG. 48, dual Z and X loops are illustrated. Examples of dual Z loops (dashed lines) to closed X loops (solid wiggly lines).

Supplemental Experimental Data

Mean Rydberg Density and Boundary Effects

Figure 49A:
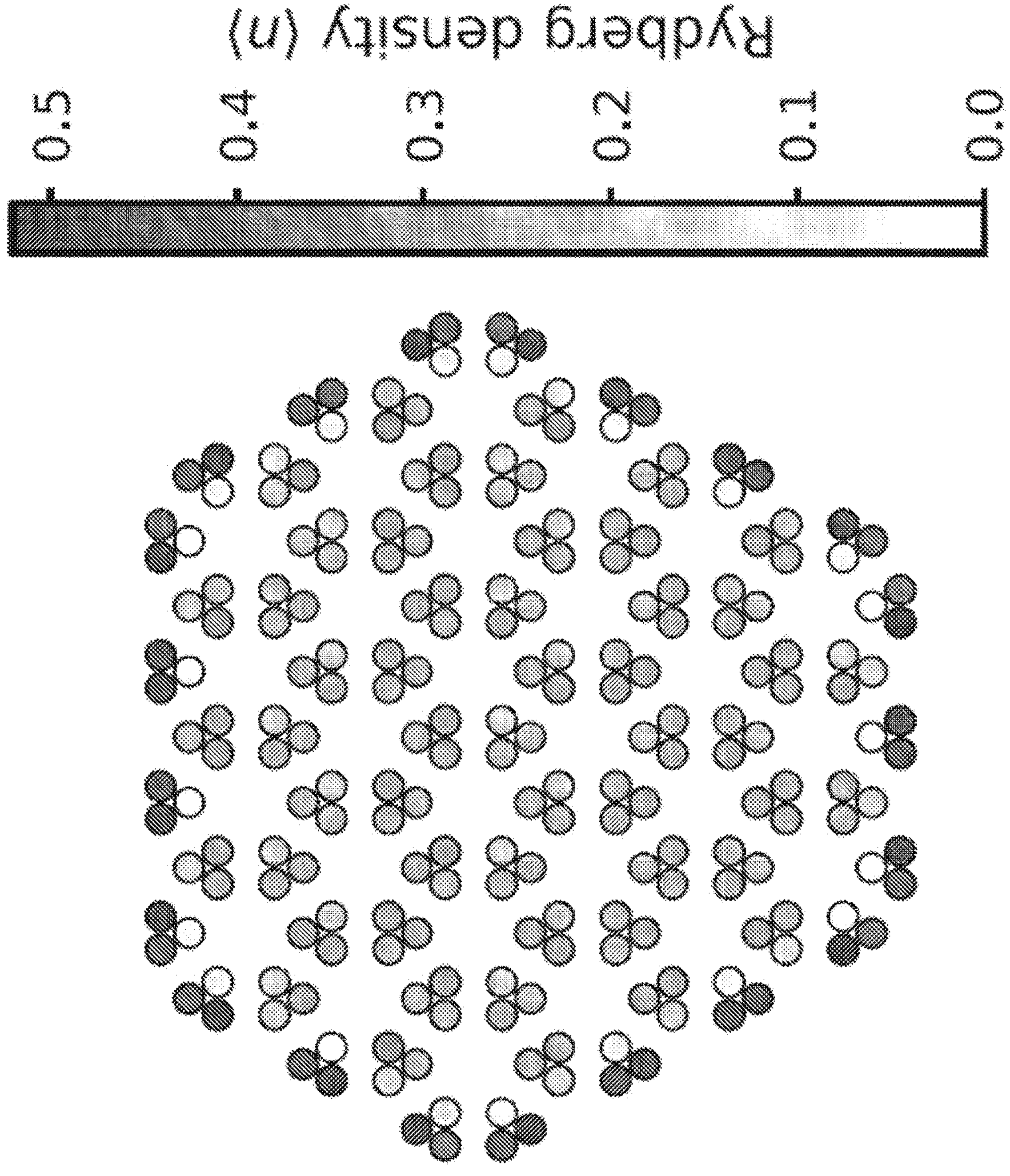
FIG. 49A-D illustrates site-by-site mean Rydberg density according to embodiments of the present disclosure.
Figure 49B:
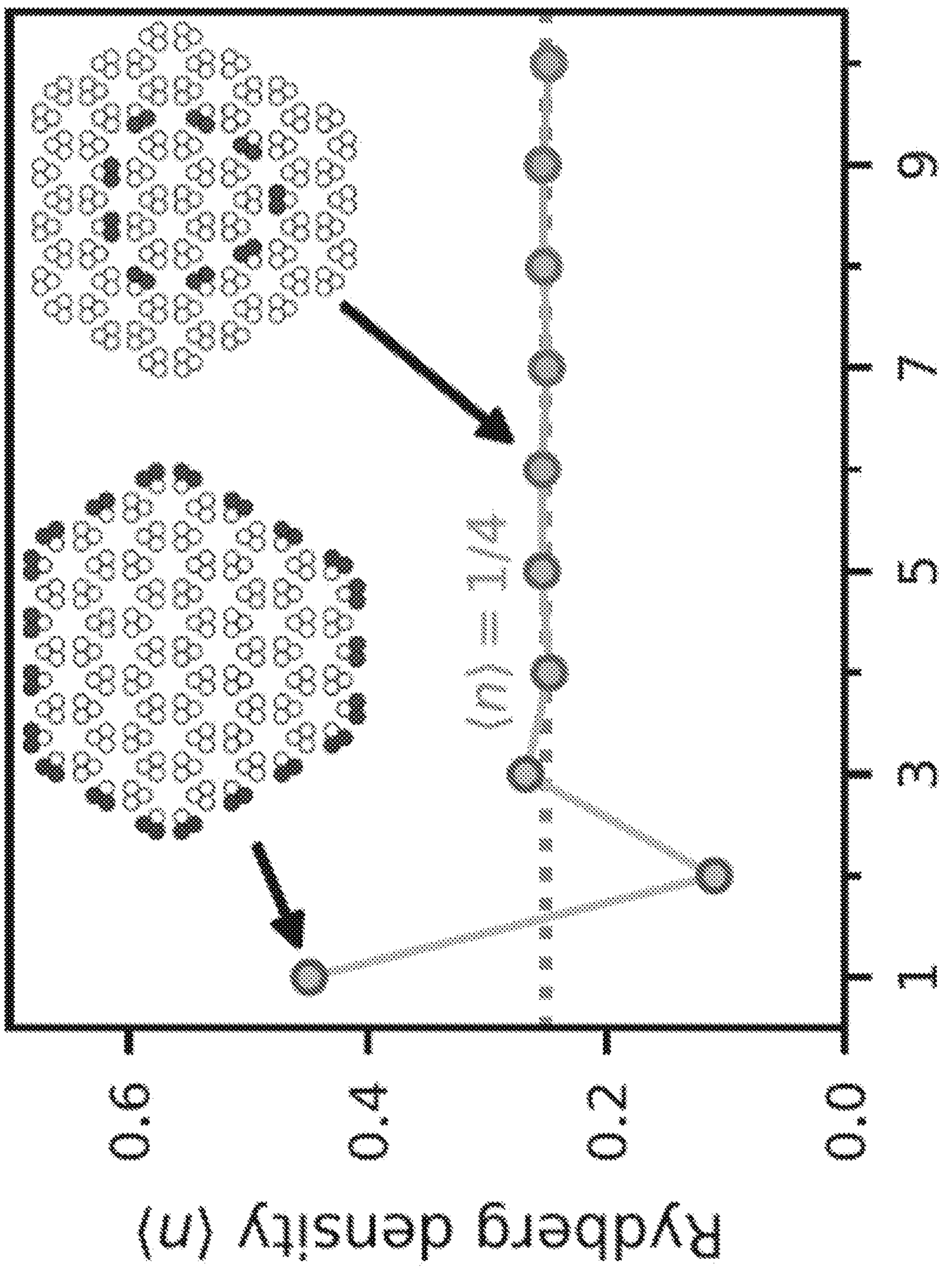
Figure 49C:
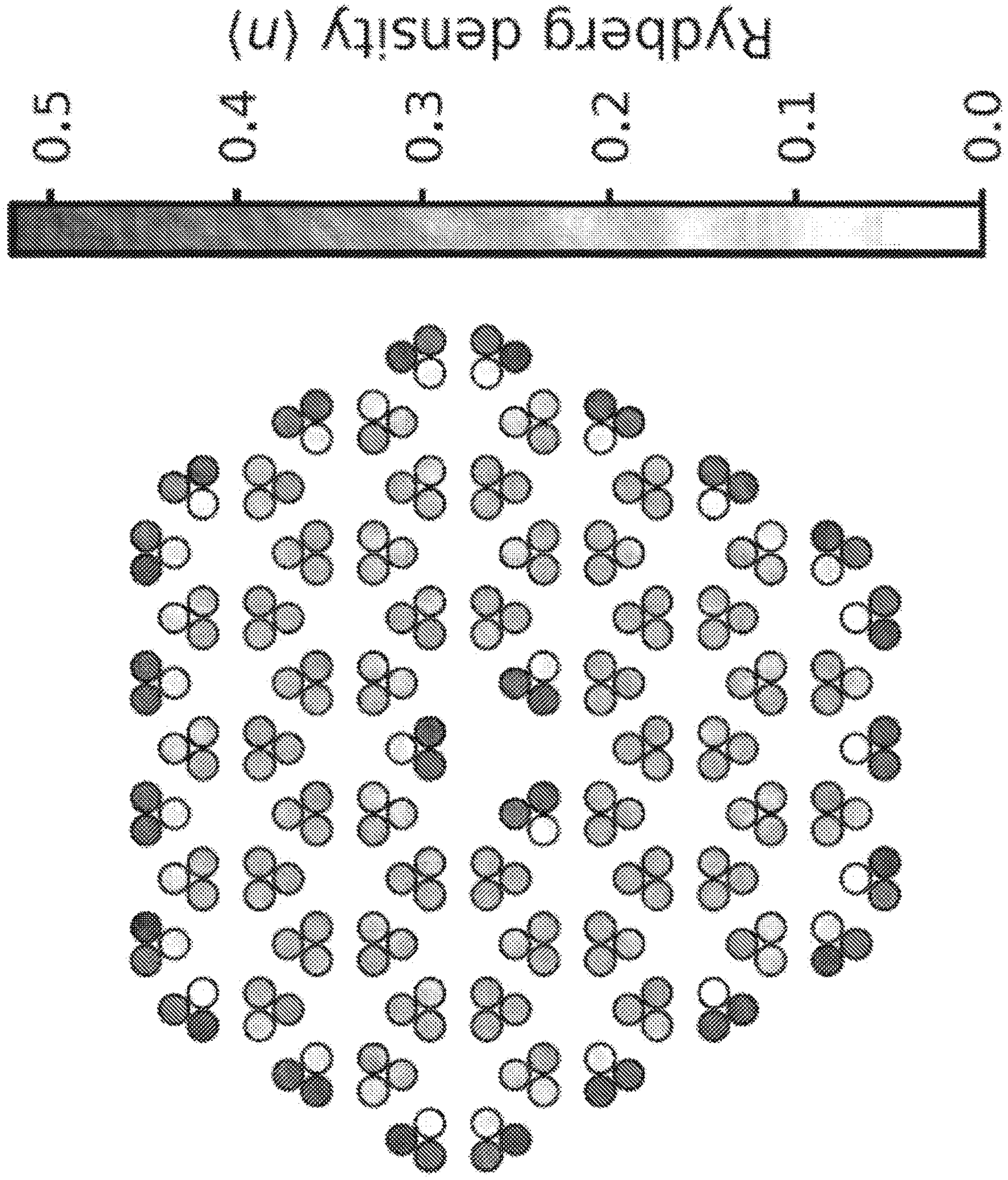
Figure 49D:
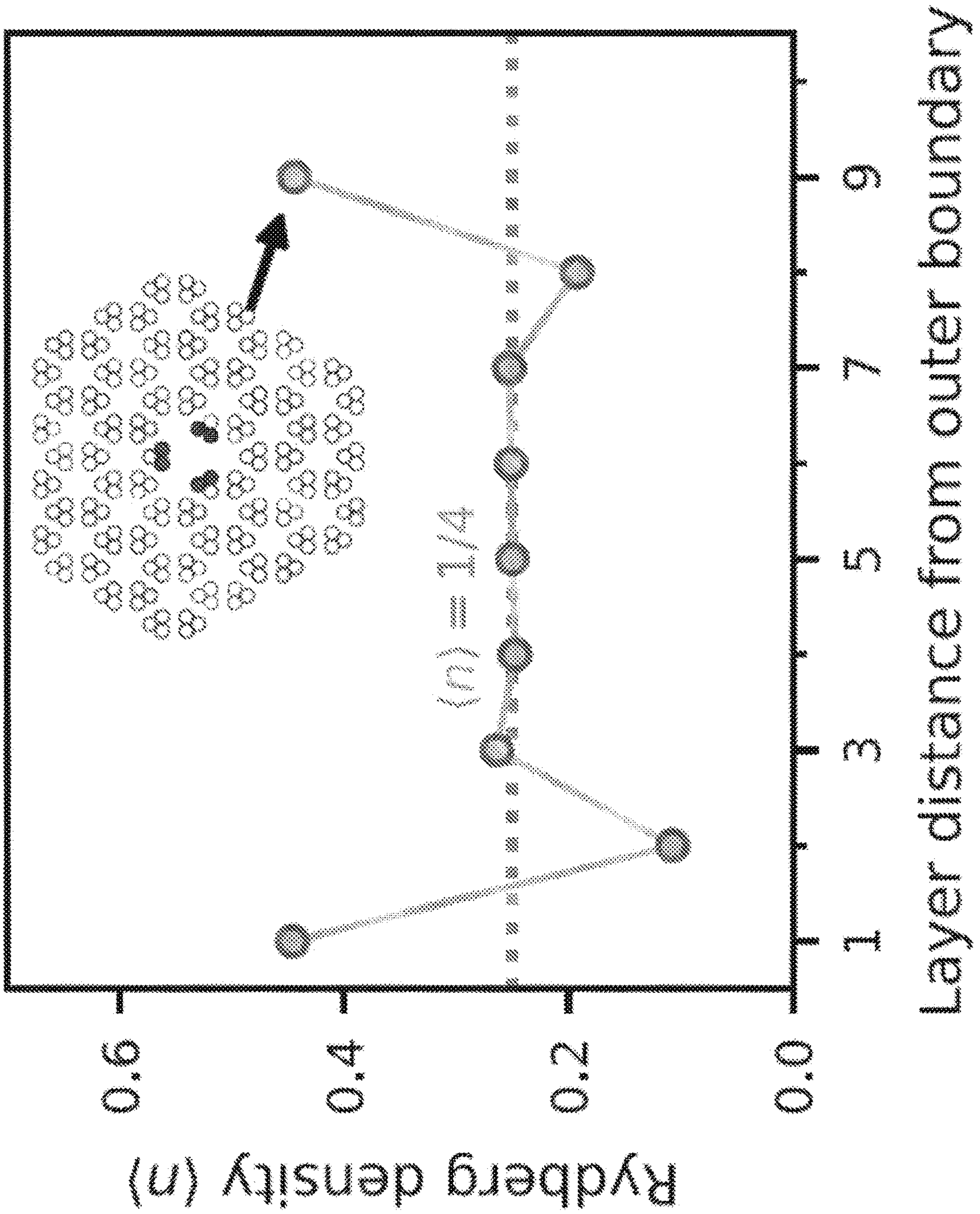

After Preparing the Dimer Phase for $$\frac{\Delta}{\Omega} \sim 4,$$

we observe a Kydberg excitation density in the bulk of $\langle n \rangle \sim 1/4$. The sites close to the boundary of the system, however, are dominated by edge effects. In FIG. 49, we show the Rydberg excitation density site-by-site, and demonstrate that the edge effects only permeate two to three layers into the bulk before the $\langle n \rangle \sim 1/4$ plateau is reached. In arrays with a topological defect, the hole forms an inner boundary and similarly induces edge effects (FIG. 49C, D). These observations allow us to determine the minimum system sizes that may be used such that the physics of the system is not dominated by boundary effects, resulting in our choice of the 219-atom arrays used in this work.

Referring to FIG. 49, site-by-site mean Rydberg density is illustrated. We measure the mean Rydberg excitation density $\langle n \rangle$ site-by-site in the dimer phase with $\Delta/\Omega=4$ for both full arrays (FIG. 49A) as well as arrays with a hole (FIG. 49C). (FIG. 49B, D) We then plot the corresponding mean density layer-by-layer as a cross-section from the edge into the bulk, showing that within the outer two to three layers, the bulk settles into the $\langle n \rangle \sim 1/4$ phase.

Lack of Spatial Order within Spin-Liquid Phase

Figure 50A:
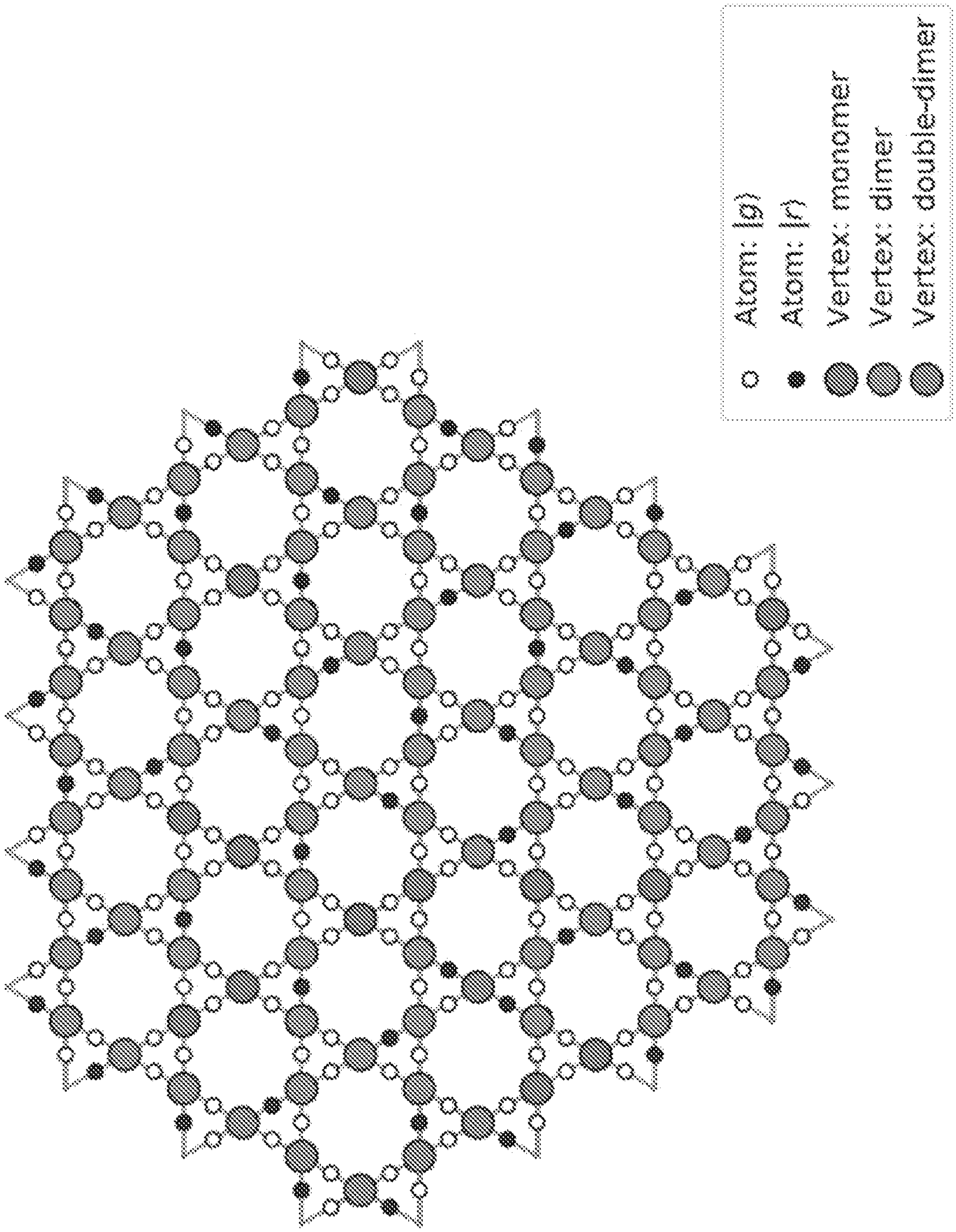
FIG. 50A-C illustrates snapshots in the dimer phase according to embodiments of the present disclosure.
Figure 50B:
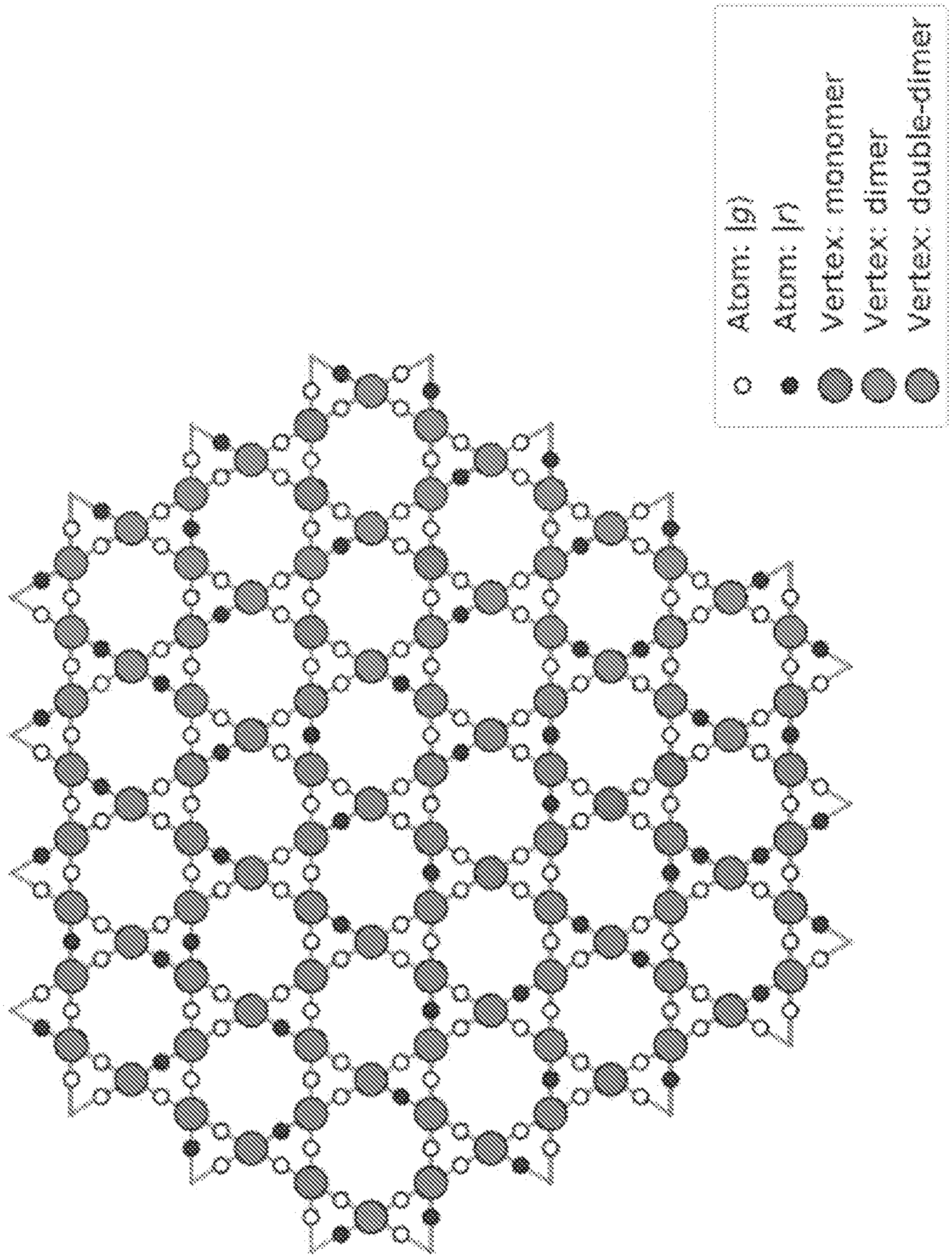
Figure 50C:
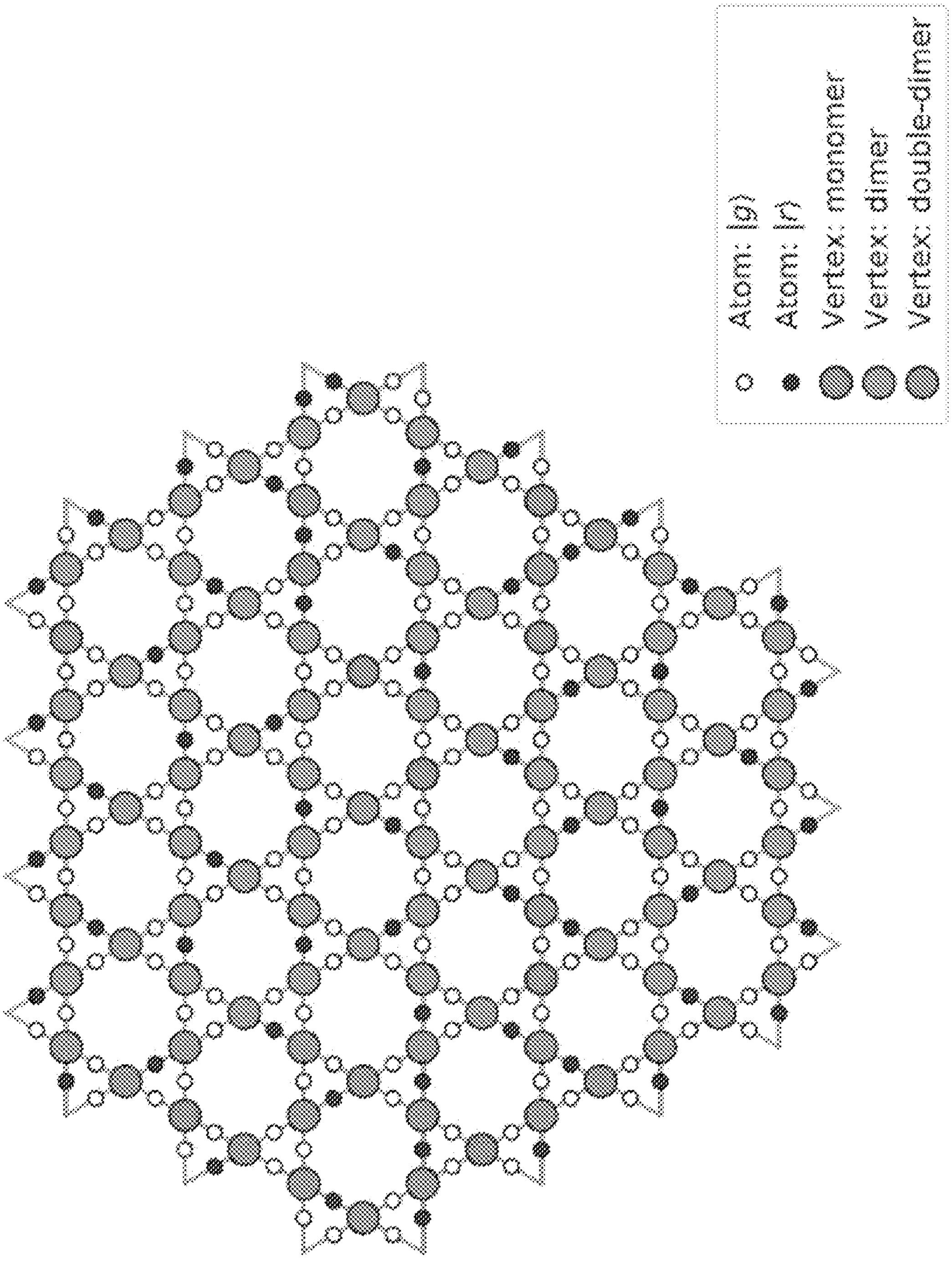

The lack of spatial order in the spin-liquid phase is a key feature that separates this phase from possible nearby solid phases. At the simplest level, spatial order can be assessed by looking at individual projective measurements of the atomic states in the ensemble. We show three examples of such snapshots in FIG. 50, where the measured states of individual atoms are represented as small circles on the links of the kagome lattice, filled or unfilled indicating a Rydberg state or a ground state, respectively. In the mapping to a monomer-dimer model, we can alternatively consider the vertices of the kagome lattice in terms of how many adjacent Rydberg excitations (dimers) are present. In practice, vertices can have zero attached dimers (so-called monomers), a single attached dimer (corresponding to an ideal dimer covering), or more attached dimers (violating the long-range blockade constraint). In FIG. 50, we additionally color each vertex according to the number of such attached dimers. The widespread abundance of vertices connected to a single dimer (FIG. 42E and snapshots from FIG. 50) signifies occupation of the dimer phase.

Referring to FIG. 50, snapshots in the dimer phase are provided. Three sample experimental realizations within the dimer phase at $$\frac{\Delta}{\Omega} = 4.3.$$

The binarized atom readout is shown by small circles on the links of the kagome lattice, with open circles denoting $|g\rangle$ and filled circles denoting $|r\rangle$. Vertices of the kagome lattice (large circles) are colored according to the number of adjacent atoms in $|r\rangle$ to visually accentuate which parts of the system are properly covered with dimers.

Referring to FIG. 51, density correlations between individual Rydberg excitations are illustrated. We directly measure the Rydberg density-density correlator $\langle n_i n_j \rangle - \langle n_i \rangle \langle n_j \rangle$ between a central atom and all other atoms in the system. We observe anticorrelations between the central atom and the other two atoms in the same triangle, as well as with atoms in the adjacent triangles, given by the choice of blockade radius Rp. Longer range correlations vanish. This data was taken at $\Delta/\Omega=4.3$.

Moreover, spatial correlations can be used to look for solid-type spatial order (FIG. 51). We measure Rydberg density-density correlations on the atomic array and find non-vanishing correlations for atoms within a single triangle or between adjacent triangles, with vanishing correlations over longer distances. This observation confirms the lack of spatial order in the dimer phase we prepare.

Phase Dependence of Quench

The quench which induces the basis rotation for measuring X parity is implemented by rapidly switching the laser detuning to $\Delta_q=0$ following the preparation of the dimer phase, and simultaneously changing the phase of the laser field by $$\frac{\pi}{2}.$$

Figure 52A:
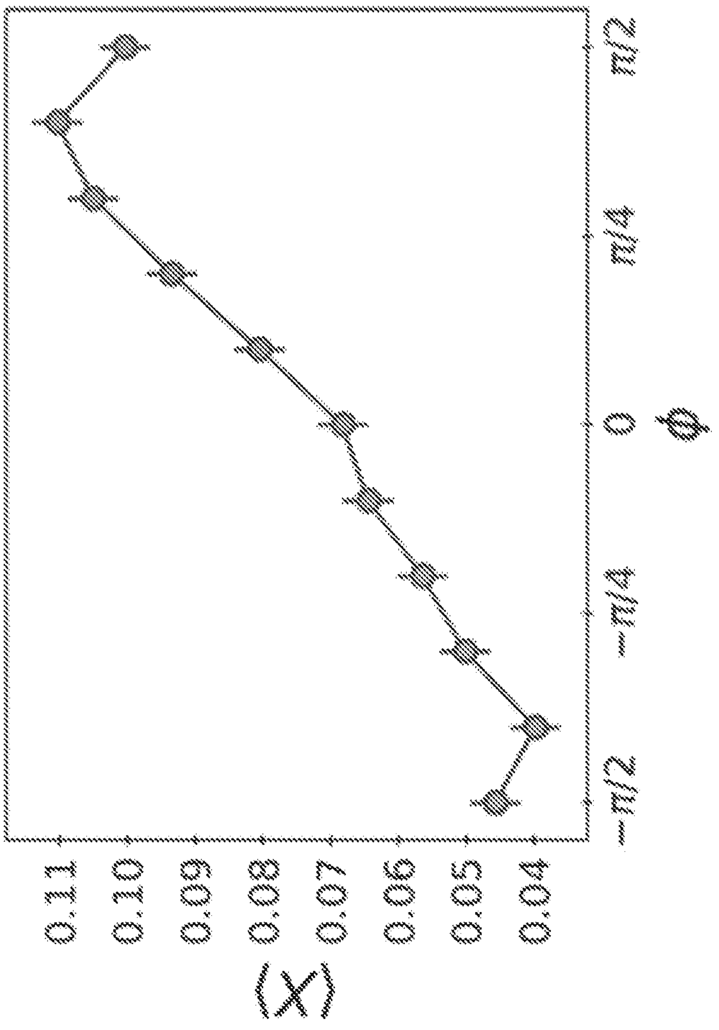
FIG. 52A-B illustrates the phase dependence of quench according to embodiments of the present disclosure.

This choice of phase approximately maximizes the X parity signal, as measured by applying the same quench duration but with variable phase (FIG. 52A).

Figure 52B:
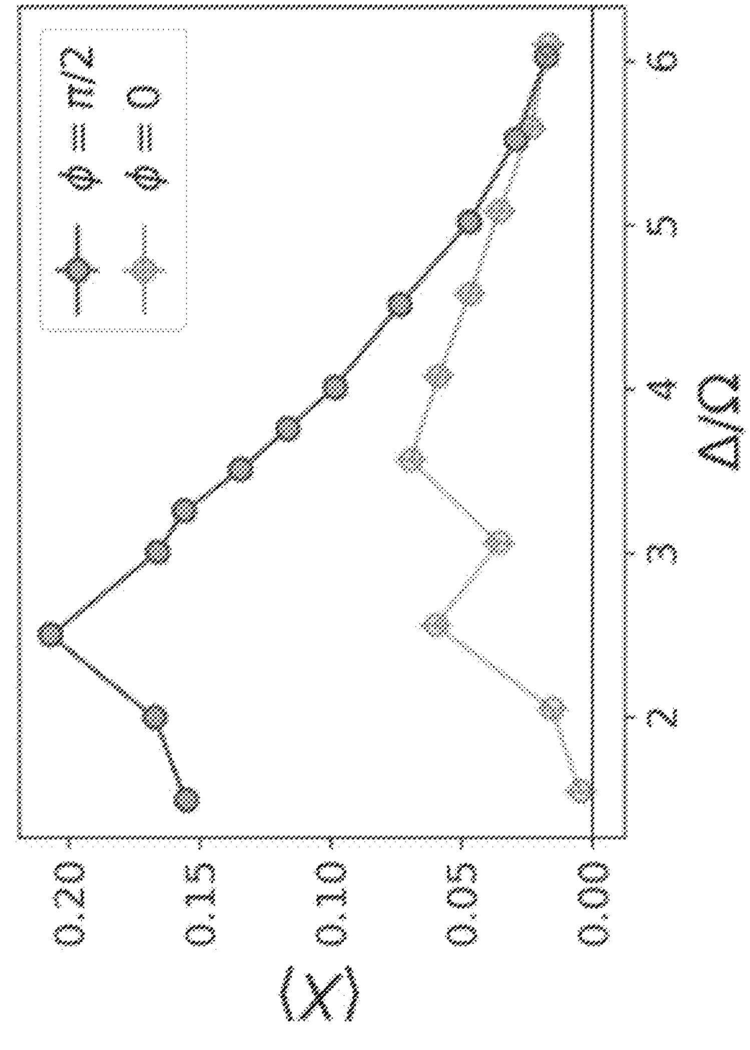

Referring to FIG. 52, the phase dependence of quench is illustrated. (FIG. 52A) After preparing the dimer phase at $\Delta/\Omega=4$, we quench for the pre-calibrated time $\tau$ with a variable quench phase and measure the resulting X loop parity around a single hexagon. (FIG. 52B) For fixed quench phase $\phi=\pi/2$ or $\phi=0$, we measure the X parity after the pre-calibrated quench time as a function of the final detuning of the cubic sweep. The data for $\phi=\pi/2$ is reproduced from FIG. 44F.

The phase change can be understood by interpreting it as evolution under $\Sigma_i n_i$ for time, followed by a fixed-phase quench. Since the quench ultimately measures coherences between different components of the wavefunction, this phase change only matters insofar as it changes the relative phases between components. We note here that coherences between perfect dimer coverings will be unchanged by the phase change, since all perfect dimer coverings have the same number of Rydberg excitations. A wavefunction which is the superposition of all perfect dimer coverings, then, would be insensitive to the choice of phase for the quench. However, in our system there is a finite density of both monomers and vertices with two attached dimers. An X loop crossing through a monomer creates a double-dimer at that vertex, and these types of component pairs are additionally included in our X parity measurements. Since the coupled states with a monomer and a double-dimer have different numbers of Rydberg excitations, these coherences are phase-sensitive. Comparing the measured X parity for $\phi=\pi/2$ and $\phi=0$ as we scan across the phase diagram (FIG. 52B), we find that the first has larger amplitude and extends more strongly into the trivial phase, consistent with the expectation from theoretical calculations.

Z Parity Measurements with Improved State Preparation

All data shown in the above discussion is taken with intermediate detuning $\delta=2\pi\times-450$ MHz for the two-photon Rydberg excitation. This choice is to enable our largest dynamic range of Rabi frequencies, which is crucial for being able to perform state preparation at low $\Omega$ and then apply the quench at large $\Omega$ with reduced blockade radius. Larger intermediate detuning would require performing state preparation at an even lower initial Rabi frequency, where we observe worse results. However, the small intermediate detuning introduces stronger decoherence due to increased spontaneous emission from the intermediate state. To supplement these results, we additionally perform state-preparation and measure Z parity at an increased intermediate detuning of $\delta=2\pi\times1$ GHz. To further optimize this state preparation, we use a larger Rabi frequency $\Omega=2\pi\times1.7$ MHz and a smaller lattice spacing a=3.7 μm, which should improve adiabaticity during the preparation. In this configuration, we indeed observe larger Z loop parities (FIG. 53), but we cannot measure corresponding X loop parities. This highlights that the large dynamical range required for the measurement of the X operator is one of the main technical challenges of this experimental work. At the same time, it shows that with more available laser power for Rydberg excitation, the quality of state preparation can be improved by working at this increased intermediate detuning and higher Rabi frequencies (and with smaller lattice spacings to achieve the same blockade radius).

Figure 53:
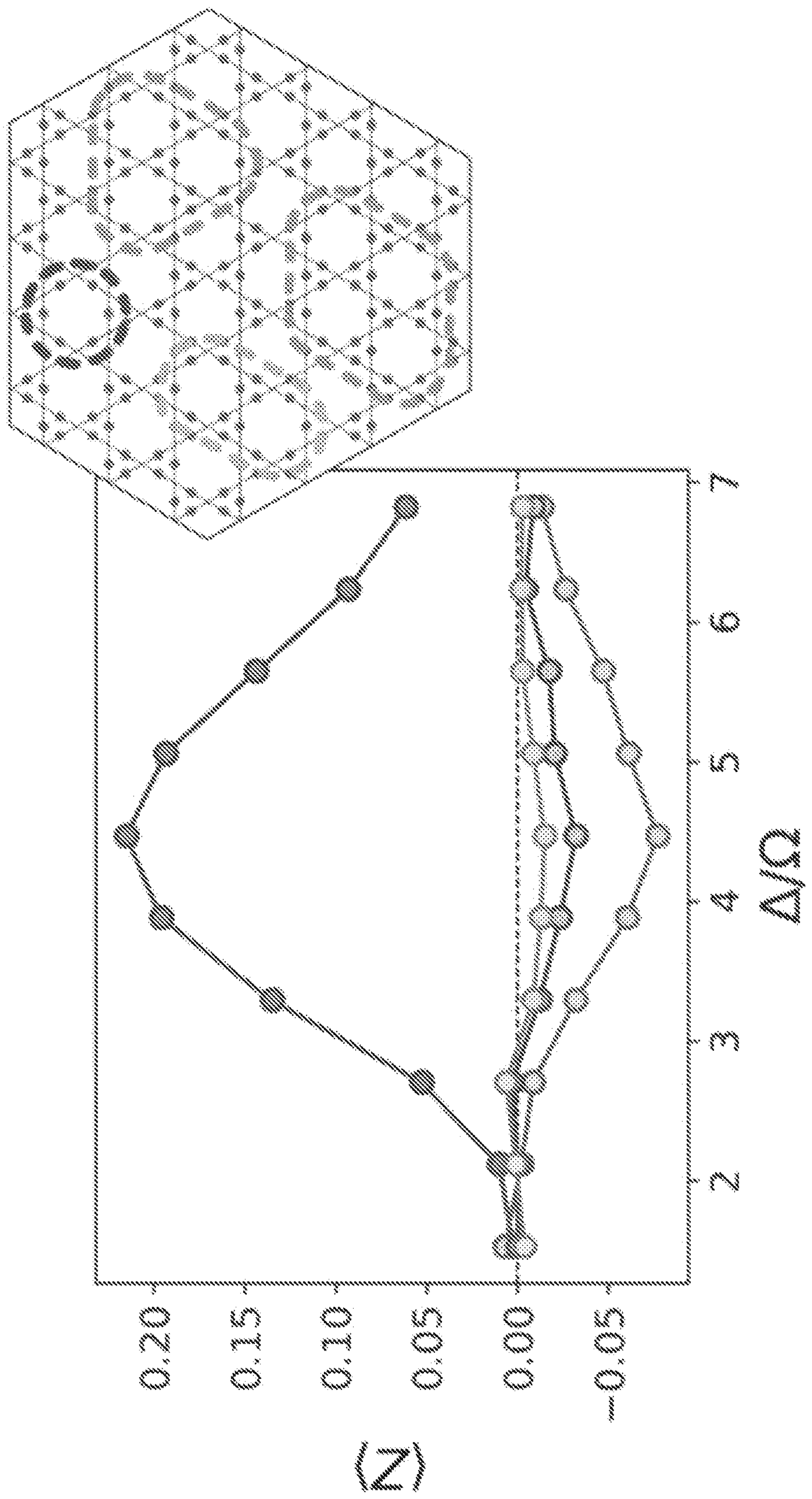
FIG. 53 illustrates Z loop parity with improved state preparation according to embodiments of the present disclosure.

Referring to FIG. 53, Z loop parity with improved state preparation is illustrated. We measure Z on closed loops with a larger intermediate state detuning for the two-photon Rydberg excitation to reduce spontaneous emission rates, and with a larger Rabi frequency during the state preparation. We observe larger parities than in the comparable FIG. 43.

Correlations Between Parity Loops

String operators are used in this work to assess long-range topological order. However, the large loops which are studied can be decomposed into the product of smaller loops around sub-regions: for example, X loops can be decomposed into the product of enclosed hexagons. To demonstrate that the parity measured on large loops is indeed indicative of long-range order, rather than emerging from the ordering of each hexagon individually, we extract correlations between the separate parity loops which comprise larger loops.

We first study parity loops which enclose adjacent hexagons of the kagome lattice. The minimal such X parity loop is exactly equal to the product of the parity around the two enclosed hexagons. The connected correlator of the parity around these two inner hexagons is Equation 26

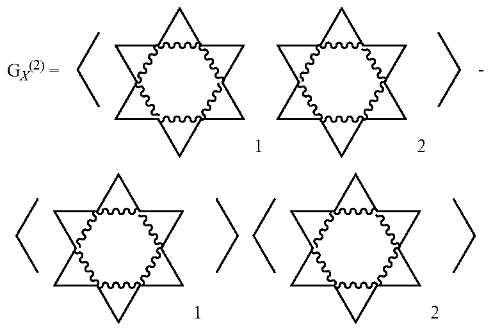

Similarly, Z loops which enclose two hexagons decompose into the product of Z parity around the two hexagons, multiplied additionally by the parity around the central interior vertex (which should always be −1 in a dimer covering). We define the analogous two-hexagon connected correlator for Z as Equation 27

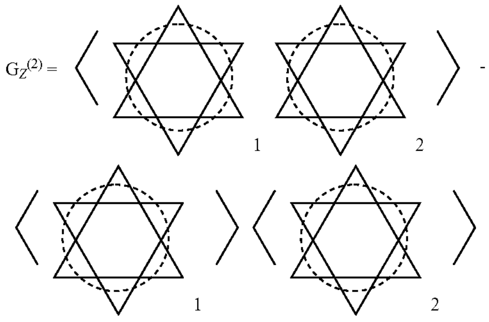

Higher-order connected correlations between three adjacent hexagons which form a triangle further highlight non-local correlations in this system. We define the connected three-point correlator which subtracts away contributions from underlying two-point correlations as Equation 28

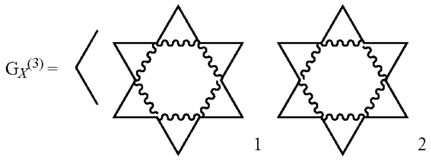

-continued

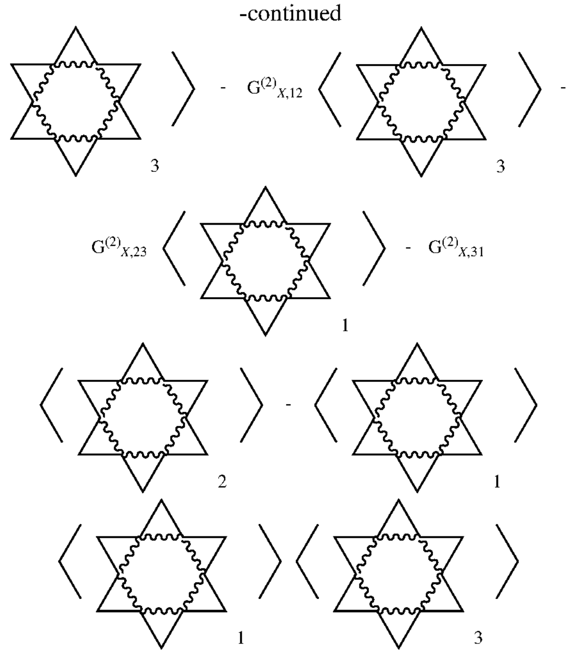

where $$G^{(2)}_{X,ij}$$

is the connected correlator for hexagons i, j. Third order connected correlators for Z parity are analogously defined.

As shown in FIG. 54, we observe nonzero two-hexagon and three-hexagon connected correlations within the dimer phase region, indicating that the parity measured on double-hexagon and triple-hexagon loops does not emerge from independently determined parity around each interior sub-region, but instead emerges due to nontrivial correlations over longer length scales.

Figure 54A:
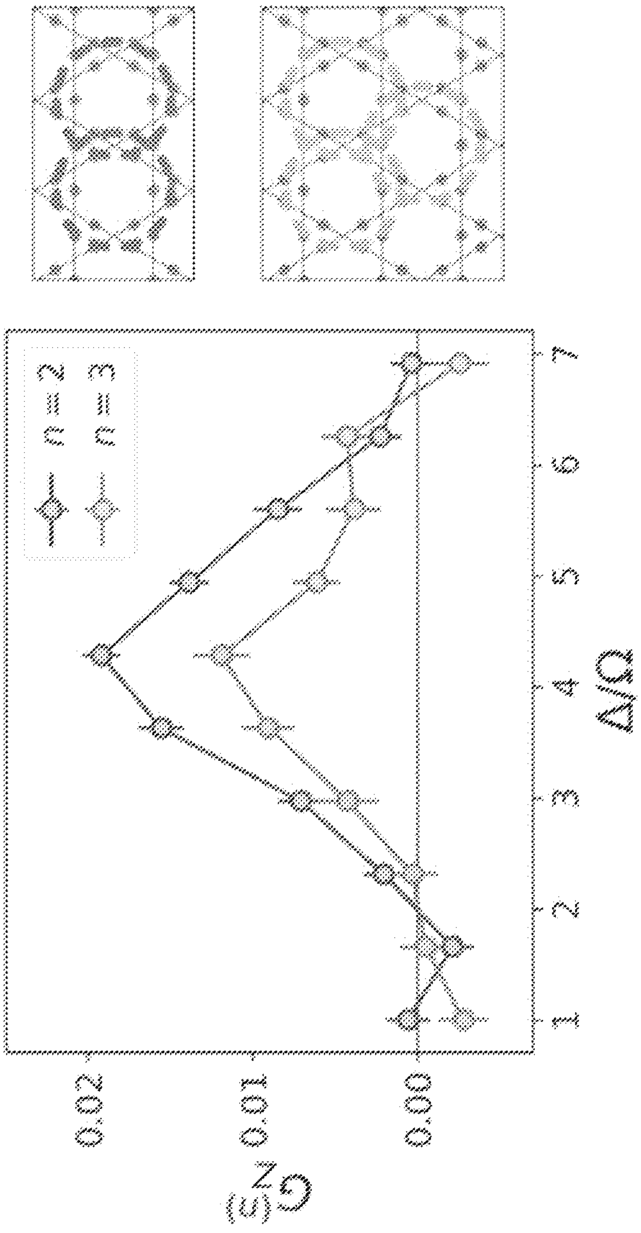
FIG. 54A-B illustrates correlations between parity loops according to embodiments of the present disclosure.
Figure 54B:
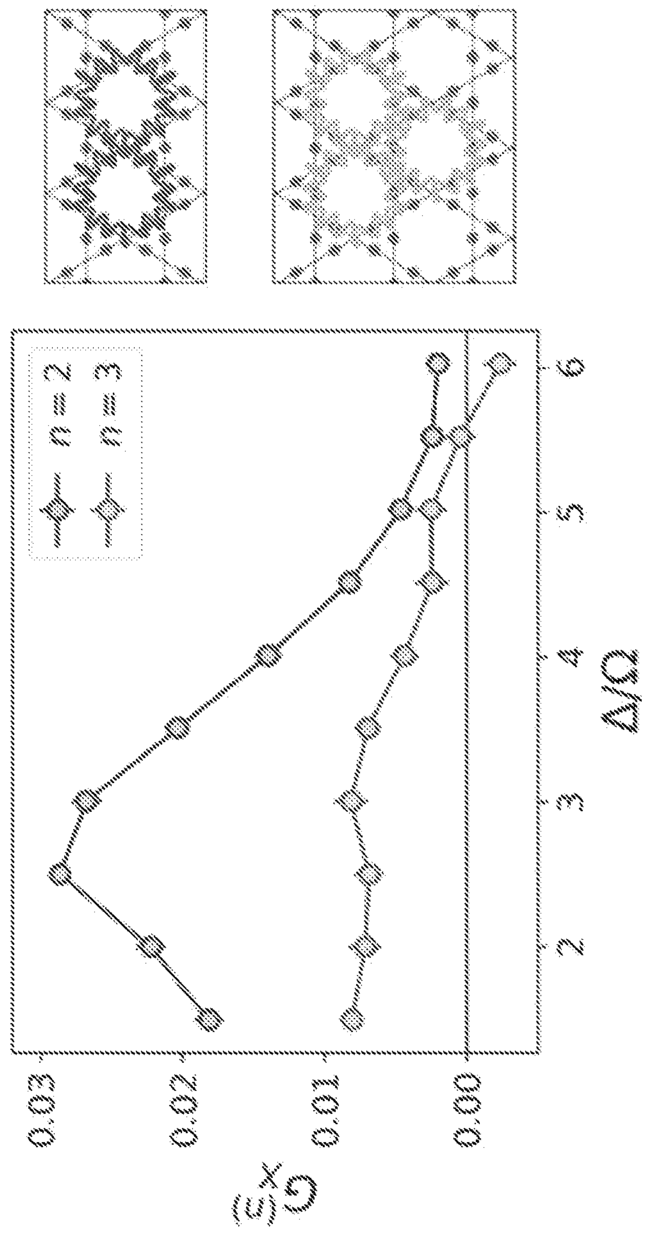

Referring to FIG. 54, correlations between parity loops are illustrated. We measure two-point and three-point connected correlations between parity around adjacent hexagons. (FIG. 54A) Z parity correlations between loops which enclose pairs and triplets of adjacent hexagons. (FIG. 54B) X parity correlations between pairs and triplets of adjacent hexagons.

Quasiparticle Excitations

Within the dimer-monomer model, quasiparticle excitations of two types are created by the application of open X and Z strings: these are the electric (e) and magnetic (m) anyons, respectively. Open X strings create monomers (or double-dimers) at their endpoints, and thus e-anyons are identified as defects in the dimer covering.

Referring to FIG. 55, magnetic anyons are illustrated. The dimer states contained in $|\psi_{QSL}\rangle$ are connected to each other by the application of X on closed loops. When an open Z string acts on the superposition, the dimer states connected by an open loop that encloses one end of the string ($X_1$) acquire opposite signs. The m-anyons generated at the endpoints of the string are then detected by X loops that enclose one of them, e.g., $\langle X_1\rangle=-1$, while $\langle X_2\rangle=+1$ is unperturbed.

Open Z strings on the other hand impart a relative phase between various dimer configurations, corresponding to m-anyons. To understand m-anyons, we first note that all dimer coverings in the QSL superposition are related to one another by the application of properly chosen closed X loops (first row of FIG. 55). An open Z string applied to the QSL state, then, results in different dimer coverings acquiring±phase factors according to the number of dimers crossed by the string. Whenever two dimer configurations are related by a closed X loop which encloses one of the endpoints of the Z string, they acquire opposite signs (FIG. 55). After the application of the open Z string, then, $\langle X\rangle$ is inverted for any closed loop around one endpoint of the Z string, analogous to how $\langle Z\rangle$ around the endpoint of an open X string (a defect) is inverted. Since open Z strings terminate in the hexagons of the kagome lattice, we associate the resulting magnetic (m) anyons as living on these hexagons, and the X parity around hexagons therefore detects the presence of m-anyon excitations.

In FIG. 56 we report the Z and X loop parities rescaled with area and perimeter law for different values of Δ in the relevant range of detunings. We observe that the excellent perimeter law scaling of X reported in FIG. 45I extends over the entire range of Δ. For Z instead we find that the initial approximate area law scaling converges towards a perimeter law for large loops.

Referring to FIG. 56, scaling of Z and X parities with the loop size is illustrated. We calculate the rescaled parities $\langle Z\rangle^{1/area}$ (FIG. 56B), $\langle Z\rangle^{1/perim}$ (FIG. 56C) and $\langle X\rangle^{1/perim}$ (FIG. 56D) for the different loop sizes in (FIG. 56A). While for the X operator we observe a very good perimeter law scaling on the entire range of detunings, for Z we observe an approximate area law scaling for small loop sizes that finally converges towards a perimeter law scaling.

We can shed light on the scaling behavior observed in the experiment by comparing it with the expected scaling from theory. Let us first note that the generic equilibrium expectation for both string operators is a perimeter law scaling. This can be seen as a consequence of the mutual statistics of e- and m-anyons: since there will be virtual fluctuations of both anyons, these will induce correlations for anyons of the other type, leading to a perimeter law. This generic expectation of a perimeter law is well-known in the (lattice) gauge theory community, and can be related to the phenomenon of string breaking. Experimentally, we observe a perimeter law for X-loops and an (approximate) area law for Z-loops (with substantial deviations for larger loop sizes). This can be understood by noting that we enter the QSL-like state from the trivial phase, which can be interpreted as a condensate of e-anyons (i.e., both closed and open X-strings give nonzero correlations): the perimeter law for closed X strings is thus already present in the trivial phase and naturally persists into the QSL-like state (while correlations for the open X-strings vanish). In contrast, the Z-correlations are absent in the trivial phase proximate to the QSL: these are only developed at the quantum critical point, and since we sweep through this at a finite rate, the Z-loop correlations are only developed over a characteristic length scale, implying an area law. Numerically, we indeed confirm that Z-loop correlations are significantly enhanced upon increasing preparation time, consistent with our observations in FIG. 53. We note that this imperfect generation of Z-loop correlations can be equivalently interpreted as generating a density of e-anyon excitations. Dynamically inducing the onset of a QSL and possible metastable states are rich phenomena which deserve further detailed study.

To clarify this further, we note that the monomers (and double-dimers) visible in the experimental snapshots need not to directly correspond to physical excitations, since the ground state will have so-called 'virtual' fluctuations when it is not in an idealized fixed-point state. These can be interpreted as correlated e-anyons. In contrast, in an ideal $\mathbb{Z}_2$ spin liquid, physical e-anyons will be uncorrelated-since this is a defining property of the deconfined phase where e-anyons move independently at sufficiently large distances.

Additional Data for Arrays with Nontrivial Topology

The distinction between two distinct topological sectors can be better understood by looking at the transition graphs between pairs of dimer states. These are built by superimposing two dimer coverings and removing the overlapping dimers (FIG. 57). The dimer states belong to opposite topological sectors if the remaining dimers form an odd number of closed loops around the hole, indicating the set of non-local moves required to transform one into the other.

Referring to FIG. 57, distinction between topological sectors is illustrated. To determine if the three dimer coverings $|D_1\rangle$, $|D_2\rangle$ and $|D_3\rangle$ belong to the same or opposite topological sectors, we build the transitions graphs $|D_1\rangle \cup |D_2\rangle$ and $|D_2\rangle \cup |D_3\rangle$. In the latter we see that the dimers form a closed loop around the hole, highlighting that the two states belong to opposite sectors.

To demonstrate that the removal of three atoms at the center of the array creates an actual inner boundary, we measure the Z and X operators on strings with both endpoints on the inner or outer boundaries (FIG. 58). In the relevant range of detunings $$\left(3.3 \lesssim \frac{\Delta}{\Omega} \lesssim 4.5\right)$$

we measure a finite $\langle Z\rangle$ and a vanishing $\langle X\rangle$ in both cases, indicating that the central hole also generates an effective boundary. This also confirms that the boundaries that are naturally created in our system are of the m-type, i.e., m-anyons localize on it (hence the finite $\langle Z\rangle$).

Referring to FIG. 58, boundary-to-boundary string operators are illustrated. We measure the Z (FIG. 58A) and X (FIG. 58B) operators on open strings connecting two points on the outer (FIG. 58C, D) or inner (FIG. 58E, F) boundaries of the array. Observing the same features for both, we confirm that the small central hole does indeed create an effective inner boundary.

Numerical Studies

Below, we report on numerical studies of the Rydberg atom array. We first discuss the zero temperature equilibrium phase diagram, established using density-matrix-renormalization-group (DMRG). Next, we directly simulate the quasi-adiabatic sweep, using both exact diagonalization and dynamical DMRG calculations. To minimize boundary effects due to limitations of numerically accessible system sizes, these calculations are performed on a torus (exact diagonalization) or on an infinite cylinder (DMRG).

Ground State Phase Diagram

To a first approximation, the Hamiltonian can be described by an effective 'PXP' model $$H_{PXP} = \sum_i \left(\frac{\Omega}{2} P\sigma_i^x P - \Delta n_i\right) \quad \text{Equation 29}$$

Here, P is a projector onto $|g\rangle$ for all sites within the blockade radius $R_b$ of the site i. This model approximates the Rydberg Hamiltonian by treating all pairwise interaction energies as either infinite, if within the blockade radius, or zero if beyond. For $R_b$=2.4a, this corresponds to blockading the first three interaction distances. It may be shown that this 'blockade model' hosts a $\mathbb{Z}_2$ spin liquid for $1.5 \lesssim \Delta/\Omega \lesssim 2$.

To include the full van der Waals interactions, we incorporate $$V(r) = \Omega\left(\frac{R_b}{r}\right)^6$$

in the microscopic model within a truncation distance $R_{trunc}$ (beyond which V(r)=0), with $R_b$=2.4a. On a technical note, we replace the very strong nearest-neighbor repulsion $$\frac{V(a)}{\Omega} = \left(\frac{R_b}{a}\right)^6 \approx 191$$

by V(a)=+∞ by working in an effectively constrained model where any triangle can host at most one dimer. The DMRG simulations on cylinder geometries were performed using the Tensor Network Python (TeNPy) package developed by Johannes Hauschild and Frank Pollmann. A bond dimension $\chi$=1000 was sufficient to guarantee convergence for the systems and parameters considered.

Referring to FIG. 59, ground state phase diagram of the link-kagome model for two truncation distances are provided. All data is for the van der Waals model with blockade radius $R_b$=2.4a on an XC-8 cylinder. (FIG. 59A-C) For truncation distance $R_{trunc}=\sqrt{7}a$, we observe a spin liquid (gray shaded area) in between the trivial phase and valence bond solid (VBS). In particular, it is characterized by a large entanglement plateau (S is the entanglement entropy upon bipartitioning the cylinder and $\xi$ is the correlation length), vanishing of the BFFM string order parameters (darker lines correspond to larger strings) and nonzero loop variables ($\langle Z\rangle_{circ}$ and $\langle X\rangle_{circ}$) around the circumference—the signs of the latter label topologically degenerate ground states. (FIG. 59D-F) By increasing the truncation distance to $R_{trunc}$=6a, the intermediate spin liquid has vanished: there is now a direct first order transition from the trivial phase to a VBS.

Figure 60:
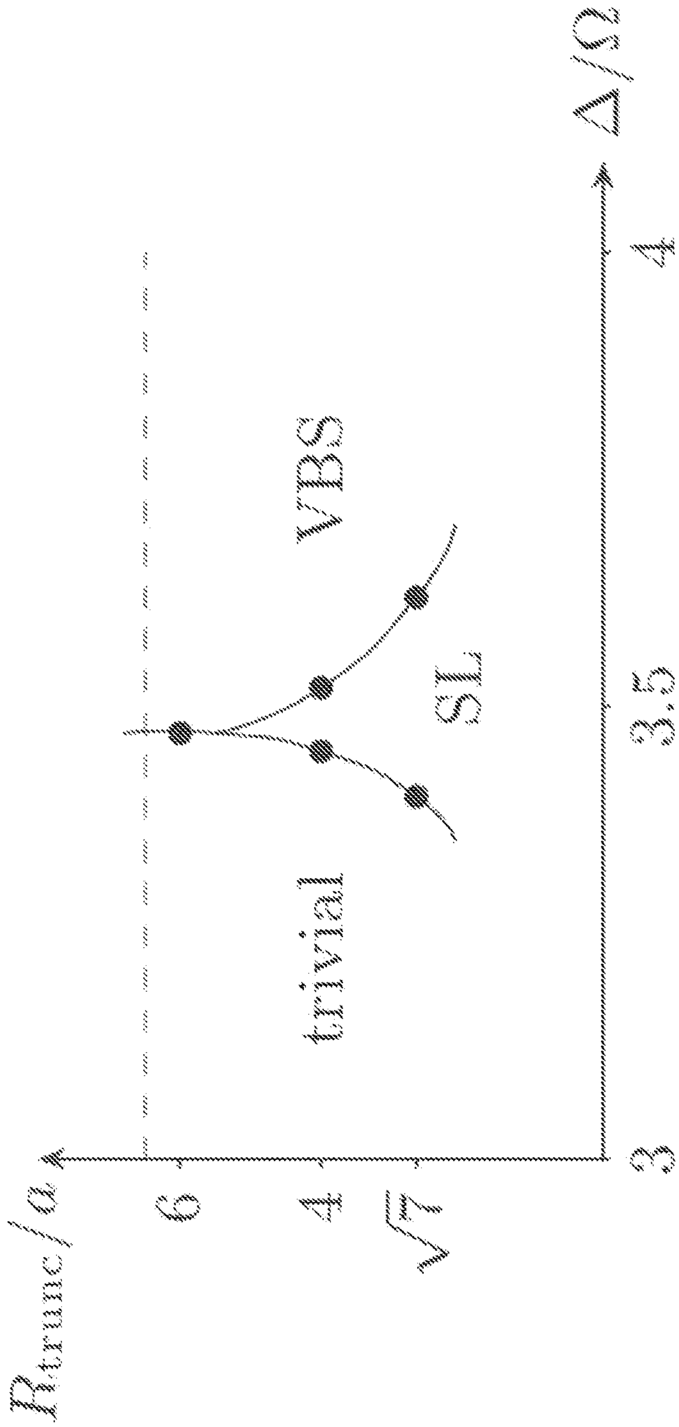
FIG. 60 is a ground state phase diagram of the link-kagome model according to embodiments of the present disclosure.

Referring to FIG. 60, a ground state phase diagram of the link-kagome model is provided. Upon including all $V(r) \sim 1/r^6$ interactions (represented by the gray dashed line), we find that there is a direct phase transition from the trivial disordered phase to a crystalline-symmetry-breaking valence bond solid (VBS). However, the model is very close to a spin liquid phase: in fact, if we truncate the interactions to a distance $R_{trunc}$, we see that a $\mathbb{Z}_2$ spin liquid can arise in the ground state phase diagram (black dots denote phase transitions obtained via DMRG on the XC-8 cylinder). It is conceivable that dynamical state preparation is not sensitive to the longer-range couplings which destabilize the spin liquid; indeed, in FIG. 62 we confirm that finite-time state preparation gives a state with properties characteristic of a spin liquid.

Figure 59A:
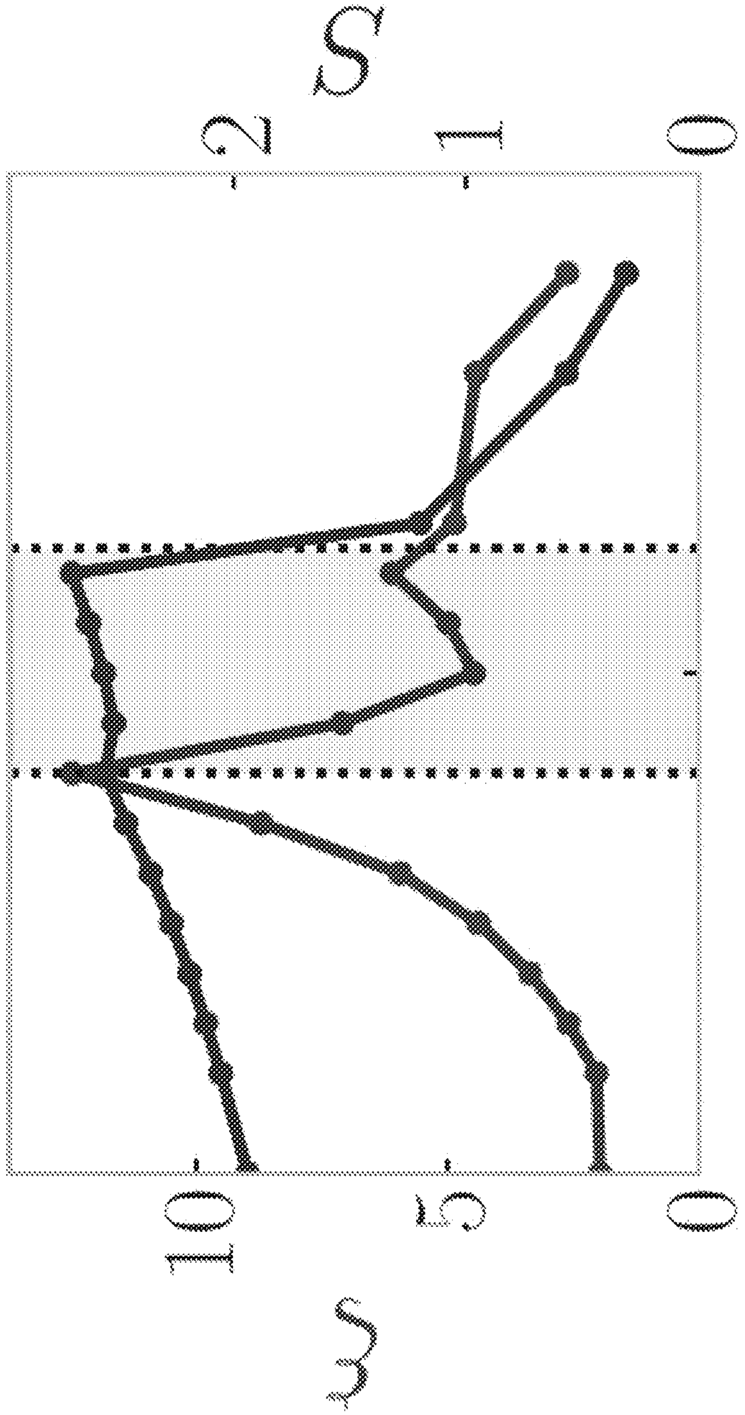
FIG. 59A-F is a ground state phase diagram of the link-kagome model for two truncation distances according to embodiments of the present disclosure.
Figure 59B:
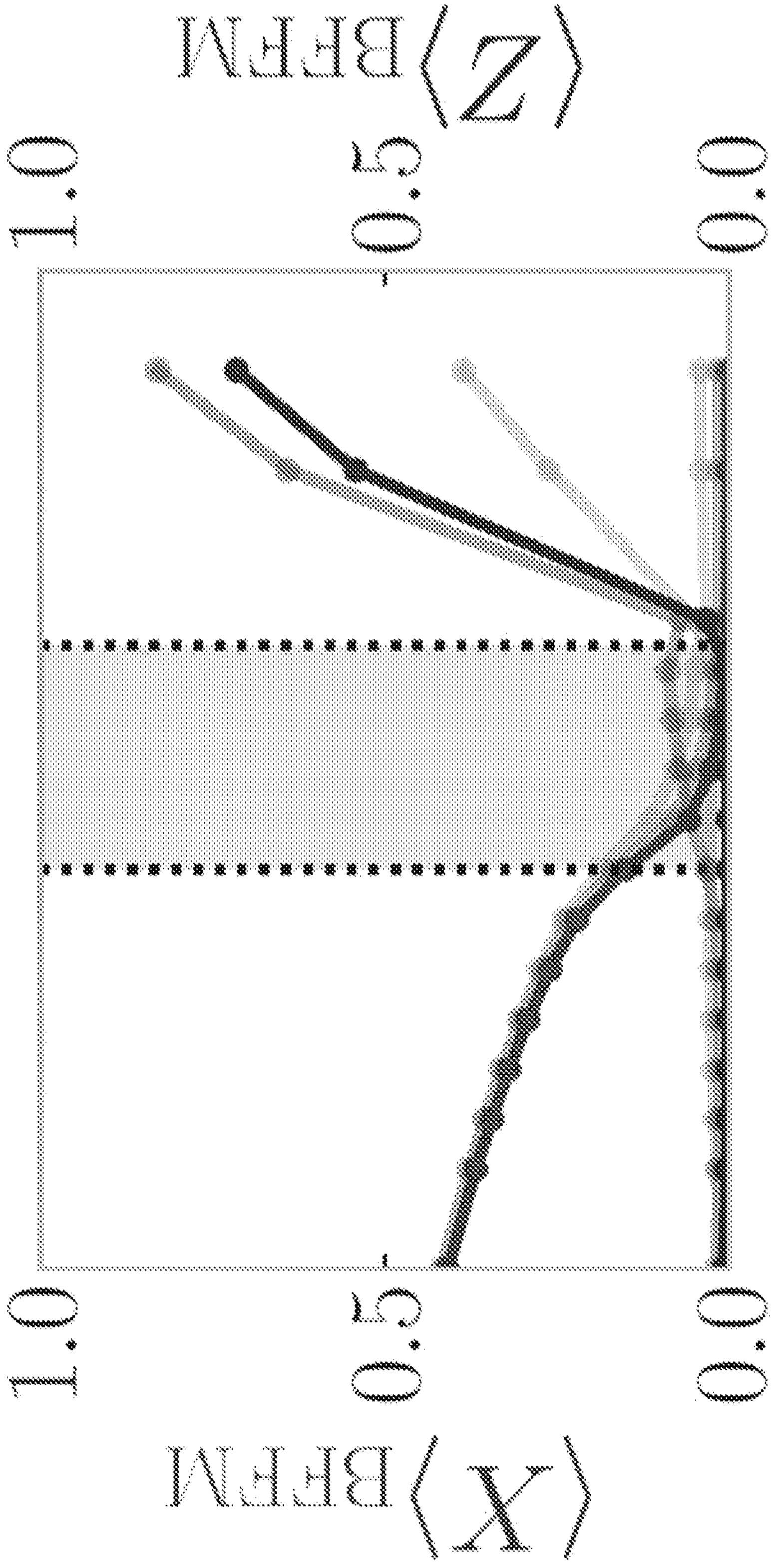
Figure 59C:
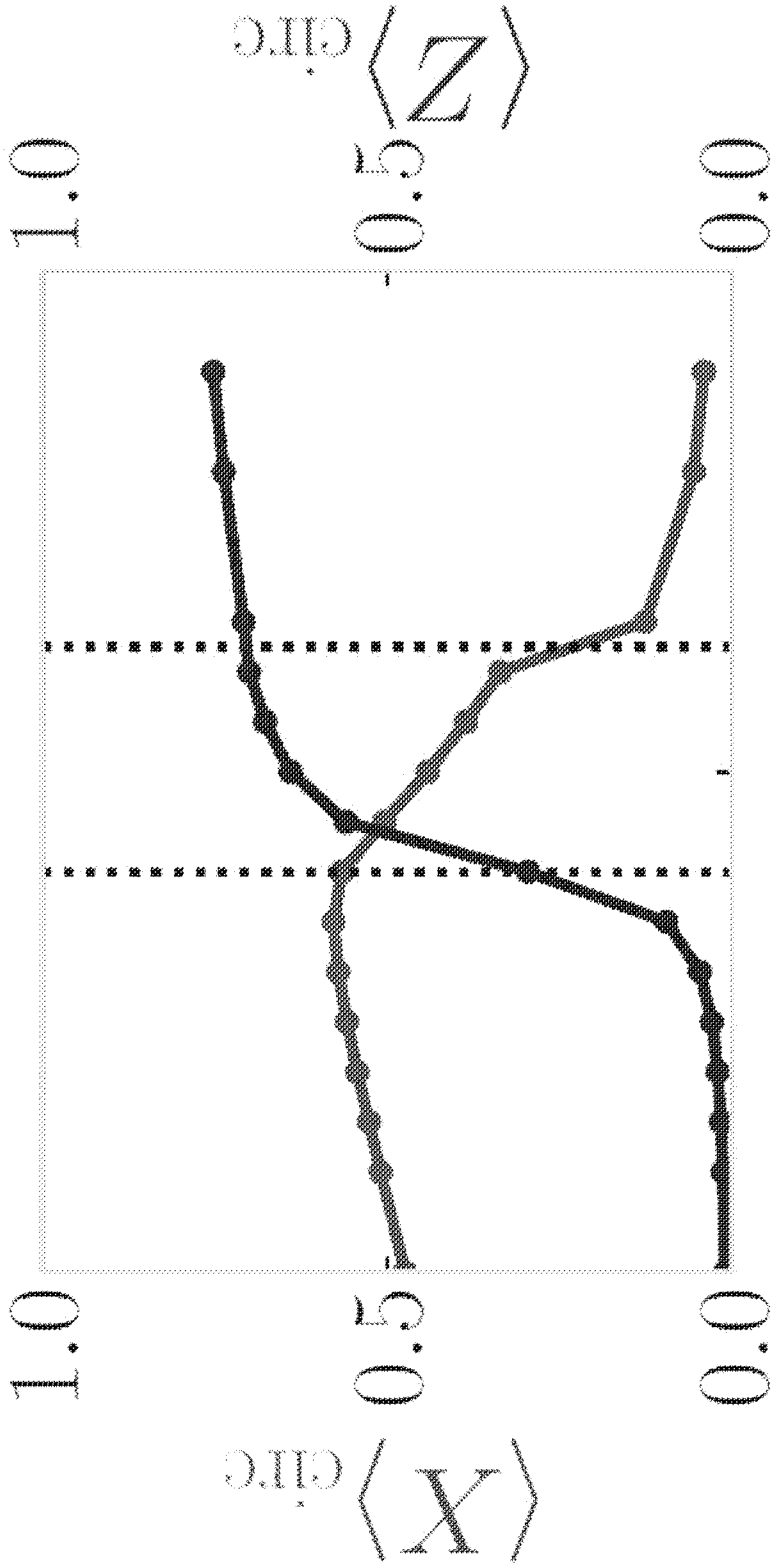

For intermediate truncation distances, we find a spin liquid in the ground state phase diagram. In particular, taking $R_{trunc}=\sqrt{7}a \approx 2.65a$, we include four nearest neighbor interactions (i.e., one more than the blockade model): every site is coupled to 10 other sites. The resulting phase diagram is shown in FIG. 59A-C). This is obtained using the DMRG method applied to an infinitely-long cylinder XC-8. The presence of a spin liquid is determined based on the behavior of the string observables, as in the experiment. Moreover, we observe topologically degenerate ground states on the cylinder.

Figure 59D:
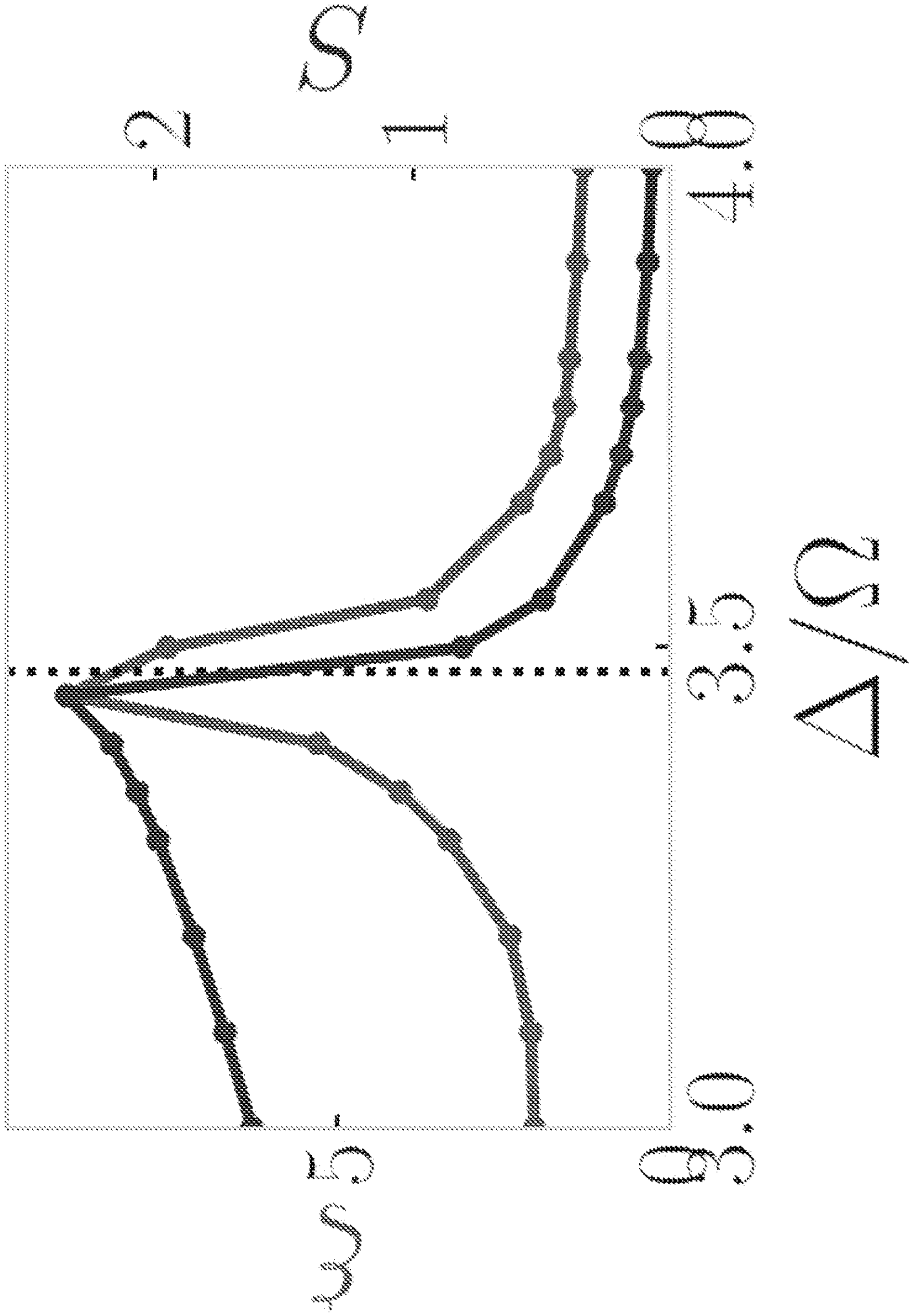
Figure 59E:
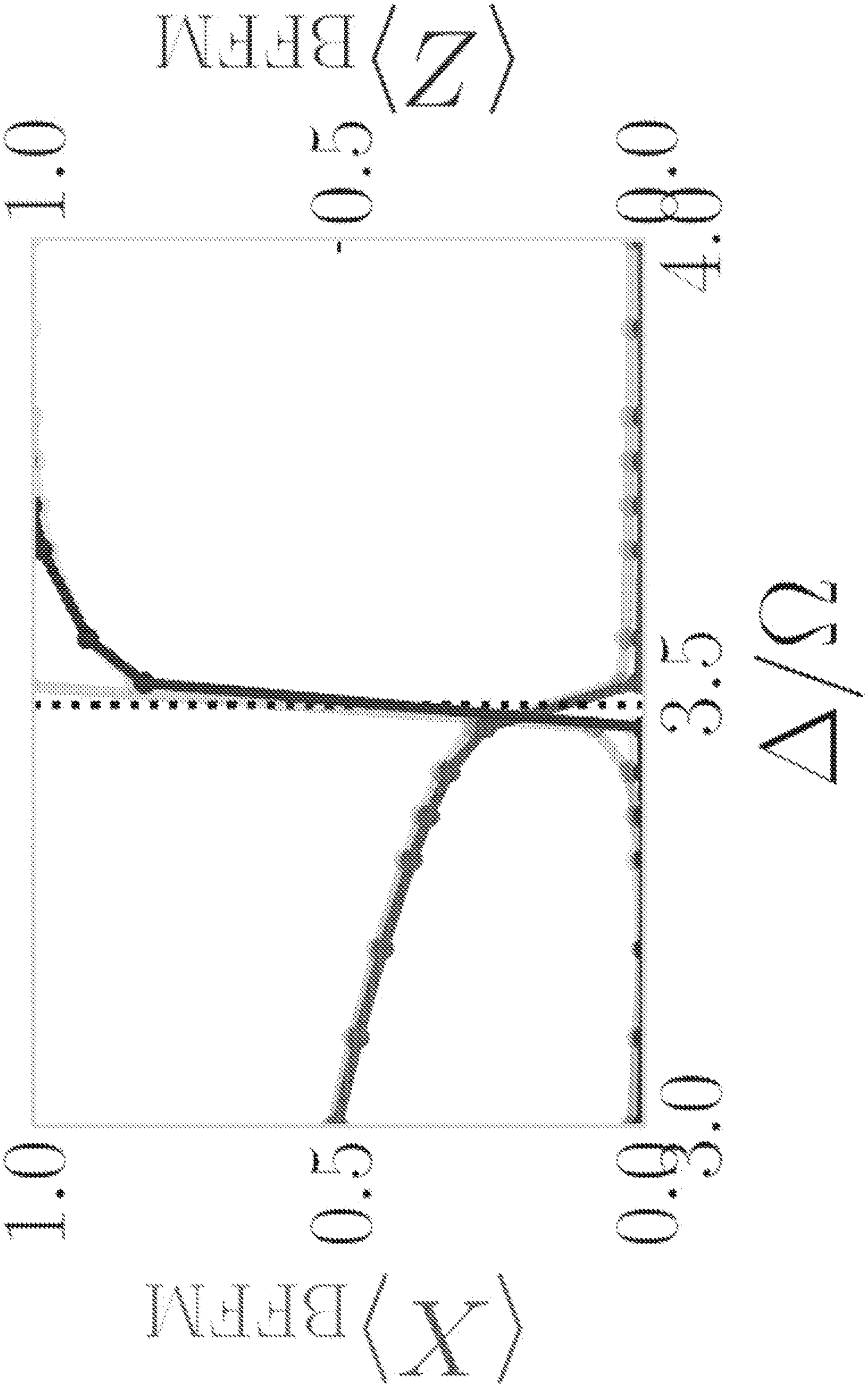
Figure 59F:
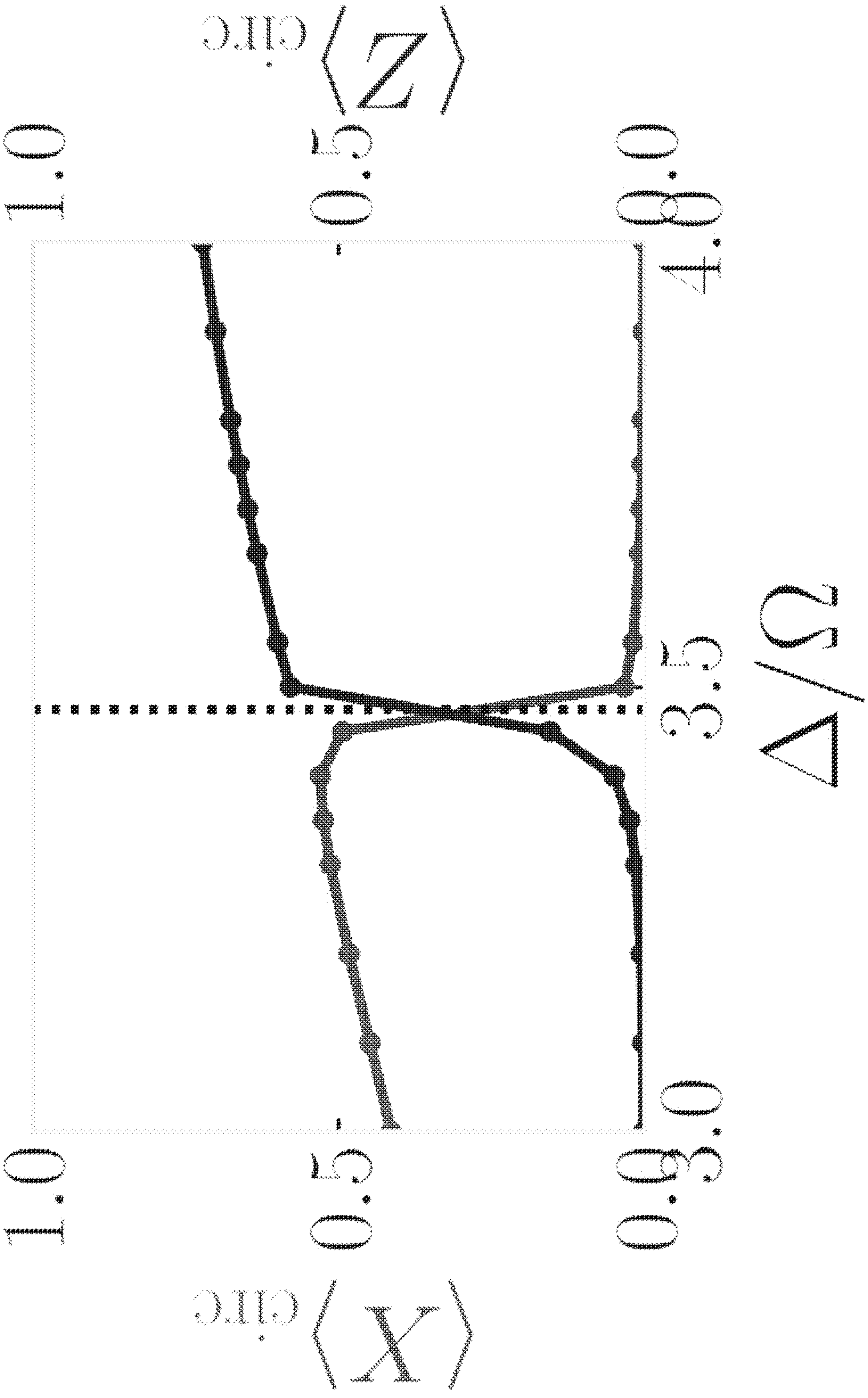

However, we find that the spin liquid is destabilized upon including even longer range interactions: for $R_{trunc}=\sqrt{7}a$ we find a spin liquid for $3.4 \lesssim \Delta/\Omega \lesssim 3.62$, for $R_{trunc}=4a$ we find that this has shrunken down to $3.45 \lesssim \Delta/\Omega \lesssim 3.52$, and for $R_{trunc}=6a$ there is no intervening spin liquid. FIG. 59D-F shows a direct first order phase transition at $$\frac{\Delta}{\Omega} \approx 3.47$$

from the trivial phase to a valence bond solid (VBS). These results are summarized in FIG. 60. We note that these conclusions are strictly valid for the Hamiltonian in Equation 20 and might be affected by additional terms, associated, e.g., with multi-body Rydberg interactions. Moreover, other modified ruby lattice geometries still support a ground state spin liquid phase even in the presence of these long range interactions. At the same time, we find that quasi-adiabatic state preparation used in the experiment is far more robust to these effects. In particular, as we will now show, such state preparation avoids the first order transition to the VBS and instead results in a state reflecting correlations characteristic of a quantum spin liquid.

Numerical Simulations of Dynamical State Preparation

Figure 61A:
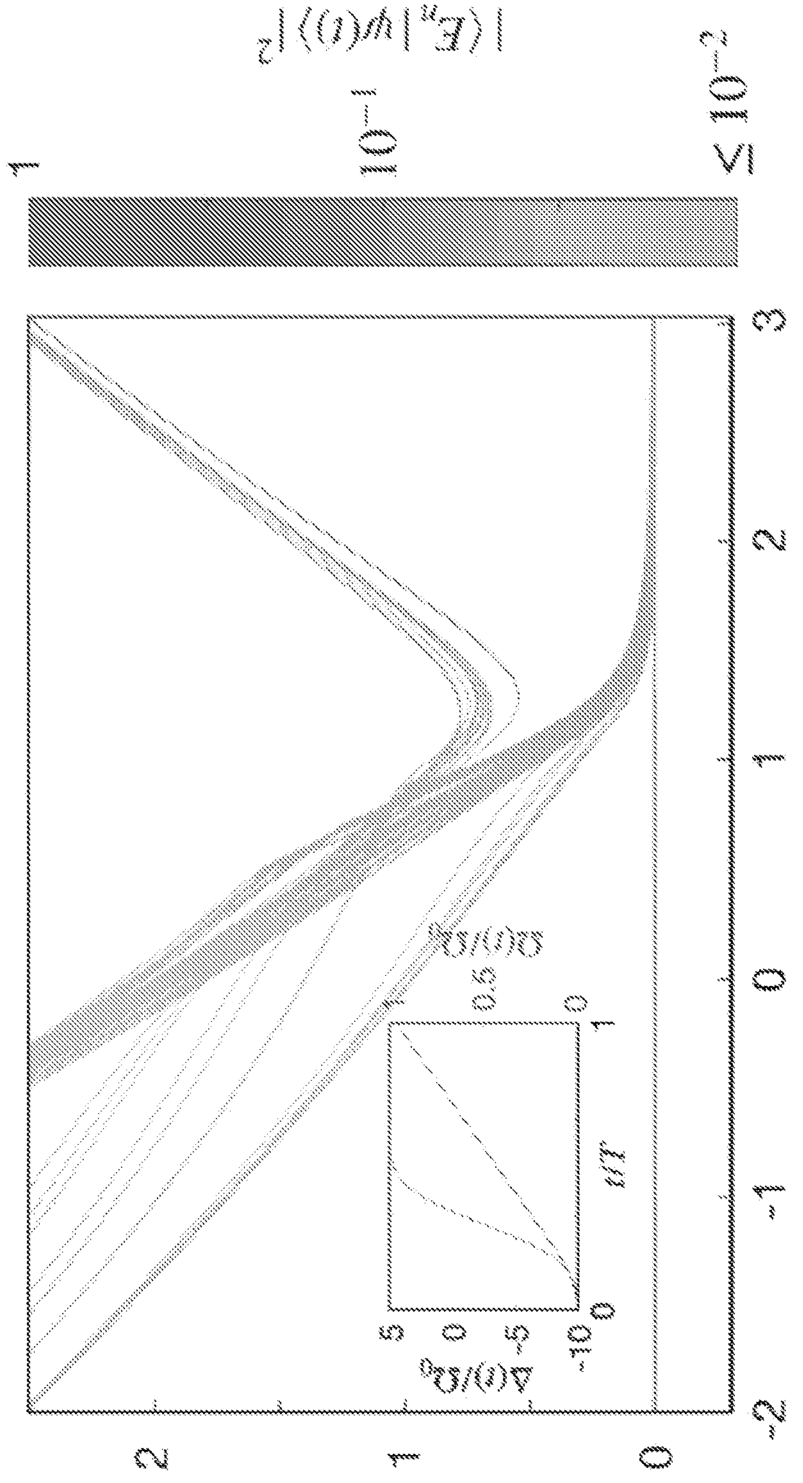
FIG. 61A-B illustrates dynamical state preparation in PXP model according to embodiments of the present disclosure.

Referring to FIG. 61, dynamical state preparation in PXP model is illustrated. (FIG. 61A) Lowest instantaneous eigenstates of the Hamiltonian in Equation 29 for 36 atoms on a torus. Colors indicate the populations of the state generated in the real time quench dynamics with Hamiltonian parameters given in the inset (data is shown for total sweep time $$T = \frac{60}{\Omega_0}).$$

(FIG. 61B) Decomposition of the ground state and the dynamically generated state at the end of the parameter sweep $$\left(\frac{\Delta}{\Omega_0} = 5\right)$$

over all dimer covering configurations for various sweep durations T. The total population in the dimer covering sector is $\sum_{i \in \mathcal{D}} |c_i|^2 = 0.27, 0.60, 0.82$ for $\Omega_0 T = 30, 60, 120$, respectively. For the ground state at $\Delta/\Omega=5$ the population in the dimer covering sector is 0.89. The inset shows the phase of each amplitude. For comparison, the experimental state preparation occurs over $\Omega_0 T=18$.

The detuning ramps, A (t), which are employed to generate various states, are motivated by the adiabatic principle. For sufficiently slow ramps, the system follows the instantaneous ground state adiabatically. In practice, finite coherence times limit the maximum evolution times, and require faster-than-adiabatic sweeps. This is expected to induce non-adiabatic processes, in particular close to the critical point, where the finite size gap is minimal.

Figure 62A:
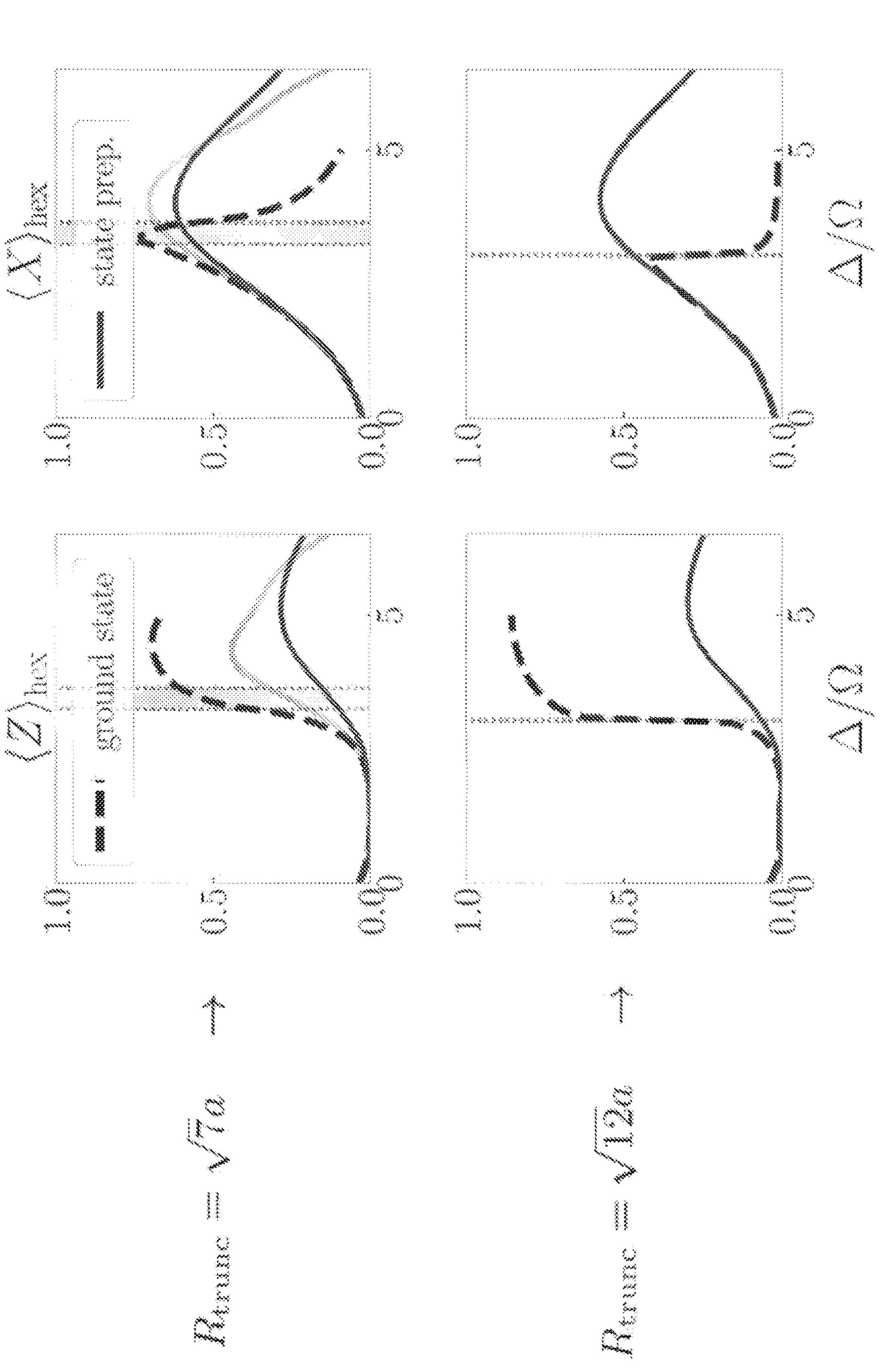
FIG. 62A-B illustrates dynamical state preparation in the van der Waals model according to embodiments of the present disclosure.
Figure 62B:
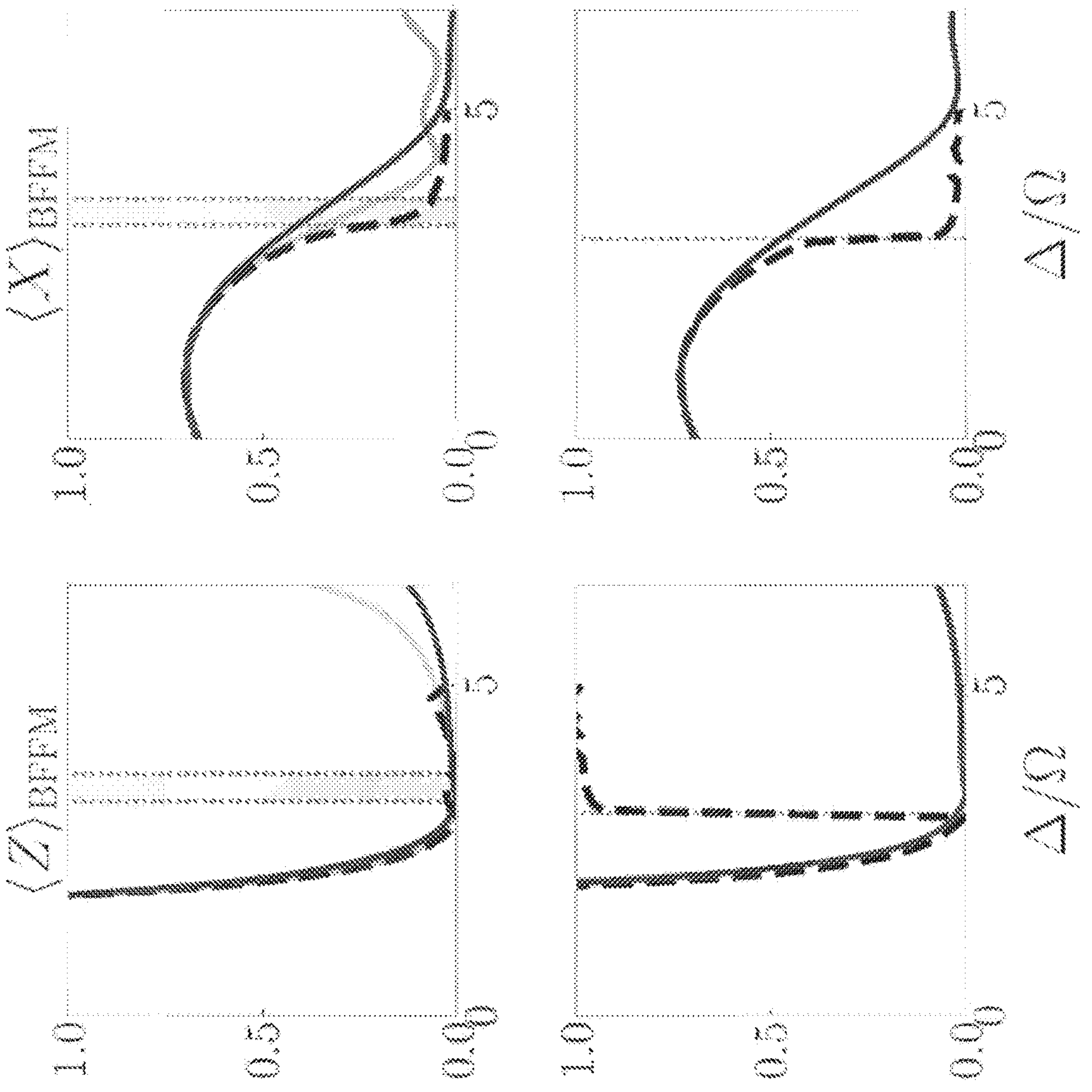
Figure 63A:
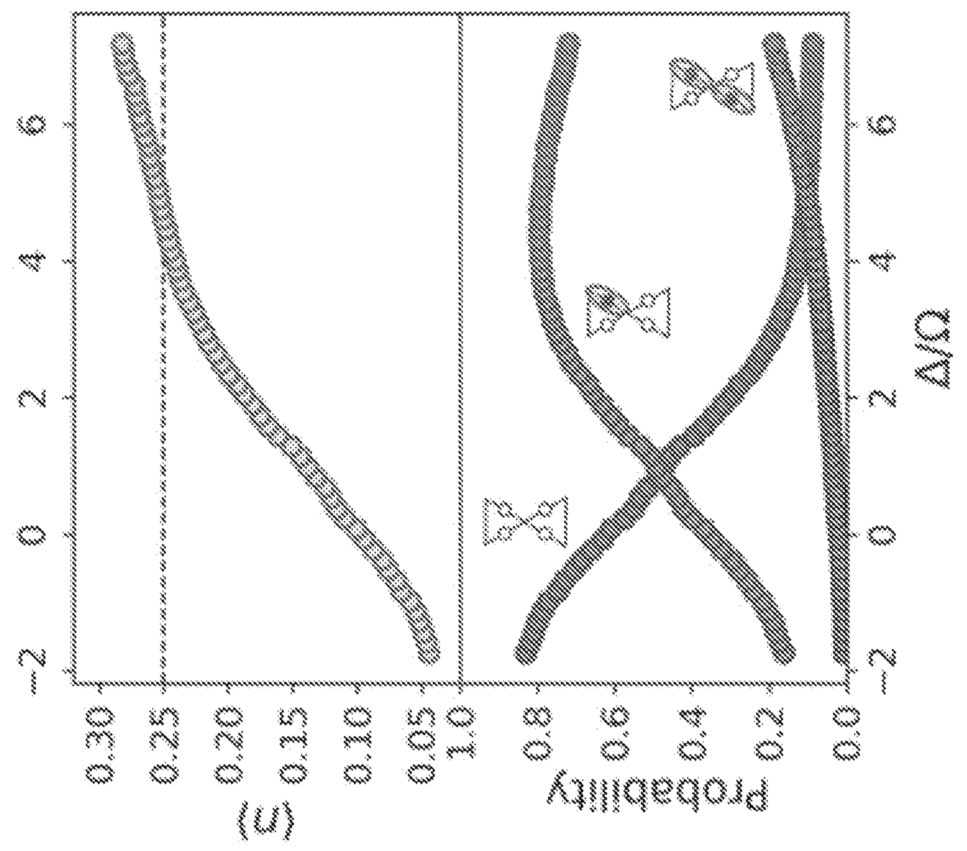
FIG. 63A-F is a comparison between experimental results and numerical simulations of dynamical state preparation according to embodiments of the present disclosure.
Figure 63B:
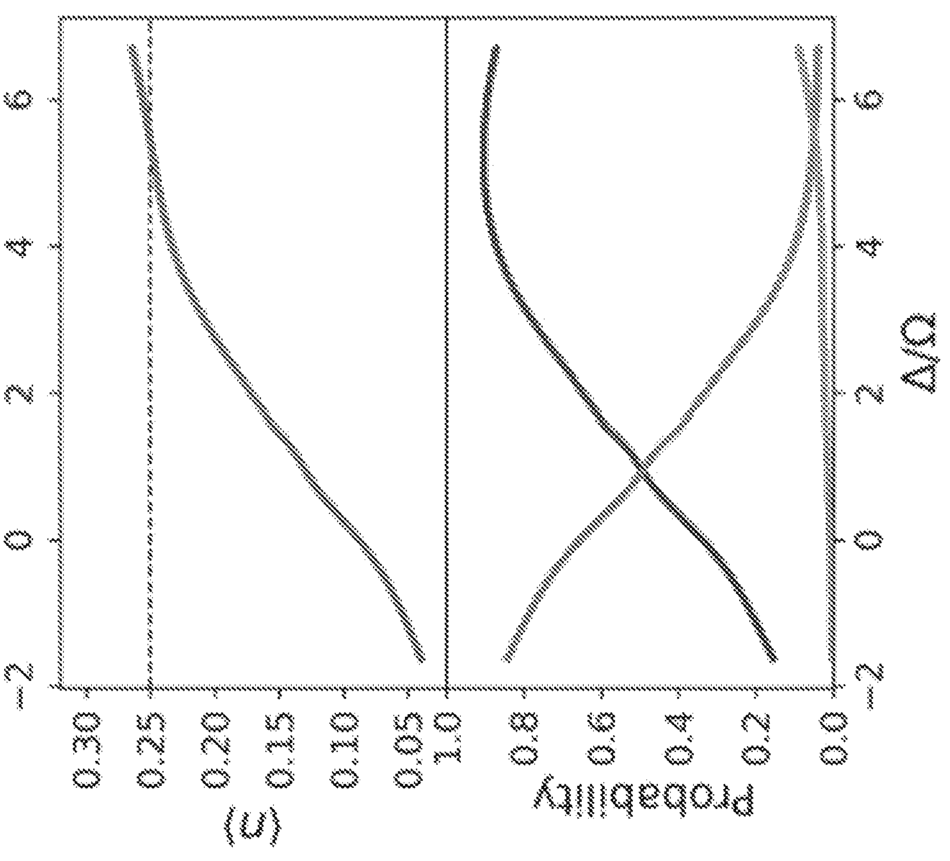
Figure 63C:
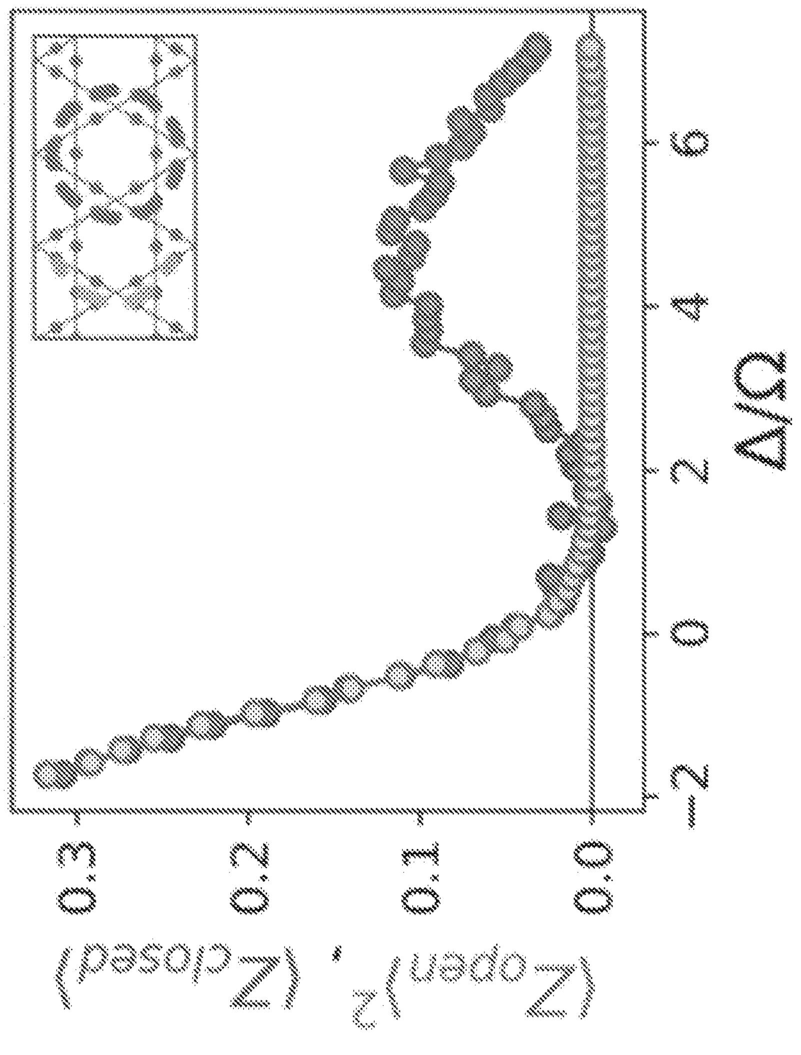
Figure 63D:
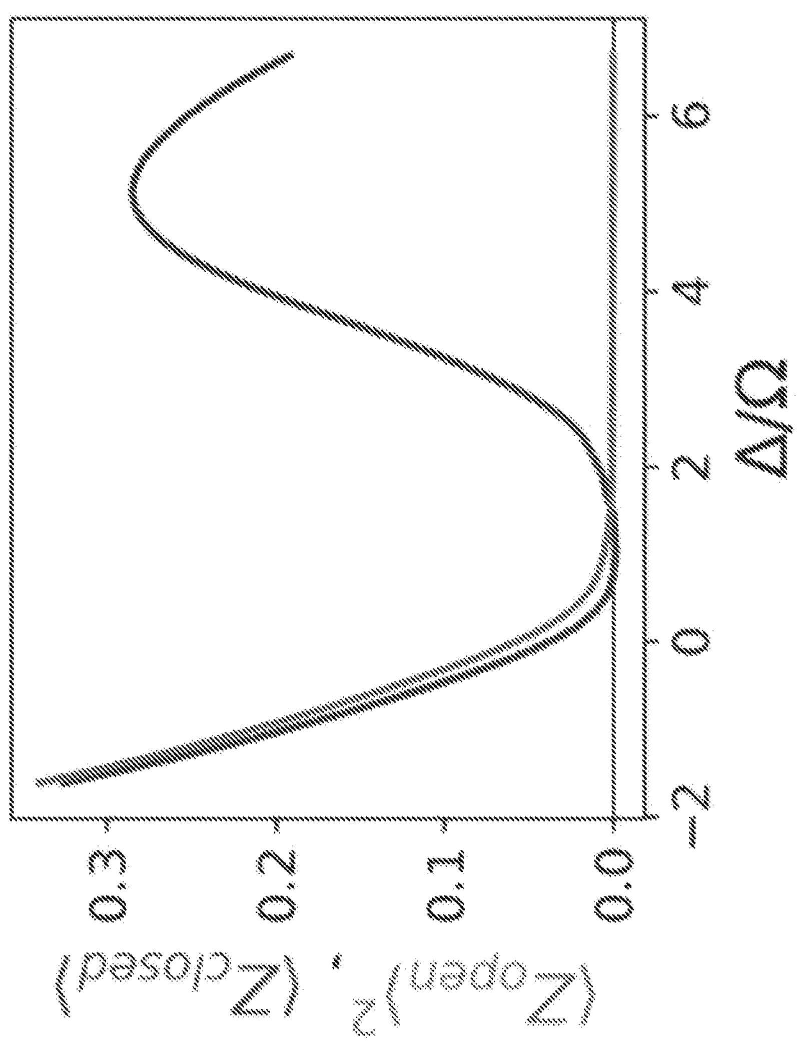
Figure 63E:
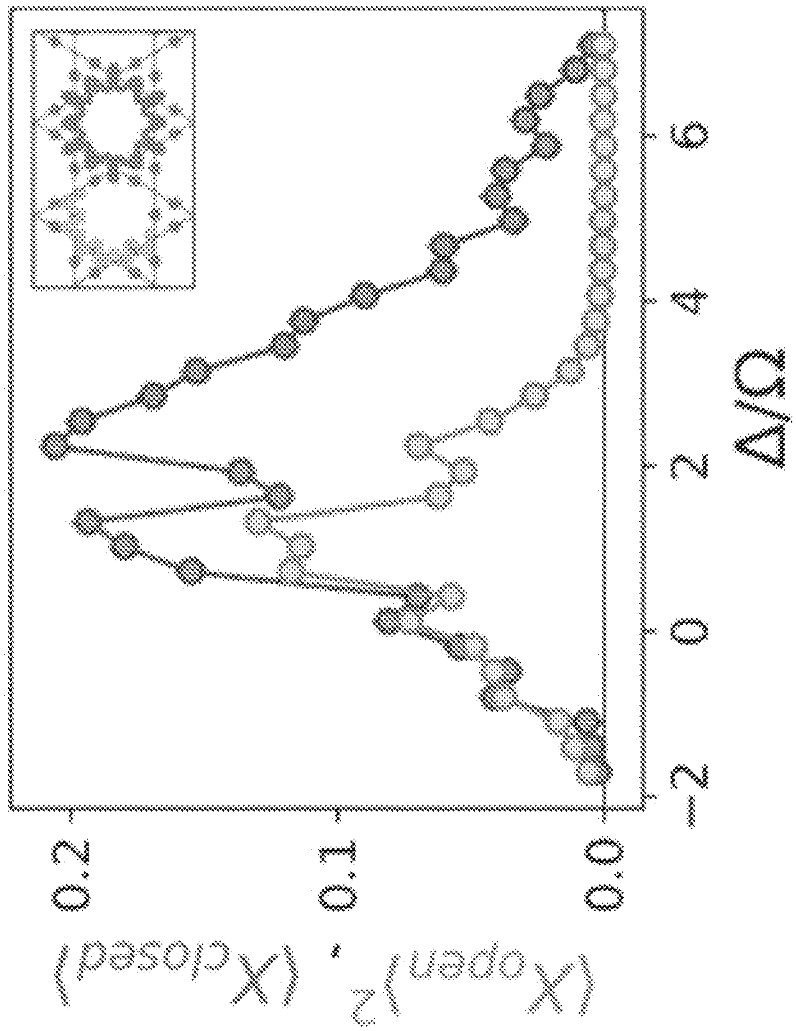
Figure 63F:
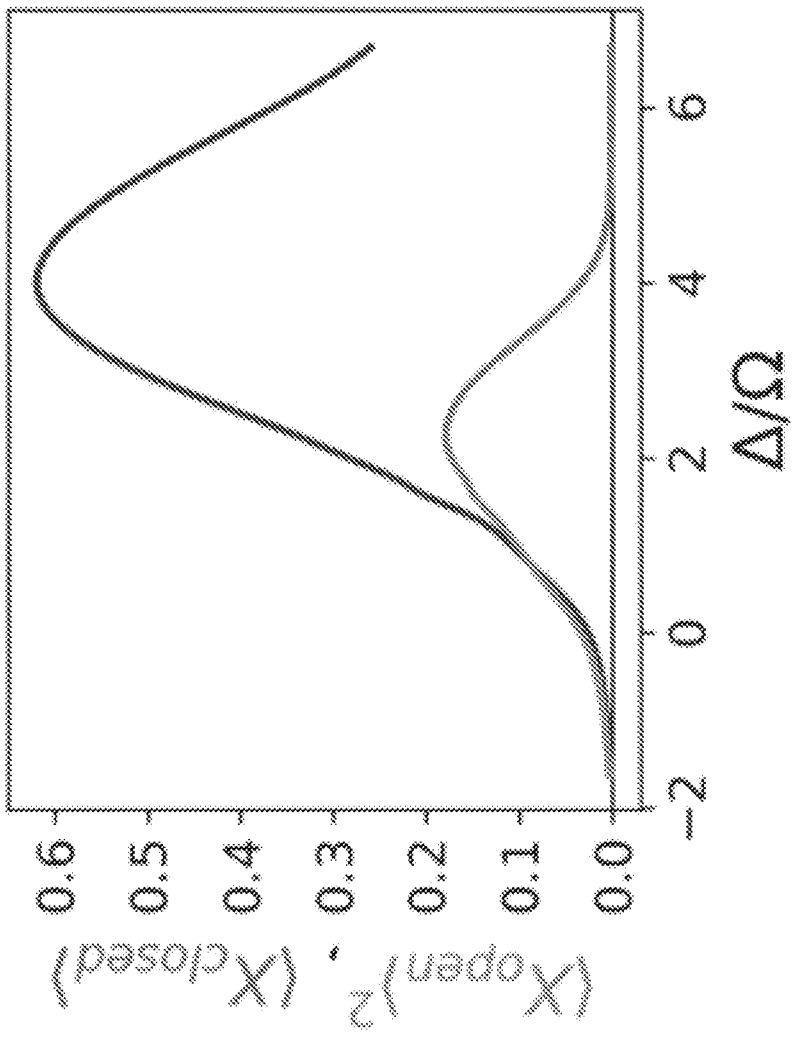

Referring to FIG. 62, dynamical state preparation in the van der Waals model is illustrated. Results are for the XC-4 cylinder for $R_b=2.4a$. The two rows correspond to two different truncation distances, as shown. For each panel, we show both the ground state result (blue dashed, obtained by DMRG) as well as the dynamical state preparation using the protocol in FIG. 47 (red solid, obtained by time-dependent DMRG; lighter solid line is for a sweep at half the speed). For the shorter truncation distance, the ground state hosts a spin liquid (blue shaded region). The diagonal loop around a hexagon is denoted by $\langle Z \rangle_{hex}$; the off-diagonal loop by $\langle X \rangle_{hex}$. The BFFM order parameters are evaluated for the open strings that correspond to half of these closed loops. Despite being short strings, due to the small system size, they already show a clear signature of a spin liquid where they both approximately vanish. Note that the ground state data for $R_{trunc}=\sqrt{7}a$ has a vanishing $\langle Z \rangle_{BFFM}$, even in the VBS phase: this is a finite-size artefact where the VBS phase consists of local resonances around the circumference. As a check, we also directly calculated the two-point correlator $\langle n_i n_j \rangle - \langle n_i \rangle \langle n_j \rangle$, which clearly shows the VBS order in the ground state, yet these correlations vanish in the time-evolved states (not shown). We conclude that dynamic state preparation is not sensitive to $R_{trunc}$, and the resulting state has properties which are similar to those of the ground state spin liquid (at $R_{trunc}=\sqrt{7}a$) albeit smeared out over a larger region.

Figure 61B:
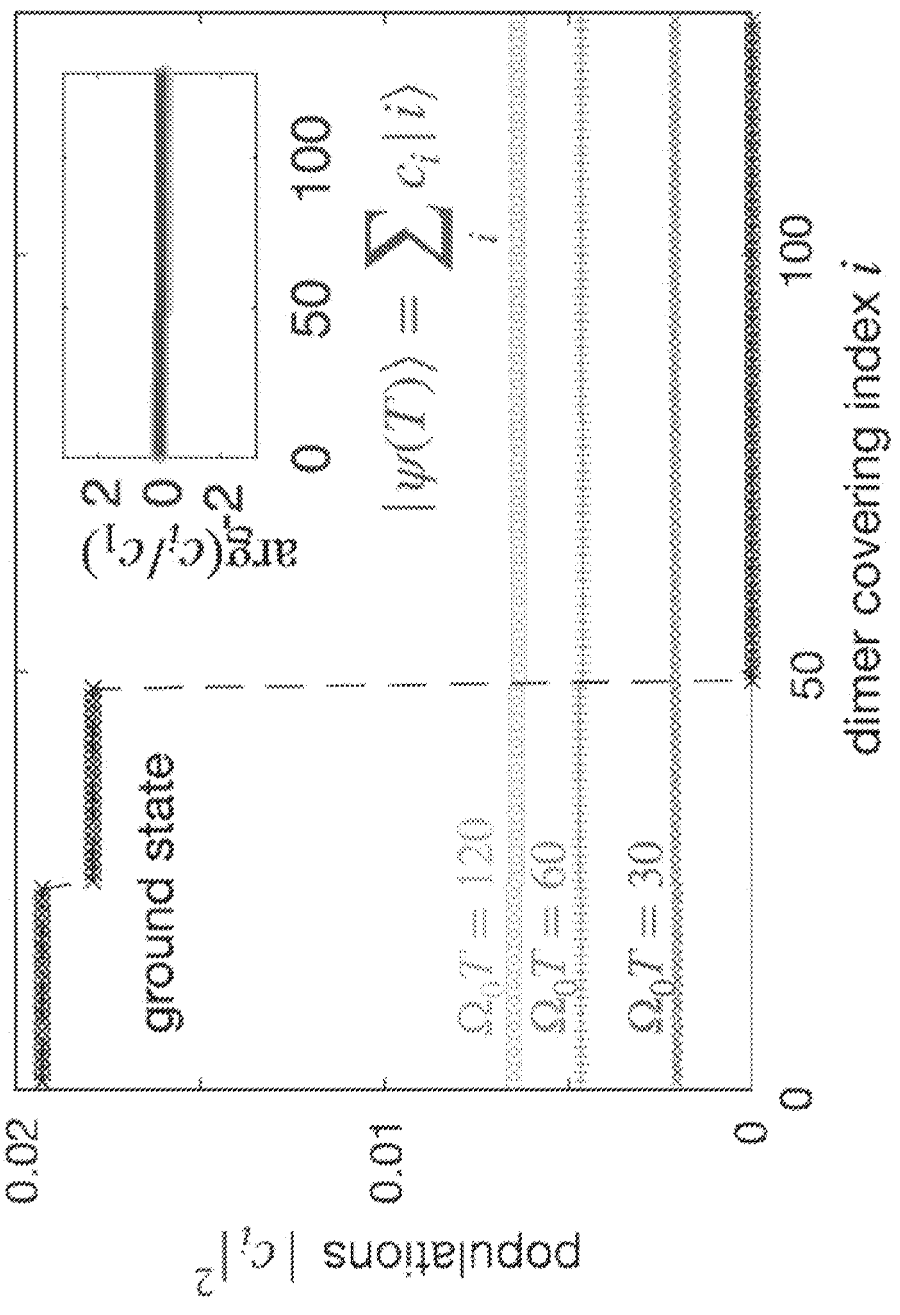

To develop an understanding for the quantum many-body states that are generated in such quasi-adiabatic sweeps, we numerically solve the corresponding Schrödinger equation to obtain the wavefunction $|\psi(t)\rangle = U(t)|\psi(0)\rangle$. We first discuss results from exact numerics on small system sizes of 36 atoms on a torus with 3×2 unit cells, using the simplified PXP-model (Equation 29). FIG. 61A shows the excitation spectrum of the instantaneous Hamiltonian throughout the sweep. Even though the system size is relatively small, the spectrum distinguishes a disordered region with a unique ground state at $\Delta/\Omega \lesssim 1.5$, and a region whose ground state physics is governed by the dimer covering configurations at $\Delta/\Omega \lesssim 1.5$. Note that the small system size does not allow to distinguish a spin liquid phase from a VBS phase in this second regime. The color of each individual instantaneous energy eigenvalue in FIG. 61A reflects the population of the wavefunction in the corresponding instantaneous eigenstate, $|\langle E_n|\psi(t)\rangle|^2$. We observe that non-adiabatic processes lead to finite population in states with energy $\sim\Delta$ outside the dimer covering subspace. This corresponds to the creation of pairs of monomers, consistent with the experimentally observed generation of a finite density of e-anyons. For the sweep profile shown in the inset, the total population in the dimer covering subspace, $\mathcal{D}$, at the end of the sweep is $\sum_{i \in \mathcal{D}} |\langle i|\psi(T)\rangle|^2 \approx 0.27, 0.60, 0.82$ for total sweep times $\Omega_0 T=30,60,120$ respectively, showing that the defect density can be controlled and reduced by decreasing the sweep rate. In FIG. 61B, we resolve the state $|\psi(t)\rangle$ within D at the end of the detuning sweep. At this point, the instantaneous ground state consists of a superposition of a subset of dimer covering configurations, akin to a VBS state. Nevertheless, the projection of the dynamically prepared state $|\psi(t)\rangle$ onto $\mathcal{D}$ consists of a superposition of all dimer coverings with nearly equal modulus and phase. This indicates that the system cannot resolve the slow dynamics within the dimer covering subspace during these finite-time sweeps, and instead "freezes" into a state that shares the essential features of the spin liquid state. This is consistent with our experimental observation of QSL characteristics in the dynamically prepared states over a relatively large parameter range, without any signatures of a VBS.

To further corroborate this picture, we also performed dynamical DMRG calculations for state preparation in the realistic model with van der Waals ($1/r^6$) interactions using the matrix product operator-based approach. We consider the infinitely-long XC-4 cylinder. As for the XC-8 results reported above, there is an intermediate spin liquid between the trivial phase and VBS phase for small truncation distance $R_{trunc}=\sqrt{7}a$: this ground state data is shown as the dashed blue lines in the top row of FIG. 62 (the shaded region highlights the intermediate spin liquid). For larger truncation distance $R_{trunc}=\sqrt{12}a$, the spin liquid is replaced by a direct first order phase transition (blue dashed lines in bottom row of FIG. 62). The dynamical state preparation data is shown as a solid red line: dark solid lines correspond to the same protocol as the experimental data (see FIG. 47); light solid line is twice as slow as the experiment.

The results in FIG. 62 imply a few salient points. Firstly, as far as dynamical state preparation is concerned, the results for the two truncation distances are very similar: the state preparation seems insensitive to longer-range interactions destroying the intermediate spin liquid in the ground state. Secondly, in both cases, the properties of the time-evolved state are qualitatively very similar to those of the ground state for $R_{trunc}=\sqrt{7}a$ in the spin liquid regime. The two main differences are: (a) the spin liquid-like state is spread out over a larger region and shifted to the right (minimum of the BFFM order parameters is achieved near $$\frac{\Delta}{\Omega} \approx 5),$$

and (b) the observables are slightly suppressed compared to their equilibrium values. With regard to the latter, we observe that the state which was prepared twice as slowly (light red line) gives improved results, in agreement with experimental observations, FIG. 53. This is consistent with the picture that already emerged from the dynamical simulations for the PXP model in FIG. 61: even if the ground state is not a spin liquid due to a first order transition to a VBS phase, the dynamically prepared state effectively exhibits spin liquid-like properties, presumably due to the freezing-out of m-anyons (which would need to condense to form the VBS phase). FIG. 63 demonstrates that the results of these dynamical simulations, despite different system sizes and geometry used, are in a good qualitative agreement with experimental observations.

Referring to FIG. 63, a comparison between experimental results and numerical simulations of dynamical state preparation is provided. The experimental data (FIG. 63A, C, E) is reproduced from FIGS. 42, 45, while in (FIG. 63B, D, F) we show the results of the time-dependent DMRG simulations for $R_{trunc}=\sqrt{7}a$, performed on the infinitely-long cylinder with a seven-atom-long circumference (XC-4).

The teachings of all patents, published applications and references cited herein are incorporated by reference in their entirety.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A device, comprising:

a two-dimensional array of particles, each particle disposed at a vertex of a ruby lattice having a parameter ρ greater than $$\frac{1}{\sqrt{2}};$$

each particle having a first state and an excited state;

each particle that belongs to at least three unit cells of the ruby lattice having a blockade radius, when in the excited state, sufficient to form a blockade of each of at least six nearest neighboring particles in the ruby lattice from transitioning from its first state to its excited state, and wherein the two-dimensional array has at least one outer edge configured to be in a first boundary condition.

2. The device of claim 1, wherein each particle is an atom, an ion, or a molecule.

3. The device of claim 1, wherein the blockade is a dipole blockade.

4. The device of claim 1, wherein the blockade is a Rydberg blockade.

5. The device of claim 1 wherein each particle is an atom, the first state is ground state, and the blockade is a Rydberg blockade.

6. The device of claim 1, wherein the two-dimensional array comprises at least a first outer edge and a third outer edge, each being in the first boundary condition, and at least a second outer edge and a fourth outer edge, each being in a second boundary condition, different from the first boundary condition.

7. The device of claim 1, wherein the two-dimensional array has a plurality of outer edges, each outer edge being either in the first boundary condition or a second boundary condition, each outer edge being in a different boundary condition than any adjacent outer edge.

8. The device of claim 6, wherein the outer edges configured to be in the first boundary condition are e-condensed, and the outer edges configured to be in the second boundary condition are m-condensed.

9. The device of claim 7, wherein the two-dimensional array comprises at least one interior edge.

10. The device of claim 9, wherein each vertex enclosed by the at least one interior edge is not particle-occupied.

11. The device of claim 10, wherein the at least one interior edge is at a same boundary condition as at least one outer edge of the plurality of outer edges.

12. The device of claim 9, wherein the at least one interior edge encloses at least four vertices.

13. The device of claim 9, wherein the at least one interior edge encloses particle-occupied vertices.

14. The device of claim 13, wherein the at least one interior edge is in the first boundary condition, different from at least one outer edge of the plurality of outer edges.

15. The device of claim 9, wherein the two-dimensional array has a plurality of interior edges, each interior edge enclosing a corresponding plurality of vertices, each of which is not particle-occupied.

16. The device of claim 9, wherein the two-dimensional array has a plurality of interior edges, each interior edge enclosing a corresponding plurality of vertices, wherein at least one enclosed vertex is particle-occupied.

17. The device of claim 16, wherein an interior edge enclosing the at least one enclosed vertex that is particle-occupied is at a boundary condition different from at least one outer edge of the plurality of outer edges.

18. The device of claim 17, wherein edges configured to be at different boundary conditions are selected from e-condensed or m-condensed edges.

19. The device of claim 1, wherein the two-dimensional array comprises at least 96 particles.

20. The device of claim 1, wherein the two-dimensional array comprises at least 200 particles.

21. A system comprising:

a confinement system for arranging particles in a two-dimensional array, wherein:

each particle is disposed at a vertex of a ruby lattice;

each particle has a first state and an excited state;

each particle that belongs to at least three unit cells of the ruby lattice has a blockade radius, when in the excited state, sufficient to blockade each of at least six nearest neighboring particles in the ruby lattice from transitioning from its first state to its excited state, and wherein two-dimensional the array has at least one outer edge configured to be at a first boundary condition;

the confinement system comprising:

a laser source arranged to create a plurality of confinement regions;

a source of an atom cloud, the atom cloud capable of being positioned to at least partially overlap with the plurality of confinement regions; and an excitation source for exciting at least some of the particles from the first state to the excited state.

22. The system of claim 21, wherein the particles are atoms, and wherein the excitation source is configured to excite at least some of the atoms into a Rydberg state.

23. The system of claim 21, wherein the two-dimensional array comprises at least 96 particles.

24. The system of claim 21, wherein the two-dimensional array comprises at least 200 particles.

25. A method of making a $\mathbb{Z}_2$ Quantum Spin Liquid ($\mathbb{Z}_2$ QSL), comprising:

arranging a two-dimensional array of particles, wherein:

each particle is disposed at a vertex of a ruby lattice having a parameter ρ greater than $$\frac{1}{\sqrt{2}};$$

each particle has a first state and an excited state;

the two-dimensional array has at least one outer edge;

exciting about 25% of the particles into the excited state, thereby causing each particle in the excited state that belongs to at least three unit cells of the ruby lattice to have a blockade radius sufficient to blockade at least six nearest neighboring particles in the ruby lattice; and optionally, imposing a first boundary condition on the at least one outer edge.

26. The method of claim 25, wherein the particles are atoms and the excited state is a Rydberg state.

27. A method of encoding a topological qubit in a $\mathbb{Z}_2$ Quantum Spin Liquid ($\mathbb{Z}_2$ QSL), comprising:

preparing a $\mathbb{Z}_2$ QSL according to the method of claim 25, wherein the two-dimensional array comprises at least a first outer edge, a second outer edge, a third outer edge, and a fourth outer edge;

imposing a first boundary condition on the first and third outer edges and imposing a second boundary condition on the second and fourth outer edges.

28. The method of claim 27, wherein the two-dimensional array has a plurality of outer edges, the method further comprising imposing either the first boundary condition or the second boundary condition on each outer edge, each outer edge having a different boundary condition than any adjacent outer edge.

29. The method of claim 27, wherein the outer edges configured to be in the first boundary condition are e-condensed, and the outer edges configured to be in the second boundary condition are m-condensed.

30. A method of encoding a topological qubit in a $\mathbb{Z}_2$ Quantum Spin Liquid ($\mathbb{Z}_2$ QSL), comprising:

preparing a $\mathbb{Z}_2$ QSL according to the method of claim 25, wherein the two-dimensional array comprises at least one interior edge.

31. The method of claim 30, wherein each vertex enclosed by the at least one interior edge is not particle-occupied.

32. The method of claim 31, wherein the at least one interior edge encloses at least four vertices.

33. The method of claim 30, wherein the at least one interior edge encloses particle-occupied vertices.

34. The method of claim 33, further comprising imposing on the at least one interior edge a boundary condition that is different from the boundary condition of the at least one outer edge.

35. The method of claim 33, further comprising imposing on the at least one interior edge a boundary condition that is a same boundary condition as that of the at least one outer edge.

36. The method of claim 30, wherein the two-dimensional array has a plurality of interior edges, each interior edge enclosing a corresponding plurality of vertices, wherein at least one enclosed vertex is particle-occupied.

37. The method of claim 36, further comprising imposing a boundary condition on an interior edge of the plurality of interior edges and enclosing the at least one particle-occupied vertex that is different from the boundary condition of the at least one outer edge.

38. The method of claim 37, wherein the interior edge configured to be at a different boundary condition is selected from e-condensed or m-condensed edges.

39. A method of reading a state of a topological qubit encoded in a $\mathbb{Z}_2$ Quantum Spin Liquid ($\mathbb{Z}_2$ QSL), the method comprising:

receiving an indication of a state of each particle of a two-dimensional array of particles, each particle disposed at a vertex of a ruby lattice;

each particle having a first state and an excited state;

each particle that belongs to at least three unit cells of the ruby lattice having a blockade radius, when in the excited state, sufficient to blockade each of at least six nearest neighboring particles in the ruby lattice from transitioning from its first state to its excited state, and wherein the two-dimensional array has a plurality of outer edges, each outer edge being either in a first boundary condition or in a second boundary condition, each outer edge being in a different boundary condition than any adjacent outer edge;

determining a first path through the two-dimensional array from a first outer edge of the plurality of outer edges having the first boundary condition to a second outer edge of the plurality of outer edges having the first boundary condition via a first plurality of vertices of the ruby lattice having thereat a first plurality of particles;

assigning a first value to the first path based on the state of each of the first plurality of particles;

based on the first value, determining the state of a first topological qubit.

40. The method of claim 39, wherein, prior to determining the first path, a basis rotation is applied to the first topological qubit.

41. The method of claim 39, further comprising determining a second path through the two-dimensional array from the first outer edge of the plurality of outer edges to the second outer edge of the plurality of outer edges via a second plurality of vertices of the ruby lattice having thereat a second plurality of particles;

assigning a second value to the second path based on the state of each of the second plurality of particles; and based on the first and second values, determining the state of the first topological qubit.

42. The method of claim 41, further comprising:

determining a third path through the two-dimensional array from the first outer edge of the plurality of outer edges to a third outer edge of the plurality of outer edges having the first boundary condition, via a third plurality of vertices of the ruby lattice having thereat a third plurality of particles;

assigning a third value to the third path based on the state of each of the third plurality of particles; and based on the third value, determining the state of a second topological qubit.

43. A method of reading a state of a topological qubit encoded in a $\mathbb{Z}_2$ Quantum Spin Liquid ($\mathbb{Z}_2$ QSL), the method comprising:

receiving an indication of a state of each particle of a two-dimensional array of particles, each particle disposed at a vertex of a ruby lattice;

each particle having a first state, and an excited state;

each particle that belongs to at least three unit cells of the ruby lattice having a blockade radius, when in the excited state, sufficient to blockade each of at least six nearest neighboring particles in the ruby lattice from transitioning from its first state to its excited state, and wherein the two-dimensional array comprises at least one outer edge and at least one interior edge;

determining a first path through the two-dimensional array from the at least one interior edge to the at least one outer edge via a first plurality of vertices of the ruby lattice having thereat a first plurality of particles;

assigning a first value to the first path based on the state of each of the first plurality of particles;

based on the first value, determining the state of a first topological qubit.

44. The method of claim 43, further comprising:

determining a second path through the two-dimensional array from the at least one interior edge to the at least one outer edge via a second plurality of vertices of the ruby lattice having thereat a second plurality of particles;

assigning a second value to the first path based on the state of each of the second plurality of particles;

based on the first and second values, determining the state of the first topological qubit.

45. The method of claim 43, wherein the two-dimensional array has at least a second interior edge, the method further comprising:

determining a third path through the two-dimensional array from the second interior edge to the at least one outer edge via a third plurality of vertices of the ruby lattice having thereat a third plurality of particles;

assigning a third value to the third path based on the state of each of the third plurality of particles;

based on the third value, determining the state of a second topological qubit.

46. The method of claim 39, wherein determining the first path comprises:

assembling the path piecewise from a plurality of segments, each segment extending between two vertices in the ruby lattice wherein each segment either:

extends between two vertices in a triangular portion of a unit cell of the ruby lattice, or extends between two vertices in different unit cells of the ruby lattice without crossing any unit cells of the ruby lattice.

47. The method of claim 39, wherein determining the first path comprises:

assembling the first path piecewise from a plurality of segments, each segment extending between two vertices in the ruby lattice wherein each segment:

extends between two vertices in a quadrilateral portion of a unit cell of the ruby lattice.

48. A method of operating on a topological qubit, comprising:

preparing a topological qubit according to the method of claim 27, wherein the first boundary condition is an e-boundary condition;

creating a first and a second e-anyon in the two-dimensional array;

removing the first e-anyon from the two-dimensional array via the first outer edge and removing the second e-anyon from the two-dimensional array via the third outer edge.

49. A method of operating on a topological qubit, comprising:

preparing a topological qubit according to the method of claim 30, creating a first and a second e-anyon in the two-dimensional array;

pinning the first e-anyon; and moving the second e-anyon along a circular path circumscribing the at least one interior edge and having an end point at a position of the first e-anyon, thereby destroying the first and the second e-anyons.

50. A method of encoding a first and a second topological qubit in a $\mathbb{Z}_2$ Quantum Spin Liquid ($\mathbb{Z}_2$ QSL), comprising:

preparing a $\mathbb{Z}_2$ QSL according to the method of claim 25, wherein the two-dimensional array comprises a first interior edge and a second interior edge, the first interior edge having a first boundary condition and the second interior edge having a second boundary condition different from the first boundary condition, the first topological qubit corresponding to the first interior edge and the second topological qubit corresponding to the second interior edge, the two-dimensional array comprises a first outer edge, the first outer edge having the first boundary condition, the two-dimensional array comprises an additional edge, the additional edge having the second boundary condition and being either an interior edge or an outer edge.

51. A method of operating on a first and second topological qubit, comprising: encoding the first and second topological qubit according to the method of claim 50;

moving the first interior edge along a closed continuous path circumscribing the second interior edge.

52. The method of claim 50, wherein either (i) the first boundary condition is m-condensed and the second boundary condition is e-condensed, or (ii) the first boundary condition is e-condensed and the second boundary condition is m-condensed.

53. The method of claim 43, wherein determining the first path comprises:

assembling the first path piecewise from a plurality of segments, each segment extending between two vertices in the ruby lattice wherein each segment either:

extends between two vertices in a triangular portion of a unit cell of the ruby lattice, or extends between two vertices in different unit cells of the ruby lattice without crossing any unit cells of the ruby lattice.

54. The method of claim 43, wherein determining the first path comprises:

assembling the first path piecewise from a plurality of segments, each segment extending between two vertices in the ruby lattice wherein each segment:

extends between two vertices in a quadrilateral portion of a unit cell of the ruby lattice.

* * * * *